United States Patent
Lee et al.

(10) Patent No.: US 10,858,375 B2
(45) Date of Patent: Dec. 8, 2020

(54) NITROGENOUS CYCLIC COMPOUND AND COLOR CHANGING FILM COMPRISING SAME

(71) Applicant: LG CHEM, LTD., Seoul (KR)

(72) Inventors: Milim Lee, Daejeon (KR); Seonkyoung Son, Daejeon (KR); Cheol Jun Song, Daejeon (KR); Sang Pil Moon, Daejeon (KR); Hoyong Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/494,673

(22) PCT Filed: Nov. 9, 2018

(86) PCT No.: PCT/KR2018/013592
§ 371 (c)(1),
(2) Date: Sep. 16, 2019

(87) PCT Pub. No.: WO2019/093805
PCT Pub. Date: May 16, 2019

(65) Prior Publication Data
US 2020/0095265 A1    Mar. 26, 2020

(30) Foreign Application Priority Data
Nov. 10, 2017  (KR) .................. 10-2017-0149750

(51) Int. Cl.
*C07F 5/02*        (2006.01)
*C07F 7/08*        (2006.01)
*F21V 8/00*        (2006.01)
*G02F 1/1335*      (2006.01)

(52) U.S. Cl.
CPC ............ *C07F 5/022* (2013.01); *C07F 7/0812* (2013.01); *G02B 6/0055* (2013.01); *G02F 1/133514* (2013.01)

(58) Field of Classification Search
None
See application file for complete search history.

(56) References Cited

U.S. PATENT DOCUMENTS
2017/0349822 A1   12/2017   Lee et al.

FOREIGN PATENT DOCUMENTS

| | | |
|---|---|---|
| CN | 103865290 A | 6/2014 |
| JP | 2011-241160 A | 12/2011 |
| KR | 10-1590299 B1 | 2/2016 |

OTHER PUBLICATIONS

Jin et al., "Rational design of organoboron heteroarene derivatives as luminescent and charge transport materials for organic light-emitting diodes", New Journal of Chemistry, 2015, vol. 39, No. 10, pp. 8188-8194.
Wang, et al., "Synthesis and optophysical properties of dimeric aza-BODIPY dyes with a push-pull benzodipyrrolidone core", Chemical Communications, 2014, vol. 50, pp. 11540-11542.
(Continued)

*Primary Examiner* — Clinton A Brooks
(74) *Attorney, Agent, or Firm* — Rothwell, Figg, Ernst & Manbeck, P.C.

(57) ABSTRACT

The present specification relates to a compound containing nitrogen, and a color conversion film, a backlight unit, and a display device, including the same.

9 Claims, 1 Drawing Sheet

(56) References Cited

OTHER PUBLICATIONS

Shimizu, et al., "Benzo[c,d]indole-Containing Aza-BODIPY Dyes: Asymmetrization-Induced Solid-State Emission and Aggregation-Induced Emission Enhancement as New Properties of a Well-Known Chromophore", Chem. Eur. J., 2015, vol. 21, pp. 12996-13003.

International Search Report and Written Opinion issued for PCT application No. PCT/KR2018/013592 dated Feb. 8, 2019, 11 pages.

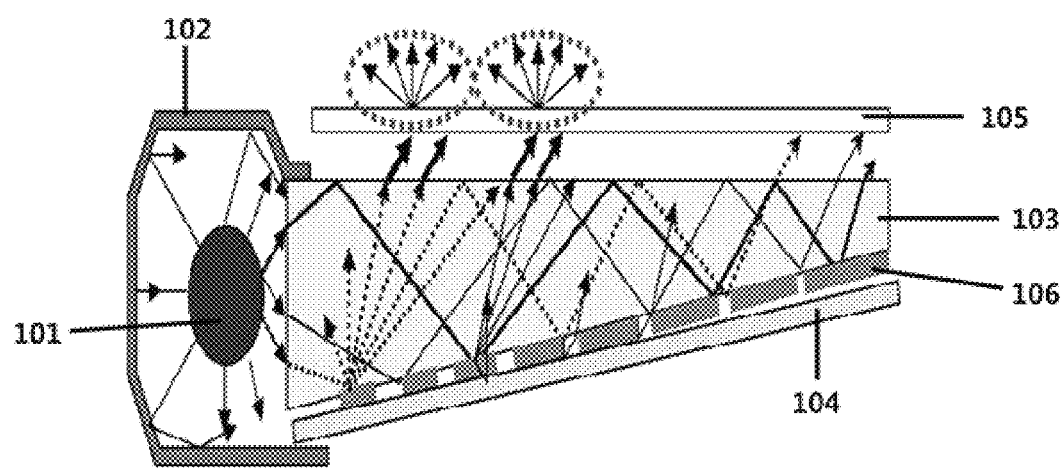

NITROGENOUS CYCLIC COMPOUND AND COLOR CHANGING FILM COMPRISING SAME

This application is a 35 U.S.C. 371 National Phase Entry Application from PCT/KR2018/013592, filed Nov. 9, 2018, which claims priority to and the benefit of Korean Patent Application Nos. 10-2017-0149750 and 10-2018-0136957 filed in the Korean Intellectual Property Office on Nov. 10, 2017 and Nov. 10, 2018, respectively, the entire contents of which are incorporated herein by reference.

TECHNICAL FIELD

The present specification relates to a cyclic compound containing nitrogen, and a color conversion film, a backlight unit, and a display device, including the same.

BACKGROUND ART

The existing light emitting diodes (LEDs) are obtained by mixing a green phosphor and a red phosphor with a blue light emitting diode or mixing a yellow phosphor and a blue-green phosphor with a UV light emission light emitting diode. However, in this method, it is difficult to control colors, and accordingly, the color rendition is not good. Therefore, the color gamut deteriorates.

In order to overcome the deterioration in the color gamut and reduce the production costs, methods of implementing green and red colors have been recently attempted by using a method of producing a quantum dot in the form of a film and combining the same with a blue LED. However, cadmium-based quantum dots have safety problems, and the other quantum dots have much lower efficiencies than those of the cadmium-based quantum dots. Further, quantum dots have low stability against oxygen and water, and have a disadvantage in that the performance thereof significantly deteriorates when the quantum dots are aggregated. In addition, when quantum dots are produced, it is difficult to constantly maintain the size thereof, and thus, the production cost is high.

PRIOR ART DOCUMENT

Patent Document

Korean Patent Application Laid-Open No. 2000-0011622

DISCLOSURE

Technical Problem

The present specification provides a compound containing nitrogen, and a color conversion film, a backlight unit, and a display device, including the same.

Technical Solution

An exemplary embodiment of the present specification provides a compound represented by the following Formula 1.

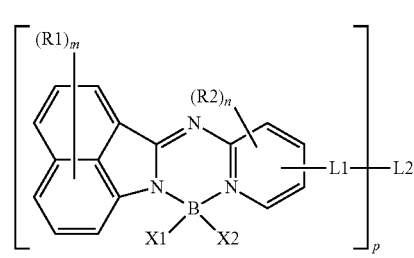

[Formula 1]

In Formula 1, p is an integer of 2 or more, and structures in the parenthesis are the same as or different from each other, L1 and L2 are the same as or different from each other, and are each independently a direct bond; —SiR$_{101}$R$_{102}$—; —SO$_2$—; —O—; —NR$_{103}$—; —C(=O)O—; a substituted or unsubstituted alkylene group; a substituted or unsubstituted cycloalkylene group; a substituted or unsubstituted arylene group; or a substituted or unsubstituted divalent heterocyclic group, R1 and R2 are the same as or different from each other, and are each independently hydrogen; deuterium; a halogen group; a cyano group; a nitro group; a carbonyl group; a carboxyl group (—COOH); an ether group; a hydroxyl group; —C(=O)NR$_{104}$R$_{105}$; C(=O)OR$_{106}$; a substituted or unsubstituted alkyl group; a substituted or unsubstituted cycloalkyl group; a substituted or unsubstituted alkoxy group; a substituted or unsubstituted aryloxy group; a substituted or unsubstituted alkenyl group; a substituted or unsubstituted amine group; a substituted or unsubstituted alkylamine group; a substituted or unsubstituted arylamine group; a substituted or unsubstituted aryl group; a substituted or unsubstituted haloalkyl group; a substituted or unsubstituted silyl group; or a substituted or unsubstituted heterocyclic group, or adjacent groups may be bonded to each other to form a ring, m is an integer from 0 to 6, and when m is 2 or more, R1's are the same as or different from each other, n is an integer from 0 to 3, and when n is 2 or more, R2's are the same as or different from each other, R$_{101}$ to R$_{107}$ are the same as or different from each other, and are each independently hydrogen; deuterium; a substituted or unsubstituted alkyl group; a substituted or unsubstituted fluoroalkyl group; a substituted or unsubstituted aryl group; or a substituted or unsubstituted heterocyclic group, and X1 and X2 are the same as or different from each other, and are each independently a halogen group; a cyano group; a substituted or unsubstituted alkyl group; a substituted or unsubstituted alkynyl group; a substituted or unsubstituted alkoxy group; a substituted or unsubstituted ether group; a substituted or unsubstituted —C(=O)OR$_{107}$; a substituted or unsubstituted aryl group; a substituted or unsubstituted aryloxy group; or a substituted or unsubstituted aralkyl group.

Another exemplary embodiment of the present specification provides a color conversion film including: a resin matrix; and the compound represented by Formula 1, which is dispersed in the resin matrix.

Still another exemplary embodiment of the present specification provides a backlight unit including the color conversion film.

Yet another exemplary embodiment of the present specification provides a display device including the backlight unit.

Advantageous Effects

A compound according to an exemplary embodiment of the present specification has better processability and light fastness than a compound having an aza-BODIPY structure in the related art. Therefore, by using the compound described in the present specification as a fluorescent material of a color conversion film, it is possible to provide a color conversion film which has excellent brightness and color gamut and excellent light fastness.

DESCRIPTION OF DRAWINGS

FIG. 1 is a schematic view in which a color conversion film according to an exemplary embodiment of the present specification is applied to a backlight.

MODE FOR INVENTION

Hereinafter, the present application will be described in more detail.

An exemplary embodiment of the present specification provides the compound represented by Formula 1.

When one part "includes" one constituent element in the present specification, unless otherwise specifically described, this does not mean that another constituent element is excluded, but means that another constituent element may be further included.

When one member is disposed "on" another member in the present specification, this includes not only a case where the one member is brought into contact with another member, but also a case where still another member is present between the two members.

Examples of the substituents in the present specification will be described below, but are not limited thereto.

The term "substitution" means that a hydrogen atom bonded to a carbon atom of a compound is changed into another substituent, and a position to be substituted is not limited as long as the position is a position at which the hydrogen atom is substituted, that is, a position at which the substituent may be substituted, and when two or more are substituted, the two or more substituents may be the same as or different from each other.

In the present specification, the term "substituted or unsubstituted" means being substituted with one or two or more substituents selected from the group consisting of deuterium; a halogen group; a cyano group; a nitro group; a carbonyl group; a carboxyl group (—COOH); an ether group; an ester group; a hydroxyl group; a substituted or unsubstituted alkyl group; a substituted or unsubstituted cycloalkyl group; a substituted or unsubstituted alkoxy group; a substituted or unsubstituted aryloxy group; a substituted or unsubstituted alkenyl group; a substituted or unsubstituted silyl group; a substituted or unsubstituted aryl group; and a substituted or unsubstituted heterocyclic group or being substituted with a substituent to which two or more substituents are linked among the substituents exemplified above, or having no substituent. For example, "the substituent to which two or more substituents are linked" may be a biphenyl group. That is, the biphenyl group may also be an aryl group, and may be interpreted as a substituent to which two phenyl groups are linked.

In the present specification,

means a moiety bonded to another substituent or a bonding portion.

In the present specification, examples of a halogen group may be fluorine, chlorine, bromine or iodine.

In the present specification, the number of carbon atoms of a carbonyl group is not particularly limited, but is preferably 1 to 30.

In the present specification, for an ether group, the oxygen of the ether may be substituted with a straight-chained, branched, or cyclic alkyl group having 1 to 25 carbon atoms; or a monocyclic or polycyclic aryl group having 6 to 30 carbon atoms.

In the present specification, for an ester group, the oxygen of the ester group may be substituted with a straight-chained, branch-chained, or cyclic alkyl group having 1 to 25 carbon atoms, or a monocyclic or polycyclic aryl group having 6 to 30 carbon atoms.

In the present specification, the alkyl group may be straight-chained or branched, and the number of carbon atoms thereof is not particularly limited, but is preferably 1 to 30. Specific examples thereof include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl, and the like, but are not limited thereto.

In the present specification, a cycloalkyl group is not particularly limited, but has preferably 3 to 30 carbon atoms, and specific examples thereof include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl, and the like, but are not limited thereto.

In the present specification, the alkoxy group may be straight-chained, branched, or cyclic. The number of carbon atoms of the alkoxy group is not particularly limited, but is preferably 1 to 30. Specific examples thereof include methoxy, ethoxy, n-propoxy, isopropoxy, i-propyloxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benzyloxy, p-methylbenzyloxy, and the like, but are not limited thereto.

In the present specification, the alkenyl group may be straight-chained or branched, and the number of carbon atoms thereof is not particularly limited, but is preferably 2 to 30. Specific examples thereof include vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group, and the like, but are not limited thereto.

In the present specification, an amine group may be selected from the group consisting of —NH$_2$; a monoalkylamine group; a dialkylamine group; an N-alkylarylamine group; a monoarylamine group; a diarylamine group; an N-arylheteroarylamine group; an N-alkylheteroarylamine group, a monoheteroarylamine group, and a diheteroarylamine group, and the number of carbon atoms thereof is not particularly limited, but is preferably 1 to 30. Specific examples of the amine group include a methylamine group, a dimethylamine group, an ethylamine group, a diethylamine group, a phenylamine group, a naphthylamine group, a biphenylamine group, an anthracenylamine group, a 9-methyl-anthracenylamine group, a diphenylamine group, a ditolylamine group, an N-phenyltolylamine group, a triphenylamine group, an N-phenylbiphenylamine group, an N-phenylnaphthylamine group, an N-biphenylnaphthylamine group, an N-naphthylfluorenylamine group, an N-phenylphenanthrenylamine group, an N-biphenylphenanthrenylamine group, an N-phenylfluorenylamine group, an N-phenyl terphenylamine group, an N-phenanthrenylfluorenylamine group, an N-biphenylfluorenylamine group, and the like, but are not limited thereto.

In the present specification, specific examples of a silyl group include a trimethylsilyl group, a triethylsilyl group, a t-butyldimethylsilyl group, a vinyldimethylsilyl group, a propyldimethylsilyl group, a triphenylsilyl group, a diphenylsilyl group, a phenylsilyl group, and the like, but are not limited thereto.

In the present specification, an aryl group is not particularly limited, but has preferably 6 to 30 carbon atoms, and the aryl group may be monocyclic or polycyclic.

When the aryl group is a monocyclic aryl group, the number of carbon atoms thereof is not particularly limited, but is preferably 6 to 30. Specific examples of the monocyclic aryl group include a phenyl group, a biphenyl group, a terphenyl group, and the like, but are not limited thereto.

When the aryl group is a polycyclic aryl group, the number of carbon atoms thereof is not particularly limited, but is preferably 10 to 30. Specific examples of the polycyclic aryl group include a naphthyl group, an anthracenyl group, a phenanthryl group, a triphenyl group, a pyrenyl group, a perylenyl group, a chrysenyl group, a fluorenyl group, dihydroanthracene

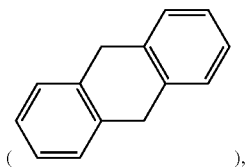 [SMILES: c1ccc2c(c1)Cc1ccccc1C2]

and the like, but are not limited thereto.

In the present specification, the fluorenyl group may be substituted, and adjacent substituents may be bonded to each other to form a ring.

When the fluorenyl group is substituted, the substituent may be

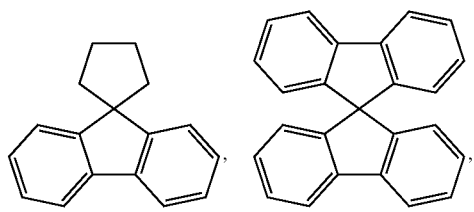

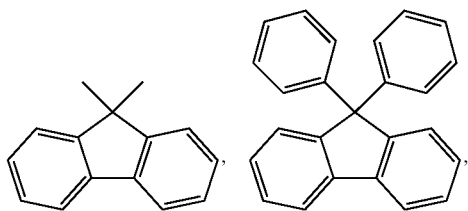

and the like. However, the substituent is not limited thereto.

In the present specification, an aryl group of an aryloxy group is the same as the above-described examples of the aryl group. Specifically, examples of the aryloxy group include a phenoxy group, a p-tolyloxy group, an m-tolyloxy group, a 3,5-dimethyl-phenoxy group, a 2,4,6-trimethylphenoxy group, a p-tert-butylphenoxy group, a 3-biphenyloxy group, a 4-biphenyloxy group, a 1-naphthyloxy group, a 2-naphthyloxy group, a 4-methyl-1-naphthyloxy group, a 5-methyl-2-naphthyloxy group, a 1-anthryloxy group, a 2-anthryloxy group, a 9-anthryloxy group, a 1-phenanthryloxy group, a 3-phenanthryloxy group, a 9-phenanthryloxy group, and the like, examples of the arylthioxy group include a phenylthioxy group, a 2-methylphenylthioxy group, a 4-tert-butylphenylthioxy group, and the like, and examples of the arylsulfoxy group include a benzenesulfoxy group, a p-toluenesulfoxy group, and the like, but the examples are not limited thereto.

In the present specification, a heterocyclic group includes one or more atoms other than carbon, that is, one or more heteroatoms, and specifically, the heteroatom may include one or more atoms selected from the group consisting of O, N, Se, S, and the like. The number of carbon atoms thereof is not particularly limited, but is preferably 2 to 30, and the heteroaryl group may be monocyclic or polycyclic. Examples of the heterocyclic group include a thiophene group, a furanyl group, a pyrrole group, an imidazolyl group, a thiazolyl group, an oxazolyl group, an oxadiazolyl group, a pyridyl group, a bipyridyl group, a pyrimidyl group, a triazinyl group, a triazolyl group, an acridyl group, a pyridazinyl group, a pyrazinyl group, a quinolinyl group, a quinazolinyl group, a quinoxalinyl group, a phthalazinyl group, a pyridopyrimidyl group, a pyridopyrazinyl group, a pyrazinopyrazinyl group, an isoquinolinyl group, an indolyl group, a carbazolyl group, a benzoxazolyl group, a benzimidazolyl group, a benzothiazolyl group, a benzocarbazolyl group, a benzothiophene group, a dibenzothiophene group, a benzofuranyl group, a phenanthrolinyl group (phenanthroline), a thiazolyl group, an isoxazolyl group, an oxadiazolyl group, a thiadiazolyl group, a benzothiazolyl group, a phenothiazinyl group, a dibenzofuranyl group, a xanthenyl group

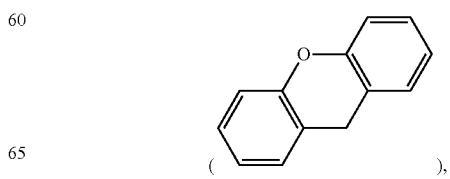

a phenoxathinyl group

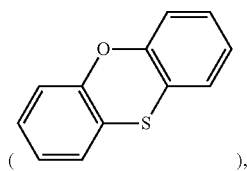 [SMILES: c1ccc2c(c1)Oc1ccccc1S2]

( ), a dihydroacridine group

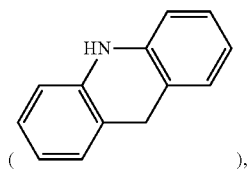

( ), and the like, but are not limited thereto.

In the present specification, a heterocyclic group may be monocyclic or polycyclic, may be an aromatic ring, an aliphatic ring, or a fused ring of the aromatic ring and the aliphatic ring, and may be selected from the examples of the heterocyclic group.

In the present specification, the "adjacent" group may mean a substituent substituted with an atom directly linked to an atom in which the corresponding substituent is substituted, a substituent disposed sterically closest to the corresponding substituent, or another substituent substituted with an atom in which the corresponding substituent is substituted. For example, two substituents substituted at the ortho position in a benzene ring and two substituents substituted with the same carbon in an aliphatic ring may be interpreted as groups which are "adjacent" to each other.

In the present specification, the "adjacent groups are bonded to each other to form a ring" among the substituents means that a substituent is bonded to an adjacent group to form a substituted or unsubstituted hydrocarbon ring; or a substituted or unsubstituted hetero ring.

In an exemplary embodiment of the present specification, Formula 1 is represented by any one of the following Formulae 2 to 10.

[Formula 2]

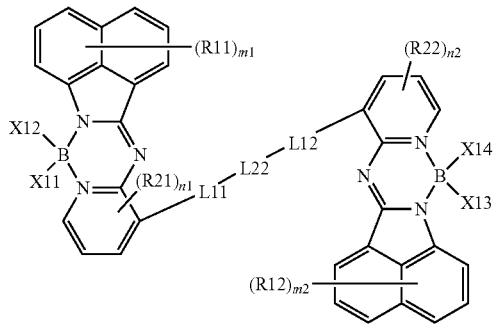

[Formula 3]

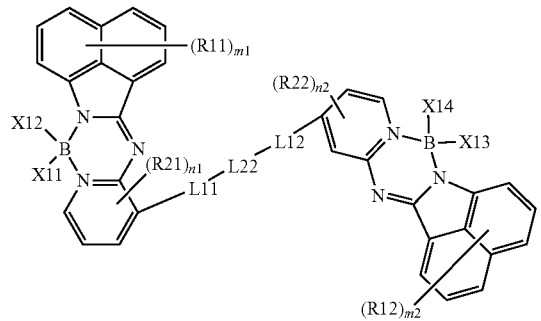

[Formula 4]

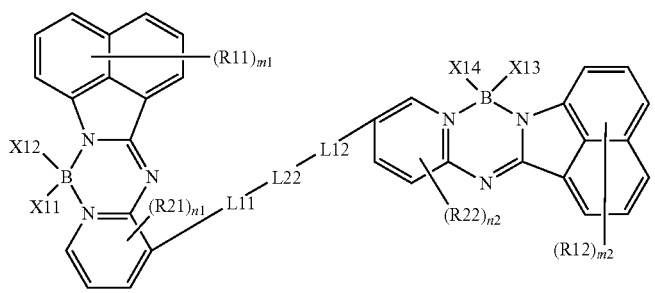

[Formula 5]

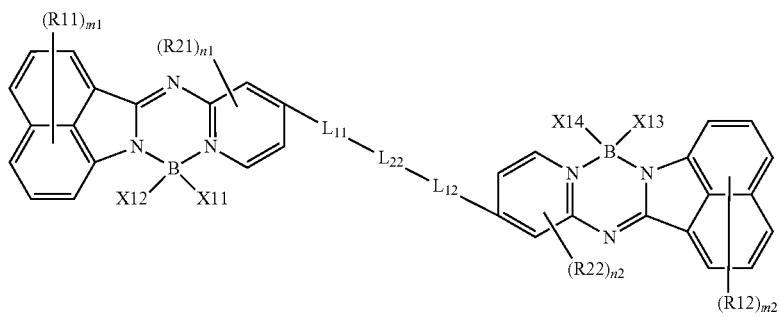

[Formula 6]
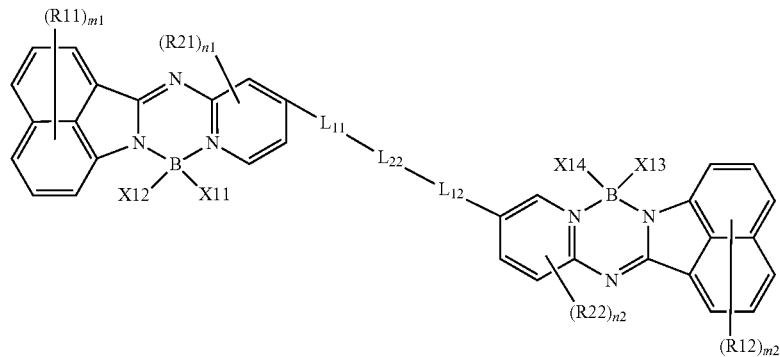
[Formula 7]
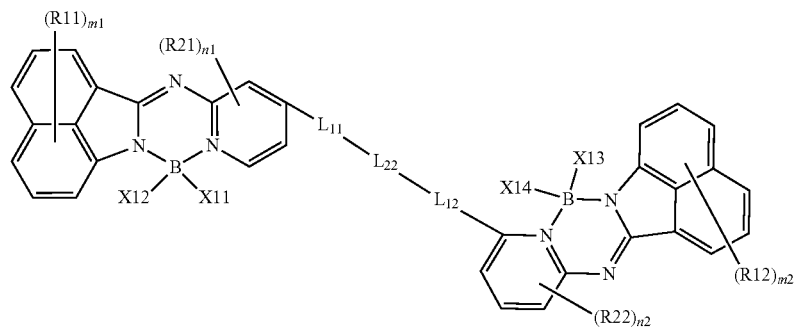
[Formula 8]
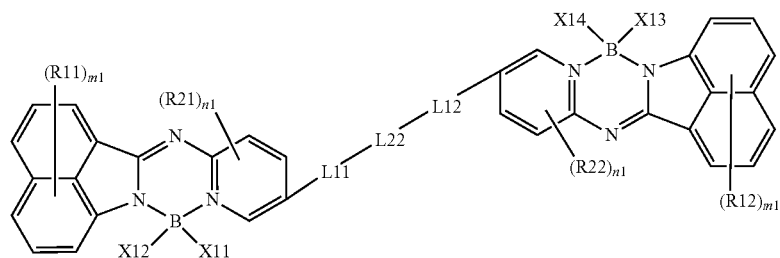
[Formula 9]
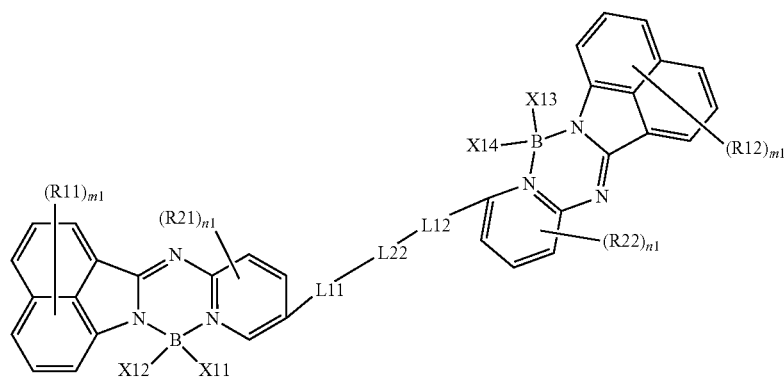

-continued

[Formula 10]

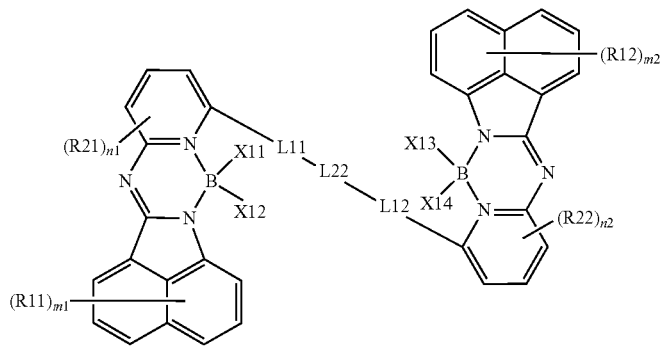

In Formulae 2 to 10,

L11 and L12 are the same as the definition of L1 of Formula 1,

L22 is the same as the definition of L2 of Formula 1, the definitions of R11, R12, R21, and R22 are the same as those of R1 and R2 of Formula 1, the definitions of m1 and m2 are the same as that of m of Formula 1, the definitions of n1 and n2 are the same as that of n of Formula 1, and the definitions of X11 to X14 are the same as those of X1 and X2 of Formula 1.

In an exemplary embodiment of the present specification, L1 and L2 are the same as or different from each other, and are each independently a direct bond; —SiR$_{101}$R$_{102}$—; —SO$_2$—; —O—; —NR$_{103}$—; —C(=O)O—; a substituted or unsubstituted alkylene group having 1 to 20 carbon atoms; a substituted or unsubstituted cycloalkylene group having 3 to 20 carbon atoms; a substituted or unsubstituted arylene group having 6 to 30 carbon atoms; or a substituted or unsubstituted divalent heterocyclic group having 2 to 30 carbon atoms.

In an exemplary embodiment of the present specification, L1 and L2 are the same as or different from each other, and are each independently a direct bond; —SiR$_{101}$R$_{102}$—; —SO$_2$—; —O—; —NR$_{103}$—; —C(=O)O—; a substituted or unsubstituted methylene group; a substituted or unsubstituted ethylene group; a substituted or unsubstituted propylene group; a substituted or unsubstituted butylene group; a substituted or unsubstituted pentylene group; a substituted or unsubstituted cyclohexylene group; a substituted or unsubstituted phenylene group; a substituted or unsubstituted biphenylene group; a substituted or unsubstituted naphthylene group; a substituted or unsubstituted anthracenylene group; a substituted or unsubstituted phenanthrenylene group; a substituted or unsubstituted pyrenylene group; a substituted or unsubstituted fluorenylene group; a substituted or unsubstituted spirobifluorenylene group; a substituted or unsubstituted pyridinylene group; a substituted or unsubstituted pyrimidinylene group; a substituted or unsubstituted pyrrolylene group; a substituted or unsubstituted furanylene group; a substituted or unsubstituted thiophenylene group; a substituted or unsubstituted oxazolylene group; a substituted or unsubstituted triazolylene group; a substituted or unsubstituted indolene group; a substituted or unsubstituted benzoxadiazolene group; a substituted or unsubstituted triazolene group; a substituted or unsubstituted dibenzofuranylene group; a substituted or unsubstituted carbazolylene group; a substituted or unsubstituted xanthenylene group; a substituted or unsubstituted dihydroanthracenylene group; a substituted or unsubstituted dihydroacridinylene group; or a substituted or unsubstituted phenoxathinylene group.

In an exemplary embodiment of the present specification, L1 and L2 are the same as or different from each other, and are each independently a direct bond; —SiR$_{101}$R$_{102}$—; —SO$_2$—; —O—; —NR$_{103}$—; —C(=O)O—; a methylene group substituted with a phenyl group; an ethylene group; a propylene group; a butylene group; a pentylene group; a cyclohexylene group; a phenylene group unsubstituted or substituted with a halogen group, a carboxyl group, an alkoxy group, a cyano group or a fluoroalkyl group; a naphthylene group; an anthracenylene group unsubstituted or substituted with an aryl group; a phenanthrenylene group; a pyrenylene group; a fluorenylene group unsubstituted or substituted with an alkyl group, an aryl group or an alkylaryl group; a spirobifluorenylene group; a pyridinylene group; a pyrrolylene group; a furanylene group; a thiophenylene group; an oxazolylene group; a triazolylene group; an indolene group; a benzoxadiazolene group; a triazolene group; a dibenzofuranylene group; a carbazolylene group unsubstituted or substituted with an alkyl group or an aryl group; a xanthenylene group substituted with an alkyl group; a dihydroanthracenylene group substituted with an alkyl group; a dihydroacridinylene group substituted with an alkyl group; or a phenoxathinylene group.

In an exemplary embodiment of the present specification, L1 and L2 are the same as or different from each other, and are each independently a direct bond; —SiR$_{101}$R$_{102}$—; —SO$_2$—; —O—; —NR$_{103}$—; —C(=O)O—; a methylene group substituted with a phenyl group; an ethylene group; a propylene group; a butylene group; a pentylene group; a cyclohexylene group; a phenylene group unsubstituted or substituted with fluorine, a carboxyl group, a methoxy group or a cyano group; a naphthylene group; an anthracenylene group unsubstituted or substituted with a phenyl group; a phenanthrenylene group; a pyrenylene group; a fluorenylene group unsubstituted or substituted with a methyl group, a hexyl group, an octyl group, a phenyl group or a butylphenyl group; a spirobifluorenylene group; a pyridinylene group; a pyrrolylene group; a furanylene group; a thiophenylene group; an oxazolylene group; a triazolylene group; an indolene group; a benzoxadiazolene group; a triazolene group; a dibenzofuranylene group; a carbazolylene group unsubstituted or substituted with a decyl group, an oxyl group, a phenyl group or a biphenyl group; a xanthenylene group substituted with a methyl group; a dihydroanthracenylene group substituted with a methyl group; a dihydroacridinylene group substituted with a methyl group; or a phenoxathinylene group.

In an exemplary embodiment of the present specification, $R_{101}$ to $R_{103}$ are the same as or different from each other, and are each independently hydrogen; deuterium; a substituted or unsubstituted alkyl group having 1 to 20 carbon atoms; or a substituted or unsubstituted aryl group having 6 to 30 carbon atoms.

In an exemplary embodiment of the present specification, $R_{101}$ to $R_{103}$ are the same as or different from each other, and are each independently hydrogen; deuterium; a substituted or unsubstituted alkyl group having 1 to 5 carbon atoms; or a substituted or unsubstituted aryl group having 6 to 20 carbon atoms.

In an exemplary embodiment of the present specification, $R_{101}$ to $R_{103}$ are the same as or different from each other, and are each independently hydrogen; deuterium; a substituted or unsubstituted methyl group; or a substituted or unsubstituted phenyl group.

In an exemplary embodiment of the present specification, $R_{101}$ to $R_{103}$ are the same as or different from each other, and are each independently hydrogen; deuterium; a methyl group; or a phenyl group.

In an exemplary embodiment of the present specification, X1 and X2 are the same as or different from each other, and are each independently a halogen group; a cyano group; an ether group; —C(=O)OR$_{107}$; a substituted or unsubstituted alkyl group; a substituted or unsubstituted alkynyl group; a substituted or unsubstituted alkoxy group; a substituted or unsubstituted aryloxy group; a substituted or unsubstituted aryl group; or a substituted or unsubstituted heterocyclic group, or X1 and X2 are bonded to each other to form a substituted or unsubstituted ring.

In an exemplary embodiment of the present specification, X1 and X2 are the same as or different from each other, and are each independently a halogen group; a cyano group; an ether group; —C(=O)OR$_{107}$; a substituted or unsubstituted alkyl group having 1 to carbon atoms; a substituted or unsubstituted alkynyl group having 2 to 20 carbon atoms; a substituted or unsubstituted alkoxy group having 1 to 20 carbon atoms; a substituted or unsubstituted aryloxy group having 6 to 30 carbon atoms; a substituted or unsubstituted aryl group having 6 to 30 carbon atoms; or a substituted or unsubstituted heterocyclic group having 2 to 30 carbon atoms, or X1 and X2 are bonded to each other to form a substituted or unsubstituted ring having 3 to 30 carbon atoms.

In an exemplary embodiment of the present specification, X1 and X2 are the same as or different from each other, and are each independently a halogen group; a cyano group; a substituted or unsubstituted aryloxy group having 6 to 30 carbon atoms; a substituted or unsubstituted alkoxy group having 1 to 20 carbon atoms; a substituted or unsubstituted aryl group having 6 to 30 carbon atoms; a substituted or unsubstituted alkynyl group having 2 to 20 carbon atoms; or —C(=O)OR$_{107}$, and R$_{107}$ is hydrogen; deuterium; a substituted or unsubstituted alkyl group having 1 to 20 carbon atoms; or a substituted or unsubstituted fluoroalkyl group having 1 to 20 carbon atoms.

In an exemplary embodiment of the present specification, X1 and X2 are the same as or different from each other, and are each independently a halogen group; a cyano group; a substituted or unsubstituted aryloxy group; a substituted or unsubstituted alkoxy group; a substituted or unsubstituted aryl group; a substituted or unsubstituted alkynyl group; or —C(=O)OR$_{107}$, and R$_{107}$ is hydrogen; deuterium; an alkyl group; or a fluoroalkyl group.

In an exemplary embodiment of the present specification, X1 and X2 are the same as or different from each other, and are each independently fluorine; chlorine; a cyano group; a substituted or unsubstituted phenoxy group; a substituted or unsubstituted phenyl group; or —C(=O)OR$_{107}$, and R$_{107}$ is hydrogen; deuterium; an alkyl group; or a fluoroalkyl group.

In an exemplary embodiment of the present specification, X1 and X2 are the same as or different from each other, and are each independently fluorine; chlorine; a cyano group; a phenoxy group unsubstituted or substituted with a nitro group; a phenyl group; or —C(=O)OR$_{107}$, and R$_{107}$ is a trifluoromethyl group.

In an exemplary embodiment of the present specification, X1 and X2 are the same as or different from each other, and are each independently fluorine; chlorine; a cyano group; a phenoxy group substituted with a nitro group; a phenyl group; or —C(=O)OR$_{107}$, and R$_{107}$ is a trifluoromethyl group.

In an exemplary embodiment of the present specification, P is 2.

In an exemplary embodiment of the present specification, n is 0 or 1.

In an exemplary embodiment of the present specification, n is 0.

In an exemplary embodiment of the present specification, m is 0, 1, or 2.

In an exemplary embodiment of the present specification, R1 is hydrogen; deuterium; a halogen group; a cyano group; a nitro group; a carbonyl group; a carboxyl group (—COOH); an ether group; a hydroxyl group; —C(=O)NR$_{104}$R$_{105}$; —C(=O)OR$_{106}$; a substituted or unsubstituted alkyl group; a substituted or unsubstituted cycloalkyl group; a substituted or unsubstituted alkoxy group; a substituted or unsubstituted aryloxy group; a substituted or unsubstituted alkenyl group; a substituted or unsubstituted silyl group; a substituted or unsubstituted amine group; a substituted or unsubstituted alkylamine group; a substituted or unsubstituted arylamine group; a substituted or unsubstituted aryl group; or a substituted or unsubstituted heterocyclic group, or adjacent groups may be bonded to each other to form a ring.

In an exemplary embodiment of the present specification, R1 is hydrogen; deuterium; fluorine; a carboxyl group; a hydroxyl group; a cyano group; a phenoxy group; a butylamine group; a diphenylamine group; a phenyl group unsubstituted or substituted with a fluoro group, a phenethyl group, a carboxyl group, a carbazole group, a butyl group or a trifluoromethyl group; a naphthyl group; an anthracenyl group; a pyrenyl group; a carbazole group unsubstituted or substituted with a butyl group; a trifluoromethyl group; a tetraphenylmethyl group; a tetraphenylsilyl group; a triphenylsilyl group; a dimethylfluorenyl group; a spirobifluorenyl group; an ethoxy group substituted with a carbazole group; an indole group unsubstituted or substituted with a carboxyl group; a triazaindene group; a triazole group substituted with a phenyl group; a dimethyldihydroacridine group; a dimethylxanthene group; a tetramethyldihydroanthracene group; or —C(=O)OR106, and R106 is a butyl group.

In an exemplary embodiment of the present specification, R1 and R2 are the same as or different from each other, and are each independently hydrogen; deuterium; fluorine; a carboxyl group; a hydroxyl group; a cyano group; —C(=O)NR$_{104}$R$_{105}$; —C(=O)OR$_{106}$; a substituted or unsubstituted aryloxy group; a substituted or unsubstituted amine group; a substituted or unsubstituted arylamine group; a substituted or unsubstituted aryl group; a substituted or unsubstituted alkyl group; a substituted or unsubstituted silyl group; a substituted or unsubstituted alkoxy group; or a substituted or unsubstituted heterocyclic group.

In an exemplary embodiment of the present specification, R1 and R2 are the same as or different from each other, and are each independently hydrogen; deuterium; fluorine; a carboxyl group; a hydroxyl group; a cyano group; —C(=O)NR$_{104}$R$_{105}$; —C(=O)OR$_{106}$; a substituted or unsubstituted phenoxy group; a substituted or unsubstituted butylamine group; a substituted or unsubstituted diphenylamine group; a substituted or unsubstituted phenyl group; a substituted or unsubstituted naphthyl group; a substituted or unsubstituted anthracenyl group; a substituted or unsubstituted pyrenyl group; a substituted or unsubstituted bipyridine group; a substituted or unsubstituted carbazole group; a substituted or unsubstituted trifluoromethyl group; a substituted or unsubstituted methyl group; a substituted or unsubstituted silyl group; a substituted or unsubstituted fluorenyl group; an ethoxy group unsubstituted or substituted with a substituted or unsubstituted spirobifluorenyl group; a substituted or unsubstituted indole group; a substituted or unsubstituted triazaindene group; a substituted or unsubstituted triazole group; a substituted or unsubstituted dihydroacridine group; a substituted or unsubstituted xanthene group; or a substituted or unsubstituted dihydroanthracene group.

In an exemplary embodiment of the present specification, R1 and R2 are the same as or different from each other, and are each independently hydrogen; deuterium; fluorine; a carboxyl group; a hydroxy group; a cyano group; —C(=O)NR$_{104}$R$_{105}$; —C(=O)OR$_{106}$; a phenoxy group; a butylamine group; a diphenylamine group; a phenyl group unsubstituted or substituted with a halogen group, a carboxyl group, an arylalkyl group, an alkyl group, a fluoroalkyl group or a heterocyclic group; a naphthyl group; an anthracenyl group; a pyrenyl group; a bipyridine group; a carbazole group unsubstituted or substituted with an alkyl group; a trifluoromethyl group; a methyl group unsubstituted or substituted with an aryl group; a silyl group unsubstituted or substituted with an alkyl group or an aryl group; a fluorenyl group unsubstituted or substituted with an alkyl group or an aryl group; a spirobifluorenyl group; an ethoxy group unsubstituted or substituted with a heterocyclic group; an indole group unsubstituted or substituted with a carboxyl group; a triazaindene group; a triazole group substituted with an aryl group; a dihydroacridine group unsubstituted or substituted with an alkyl group; a xanthene group unsubstituted or substituted with an alkyl group; or a dihydroanthracene group unsubstituted or substituted with an alkyl group.

In an exemplary embodiment of the present specification, R1 and R2 are the same as or different from each other, and are each independently hydrogen; deuterium; fluorine; a carboxyl group; a hydroxyl group; a cyano group; —C(=O)NR$_{104}$R$_{105}$; —C(=O)OR$_{106}$; a phenoxy group; a butylamine group; a diphenylamine group; a phenyl group unsubstituted or substituted with a fluoro group, a phenethyl group, a carboxyl group, a carbazole group, a butyl group or a trifluoromethyl group; a naphthyl group; an anthracenyl group; a pyrenyl group; a bipyridine group; a carbazole group unsubstituted or substituted with a butyl group; a trifluoromethyl group; a tetraphenylmethyl group; a tetraphenylsilyl group; a triphenylsilyl group; a dimethylfluorenyl group; a spirobifluorenyl group; an ethoxy group substituted with a carbazole group; an indole group unsubstituted or substituted with a carboxyl group; a triazaindene group; a triazole group substituted with a phenyl group; a dimethyldihydroacridine group; a dimethylxanthene group; or a tetramethyldihydroanthracene group.

In an exemplary embodiment of the present specification, R$_{104}$ and R$_{106}$ are the same as or different from each other, and are each independently hydrogen or a substituted or unsubstituted alkyl group.

In an exemplary embodiment of the present specification, R$_{104}$ to R$_{106}$ are the same as or different from each other, and are each independently hydrogen or a substituted or unsubstituted alkyl group having 1 to 20 carbon atoms.

In an exemplary embodiment of the present specification, R$_{104}$ to R$_{106}$ are the same as or different from each other, and are each independently hydrogen, a substituted or unsubstituted methyl group, a substituted or unsubstituted ethyl group, a substituted or unsubstituted propyl group, or a substituted or unsubstituted butyl group.

In an exemplary embodiment of the present specification, R$_{104}$ to R$_{106}$ are the same as or different from each other, and are each independently hydrogen, a methyl group, an ethyl group, a propyl group, or a butyl group.

In an exemplary embodiment of the present specification, R$_{104}$ to R$_{106}$ are the same as or different from each other, and are each independently hydrogen; a propyl group; or a butyl group.

In an exemplary embodiment of the present specification, the compound of Formula 1 is represented any one of the following structural formulae 1 to 114.

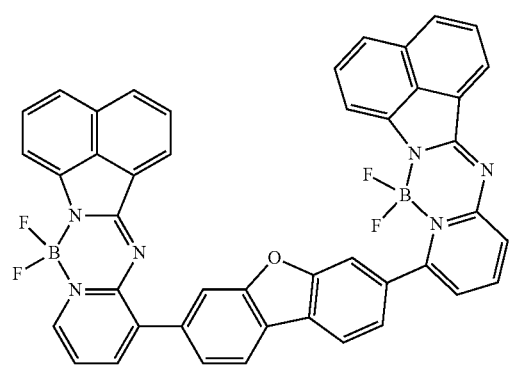
1
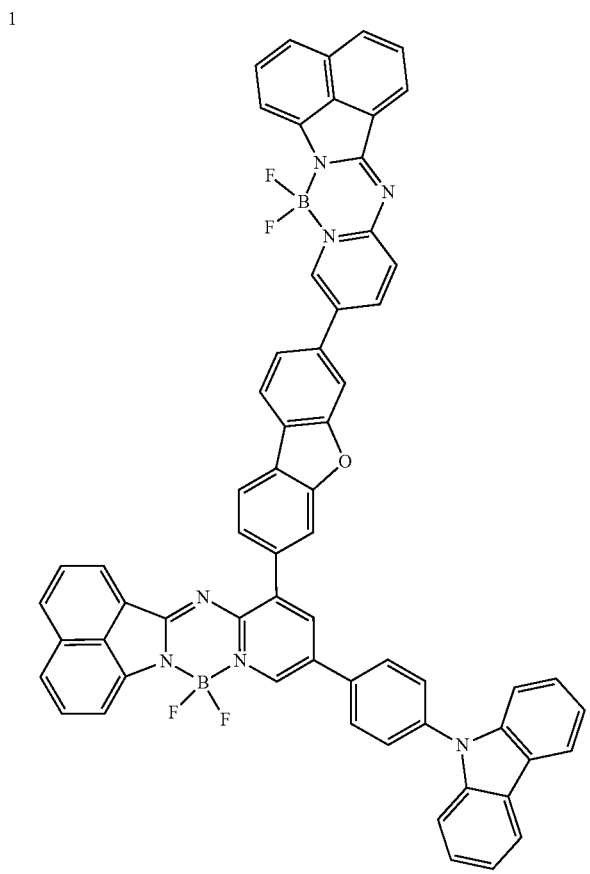
2
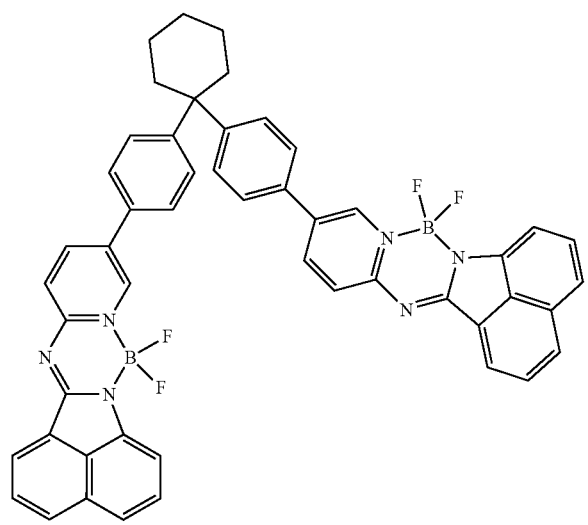
3
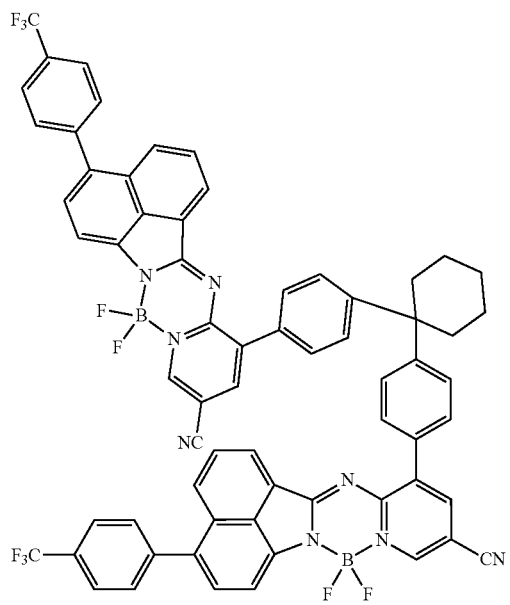
4

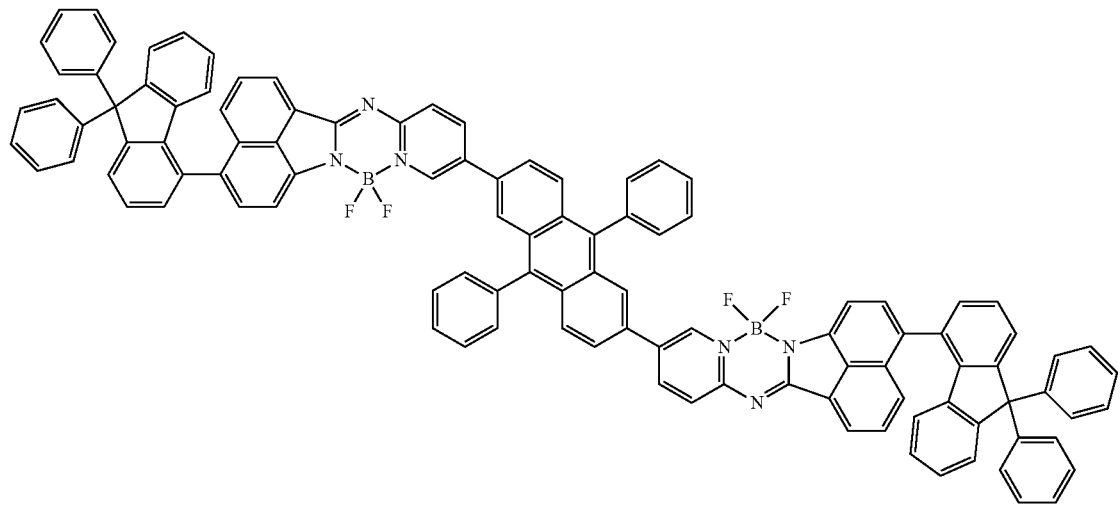
5
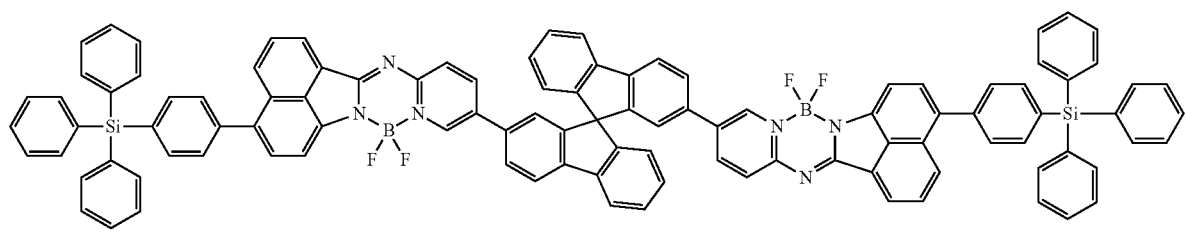
6
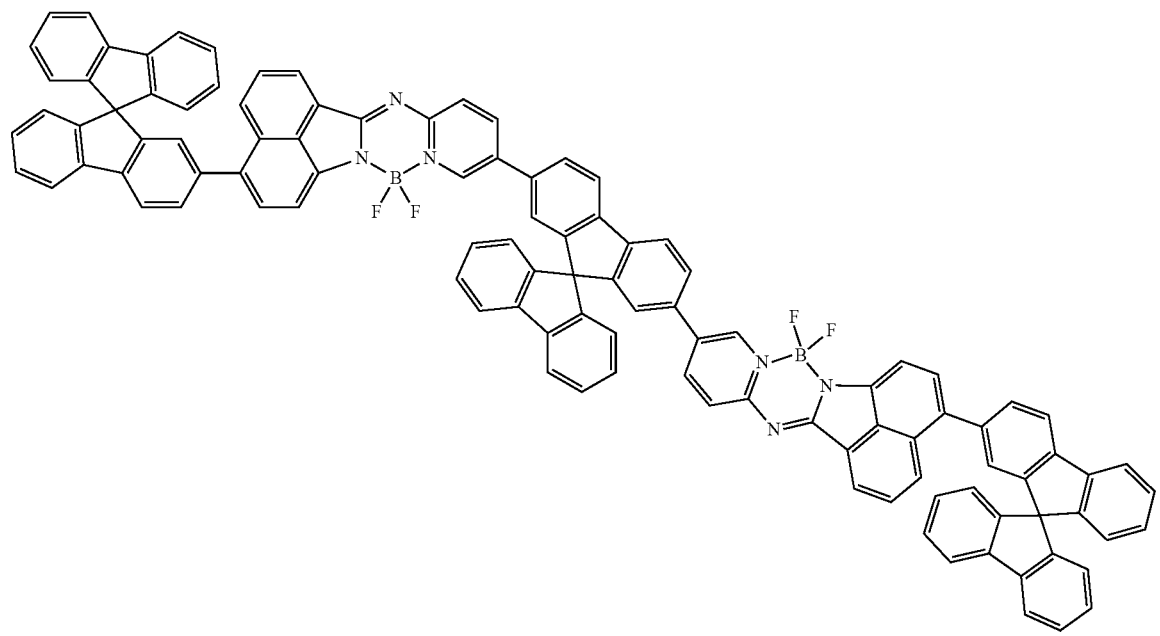
7

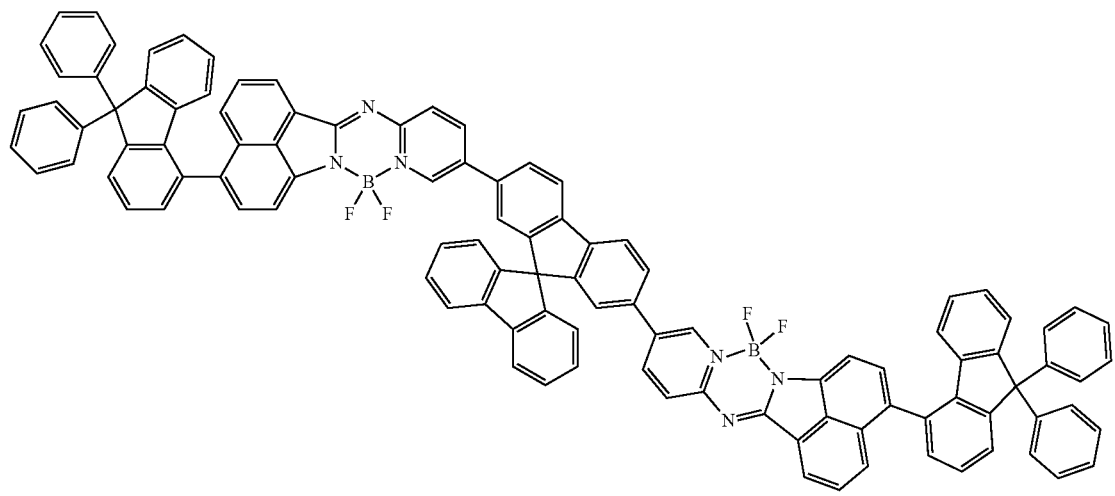
8
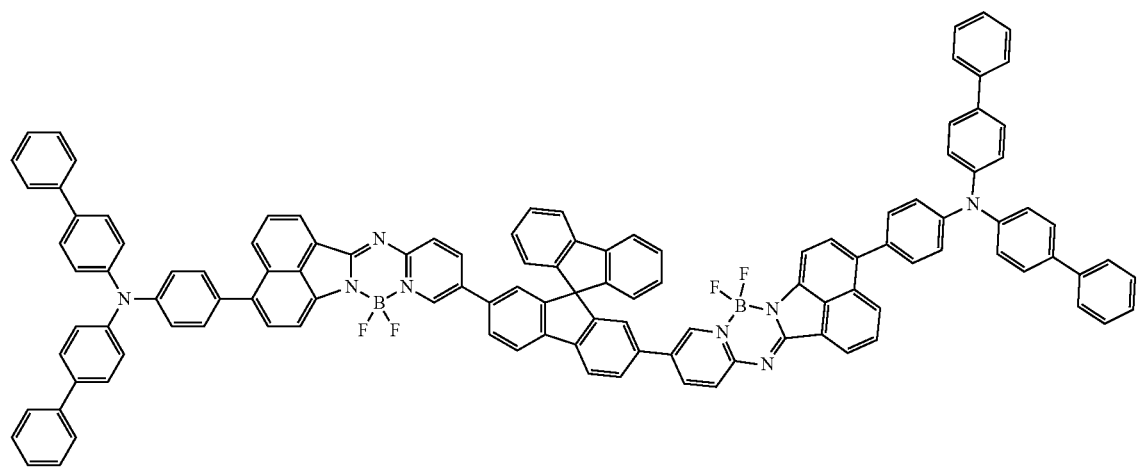
9
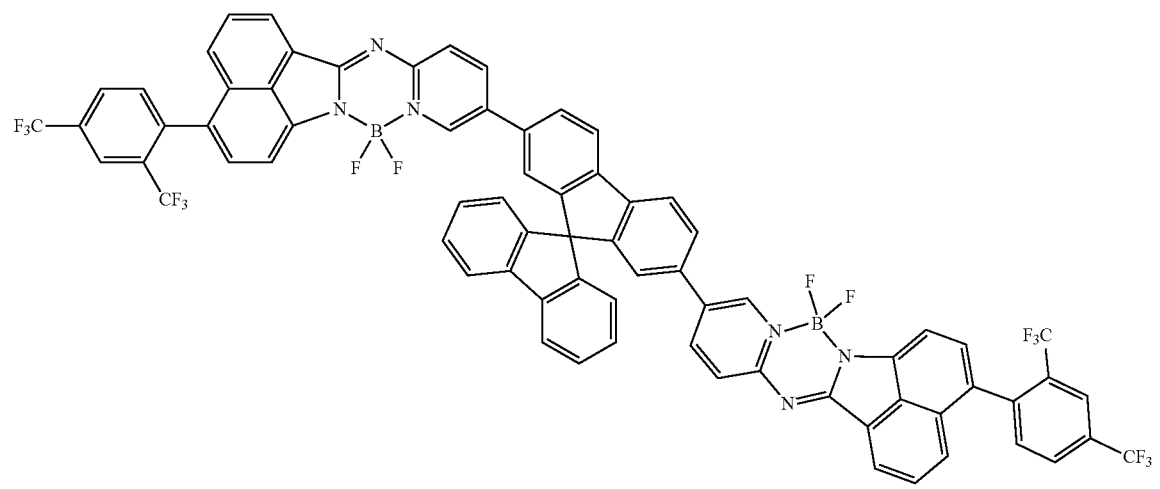
10

-continued
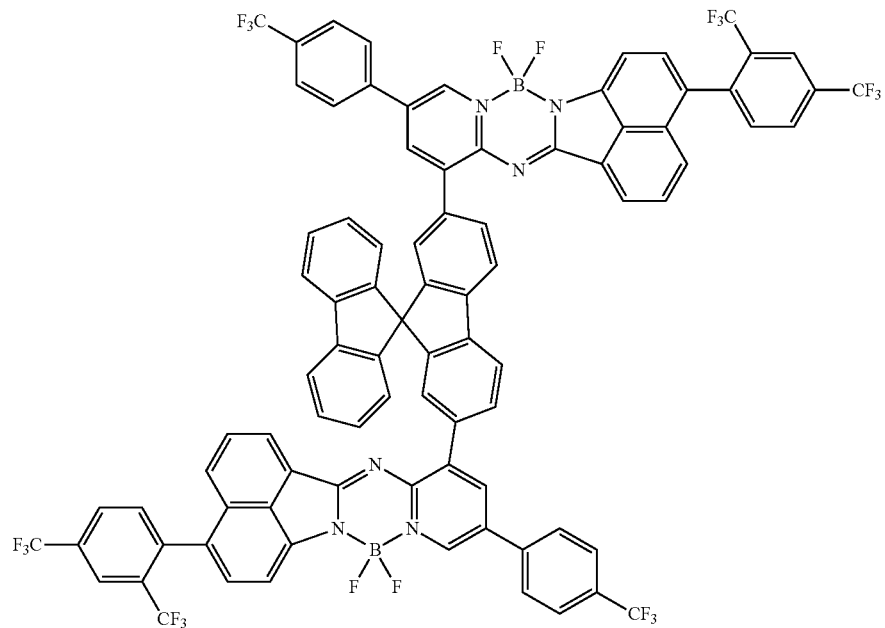
11
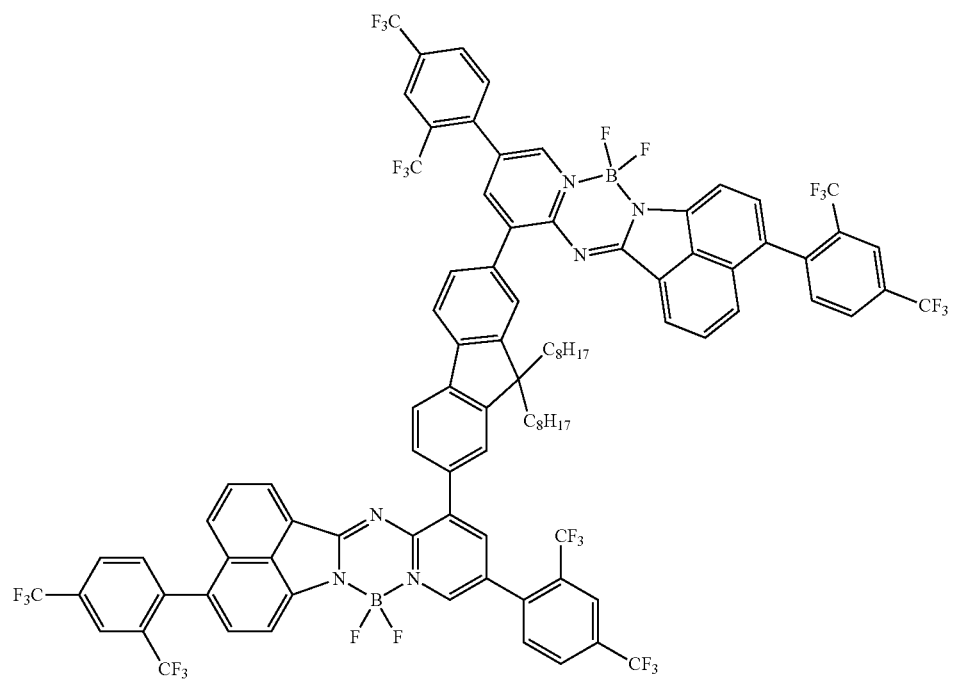
12
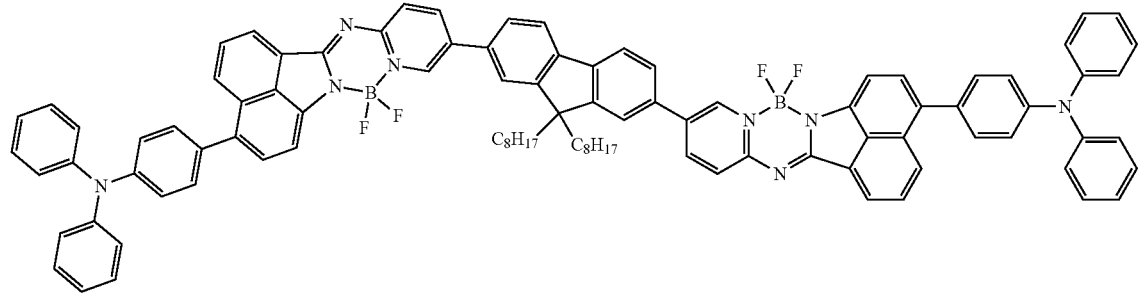
13

14
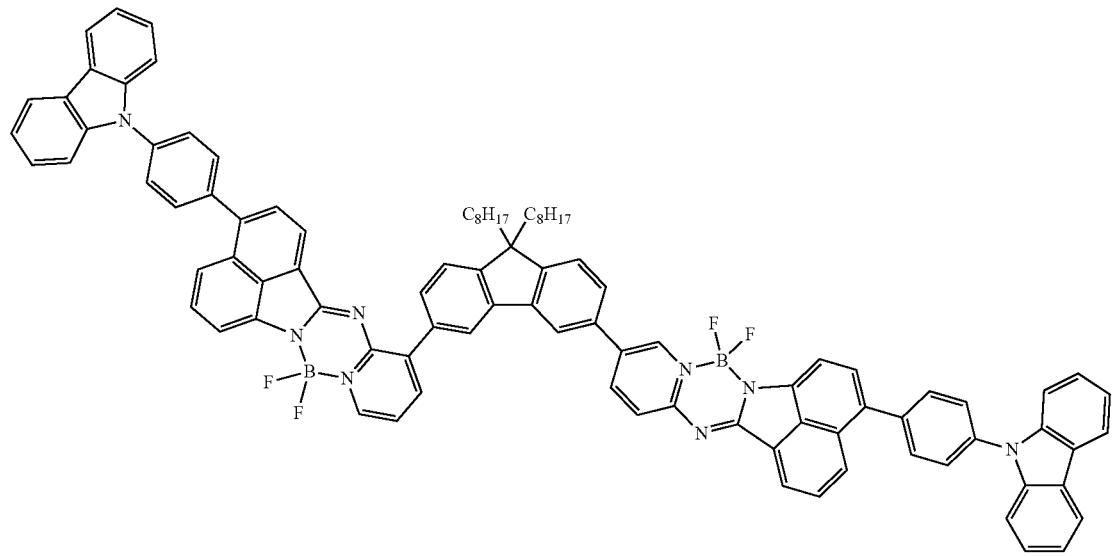
15
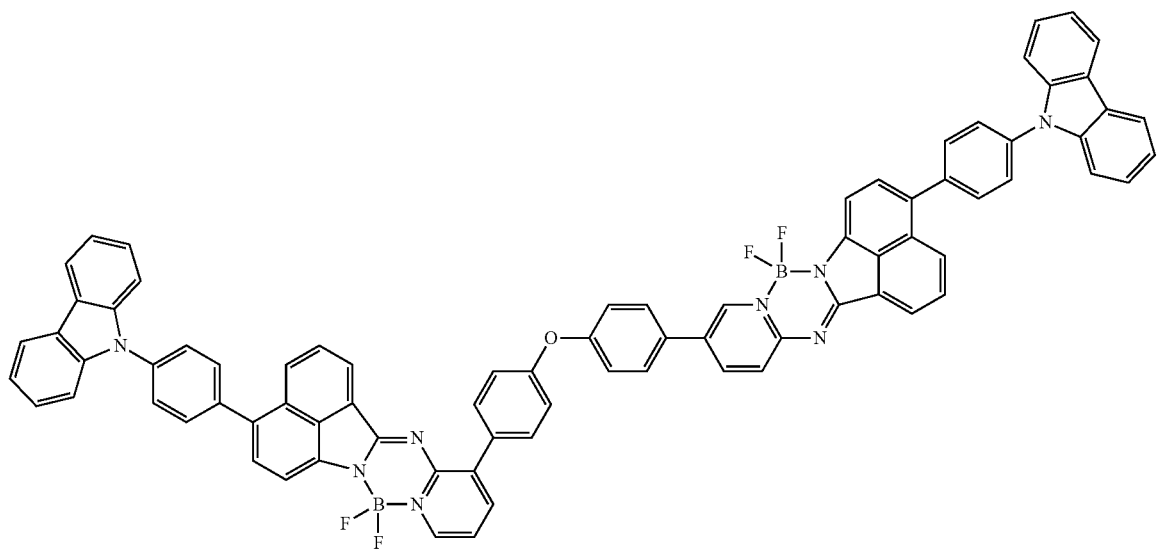
16
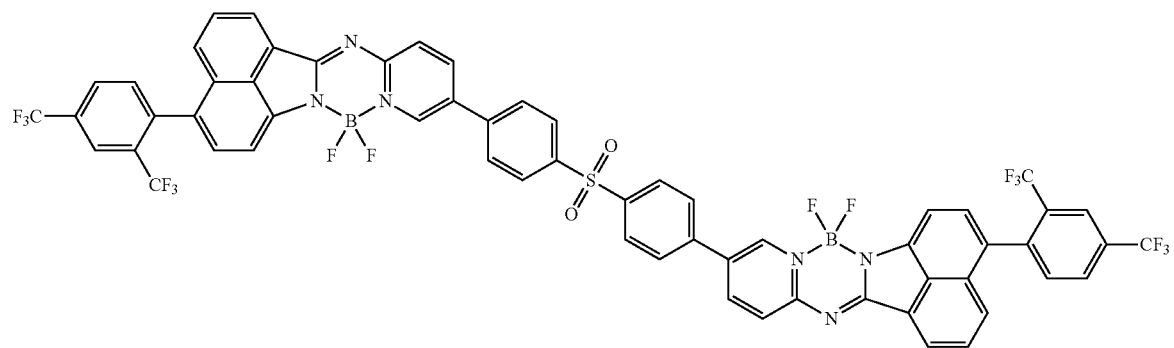

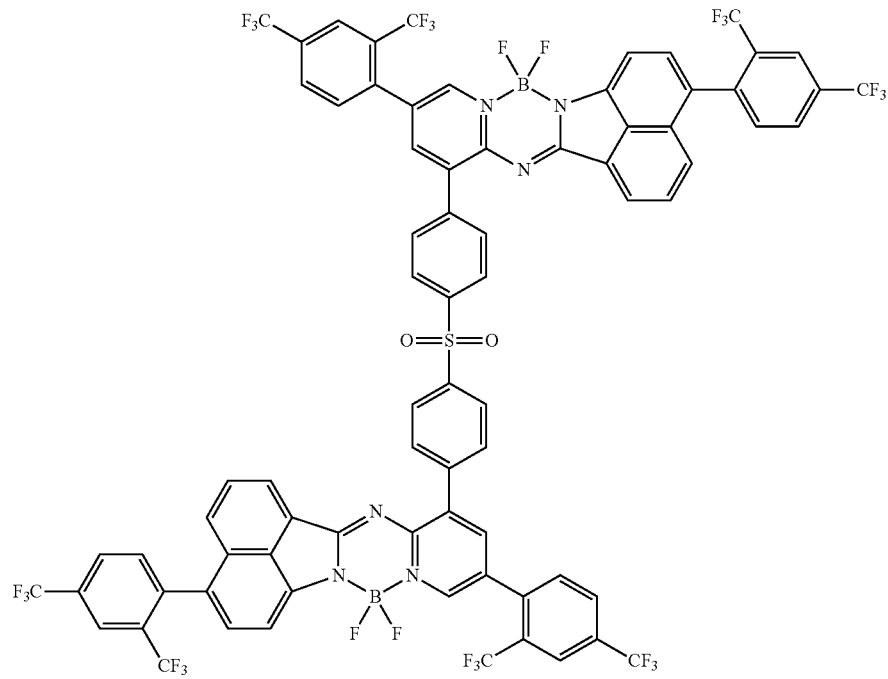
17
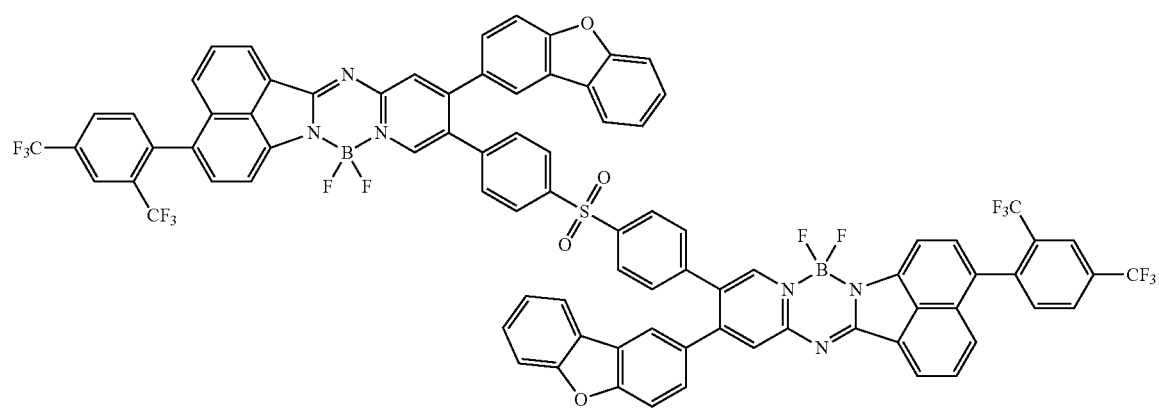
18

-continued
19
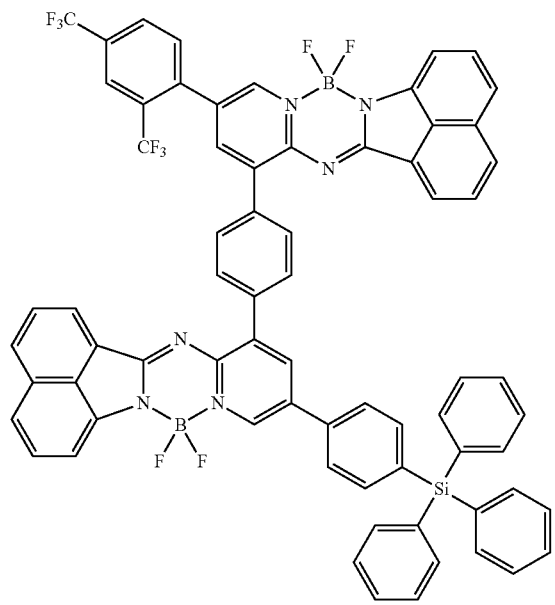
20
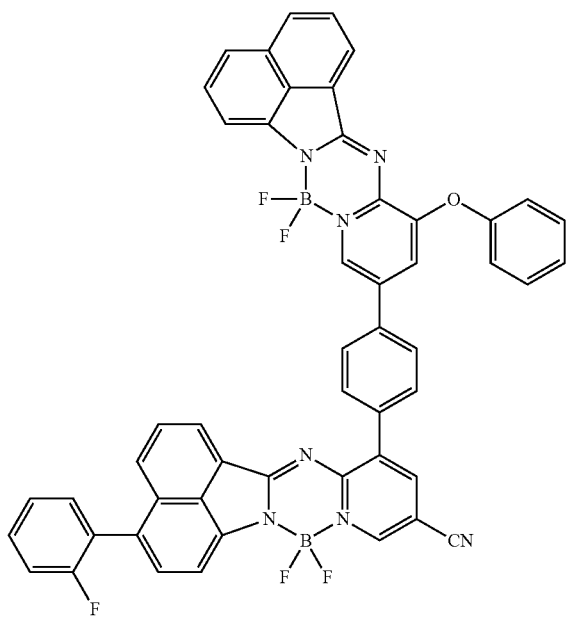
21
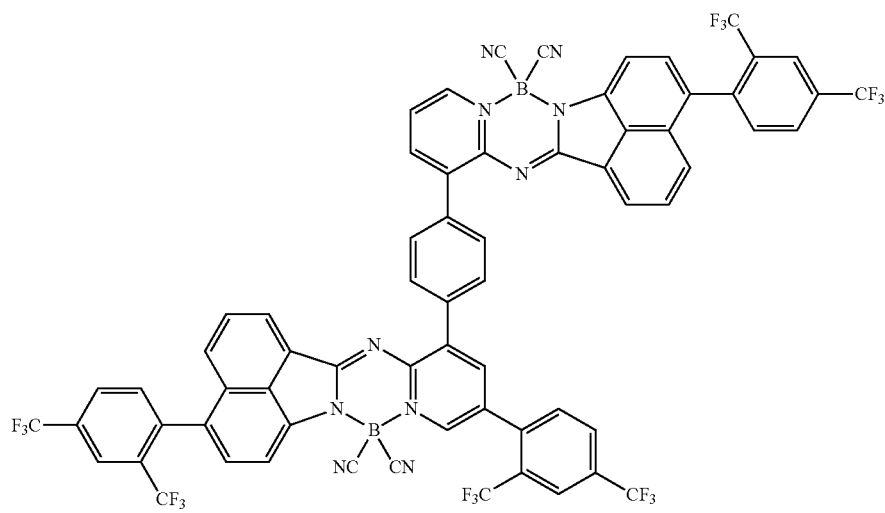
22
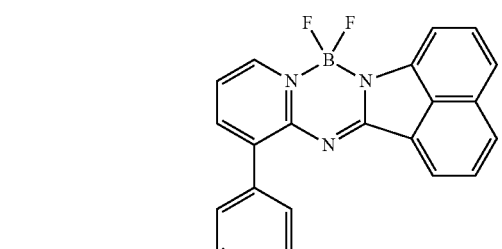
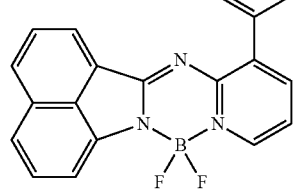
23
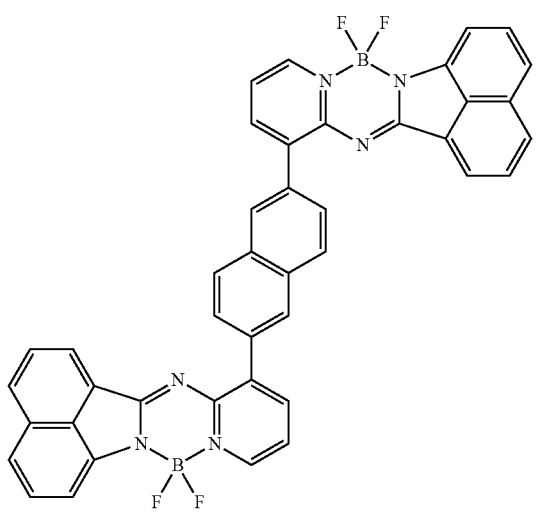

-continued
24
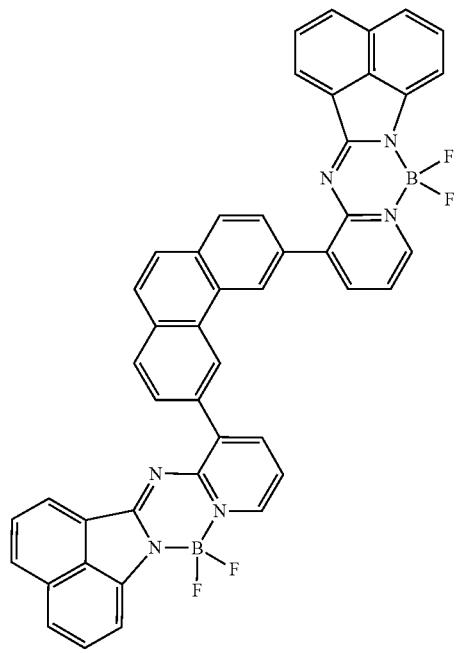
25
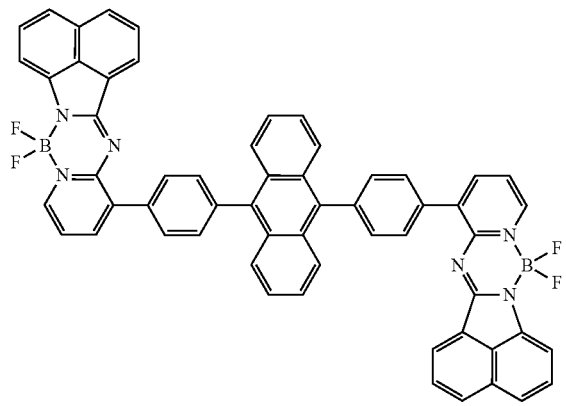
26
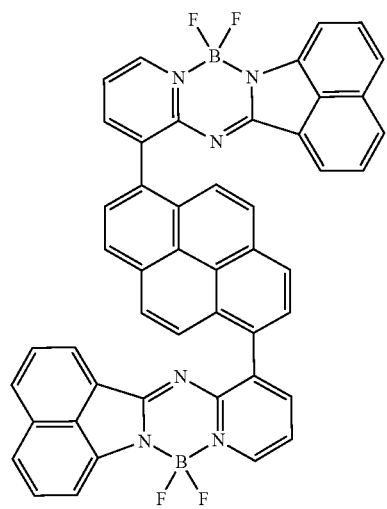
27
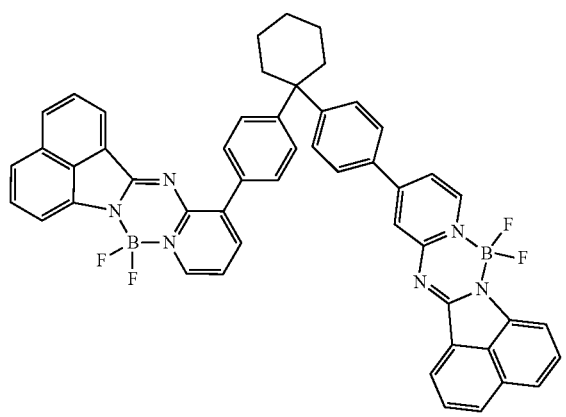
28
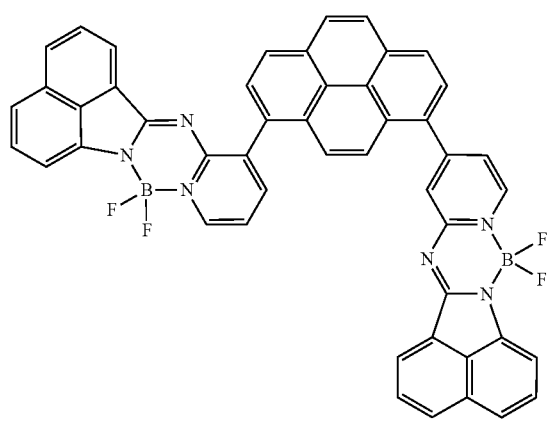
29
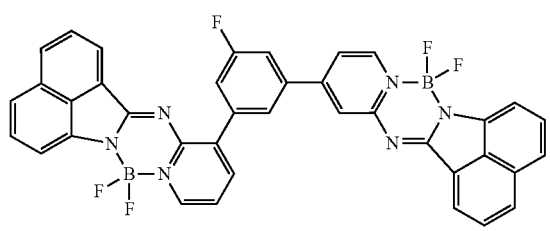

-continued
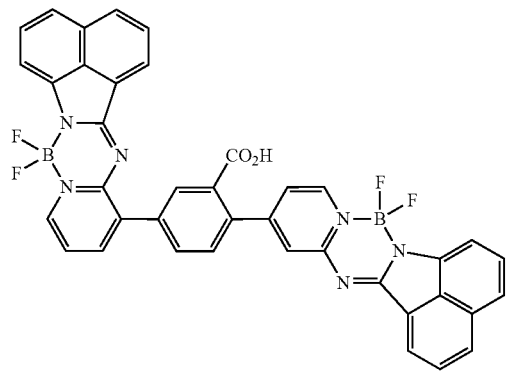
30
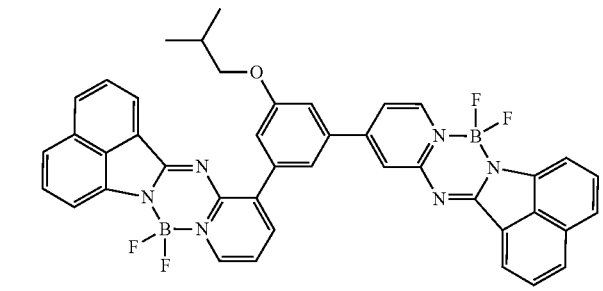
31
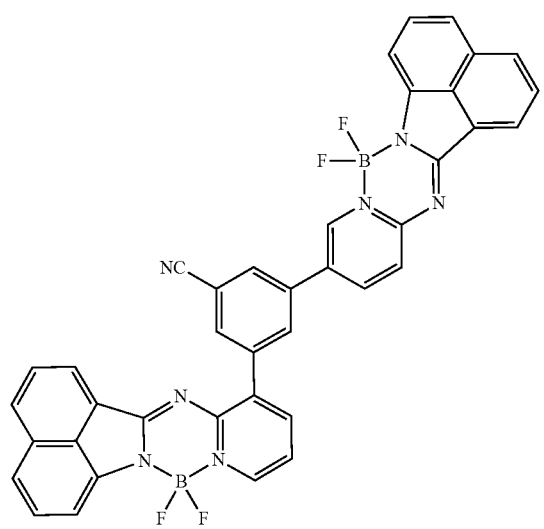
32
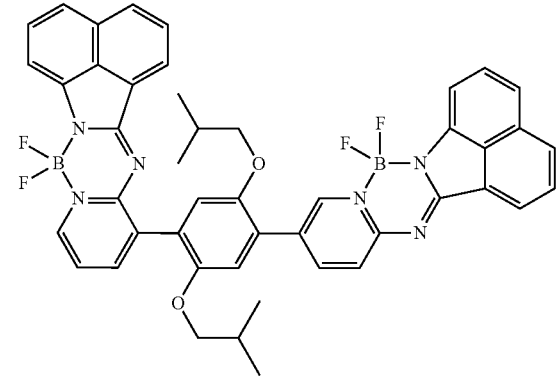
33
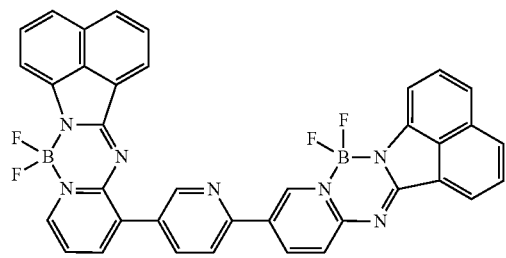
34
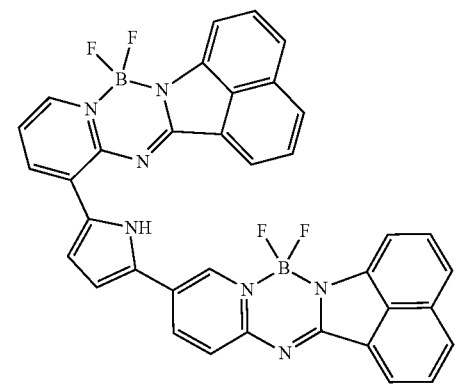
35

-continued
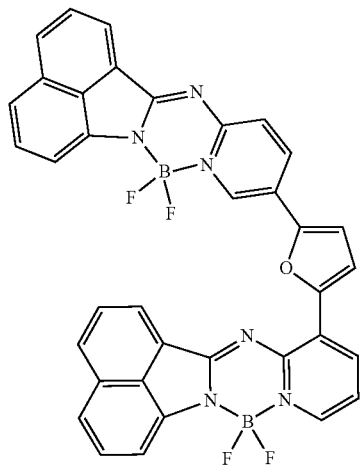
36
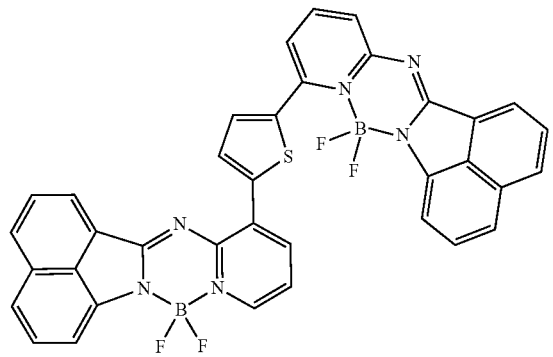
37
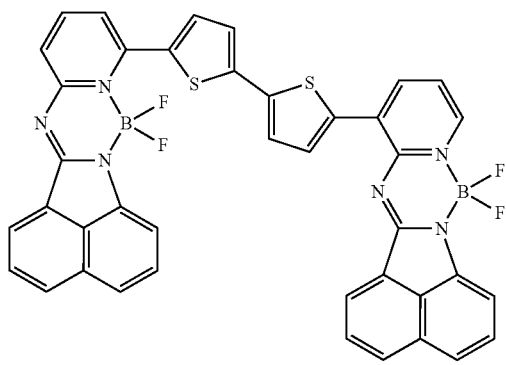
38
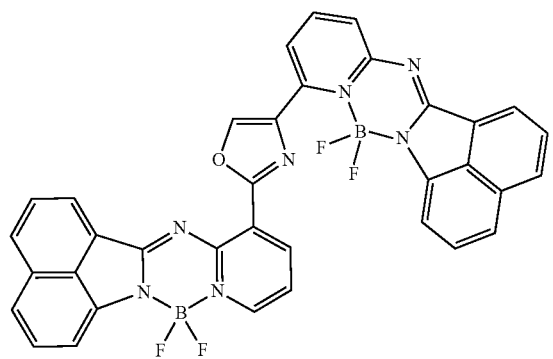
39
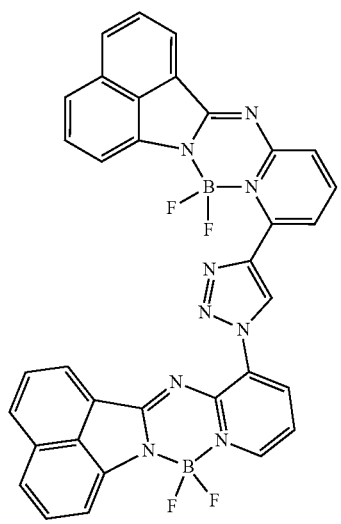
40

41
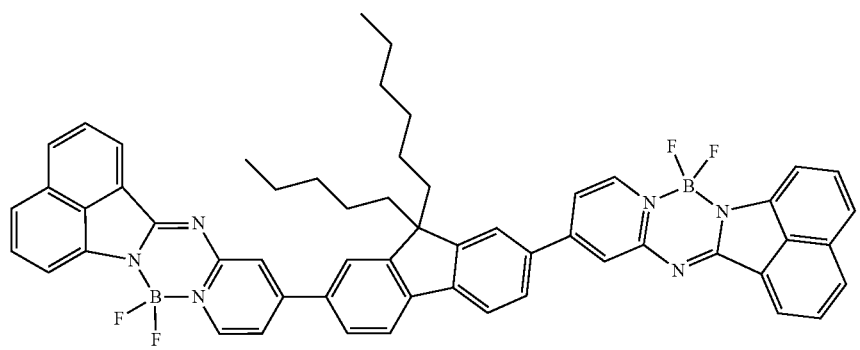
42
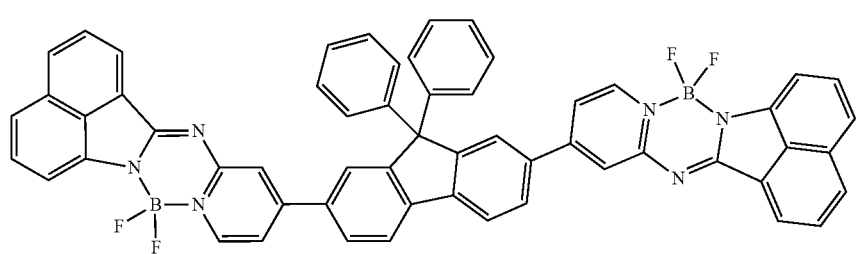
43
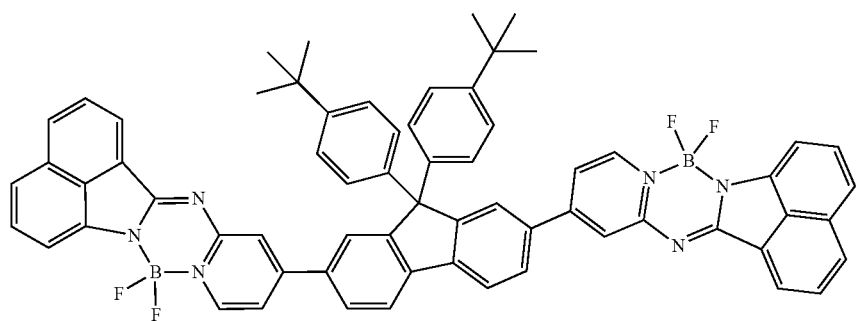
44
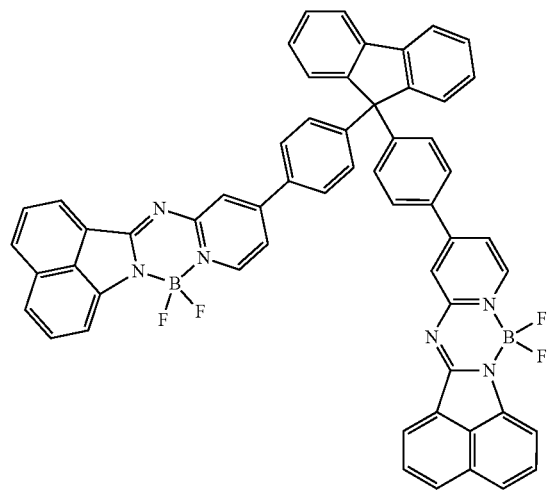

45
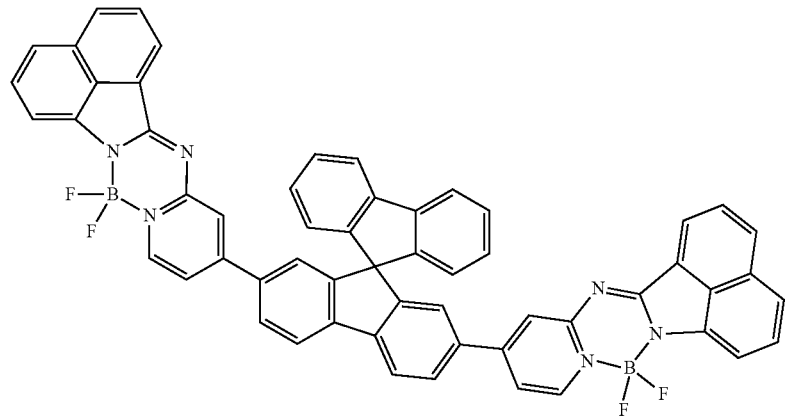
46
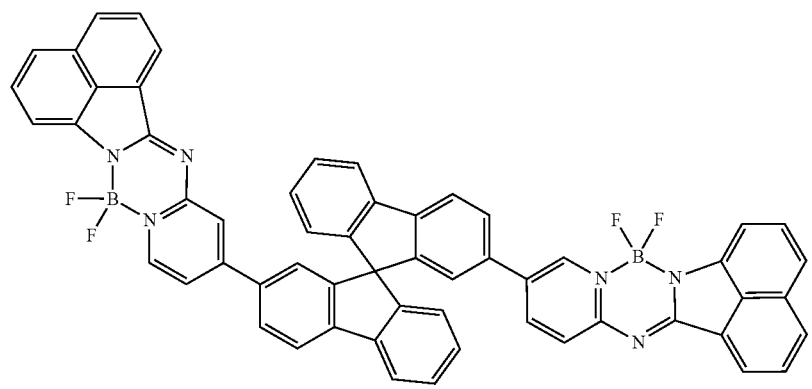
47
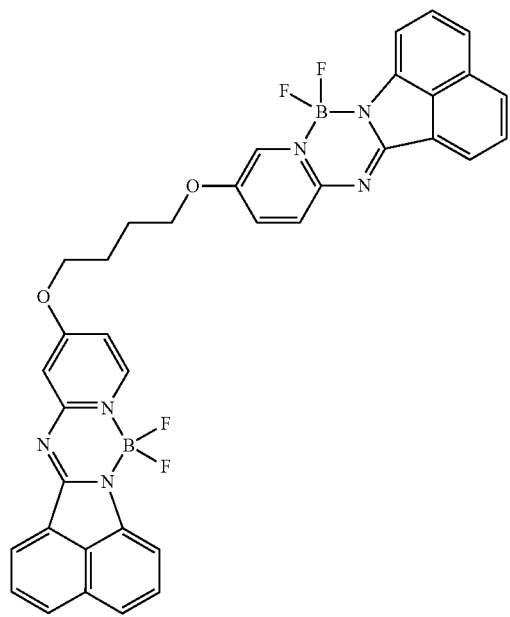
48
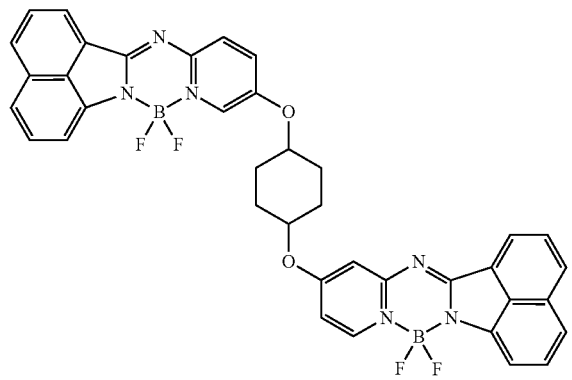

49
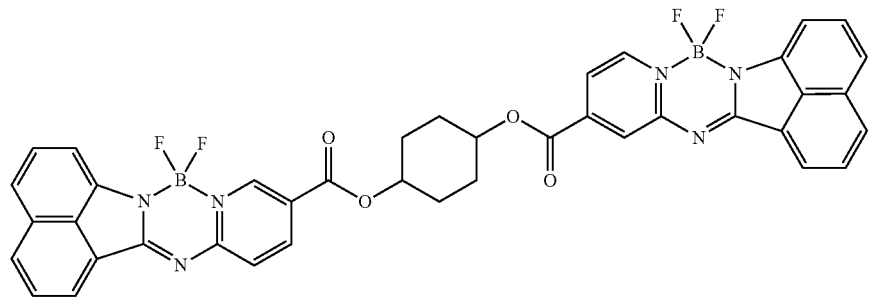
50
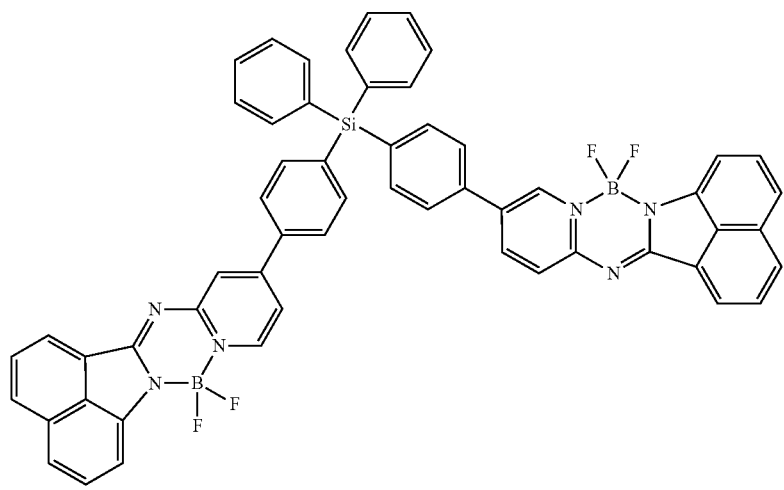
51
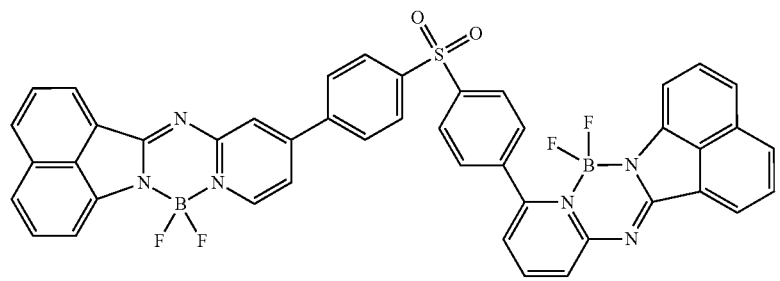
52
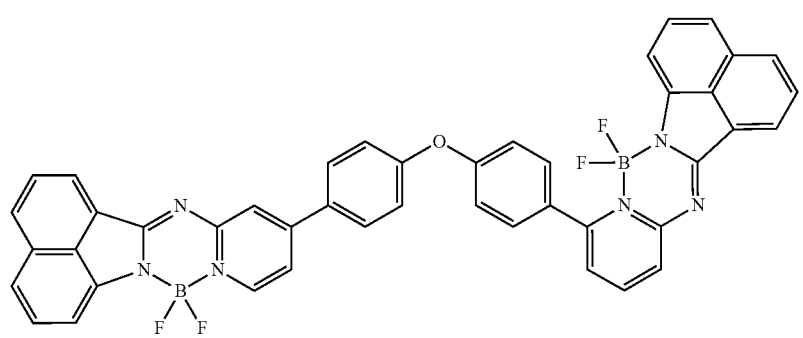

-continued
53
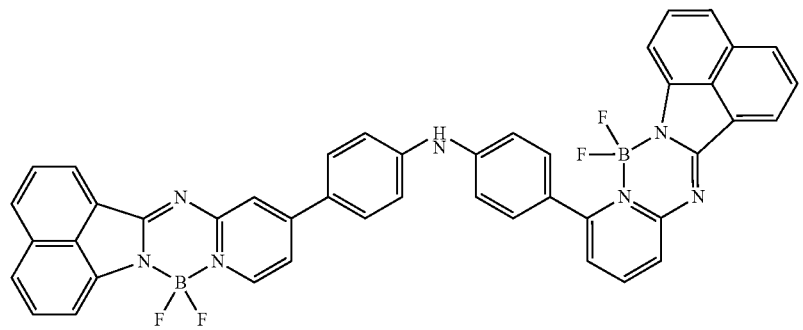
54
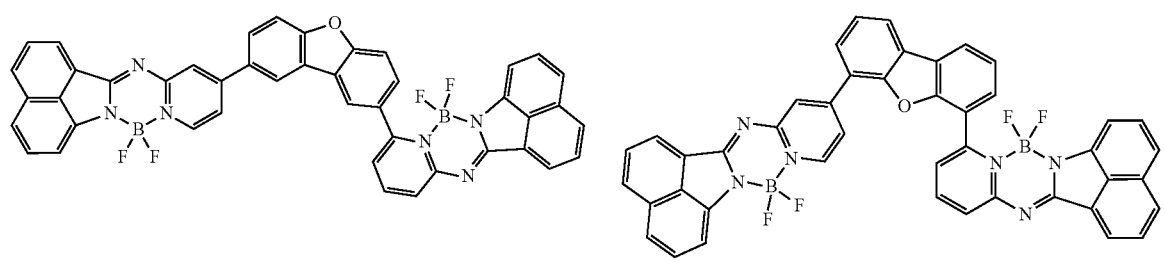
55
56
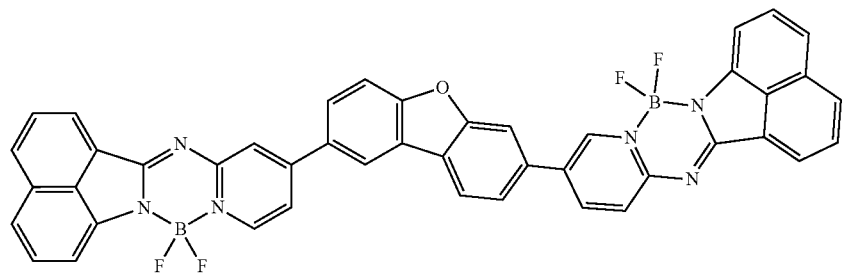
57
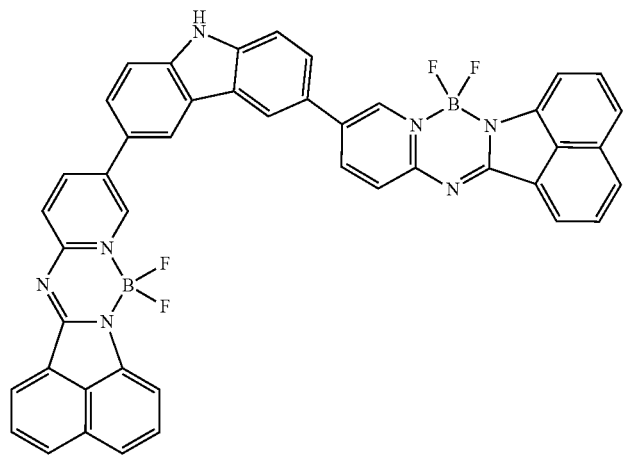

-continued
58
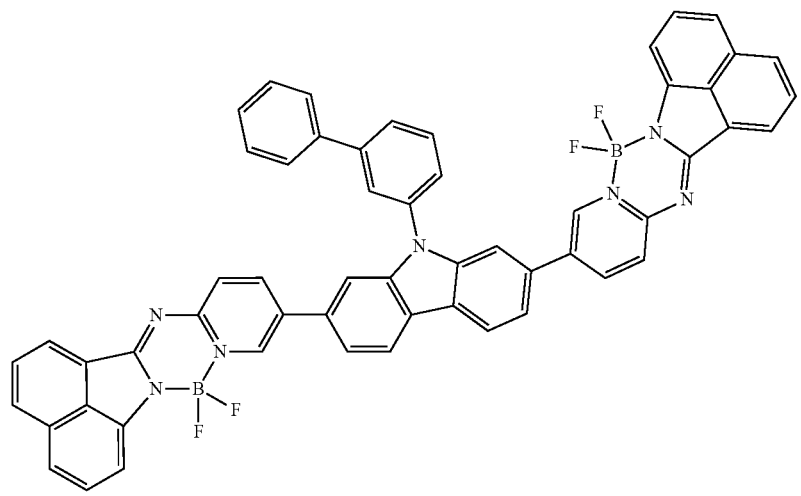
59
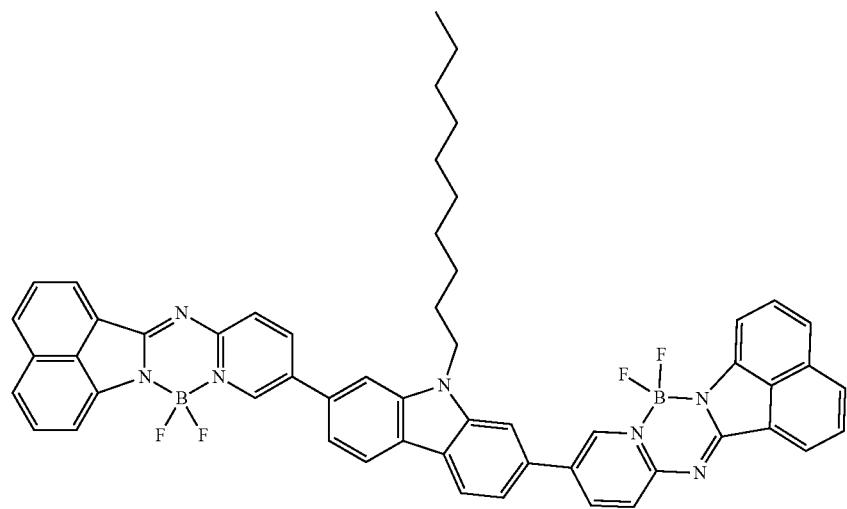
60
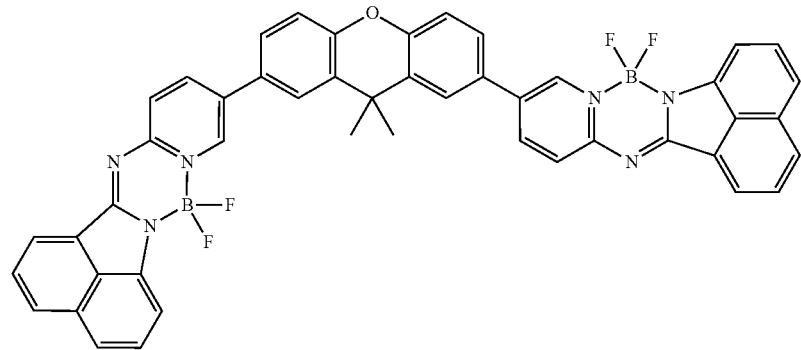

-continued
61
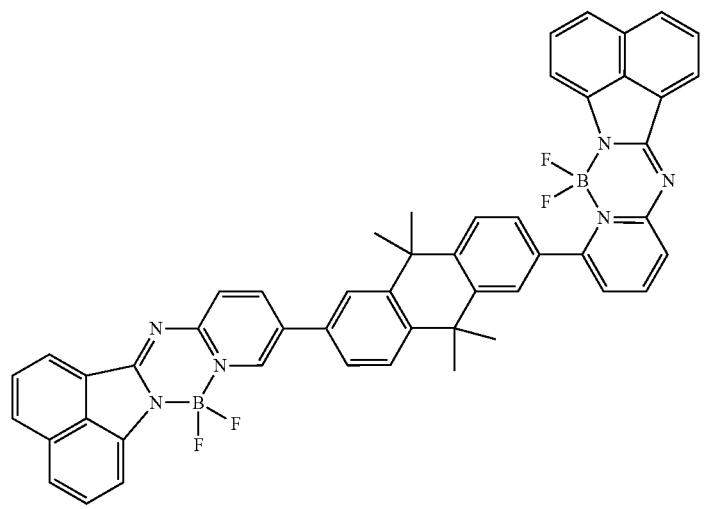
62
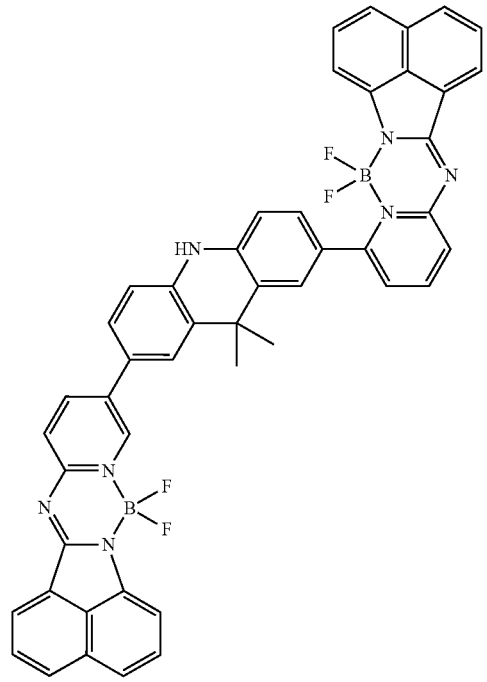
63
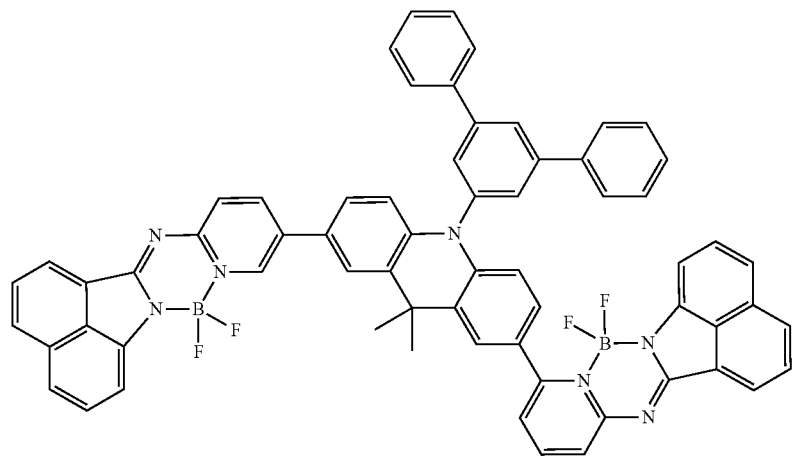

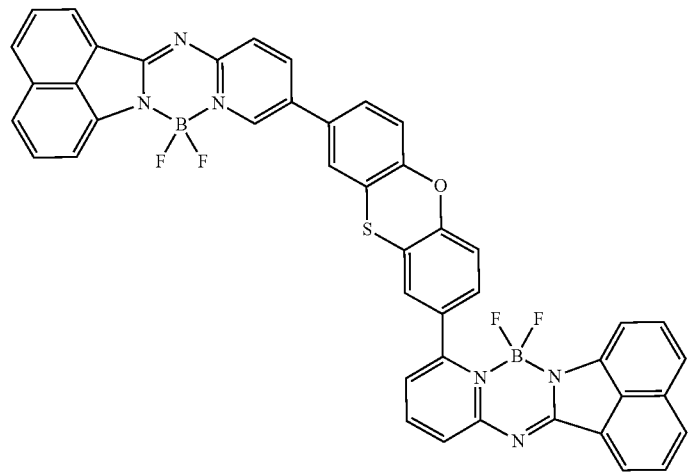
64
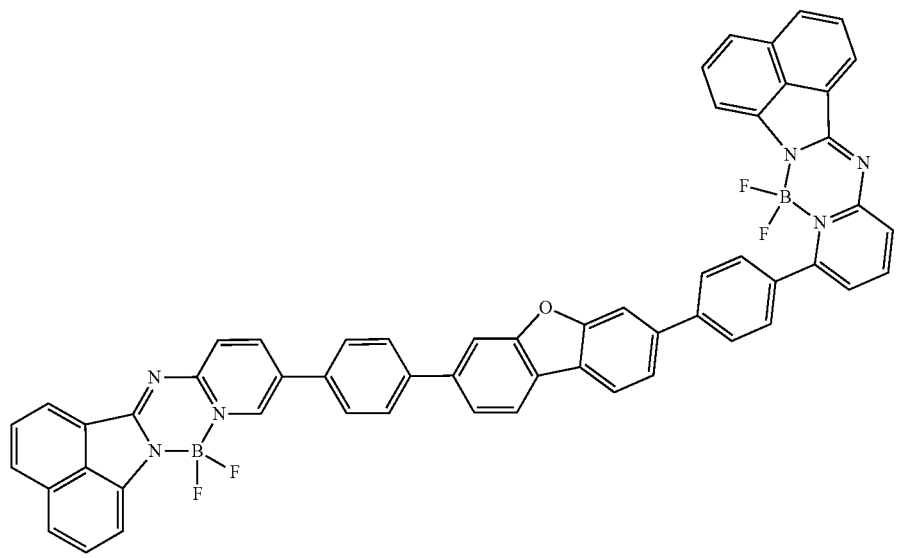
65
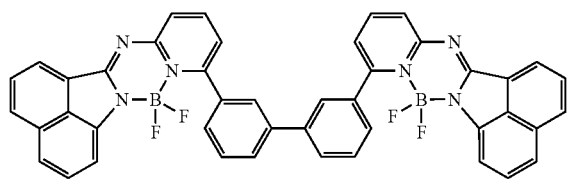
67
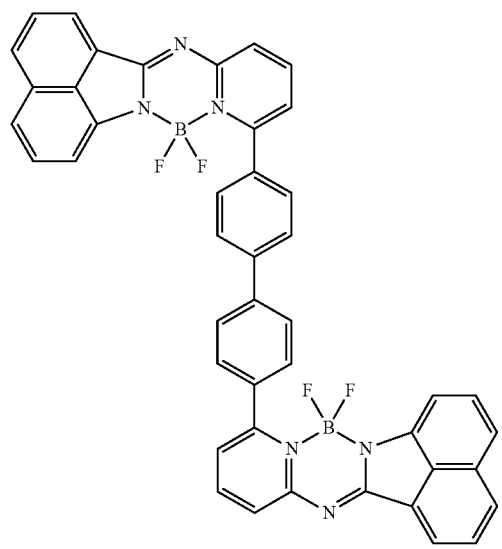
66

-continued
68
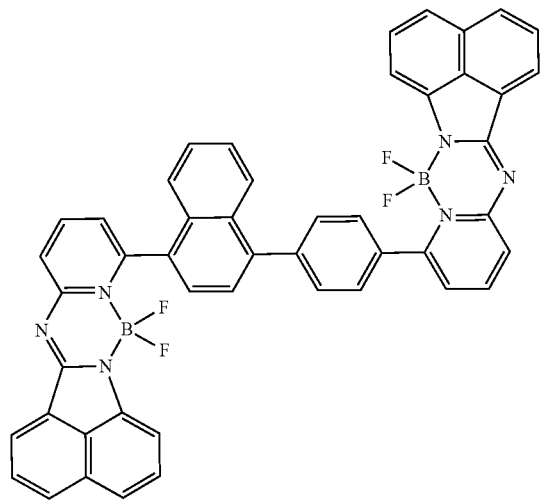
69
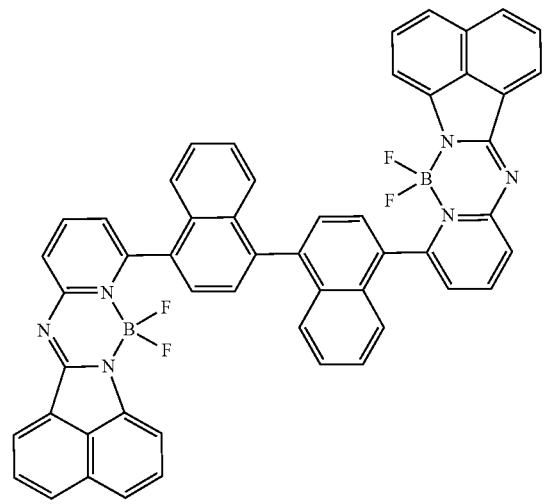
70
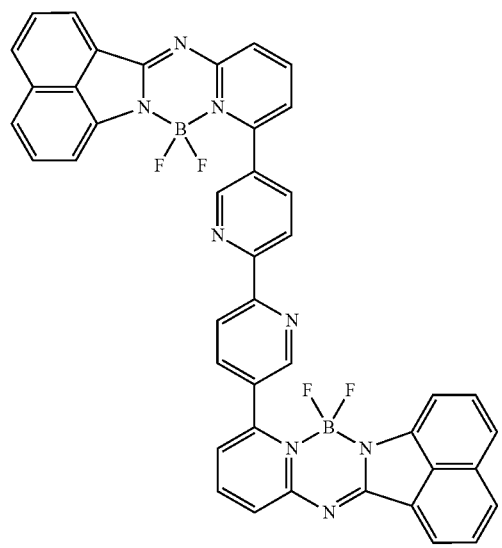
71
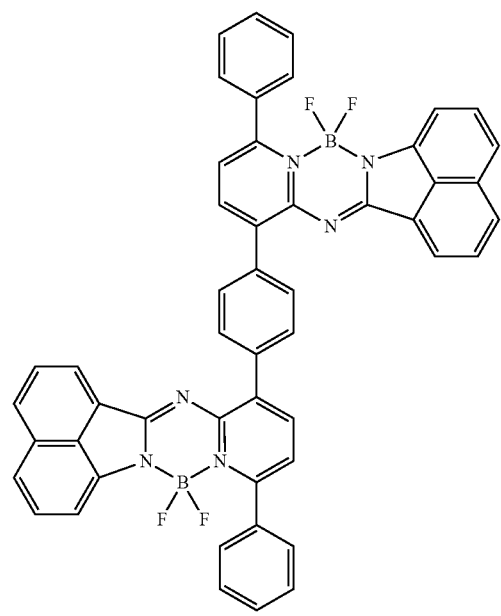
72
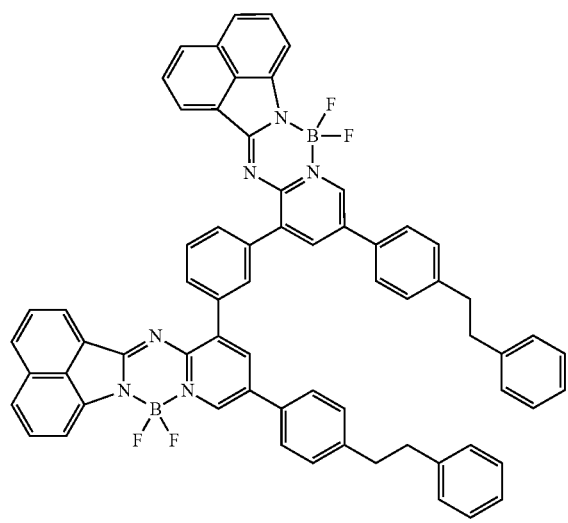
73
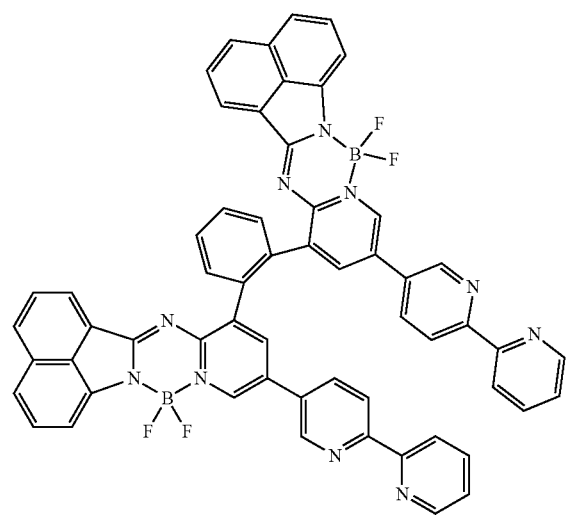

-continued
74
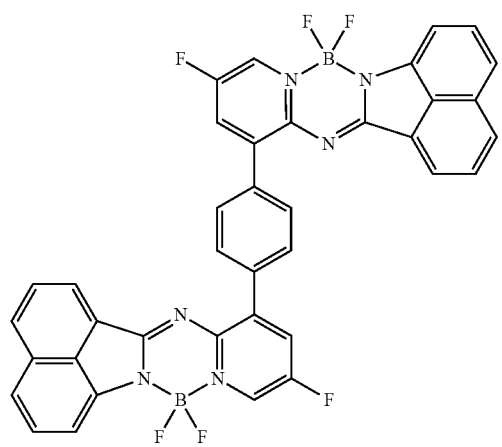
75
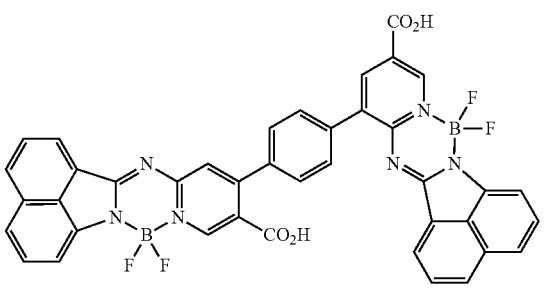
76
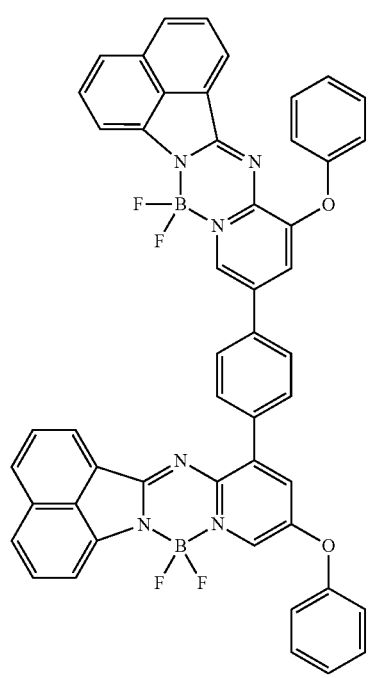
77
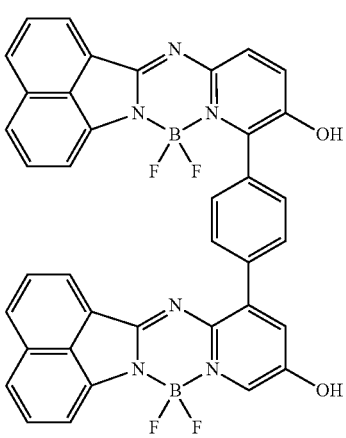
78
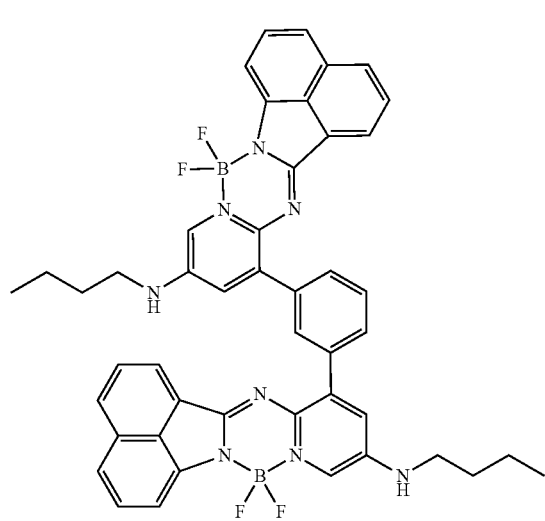
79
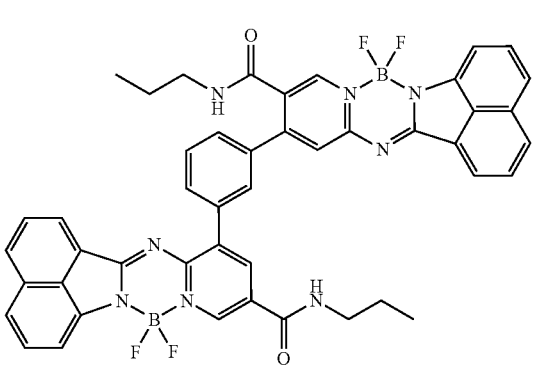

-continued
80
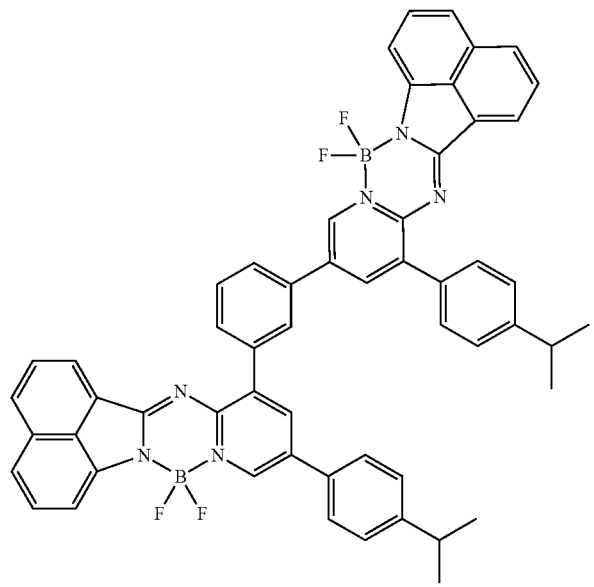
81
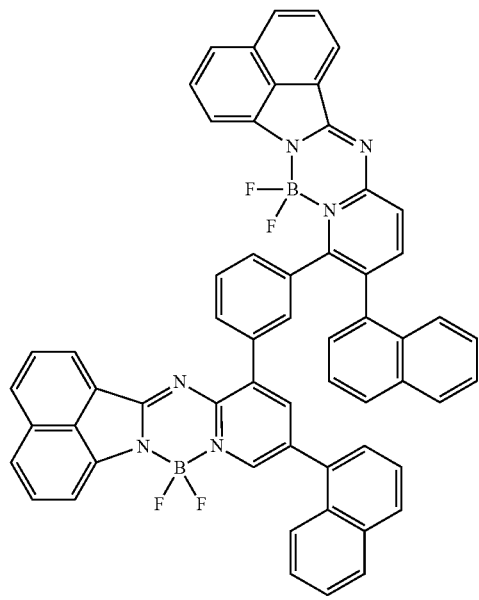
82
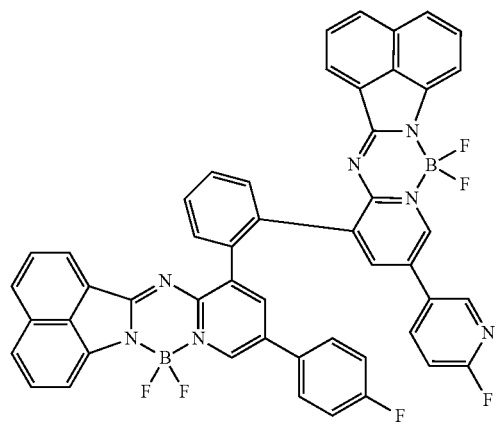
83
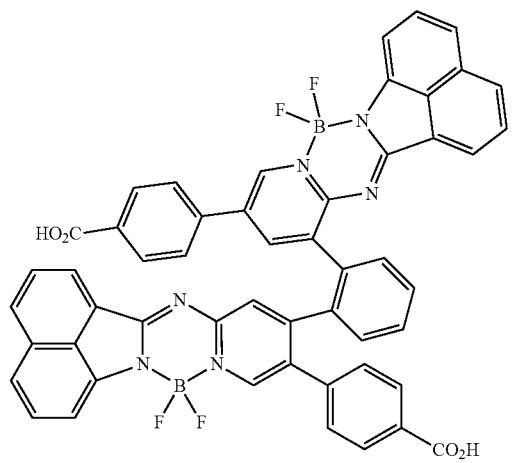
84
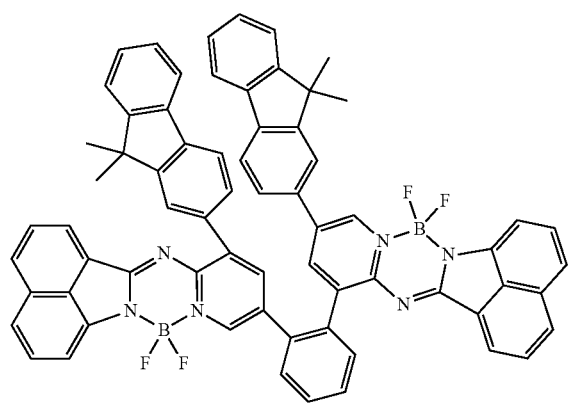
85
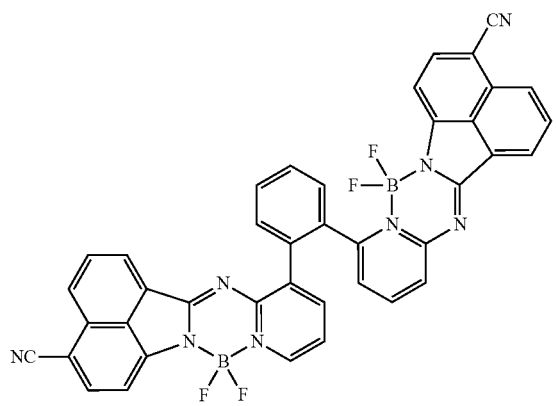

-continued
86
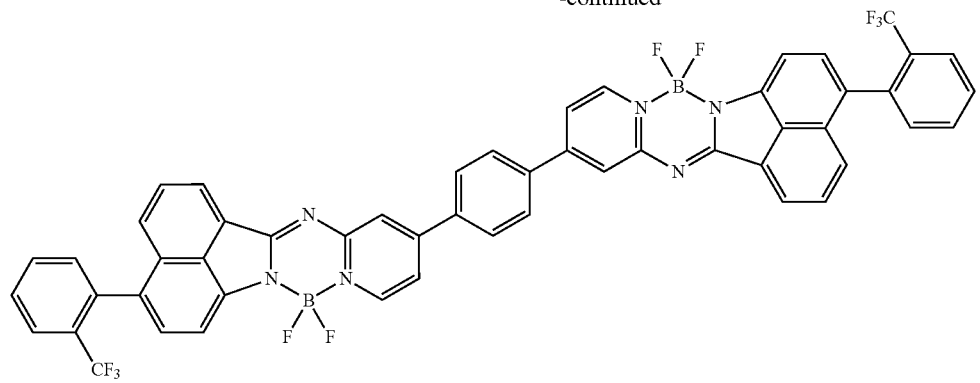
87
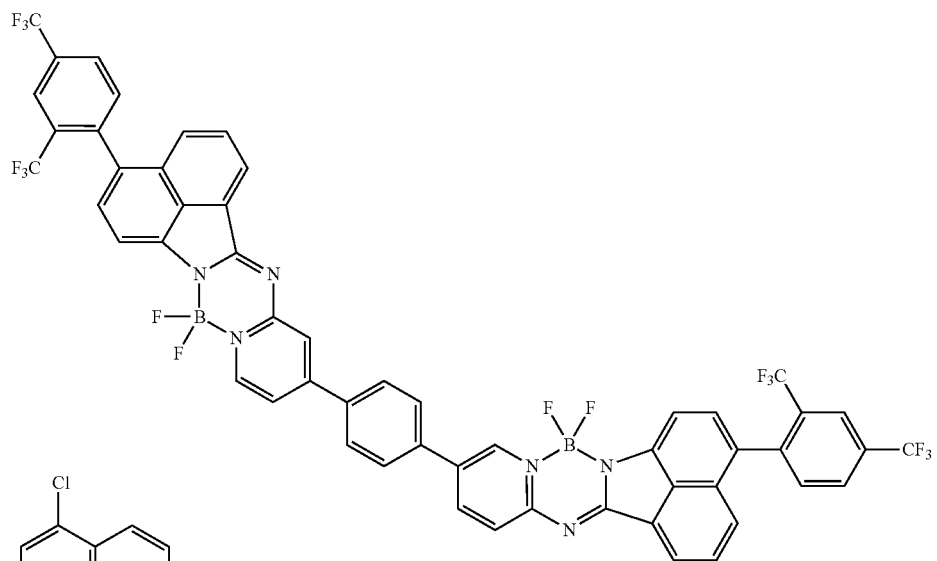
88
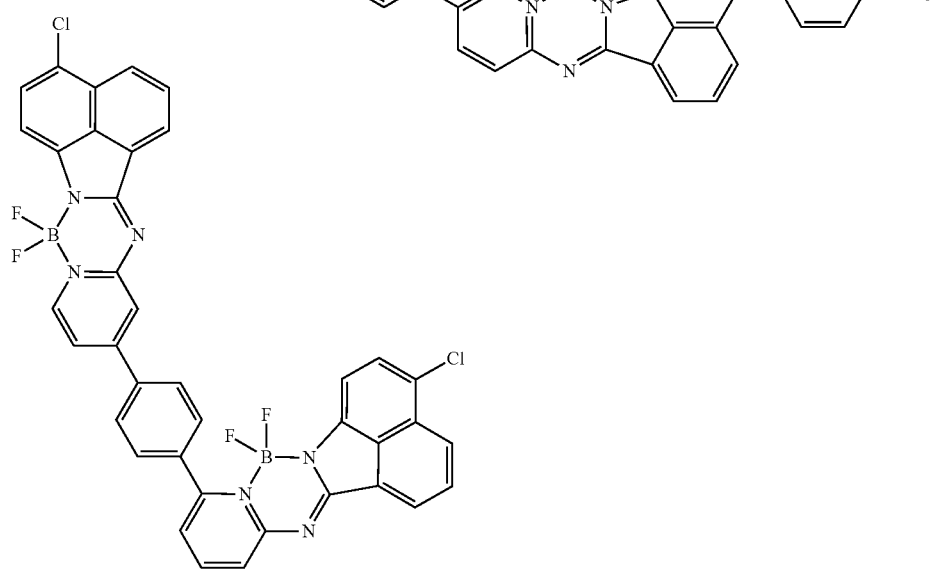
89
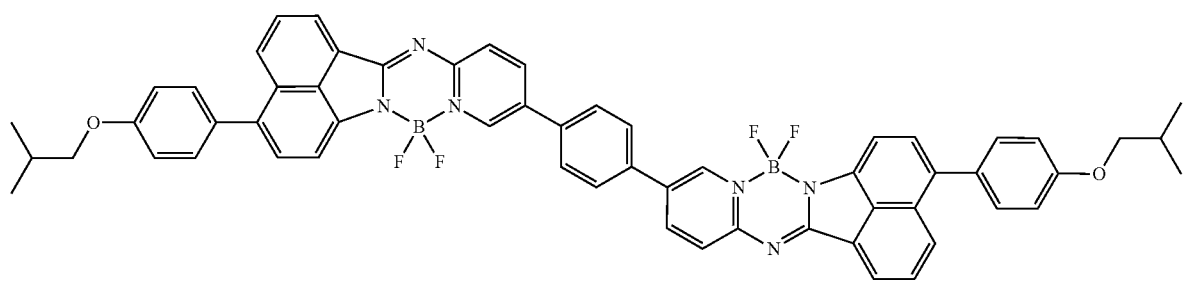

-continued
90
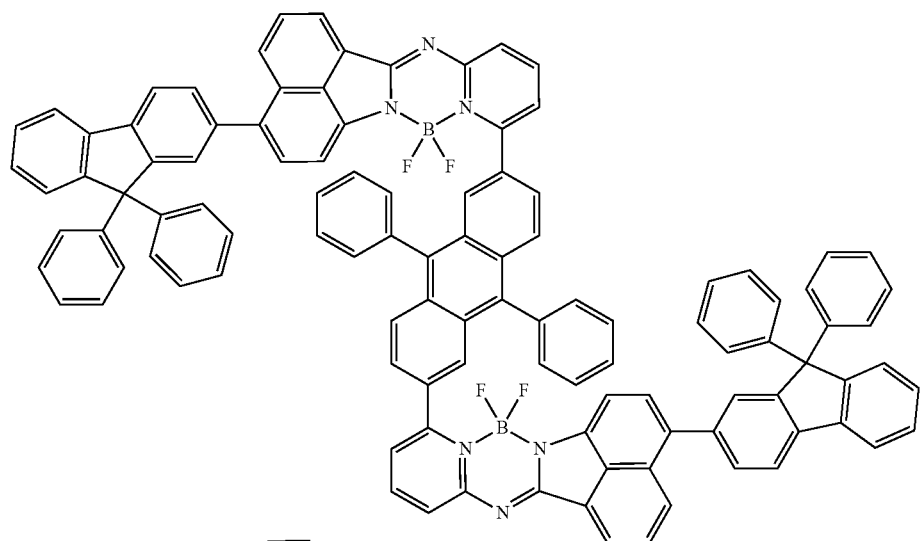
91
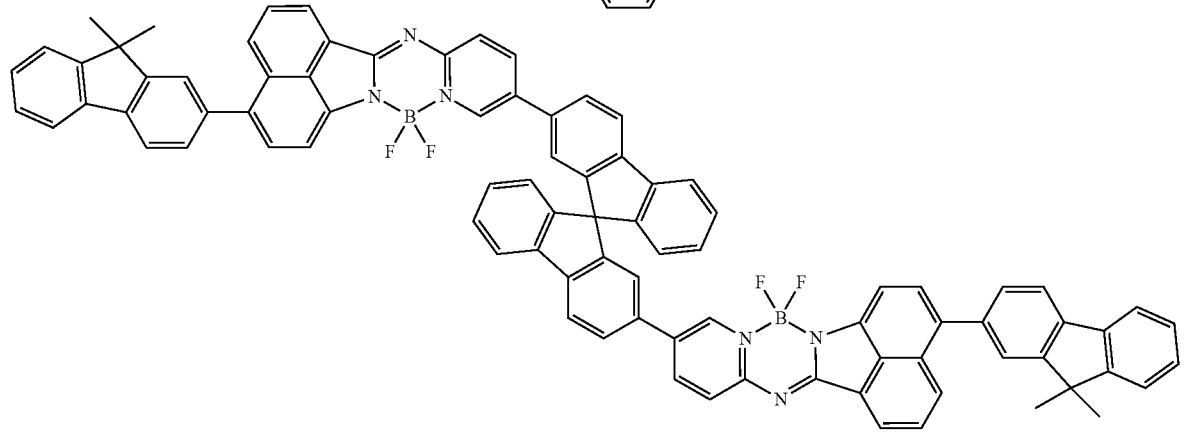
92
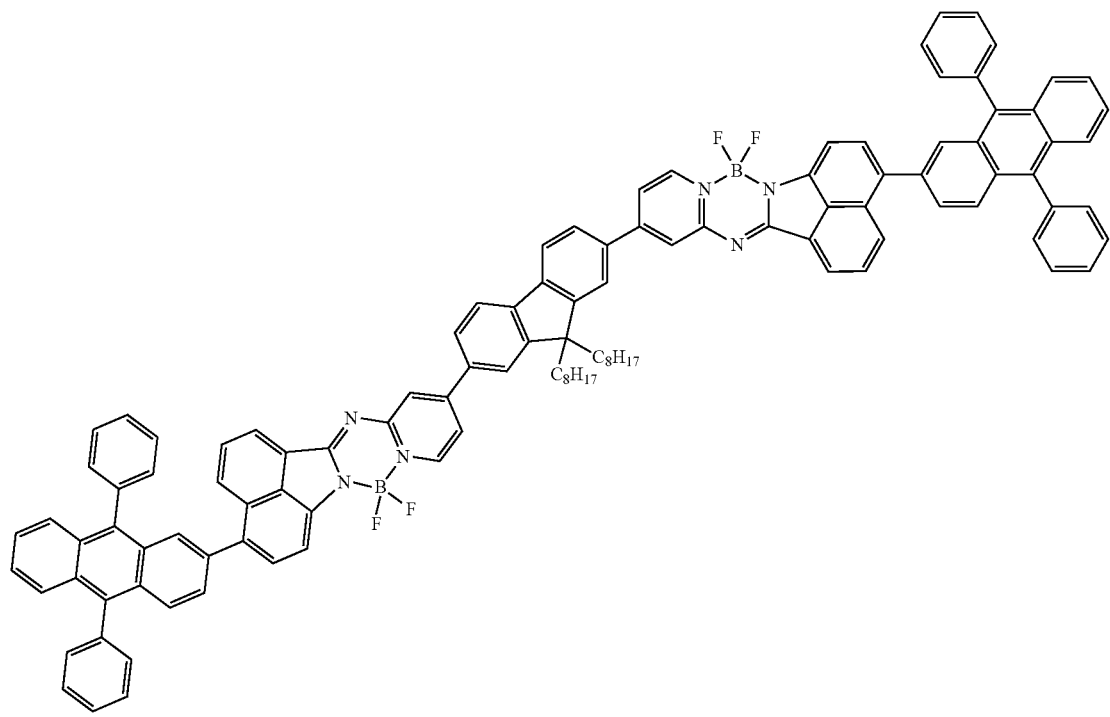

93
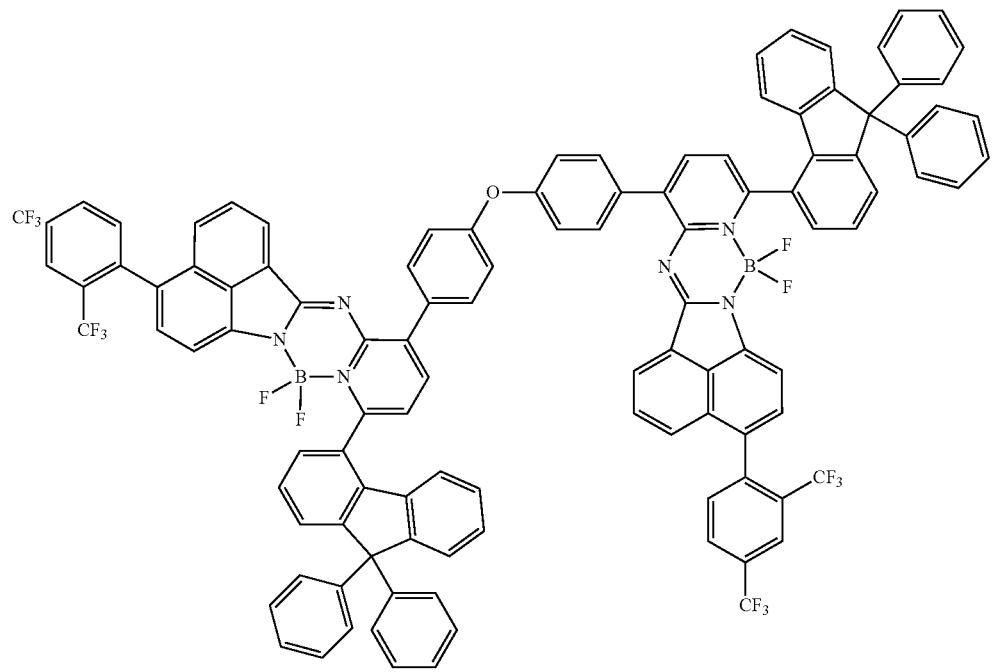
94
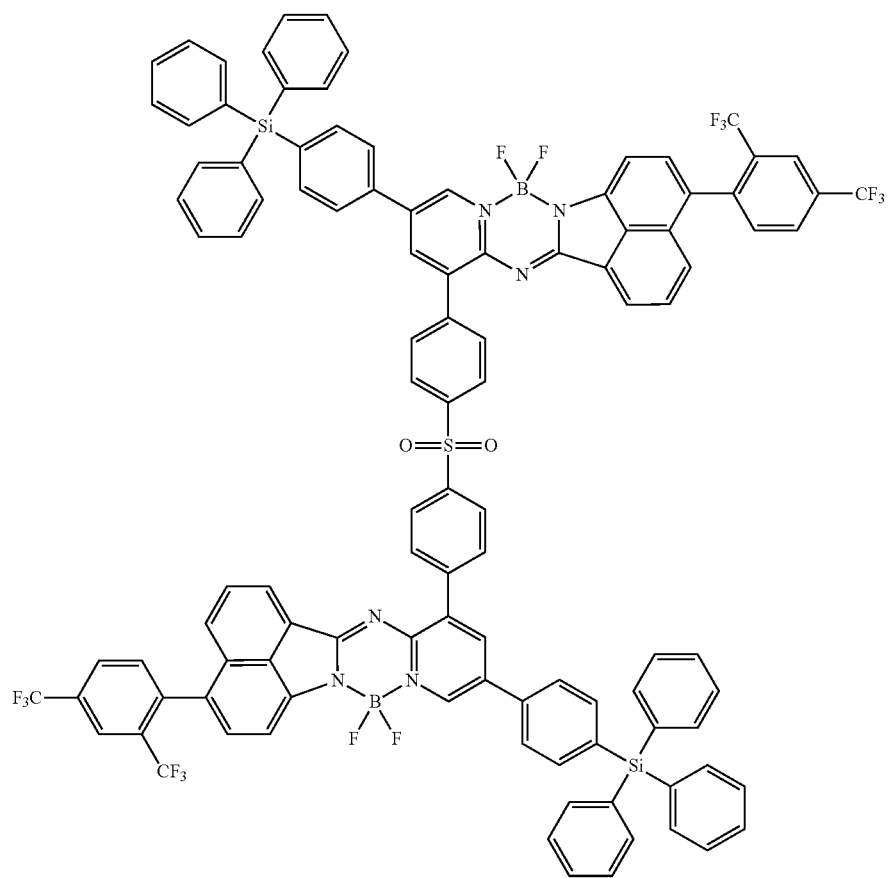

-continued
95
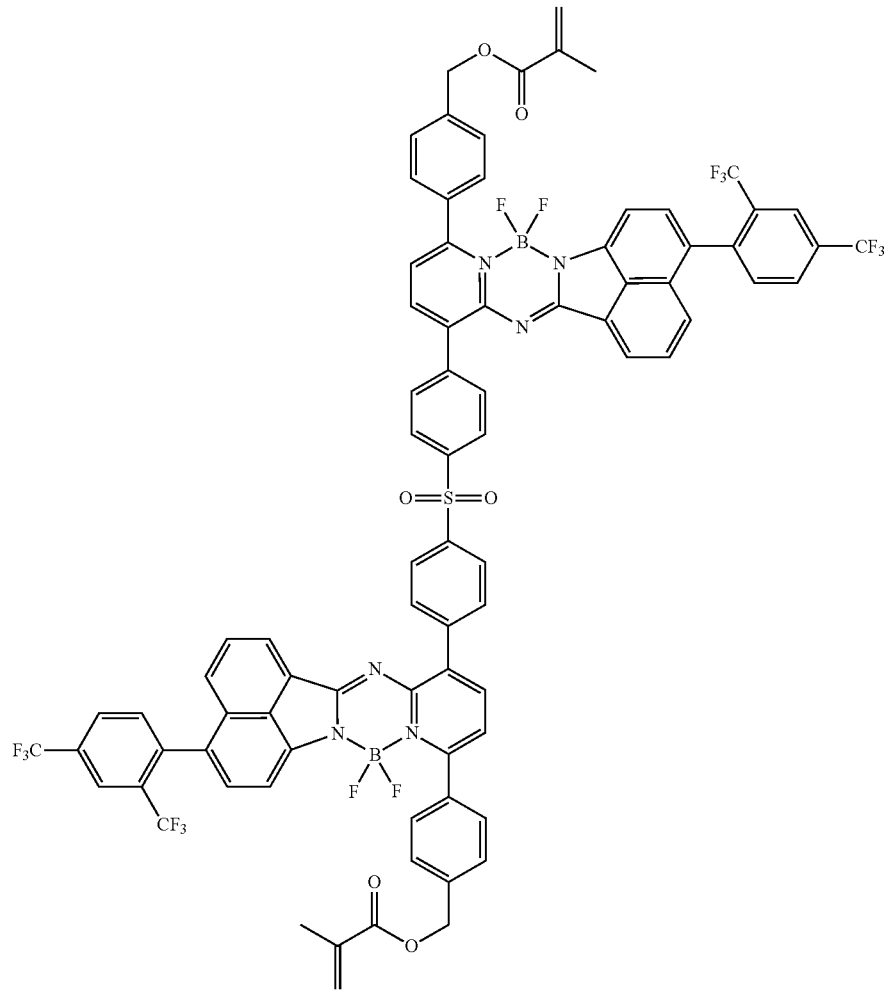
96
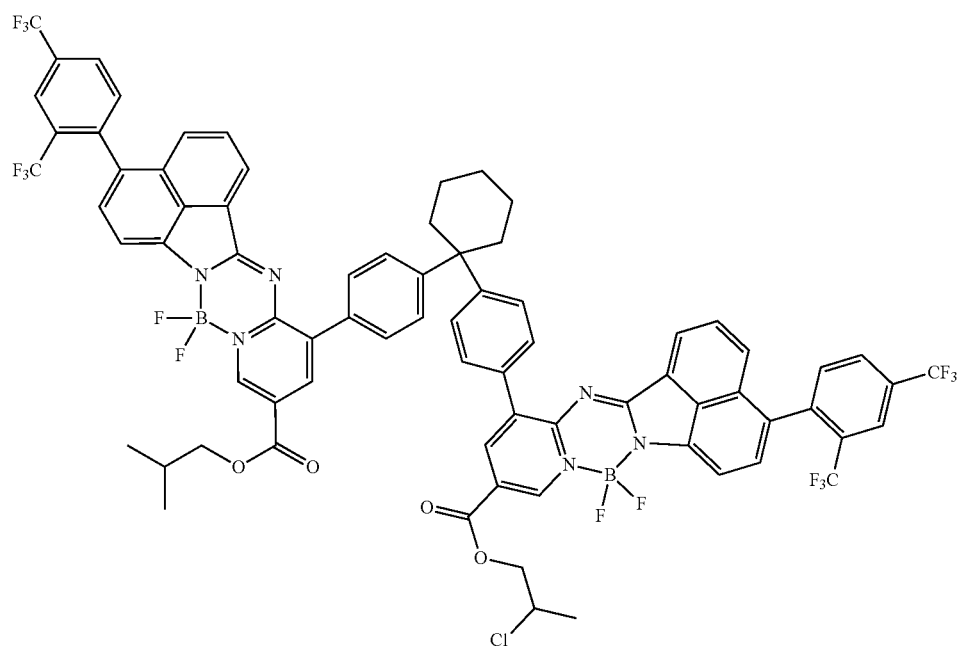

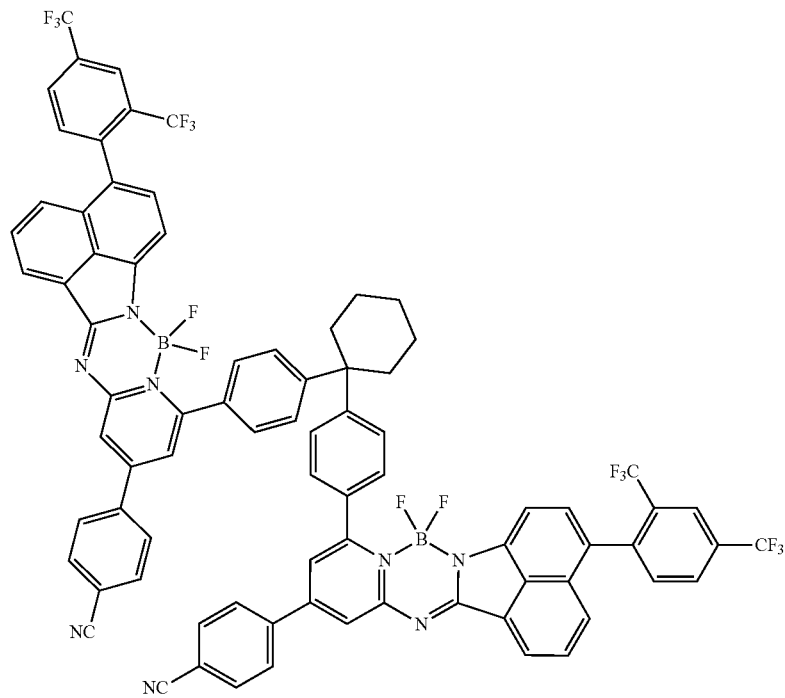
97
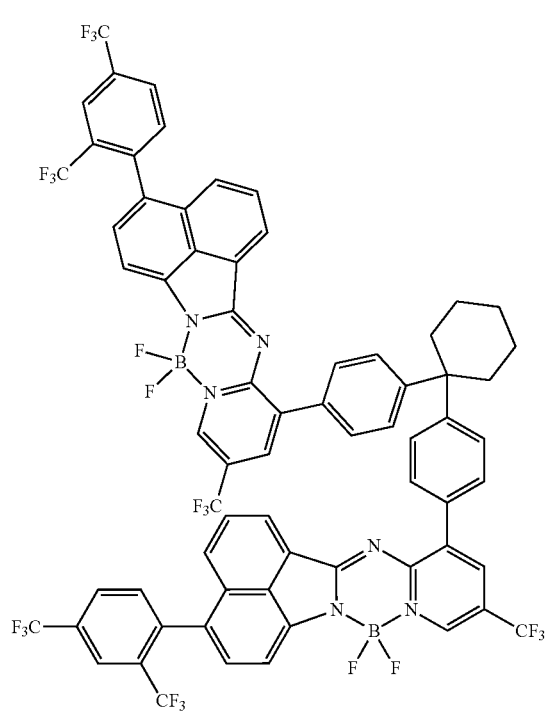
98

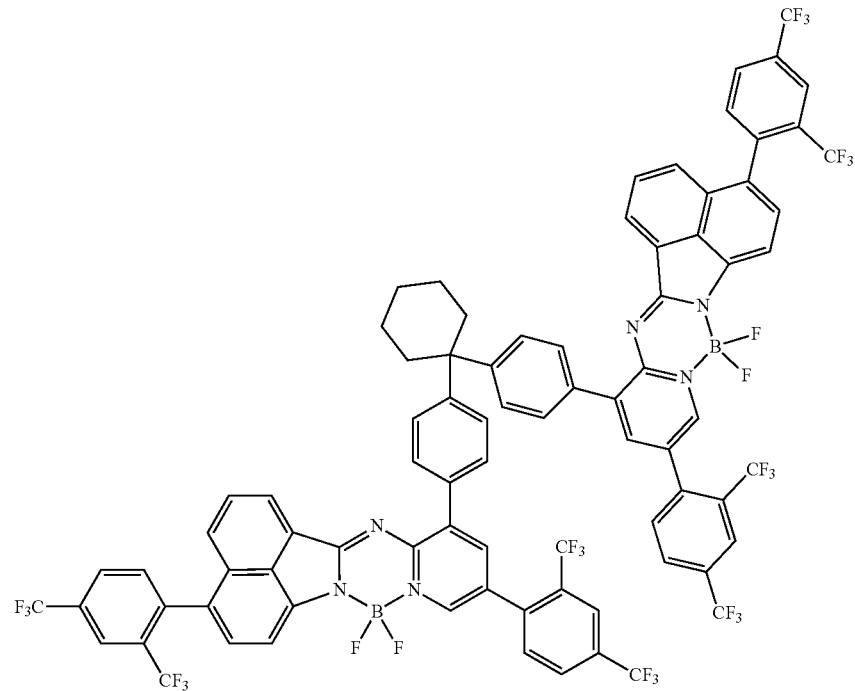
99
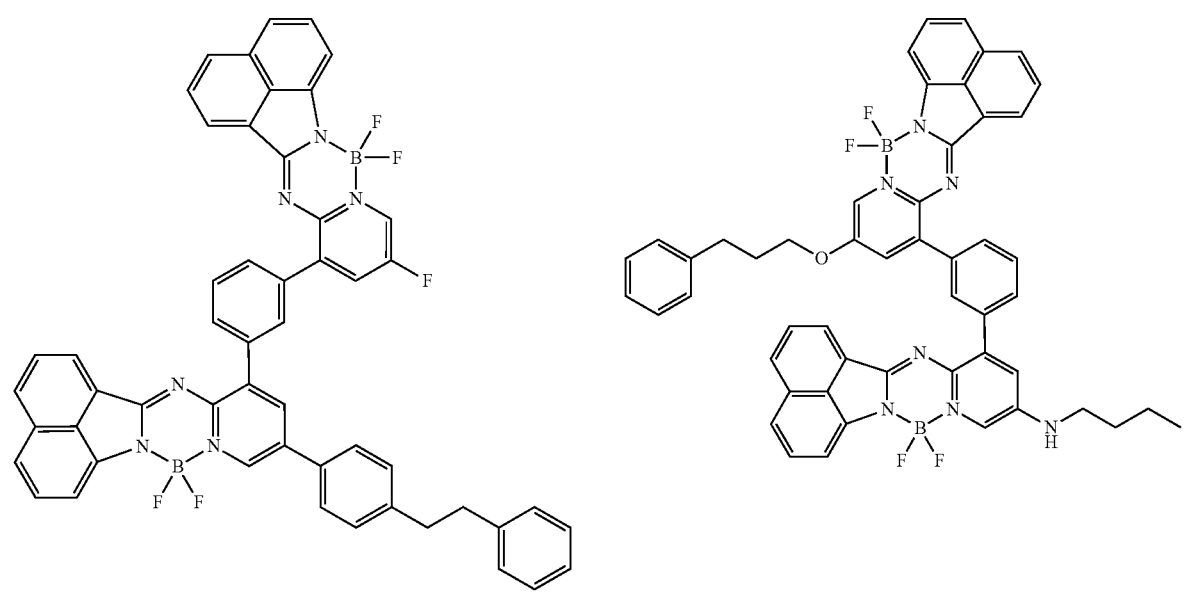
100
101

-continued
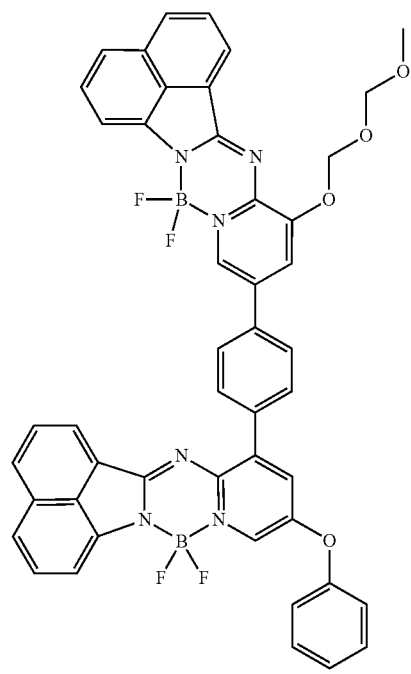
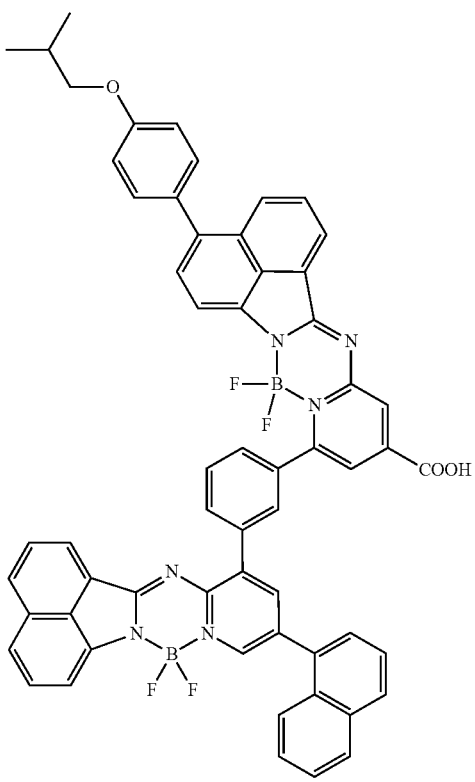
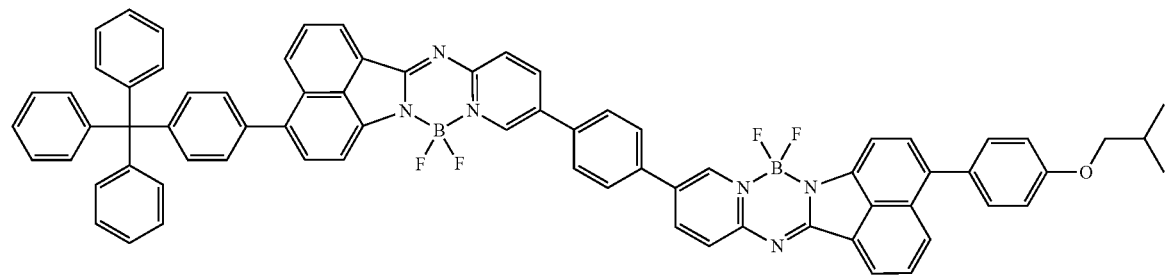
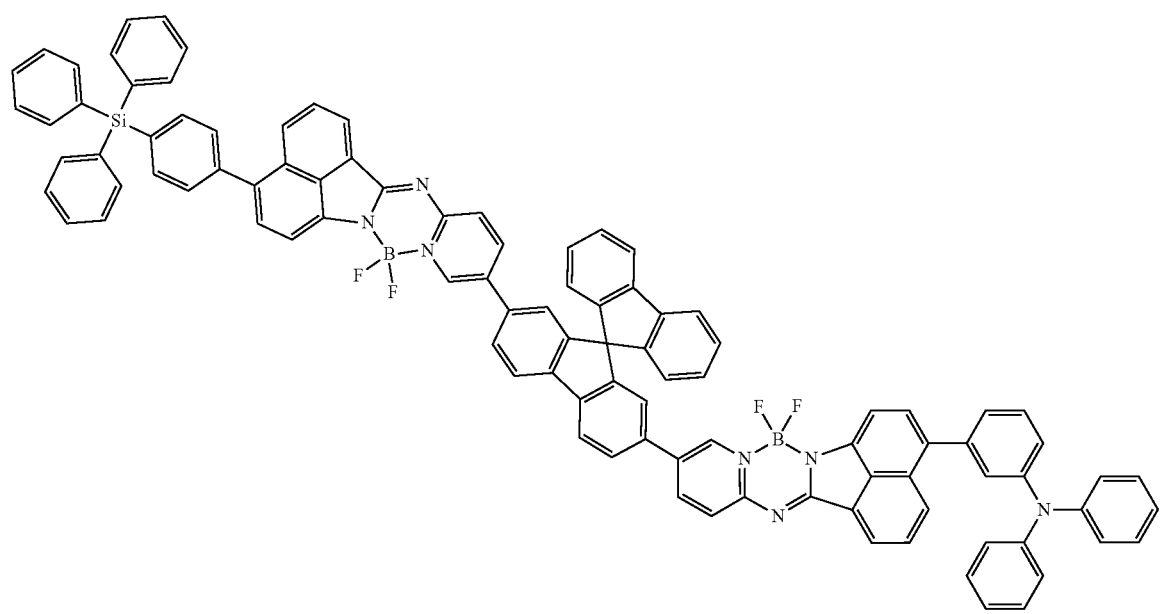

106
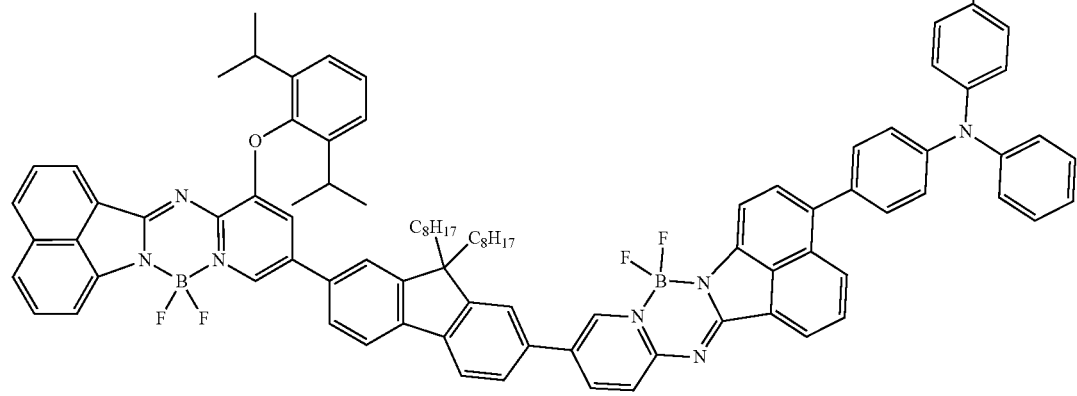
104
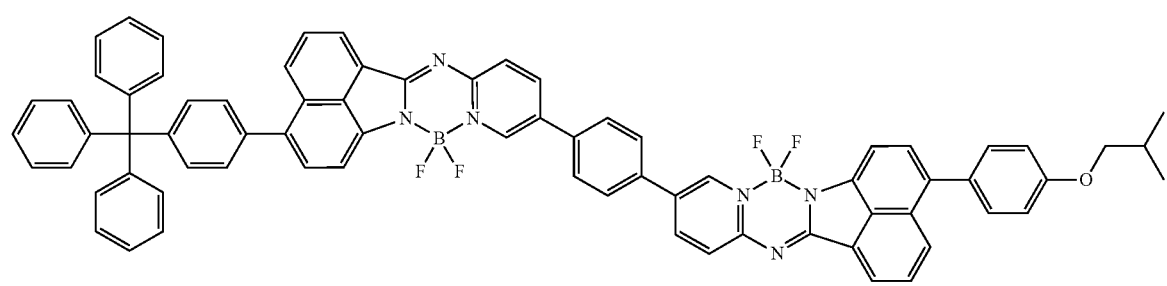
105
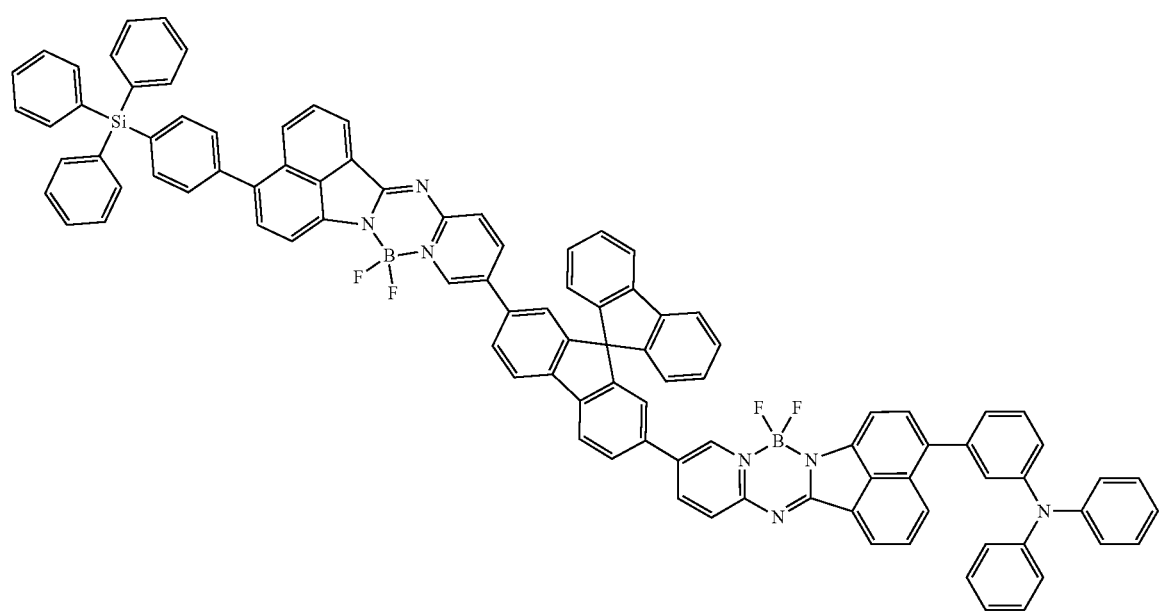

106
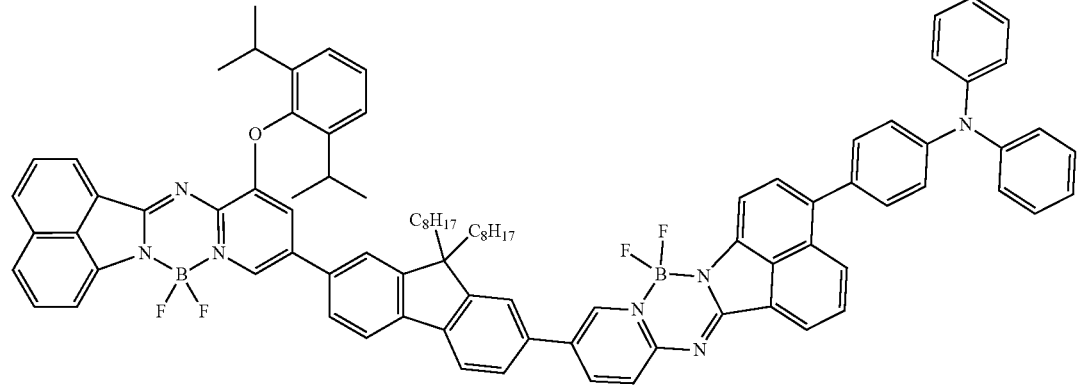
107
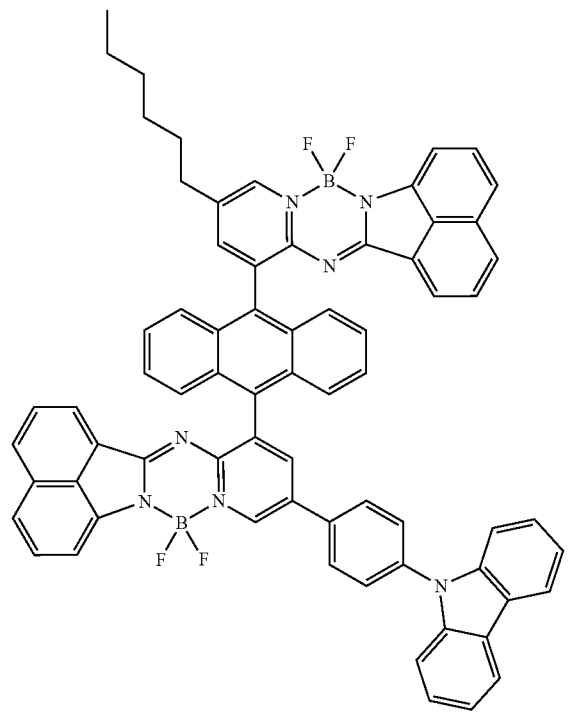
108
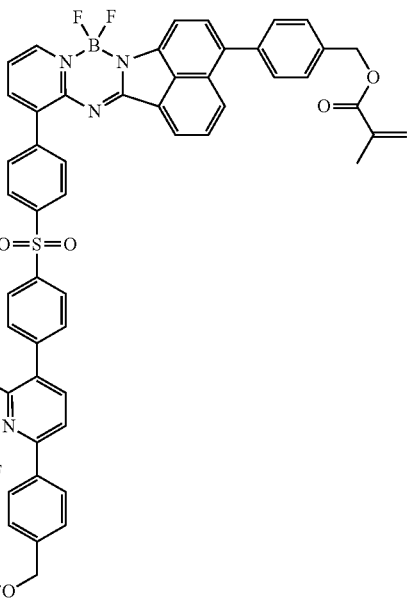

-continued
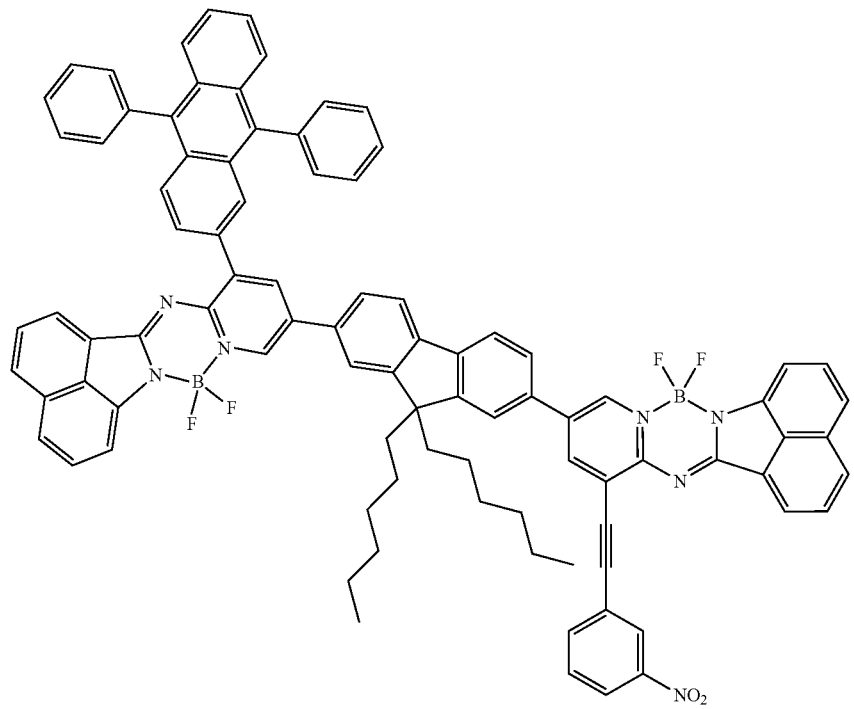
109
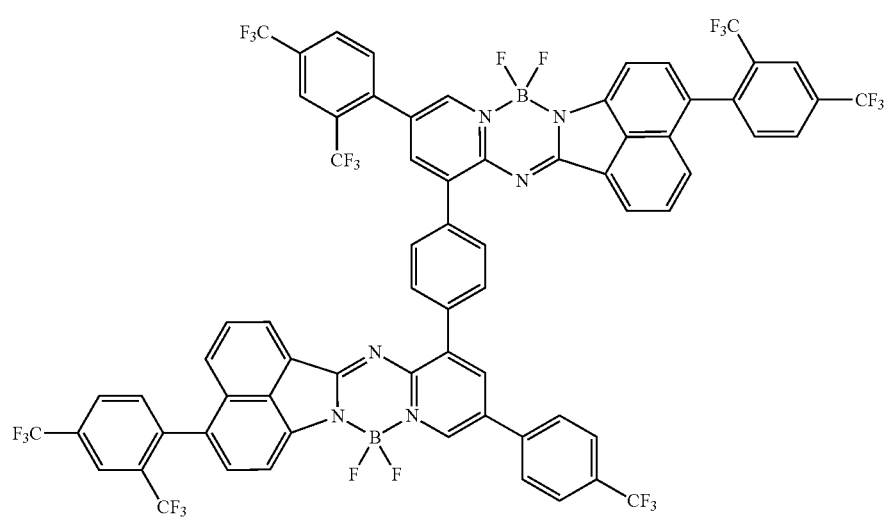
110

-continued
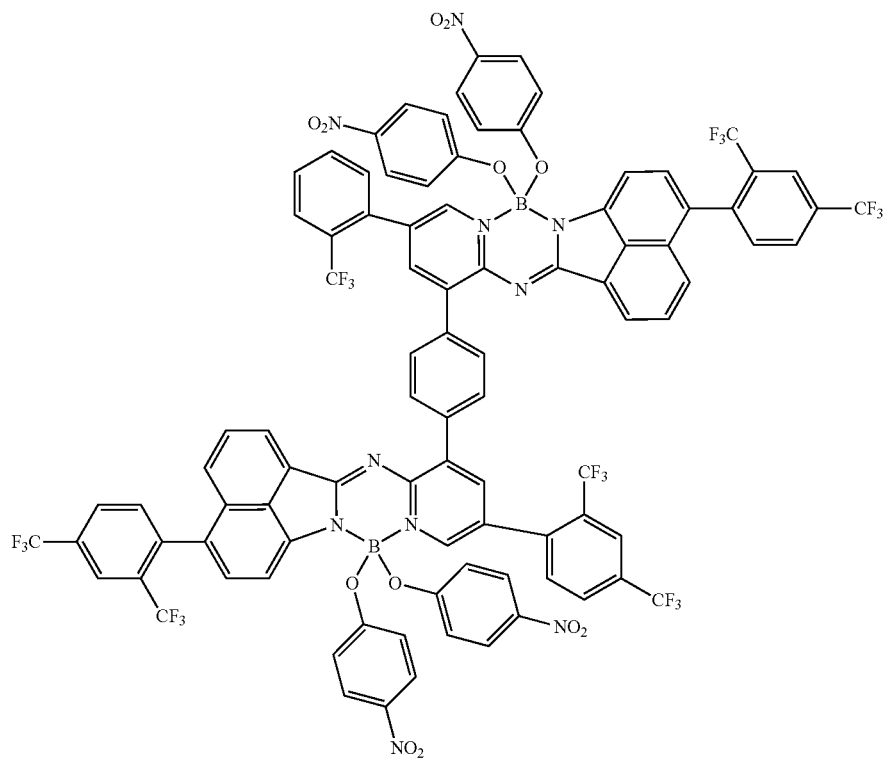
111
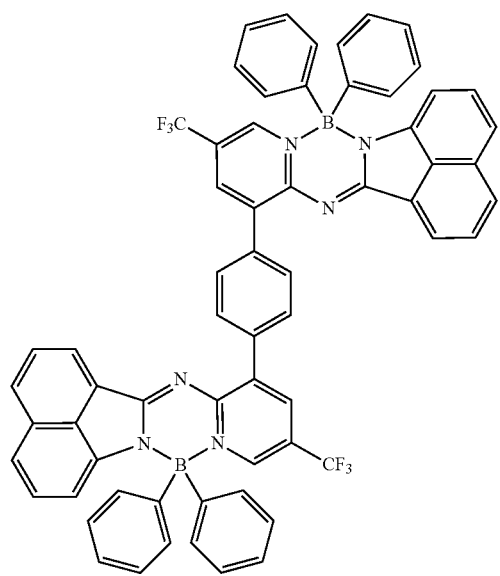
112
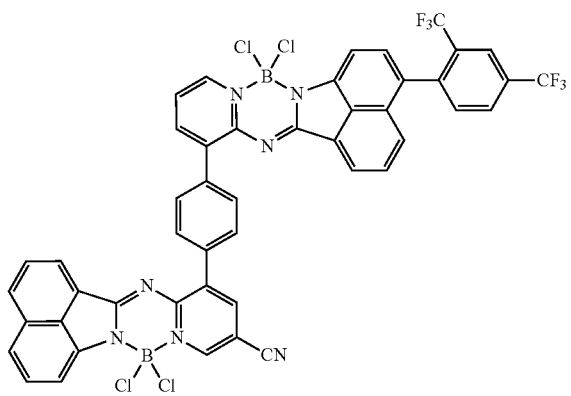
113

114

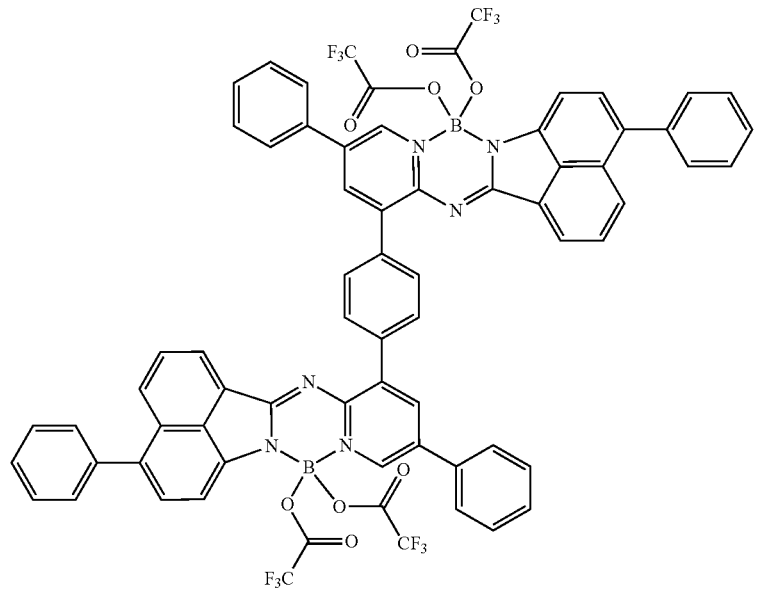

The compound according to an exemplary embodiment of the present specification may be prepared by a preparation method to be described below.

For example, a core structure of the compound of Formula 1 may be prepared as in the following Reaction Formula 1. The substituent may be bonded by a method known in the art, and the kind and position of the substituent or the number of substituents may be changed according to the technology known in the art.

[Reaction Formula 1]

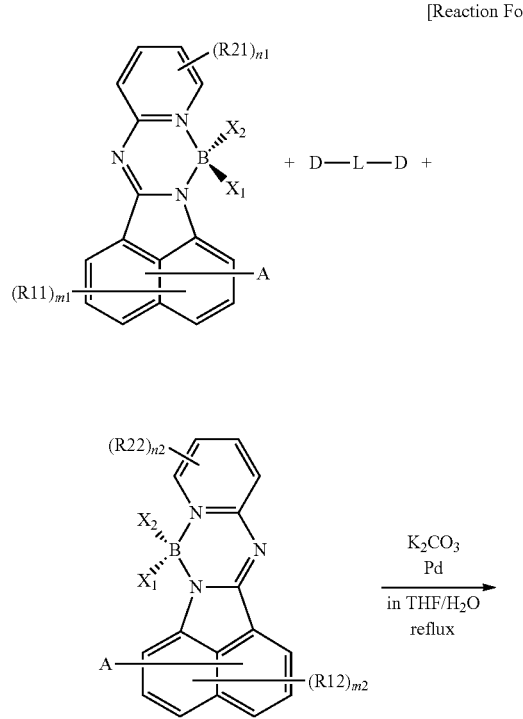

-continued

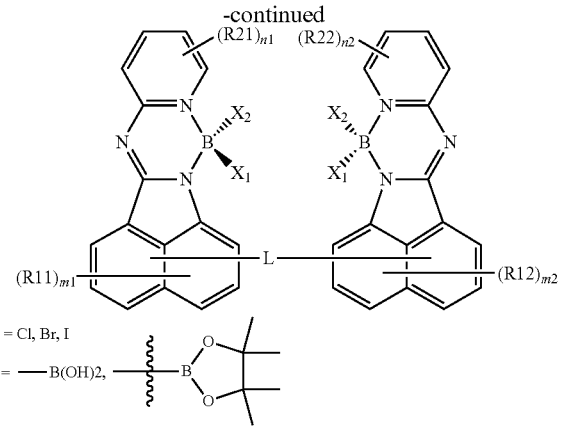

An exemplary embodiment of the present specification provides a color conversion film including: a resin matrix; and the compound represented by Formula 1, which is dispersed in the resin matrix.

The content of the compound represented by Formula 1 in the color conversion film may be within a range of 0.001 wt % to 10 wt %.

The color conversion film may include one or two or more of the compounds represented by Formula 1.

The color conversion film may further include an additional fluorescent material in addition to the compound represented by Formula 1. When a light source which emits blue light is used, is preferred that the color conversion film includes both a fluorescent material which emits green light and a fluorescent material which emits red light. Further, when a light source which emits blue light and green light is used, the color conversion film may include only a fluorescent material which emits red light. However, the color conversion film is not limited thereto, and even when a light source which emits blue light is used, the color conversion film may include only a compound, which emits red light, in the case where a separate film including a fluorescent material which emits green light is stacked. Conversely, even when a light source which emits blue light is used, the color conversion film may include only a compound, which emits green light, in the case where a separate film including a fluorescent material which emits red light is stacked.

The color conversion film may further include a resin matrix; and an additional layer including a compound which is dispersed in the resin matrix and emits light having a wavelength different from that of the compound represented by Formula 1. The compound which emits light having a wavelength different from that of the compound represented by Formula 1 may also be the compound expressed as Formula 1, and may also be another publicly-known fluorescent material.

It is preferred that a material for the resin matrix is a thermoplastic polymer or a thermosetting polymer. Specifically, as the material for the resin matrix, it is possible to use a poly(meth)acrylic material such as polymethylmethacrylate (PMMA), a polycarbonate (PC)-based material, a polystyrene (PS)-based material, a polyarylene (PAR)-based material, a polyurethane (PU)-based material, a styrene-acrylonitrile (SAN)-based material, a polyvinylidenefluoride (PVDF)-based material, a modified-polyvinylidenefluoride (modified-PVDF)-based material, and the like.

According to an exemplary embodiment of the present specification, the color conversion film according to the above-described exemplary embodiment additionally includes light diffusion particles. By dispersing light diffusion particles in the color conversion film instead of a light diffusion film used in the related art in order to improve brightness, an attaching process may be omitted, and higher brightness may be exhibited as compared to the case where a separate light diffusion film is used.

As the light diffusion particle, a particle having a refractive index higher than a resin matrix may be used, and it is possible to use, for example, $TiO_2$, silica, borosilicate, alumina, sapphire, air or another gas, air- or gas-filled hollow beads or particles (for example, air/gas-filled glass or polymer); polymer particles including polystyrene, polycarbonate, polymethylmethacrylate, acryl, methyl methacrylate, styrene, a melamine resin, a formaldehyde resin, or a melamine and formaldehyde resin, or any suitable combination thereof.

The particle diameter of the light diffusion particles may be within a range of 0.1 μm to 5 μm, for example, within a range of 0.3 μm to 1 μm. The content of the light diffusion particles may be determined, if necessary, and may be, for example, within a range of about 1 part by weight to about 30 parts by weight based on 100 parts by weight of the resin matrix.

The color conversion film according to the above-described exemplary embodiment may have a thickness of 2 μm to 200 μm. In particular, the color conversion film may exhibit high brightness even in a small thickness of 2 μm to 20 μm. This is because the content of the fluorescent material molecule included in a unit volume is higher than that of a quantum dot.

A base material may be provided on one surface of the color conversion film according to the above-described exemplary embodiment. The base material may function as a support when preparing the color conversion film. The kind of base material is not particularly limited, and the material or thickness of the base material is not limited as long as the base material is transparent and may function as the support. Here, transparency means that the transmittance of visible light is 70% or more. For example, as the base material, a PET film may be used.

The above-described color conversion film may be prepared by coating a resin solution, in which the above-described compound represented by Formula 1 is dissolved, on a base material and drying the resin solution, or extruding the above-described compound represented by Formula 1 together with the resin to produce a film.

Since the above-described compound represented by Formula 1 is dissolved in the resin solution, the compound represented by Formula 1 is uniformly distributed in the solution. This is different from a process of preparing a quantum dot film, which requires a separate dispersing process.

The preparation method of the resin solution in which the compound represented by Formula 1 is dissolved is not particularly limited as long as the above-described compound represented by Formula 1 is in a state where the resin is dissolved in the solution.

According to an example, the resin solution in which the compound represented by Formula 1 is dissolved may be prepared by a method including: dissolving the compound represented by Formula 1 in a solvent to prepare a first solution, dissolving a resin in a solvent to prepare a second solution, and mixing the first solution with the second solution. When the first solution and the second solution are mixed, it is preferred to uniformly mix the solutions. However, the method is not limited thereto, and it is possible to use a method of simultaneously adding a compound represented by Formula 1 and a resin to a solvent to dissolve the compound and the resin, a method of dissolving the compound represented by Formula 1 in a solvent, and subsequently adding the resin thereto to dissolve the resin, a method of dissolving the resin in a solvent, and subsequently adding the compound represented by Formula 1 thereto to dissolve the compound, and the like.

As the resin included in the solution, it is possible to use the above-described resin matrix material, a monomer which is curable by the resin matrix material, or a mixture thereof. Examples of the monomer which is curable by the resin matrix material include a (meth)acrylic monomer, and the monomer may be formed of a resin matrix material by UV curing. When a curable monomer is used as described above, an initiator required for curing may be further added, if necessary.

The solvent is not particularly limited, and is not particularly limited as long as the solvent does not adversely affect the coating process and may be removed by a subsequent drying. As a non-limiting example of the solvent, it is possible to use toluene, xylene, acetone, chloroform, various alcohol-based solvents, methyl ethyl ketone (MEK), methyl isobutyl ketone (MIBK), ethyl acetate (EA), butyl acetate, dimethylformamide (DMF), dimethylacetamide (DMAc), dimethylsulfoxide (DMSO), N-methyl-pyrrolidone (NMP), and the like, and one or a mixture of two or more may be used. When the first solution and the second solution are used, the solvents included in each of the solutions may also be the same as or different from each other. Even when different solvents are used in the first solution and the second solution, it is preferred that these solvents have compatibility so as to be mixed with each other.

For the process of coating the resin solution, in which the compound represented by Formula 1 is dissolved, on a base material, a roll-to-roll process may be used. For example, the roll-to-roll process may be performed by a process of unwinding a base material from a roll on which the base material is wound, coating a resin solution, in which the compound represented by Formula 1 is dissolved, on one surface of the base material, drying the resin solution, and then winding the base material again on the roll. When the roll-to-roll process is used, it is preferred that the viscosity of the resin solution is determined within a range in which the process may be implemented, and the viscosity may be determined within a range of, for example, 200 cps to 2,000 cps.

As the coating method, various publicly-known methods may be used, and for example, a die coater may also be used, and various bar-coating methods such as a comma coater and a reverse comma coater may also be used.

After the coating, a drying process is performed. The drying process may be performed under conditions required for removing the solvent. For example, it is possible to obtain a color conversion film including a fluorescent material including the compound represented by Formula 1, which has desired thickness and concentration, on a base material by carrying out the drying in an oven located close to a coater under a condition to sufficiently evaporate a solvent, in a direction in which the base material progresses during the coating process.

When the monomer which is curable by the resin matrix material is used as a resin included in the solution, curing, for example, UV curing may be performed before the drying or simultaneously with the drying.

When the compound represented by Formula 1 is extruded with a resin to produce a film, an extrusion method known in the art may be used, and for example, a color conversion film may be prepared by extruding the compound represented by Formula 1 with a resin such as a polycarbonate (PC)-based resin, a poly(meth)acrylic resin, and a styrene-acrylonitrile (SAN)-based resin.

According to an exemplary embodiment of the present specification, a protective film or a barrier film may be provided on at least one surface of the color conversion film. As the protective film and the barrier film, films known in the art may be used.

An exemplary embodiment of the present specification provides a backlight unit including the above-described color conversion film. The backlight unit may have a backlight unit configuration known in the art, except that the backlight unit includes the color conversion film. FIG. 1 illustrates a schematic view of a backlight unit structure according to an example. The backlight unit according to FIG. 1 includes a side chain-type light source 101, a reflective plate 102 which surrounds the light source, a light guide plate 103 which guides light directly emitted from the light source or light reflected from the reflective plate, a reflective layer 104 which is provided on one surface of the light guide plate, and a color conversion film 105 which is provided on a surface opposite to a surface of the light guide plate facing the reflective layer. A part indicated as grey in FIG. 1 is a light dispersion pattern 106 of the light guide plate. The light incident inside the light guide plate has an irregular light distribution due to the repetition of an optical process such as reflection, total reflection, refraction, and transmission, and a 2-dimensional light dispersion pattern may be used in order to guide the irregular light distribution to have a uniform luminance. However, the scope of the present invention is not limited by FIG. 1, and not only a side chain-type light source but also a direct-type light source may also be used as the light source, and the reflective plate or the reflective layer may be omitted or may also be replaced with another configuration, if necessary, and an additional film, for example, a light diffusion film, a light collecting film, a brightness enhancement film, and the like may be further provided, if necessary.

An exemplary embodiment of the present specification provides a display device including the backlight unit. The display device is not particularly limited as long as the display device is a display device including a backlight unit, and may be included in a TV, a monitor of a computer, a laptop computer, a mobile phone, and the like.

Hereinafter, the present specification will be described in detail with reference to Examples for specifically describing the present specification. However, the Examples according to the present specification may be modified in various forms, and it is not interpreted that the scope of the present application is limited to the Examples described in detail below. The Examples of the present application are provided for more completely explaining the present specification to the person with ordinary skill in the art.

Preparation Examples

The compound according to an exemplary embodiment of the present application may be prepared by a preparation method to be described below.

For example, in the compound of Formula 1, a core structure may be prepared as in the following Reaction Formulae 1 and 2. The substituent may be bonded by a method known in the art, and the kind and position of the substituent or the number of substituents may be changed according to the technology known in the art.

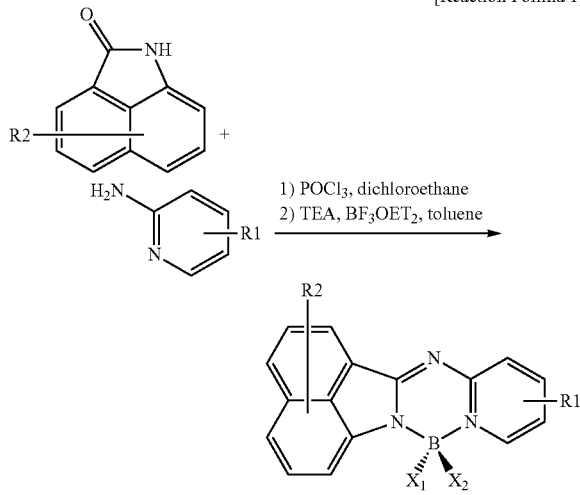

[Reaction Formla 1]

1 equivalent of benzo[c,d]indol-2(1H)-one and 1.5 equivalents of aminopyrimidine were put into a solvent, and the resulting mixture was heated and stirred at 90° C. under nitrogen. After benzo[c,d]indol-2(1H)-one disappeared, the product was cooled down. After water was poured into the product and the resulting product was stirred for 30 minutes, extraction was performed by using chloroform, and the moisture was removed over anhydrous magnesium sulfate. After the residue was concentrated through distillation under reduced pressure, the resulting product was dissolved in toluene, TEA and $BF_3OET_2$ were put thereinto while being stirred, and the resulting mixture was stirred at 120° C. When the reaction was terminated, the resulting product was cooled down and extraction was performed with $CHCl_3$, the moisture was removed over anhydrous magnesium sulfate, and then the residue was concentrated through distillation under reduced pressure and was purified through recrystallization or column chromatography.

[Reaction Formula 2]

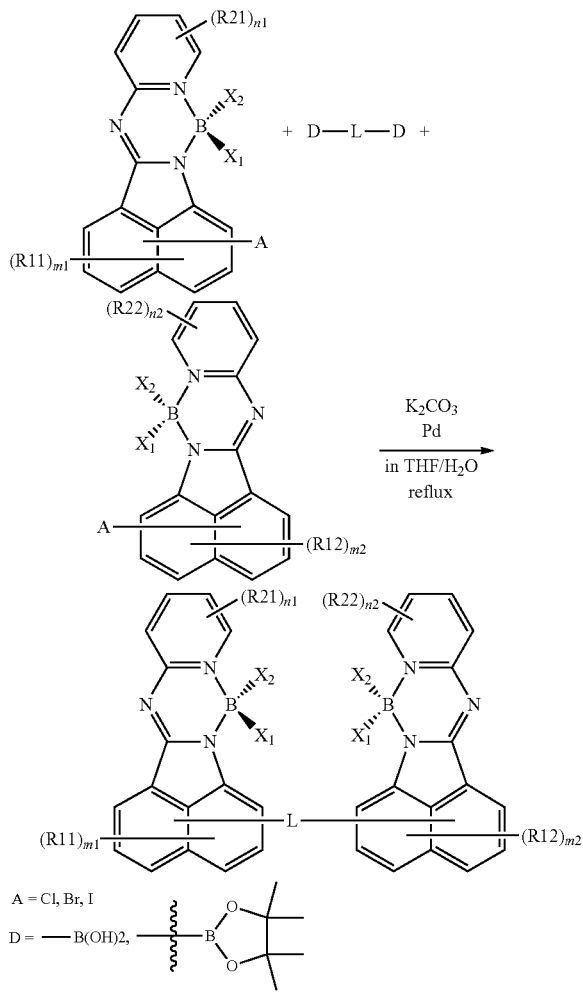

The product was synthesized by a method which is the same as a general Suzuki C—C cross coupling.

Preparation Example 1. <Compound 1>

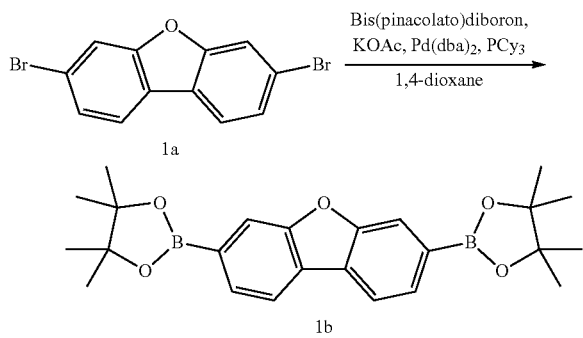

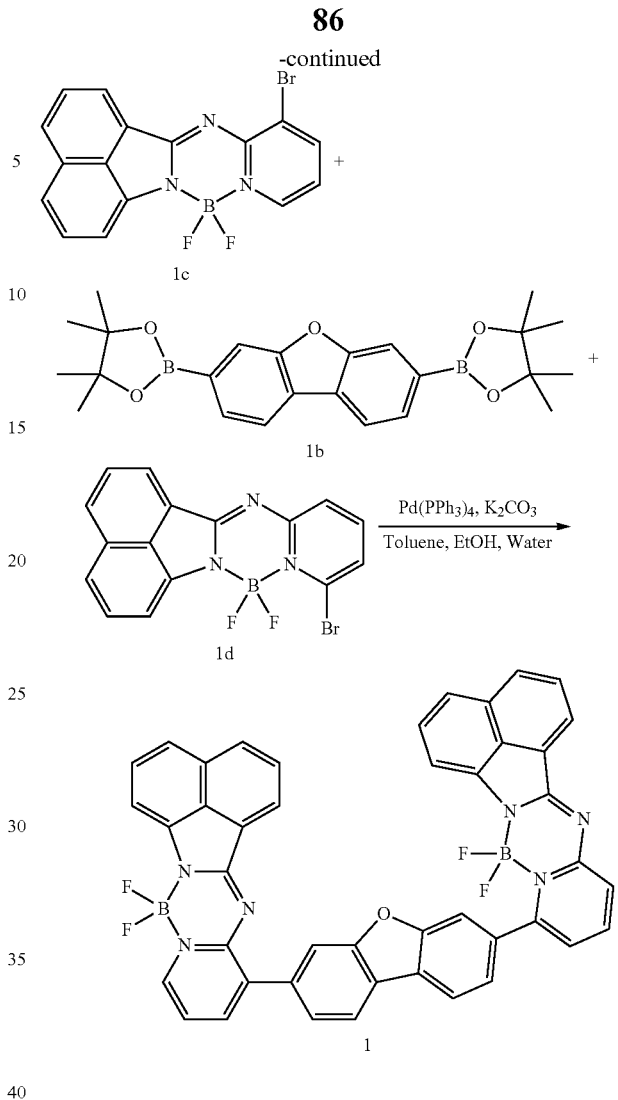

1) Synthesis of Compound 1b 2.00 g (6.14 mmol, 1 equivalent) of Compound 1a, 2 equivalents of bis(pinacolato)diboron, and 3 equivalents of potassium acetate were stirred under a 1,4-dioxane solvent, and a reaction was performed under a nitrogen atmosphere by using 0.03 equivalent of Pd(dba)$_2$ and 0.06 equivalent of PCy$_3$ as a catalyst. After the reaction was terminated, the resulting product was cooled to room temperature, and the salt was removed through a celite filter. The filtrate was removed through distillation under reduced pressure and recrystallized by using EtOH. Through the recrystallization, 2.32 g (yield 90%) of Compound 1b could be obtained.

2) Synthesis of Compound 1

2.00 g (4.76 mmol, 1 equivalent) of Compound 1b, 1 equivalent of Compound 1c, and 1 equivalent of Compound 1d were stirred under toluene and ethanol solvents, 5 equivalents of potassium carbonate were dissolved in water, and the resulting solution was added thereto. A reaction was performed under a nitrogen atmosphere by using 0.1 equivalent of tetrakistriphenylphosphine as a catalyst. After the reaction was terminated, the resulting product was cooled to room temperature, and the product was precipitated as a solid by pouring water to the product. After the produced solid was separated from the solution through a filter, 1.07 g (yield 30%) of Compound 1 could be obtained through column purification.

HR LC/MS/MS m/z calcd for $C_{44}H_{24}B_2F_4N_6O$ (M+): 750.2134; found: 750.2136.
Preparation Example 2. <Compound 2>
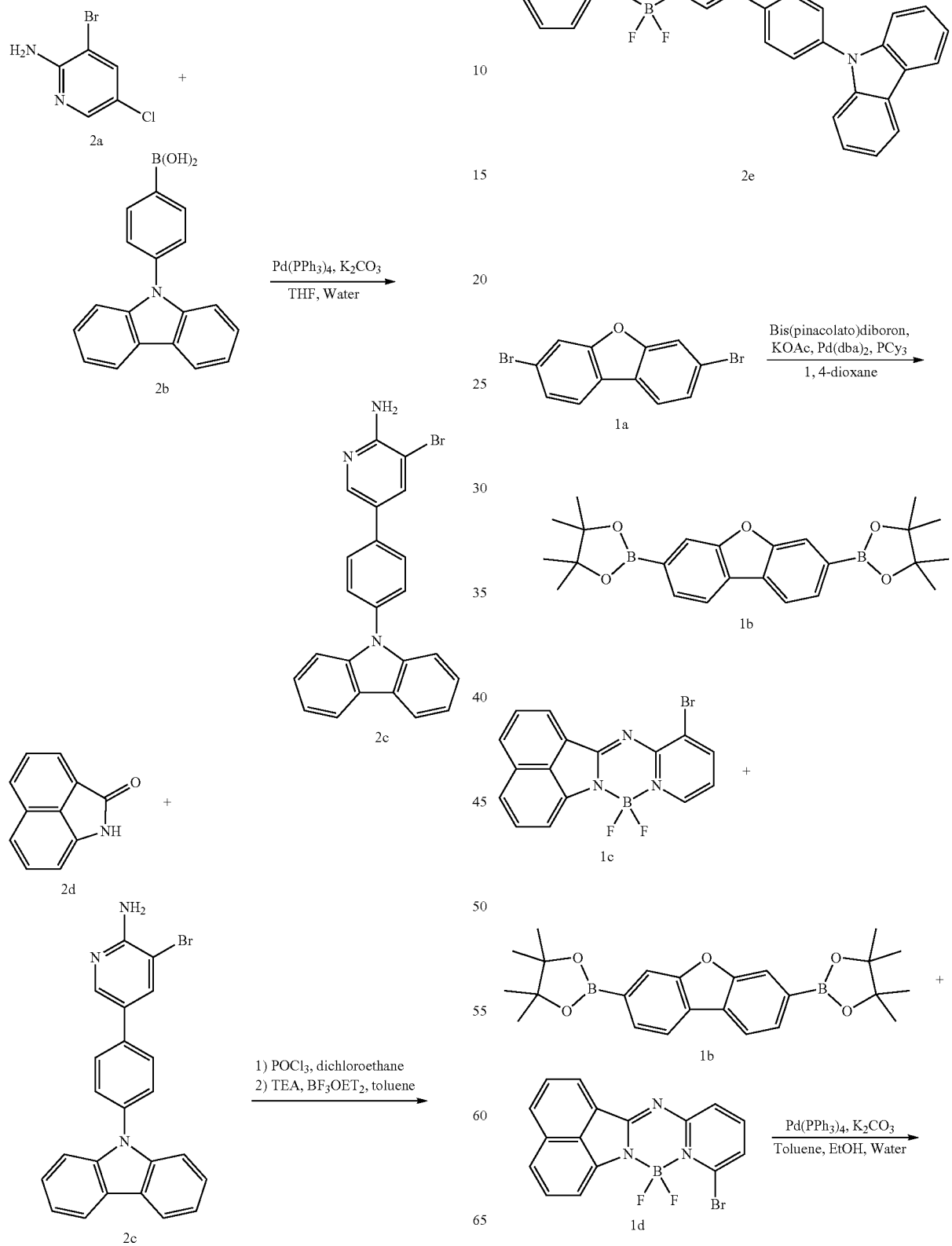

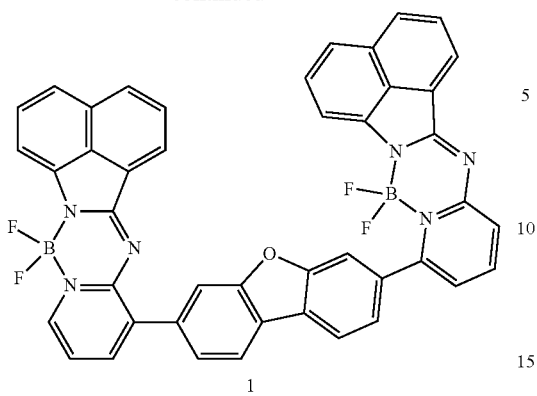

1

1) Synthesis of Compound 2c 6.00 g (23.8 mmol, 1 equivalent) of Compound 2a and 1.5 equivalents of Compound 2b were stirred under a tetrahydrofuran solvent, 3 equivalents of potassium carbonate were dissolved in water, and the resulting solution was added thereto. A reaction was performed under a nitrogen atmosphere at 80° C. by using 0.1 equivalent of tetrakistriphenylphosphine as a catalyst. After the reaction was terminated, the resulting product was cooled to room temperature, and water was poured to the product. Extraction was performed by using chloroform, and the moisture was removed over anhydrous magnesium sulfate. After the residue was concentrated through distillation under reduced pressure, 3.95 g (yield 40%) of Compound 2c could be obtained through column purification.

2) Synthesis of Compound 2e 3.26 g (yield 90%) of Compound 2e could be obtained by the method of [Reaction Formula 1] using 1.00 g (5.91 mmol, 1 equivalent) of Compound 2d and 1.5 equivalents of Compound 2c.

3) Synthesis of Compound 2

1.04 g (yield 22%) of Compound 2 could be obtained by performing the synthesis based on 2.00 g (4.76 mmol, 1 equivalent) of Compound 1b in the same manner as in the synthesis of Compound 1, except that Compound 2e was used instead of Compound 1c, and Compound 2f was used instead of Compound 1d.

HR LC/MS/MS m/z calcd for $C_{62}H_{35}B_2F_4N_7O$ (M+): 991.3025; found: 993.3030.

Preparation Example 3. <Compound 3>

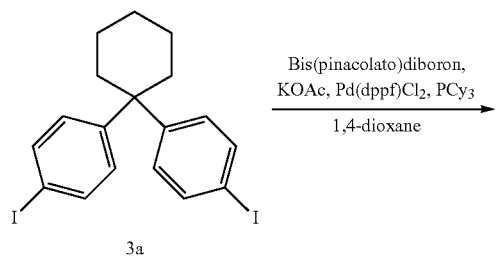

3a

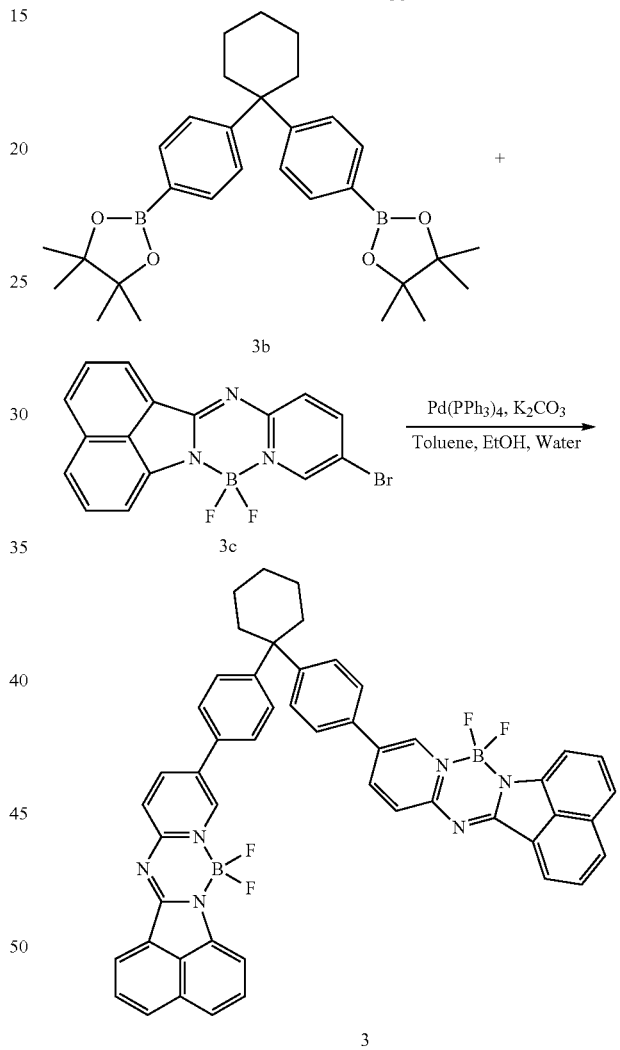

1) Synthesis of Compound 3b 1.05 g (yield 35%) of Compound 3b could be obtained by performing the synthesis in the same manner as in the synthesis of Compound 1b, except that 2.00 g (6.14 mmol, 1 equivalent) of Compound 3a was used instead of using Compound 1a.

2) Synthesis of Compound 3

1.00 g (2.05 mmol, 1 equivalent) of Compound 3b and 2.4 equivalents of Compound 3c were stirred under toluene and ethanol solvents, 5 equivalents of potassium carbonate were dissolved in water, and the resulting solution was added thereto. A reaction was performed under a nitrogen atmosphere by using 0.1 equivalent of tetrakistriphenylphosphine as a catalyst. After the reaction was terminated, the resulting product was cooled to room temperature, and the product was precipitated as a solid by pouring water to the product. After the produced solid was separated from the solution through a filter, 1.22 g (yield 73%) of Compound 3 could be obtained through column purification.

HR LC/MS/MS m/z calcd for $C_{50}H_{36}B_2F_4N_6$ (M+): 818.3124; found: 818.3126.

Preparation Example 4. <Compound 4>

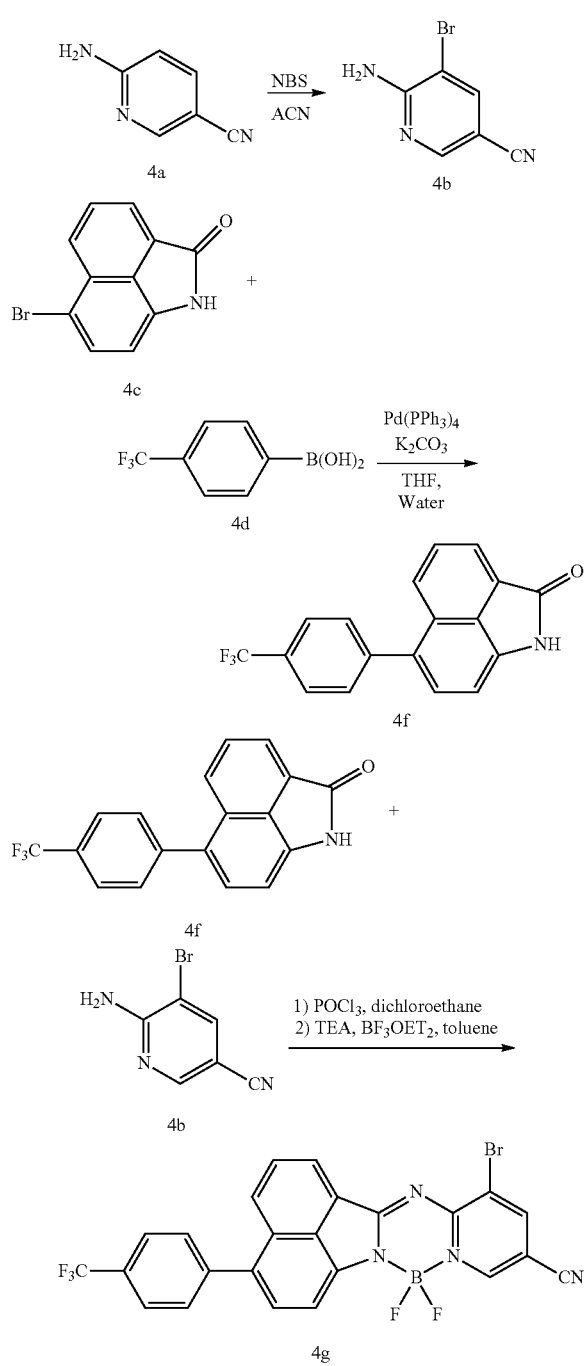

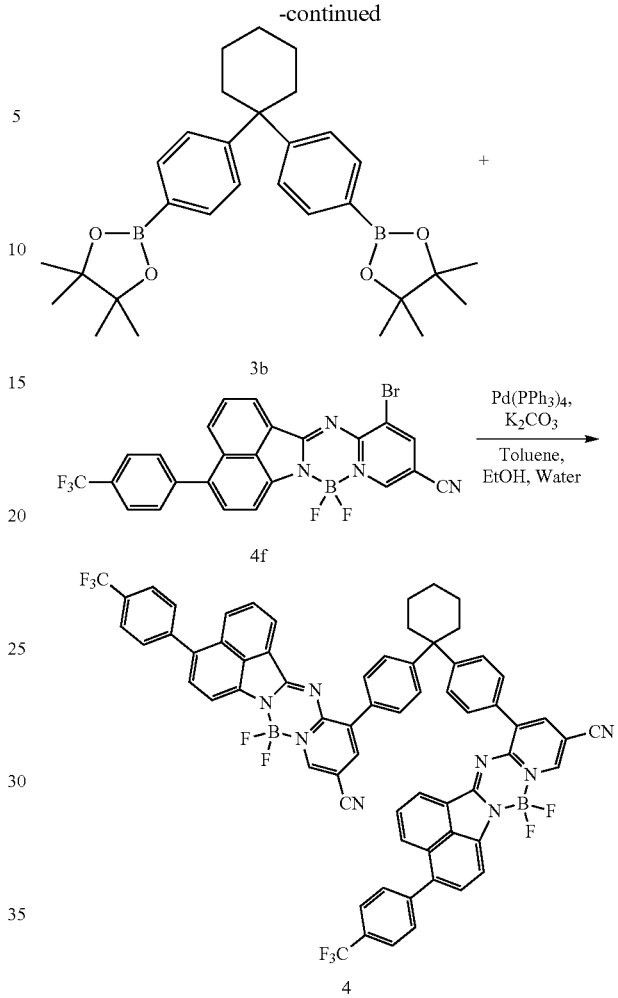

1) Synthesis of Compound 4b

A reaction was performed at room temperature while stirring 2.00 g (16.8 mmol, 1 equivalent) of Compound 4a and 1.2 equivalents of N-bromosuccinimide under an acetonitrile solvent. After the reaction was terminated, water was poured thereto. Extraction was performed by using chloroform, the extract was washed with $Na_2S_2O_3$ (aq), and then the moisture was removed over anhydrous magnesium sulfate. 3.16 g (yield 95%) of Compound 4b could be obtained by concentrating the residue through distillation under reduced pressure.

2) Synthesis of Compound 4f 2.27 g (yield 90%) of Compound 4f could be obtained by performing the synthesis in the same manner as in the synthesis of Compound 2c, except that 2.00 g (8.06 mmol, 1 equivalent) of Compound 4c was used instead of Compound 2a, and Compound 4d was used instead of using Compound 2b.

3) Synthesis of Compound 4g 2.93 g (yield 90%) of Compound 4g could be obtained by the method of [Reaction Formula 1] using 2.00 g (6.38 mmol, 1 equivalent) of Compound 4f and 1.5 equivalents of Compound 4b.

4) Synthesis of Compound 4

1.85 g (yield 78%) of Compound 4 could be obtained by performing the synthesis using 1.00 g (2.05 mmol, 1 equivalent) of Compound 3b in the same manner as in the synthesis of Compound 3, except that Compound 4f was used instead of Compound 3c.

HR LC/MS/MS m/z calcd for $C_{66}H_{40}B_2F_{10}N_8$ (M+): 1156.3402; found: 1156.3417.

Preparation Example 5. <Compound 5>
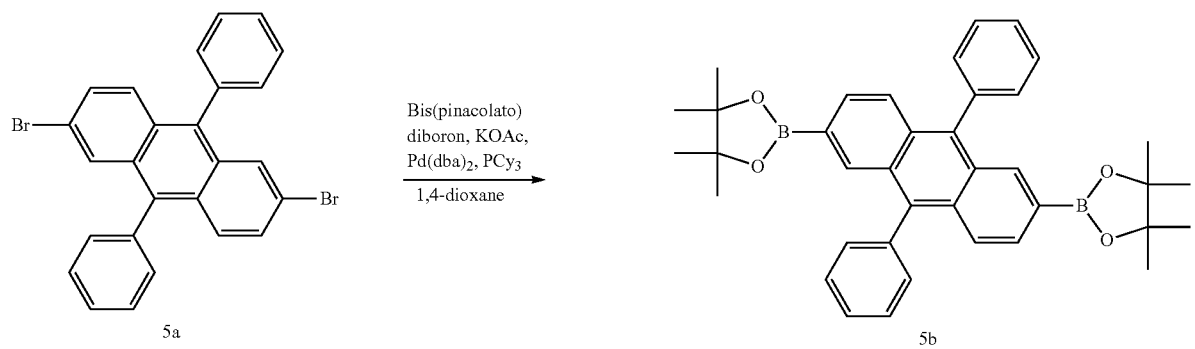
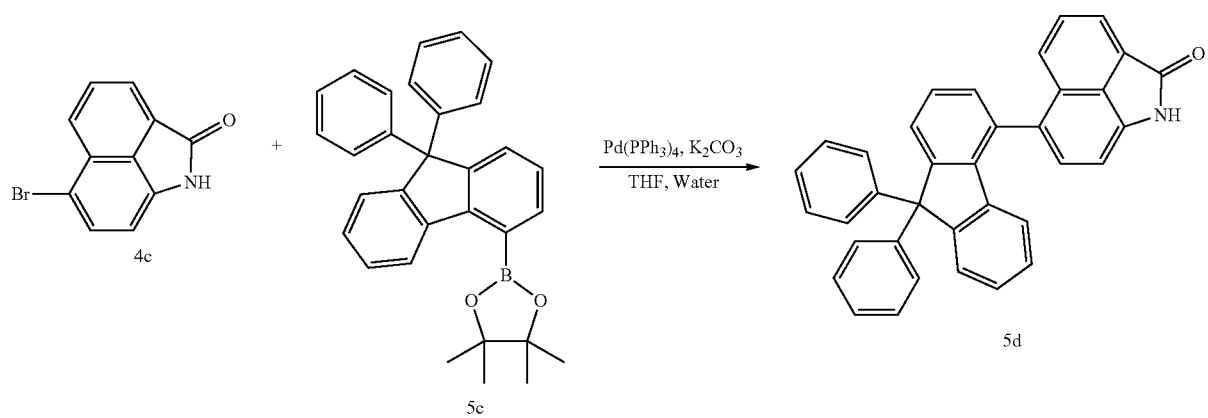 [SMILES: O=C1Nc2ccc(Br)c3cccc1c23 ; CC1(C)OB(c2cccc3c2-c2ccccc2C3(c2ccccc2)c2ccccc2)OC1(C)C ; O=C1Nc2ccc(-c3cccc4c3-c3ccccc3C4(c3ccccc3)c3ccccc3)c3cccc1c23]
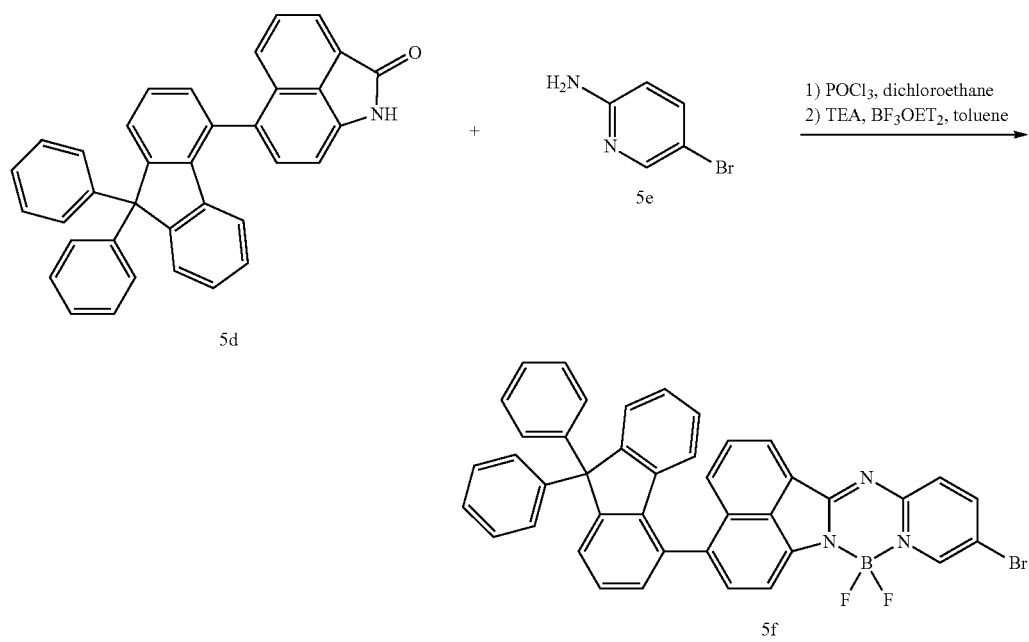

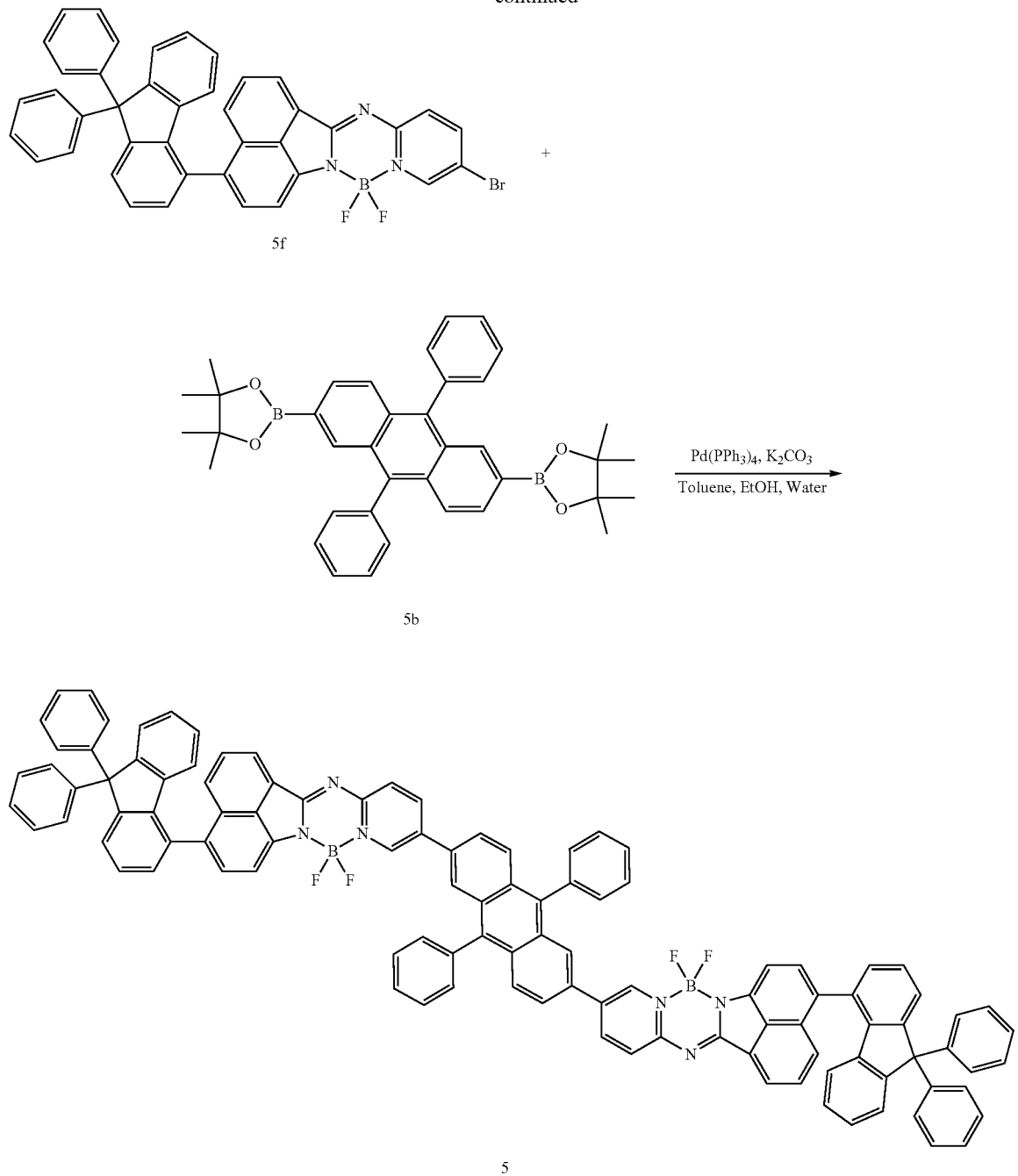

1) Synthesis of Compound 5b 1.7 g (yield 70%) of Compound 5b could be obtained by performing the synthesis in the same manner, except that as in the synthesis of Compound 1b, 2.00 g (4.10 mmol, 1 equivalent) of Compound 5a was used instead of using Compound 1a.

2) Synthesis of Compound 5d 2.93 g (yield 75%) of Compound 5d could be obtained by performing the synthesis in the same manner as in the synthesis of Compound 2c, except that 2.00 g (8.06 mmol, 1 equivalent) of Compound 4c was used instead of Compound 2a, and Compound 5c was used instead of using Compound 2b.

3) Synthesis of Compound 5f 2.62 g (yield 92%) of Compound 5e could be obtained by the method of [Reaction Formula 1] using 2.00 g (6.38 mmol, 1 equivalent) of Compound 5d and 1.5 equivalents of Compound 5e.

4) Synthesis of Compound 5

1.33 g (yield 50%) of Compound 5 could be obtained by performing the synthesis in the same manner as in the synthesis of Compound 3, except that Compound 5f was used instead of Compound 3c, and 1.00 g (1.72 mmol, 1 equivalent) of Compound 5b was used instead of Compound 3b.

HR LC/MS/MS m/z calcd for $C_{108}H_{66}B_2F_4N_6$ (M+): 1544.5471; found: 1544.5465.

Preparation Example 6. <Compound 6>
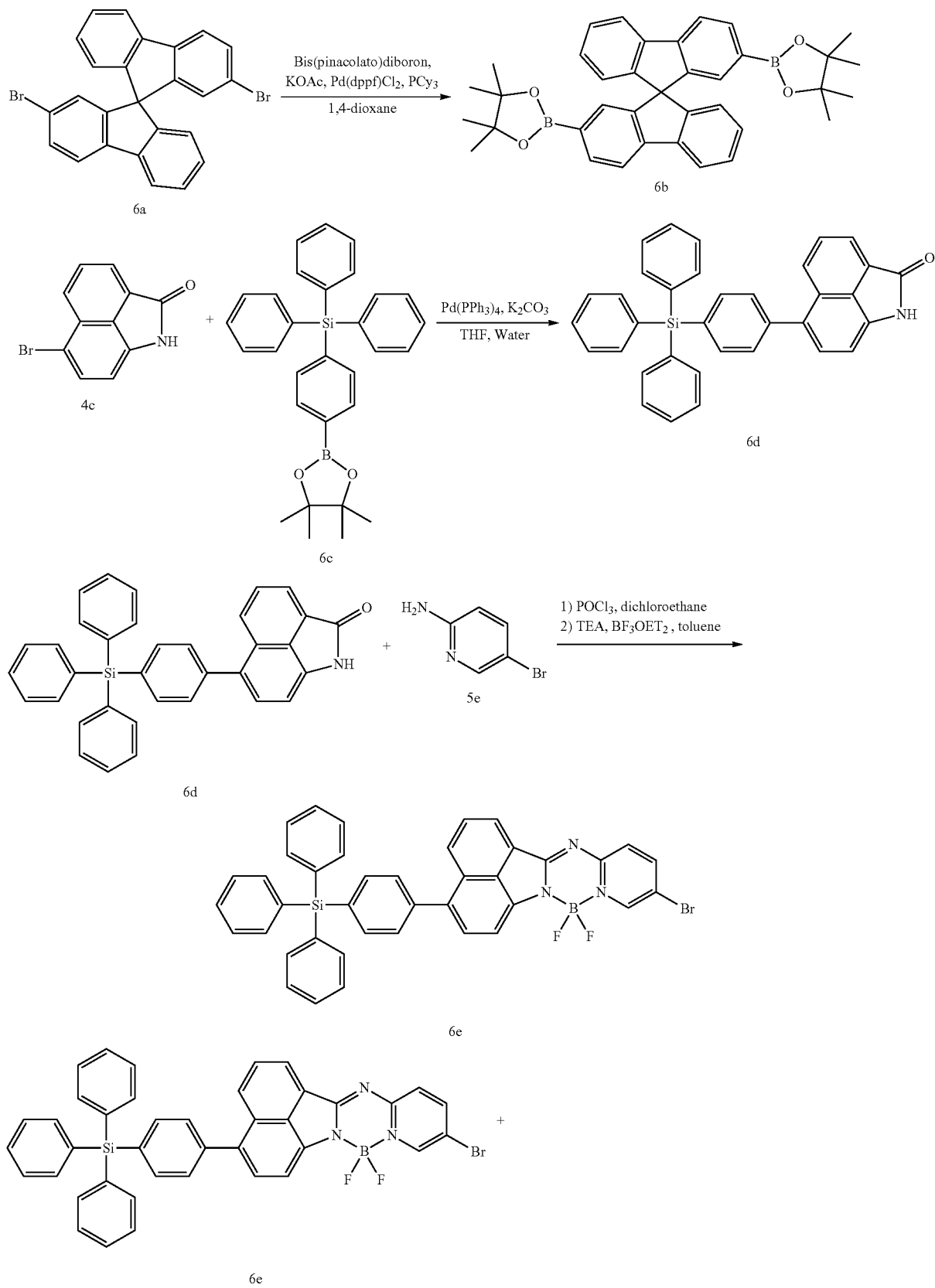

-continued

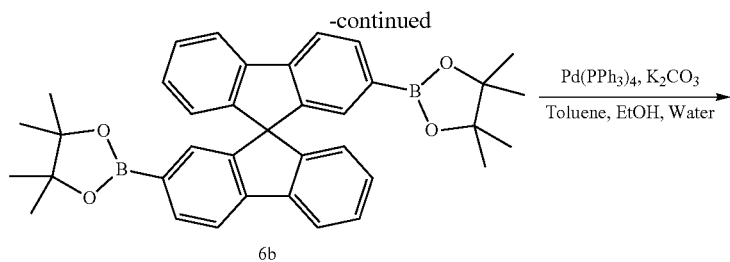
6b

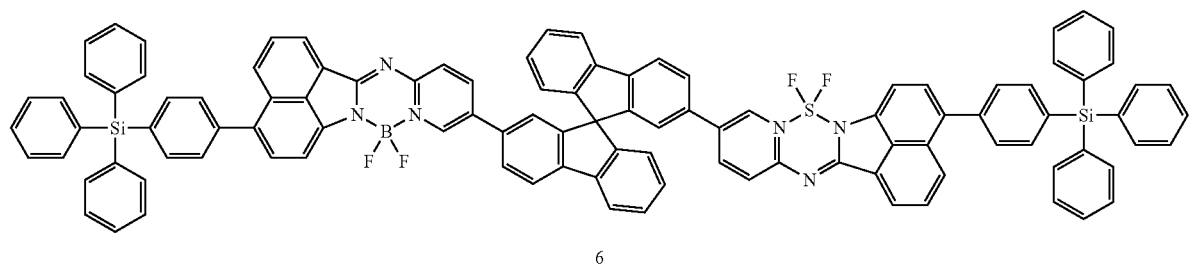
6

1) Synthesis of Compound 6b 1.68 g (yield 70%) of Compound 6b could be obtained by performing the synthesis in the same manner as in the synthesis of Compound 1b, except that 2.00 g (4.22 mmol, 1 equivalent) of Compound 6a was used instead of using Compound 1a.

2) Synthesis of Compound 6d 3.86 g (yield 95%) of Compound 6d could be obtained by performing the synthesis in the same manner as in the synthesis of Compound 2c, except that 2.00 g (8.06 mmol, 1 equivalent) of Compound 4c was used instead of Compound 2a, and Compound 6c was used instead of using Compound 2b.

3) Synthesis of Compound 6e 2.38 g (yield 85%) of Compound 6e could be obtained by the method of [Reaction Formula 1] using 2.00 g (6.38 mmol, 1 equivalent) of Compound 6d and 1.5 equivalents of Compound 5e.

4) Synthesis of Compound 6

1.65 g (yield 60%) of Compound 6 could be obtained by performing the synthesis in the same manner as in the synthesis of Compound 3, except that Compound 6e was used instead of Compound 3c, and 1.00 g (1.76 mmol, 1 equivalent) of Compound 6b was used instead of Compound 3b.

HR LC/MS/MS m/z calcd for $C_{105}H_{68}B_2F_4N_6Si_2$ (M+): 1566.5166; found: 1566.5170.

Preparation Example 7. <Compound 7>

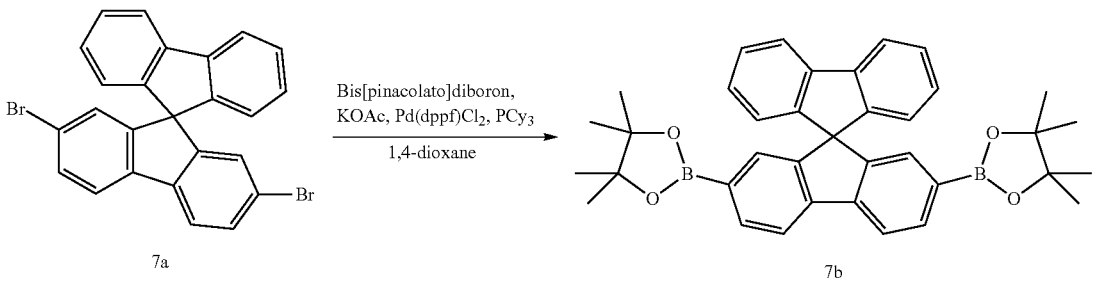

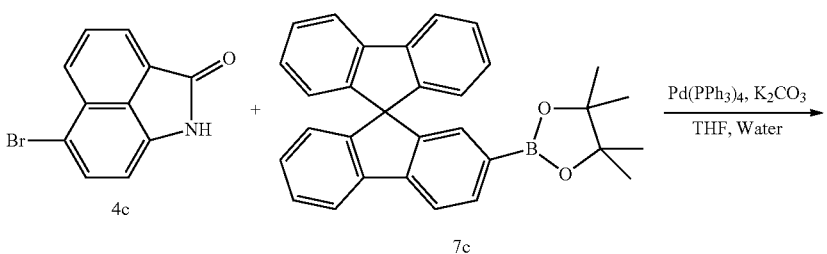

-continued
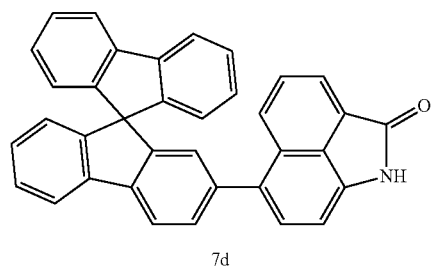
7d
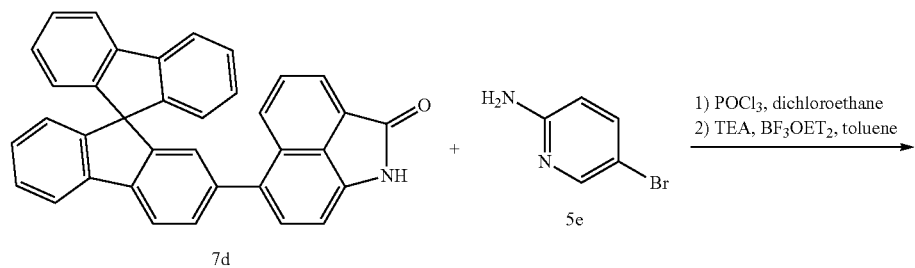
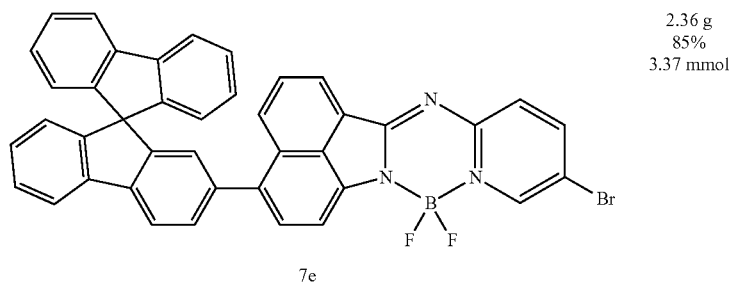
7e
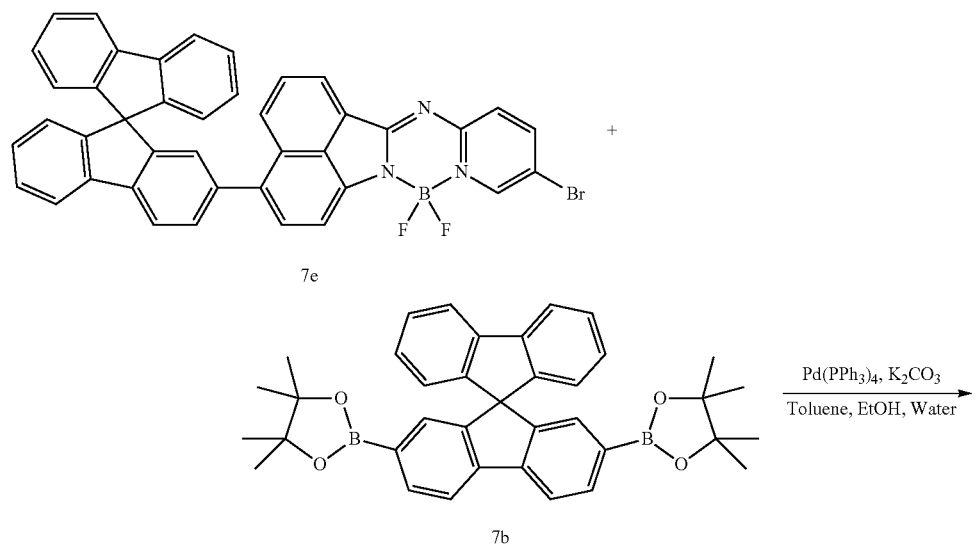

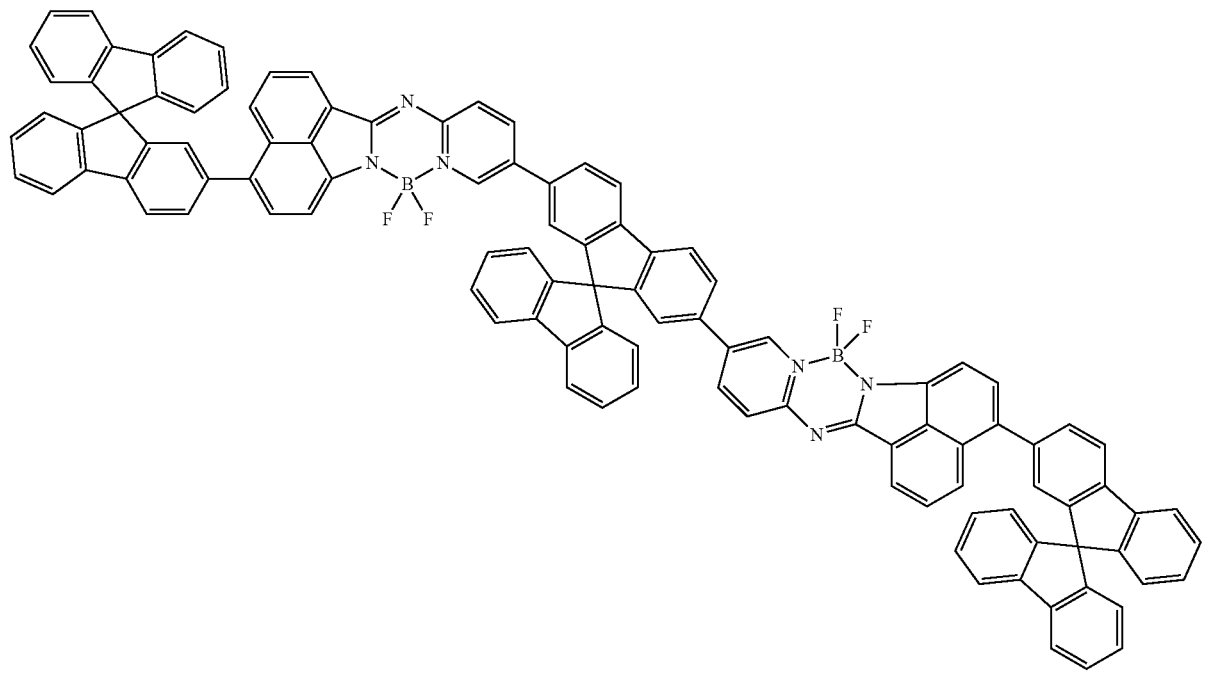

7

1) Synthesis of Compound 7b 1.68 g (yield 70%) of Compound 7b could be obtained by performing the synthesis in the same manner as in the synthesis of Compound 1b, except that 2.00 g (4.22 mmol, 1 equivalent) of Compound 7a was used instead of using Compound 1a.

2) Synthesis of Compound 7d 3.59 g (yield 92%) of Compound 7d could be obtained by performing the synthesis in the same manner as in the synthesis of Compound 2c, except that 2.00 g (8.06 mmol, 1 equivalent) of Compound 4c was used instead of Compound 2a, and Compound 7c was used instead of using Compound 2b.

3) Synthesis of Compound 7e 2.47 g (yield 87%) of Compound 7e could be obtained by the method of [Reaction Formula 1] using 2.00 g (4.14 mmol, 1 equivalent) of Compound 7d and 1.5 equivalents of Compound 5e.

4) Synthesis of Compound 7

1.34 g (yield 50%) of Compound 7 could be obtained by performing the synthesis in the same manner as in the synthesis of Compound 3, except that Compound 7e was used instead of Compound 3c, and 1.00 g (1.76 mmol, 1 equivalent) of Compound 7b was used instead of Compound 3b.

HR LC/MS/MS m/z calcd for $C_{107}H_{60}B_2F_4N_6$ (M+): 1526.5002; found: 1526.5007.

Preparation Example 8. <Compound 8>

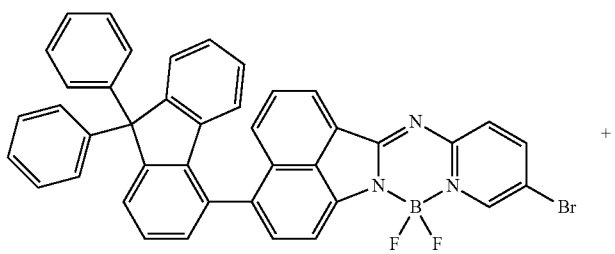

5f

+

-continued
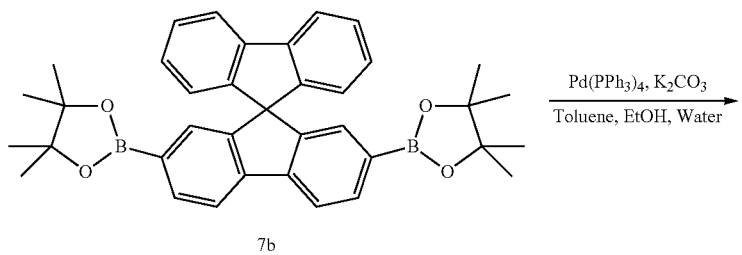
7b
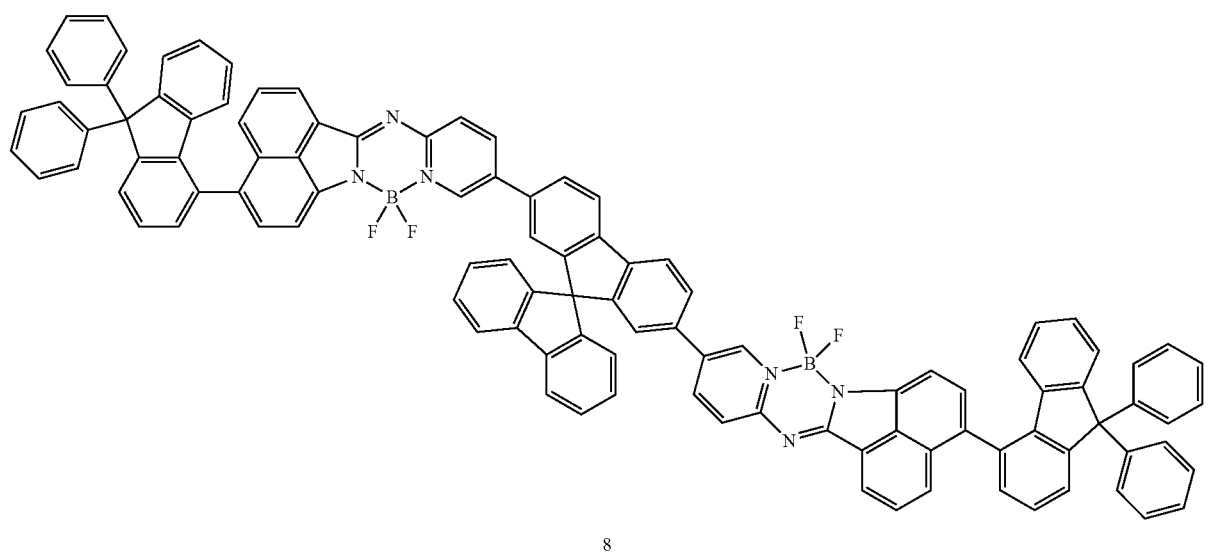
8
1) Synthesis of Compound 8
1.21 g (yield 45%) of Compound 8 could be obtained by performing the synthesis using 1.00 g (1.76 mmol, 1 equivalent) of Compound 7b in the same manner as in the synthesis of Compound 7, except that Compound 5f was used instead of Compound 7e.
HR LC/MS/MS m/z calcd for $C_{107}H_{64}B_2F_4N_6$ (M+): 1530.5315; found: 1530.5319.
Preparation Example 9. <Compound 9>
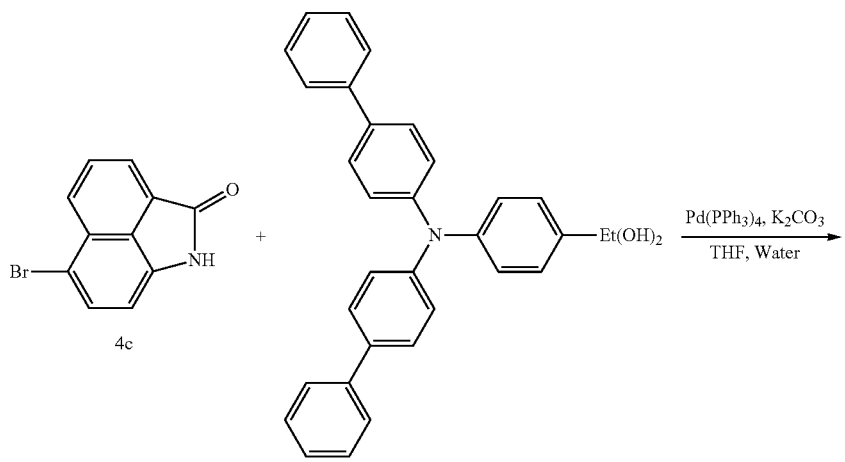

-continued
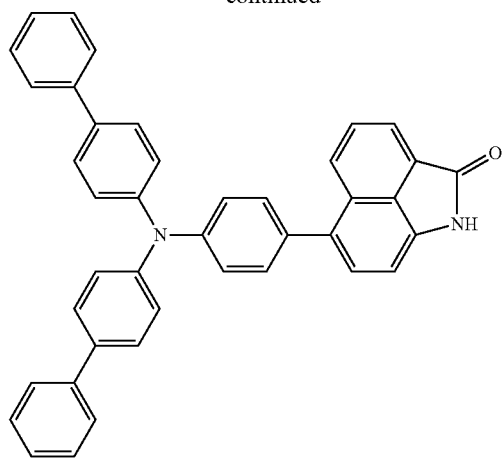
9b
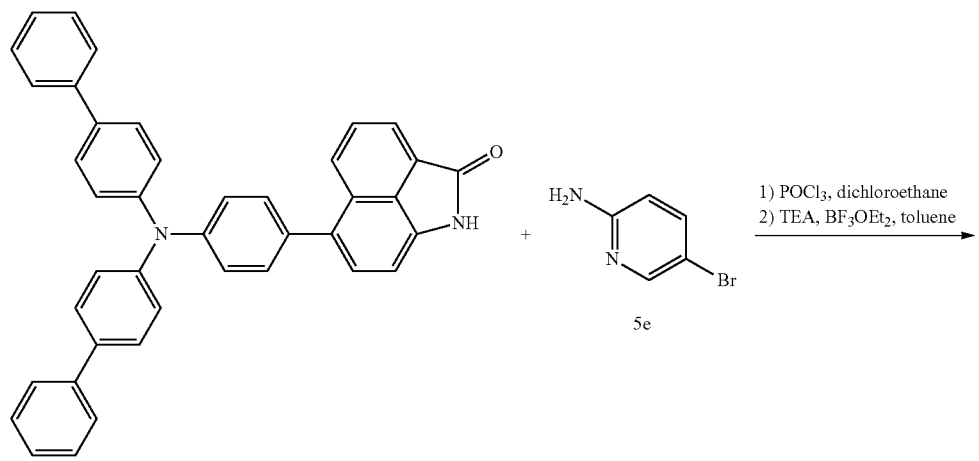
9b    5e
1) POCl$_3$, dichloroethane
2) TEA, BF$_3$OEt$_2$, toluene
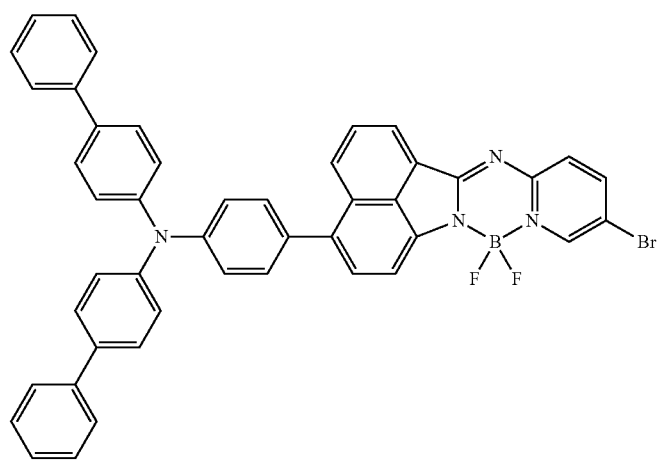
9c -continued

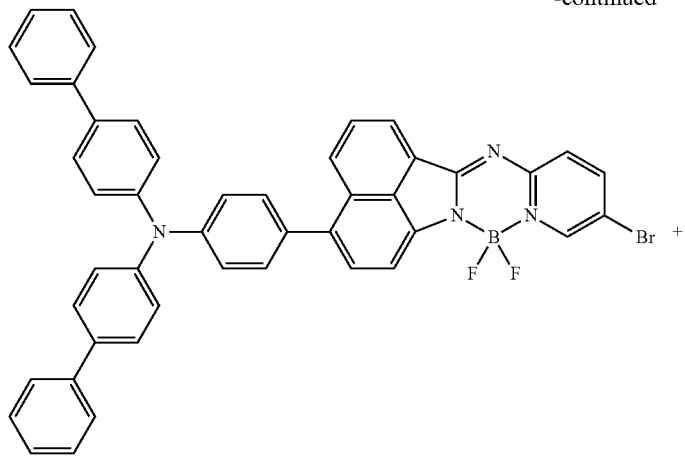

9c

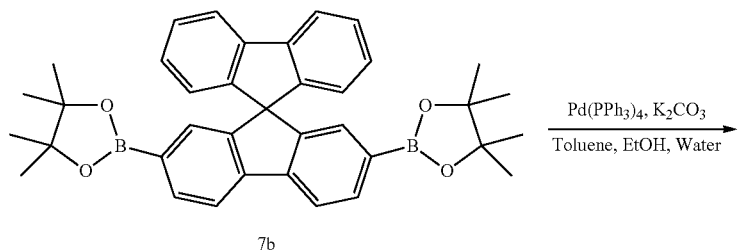

7b

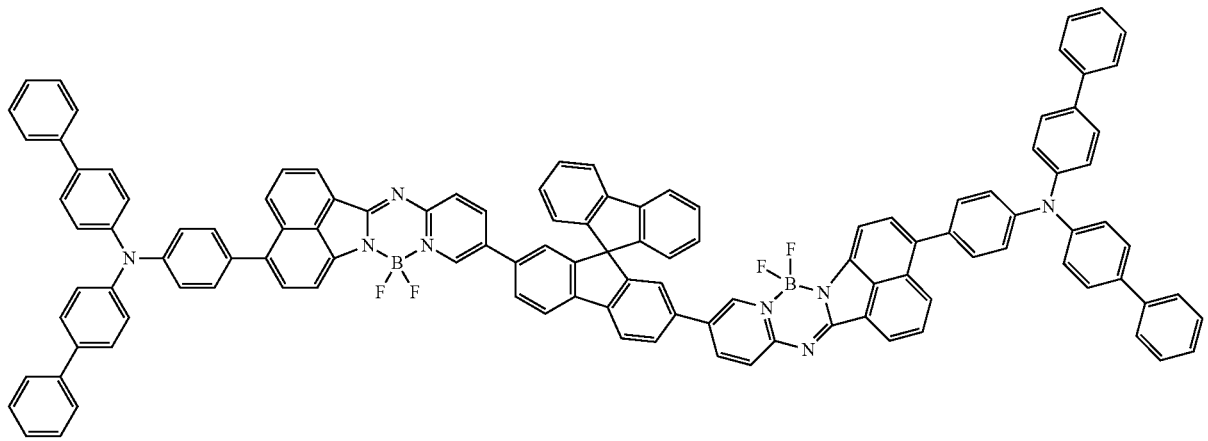

9

1) Synthesis of Compound 9b 3.19 g (yield 70%) of Compound 9b could be obtained by performing the synthesis in the same manner as in the synthesis of Compound 2c, except that 2.00 g (8.06 mmol, 1 equivalent) of Compound 4c was used instead of Compound 2a, and Compound 9a was used instead of using Compound 2b.

2) Synthesis of Compound 9c 2.50 g (yield 92%) of Compound 9c could be obtained by the method of [Reaction Formula 1] using 2.00 g (3.54 mmol, 1 equivalent) of Compound 9b and 1.5 equivalents of Compound 5e.

3) Synthesis of Compound 9

2.08 g (yield 70%) of Compound 9 could be obtained by performing the synthesis using 1.00 g (1.75 mmol, 1 equivalent) of Compound 7b in the same manner as in the synthesis of Compound 7, except that Compound 9c was used instead of Compound 7e.

HR LC/MS/MS m/z calcd for $C_{117}H_{74}B_2F_4N_8$ (M+): 1688.6159; found: 1688.6165.

Preparation Example 10. <Compound 10>
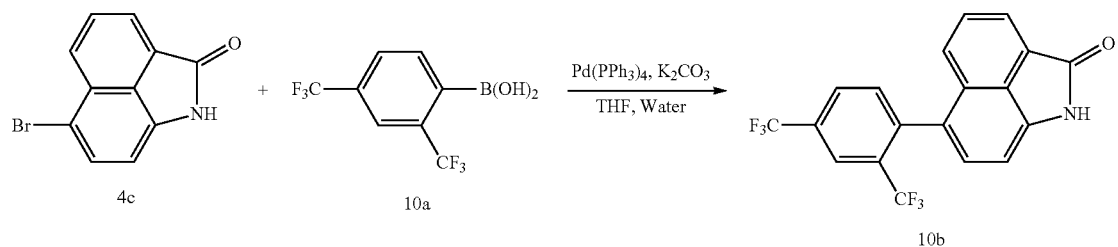
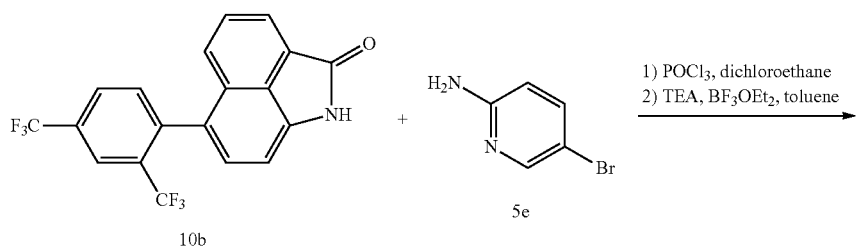
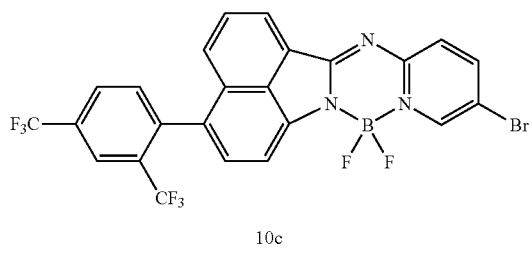
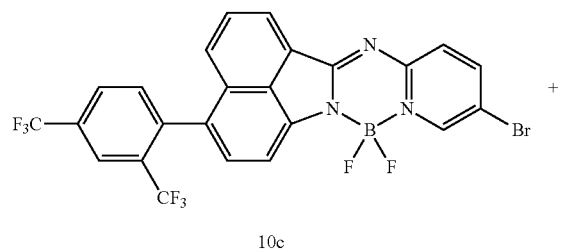
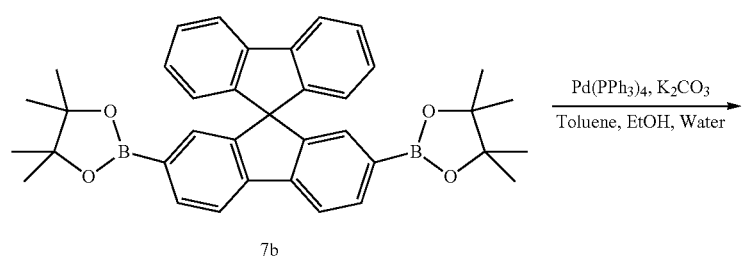

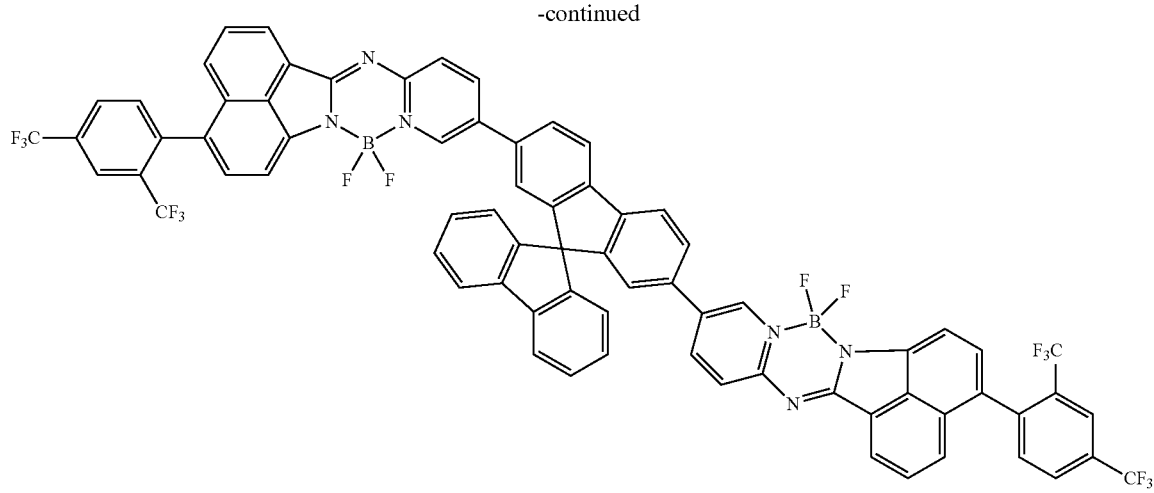

10

1) Synthesis of Compound 10b 2.24 g (yield 73%) of Compound 10b could be obtained by performing the synthesis in the same manner as in the synthesis of Compound 2c, except that 2.00 g (8.06 mmol, 1 equivalent) of Compound 4c was used instead of Compound 2a, and Compound 10a was used instead of using Compound 2b.

2) Synthesis of Compound 10c 2.63 g (yield 86%) of Compound 10c could be obtained by the method of [Reaction Formula 1] using 2.00 g (3.54 mmol, 1 equivalent) of Compound 10b and 1.5 equivalents of Compound 5e.

3) Synthesis of Compound 10

1.68 g (yield 72%) of Compound 10 could be obtained by performing the synthesis using 1.00 g (1.76 mmol, 1 equivalent) of Compound 7b in the same manner as in the synthesis of Compound 7, except that Compound 10c was used instead of Compound 7e.

HR LC/MS/MS m/z calcd for $C_{73}H_{36}B_2F_{16}N_6$ (M+): 1322.2932; found: 1322.2933.

Preparation Example 11. <Compound 11>

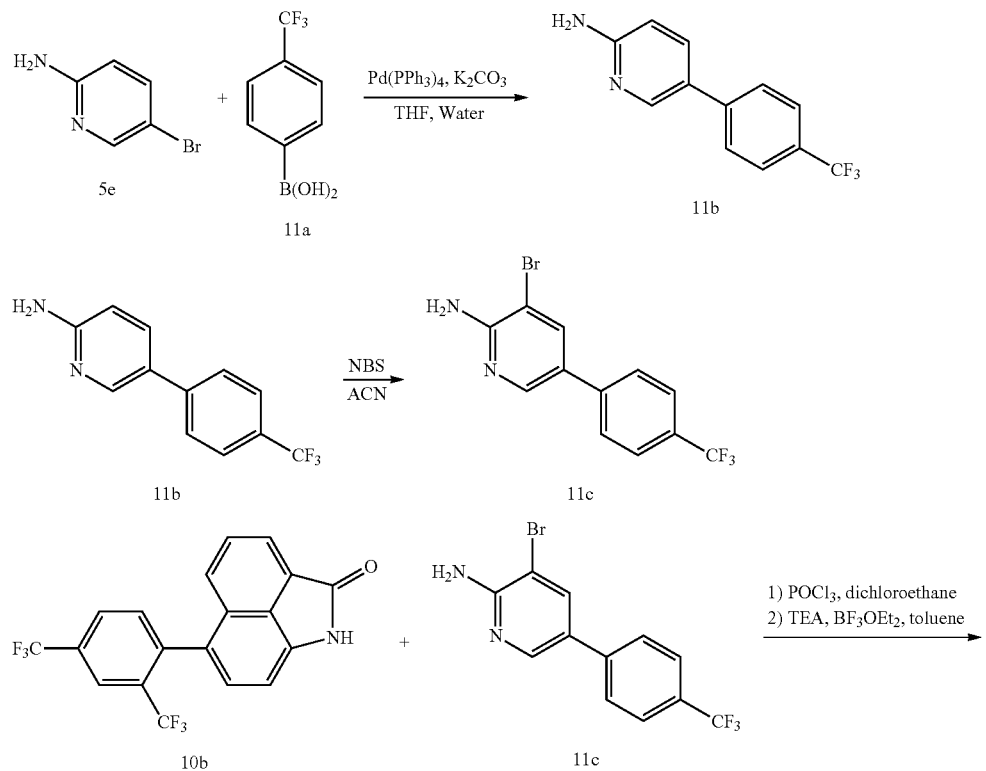

-continued

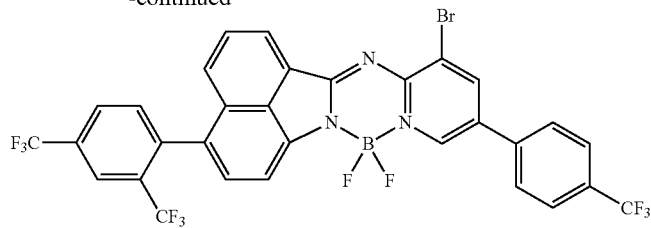
11d

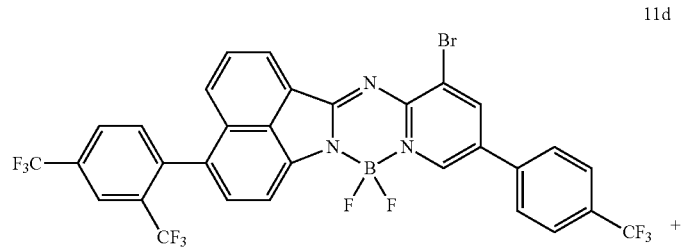
11d

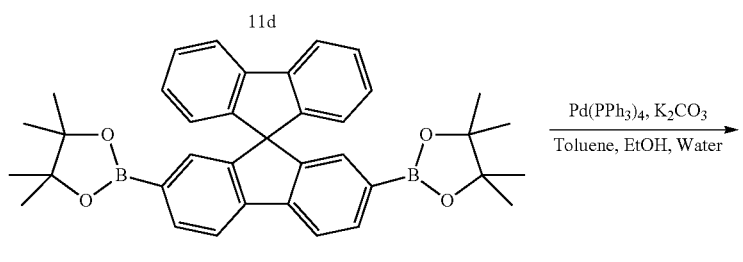
7b

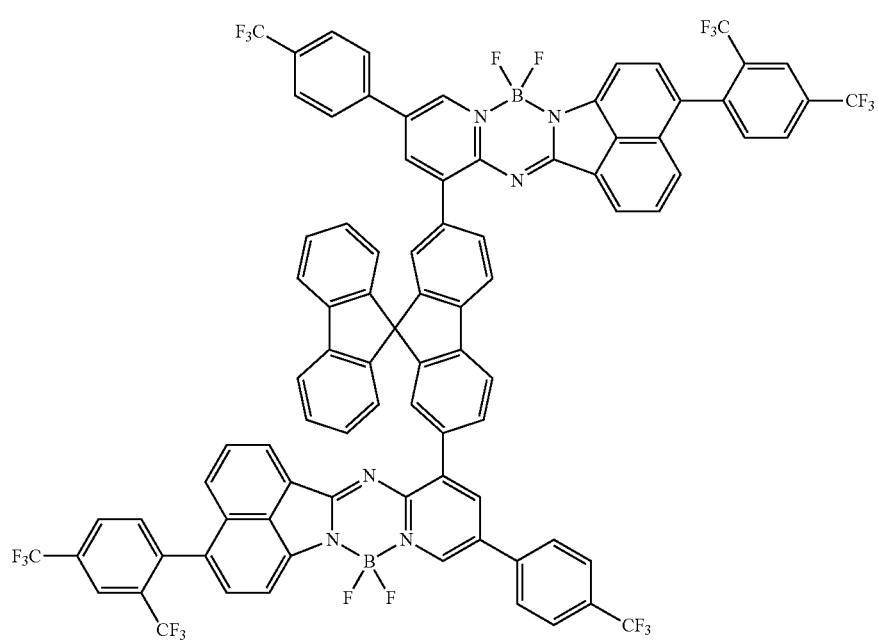
11

1) Synthesis of Compound 11b 2.42 g (yield 88%) of Compound 11b could be obtained by performing the synthesis in the same manner as in the synthesis of Compound 2c, except that 2.00 g (11.5 mmol, 1 equivalent) of Compound 5e was used instead of Compound 2a, and Compound 11a was used instead of using Compound 2b.

2) Synthesis of Compound 11c 3.20 g (yield 99%) of Compound 11c could be obtained by performing the synthesis in the same manner as in the synthesis of Compound 4b, except that 2.42 g (10.2 mmol, 1 equivalent) of Compound 11b was used instead of using Compound 4a.

3) Synthesis of Compound 11d 3.28 g (yield 85%) of Compound 11d could be obtained by the method of [Reaction Formula 1] using 2.00 g (5.25 mmol, 1 equivalent) of Compound 10b and 1.5 equivalents of Compound 11c.

4) Synthesis of Compound 11

1.47 g (yield 52%) of Compound 11 could be obtained by performing the synthesis using 1.00 g (1.76 mmol, 1 equivalent) of Compound 7b in the same manner as in the synthesis of Compound 7, except that Compound 11d was used instead of Compound 7e.

HR LC/MS/MS m/z calcd for $C_{87}H_{42}B_2F_{22}N_6$ (M+): 1610.3306; found: 1610.3310.

Preparation Example 12. <Compound 12>

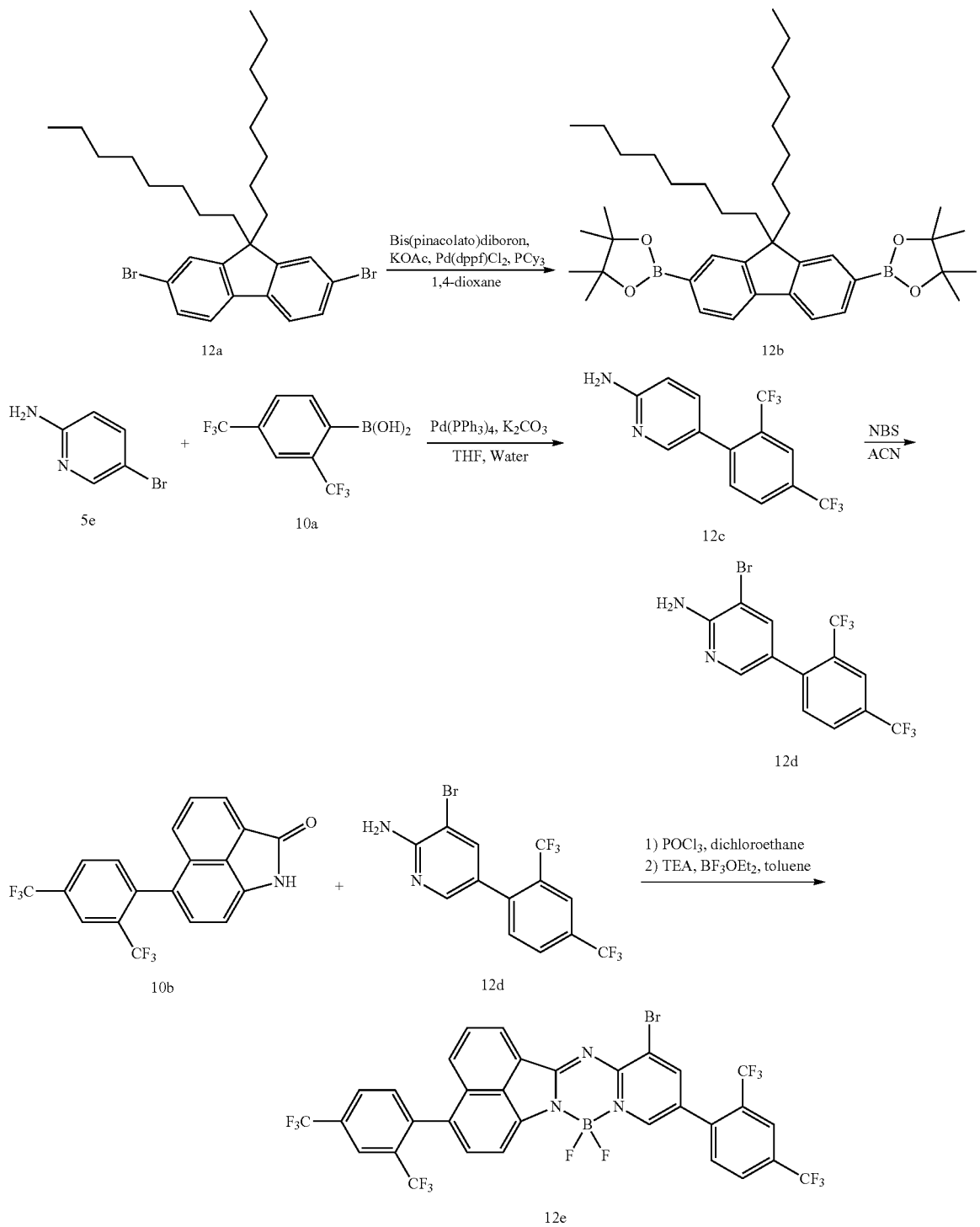

-continued

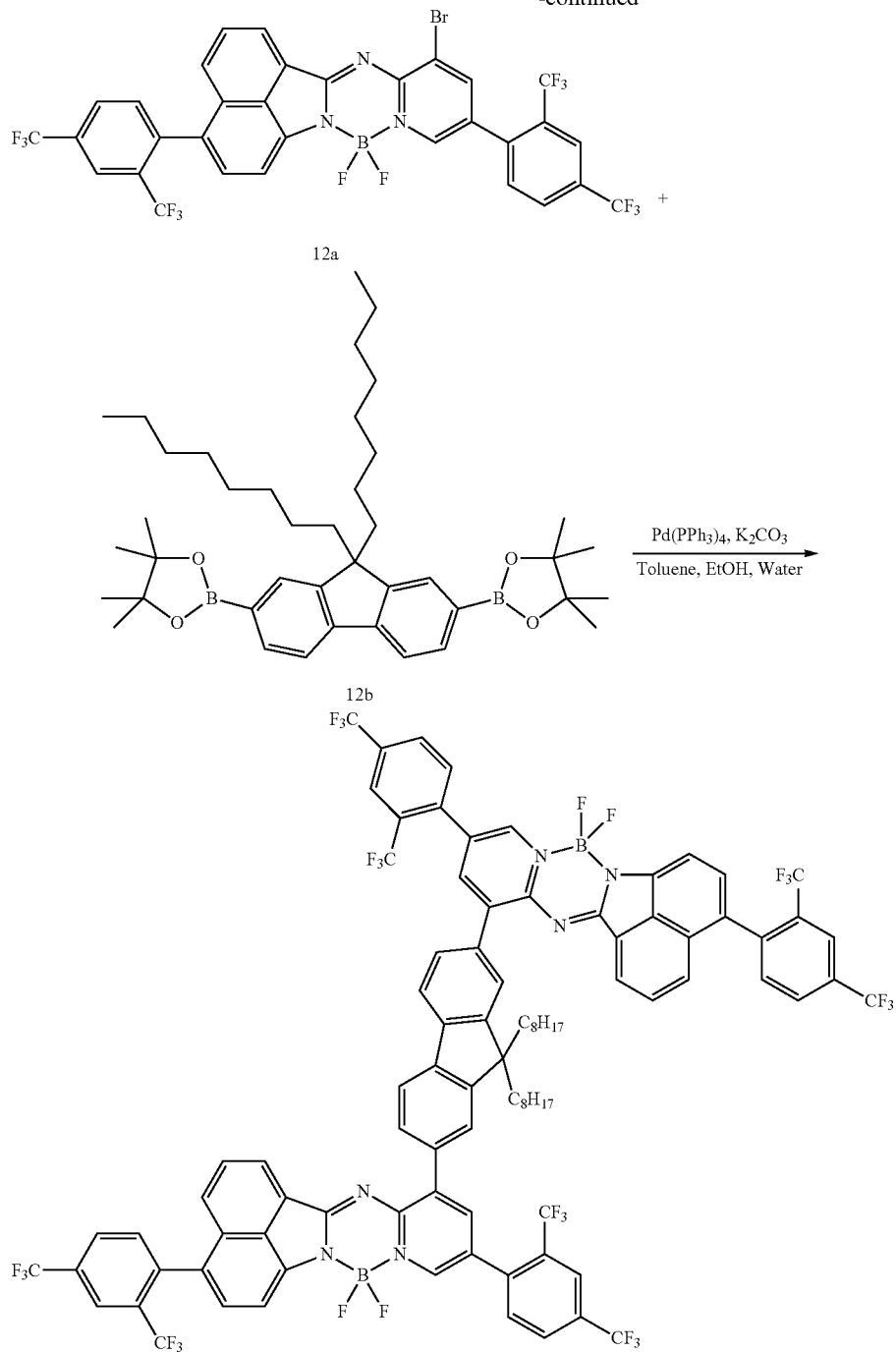

1) Synthesis of Compound 12b 1.71 g (yield 73%) of Compound 12b could be obtained by performing the synthesis in the same manner as in the synthesis of Compound 1b, except that 2.00 g (3.65 mmol, 1 equivalent) of Compound 12a was used instead of using Compound 1a.

2) Synthesis of Compound 12c 3.18 g (yield 90%) of Compound 12c could be obtained by performing the synthesis in the same manner as in the synthesis of Compound 2c, except that 2.00 g (11.5 mmol, 1 equivalent) of Compound 5e was used instead of Compound 2a, and Compound 10a was used instead of using Compound 2b.

3) Synthesis of Compound 12d 3.92 g (yield 98%) of Compound 12d could be obtained by performing the synthesis in the same manner as in the synthesis of Compound 4b, except that 3.18 g (10.4 mmol, 1 equivalent) of Compound 12c was used instead of using Compound 4a.

4) Synthesis of Compound 12e 3.51 g (yield 84%) of Compound 12e could be obtained by the method of [Reaction Formula 1] using 2.00 g (5.25 mmol, 1 equivalent) of Compound 10b and 1.5 equivalents of Compound 12d.

5) Synthesis of Compound 12

1.62 g (yield 57%) of Compound 12 could be obtained by performing the synthesis in the same manner as in the synthesis of Compound 3, except that Compound 12e was used instead of Compound 3c, and 1.00 g (1.56 mmol, 1 equivalent) of Compound 12b was used instead of Compound 3b.

HR LC/MS/MS m/z calcd for $C_{93}H_{66}B_2F_{28}N_6$ (M+): 1820.5088; found: 1820.5084.

Preparation Example 13. <Compound 13>

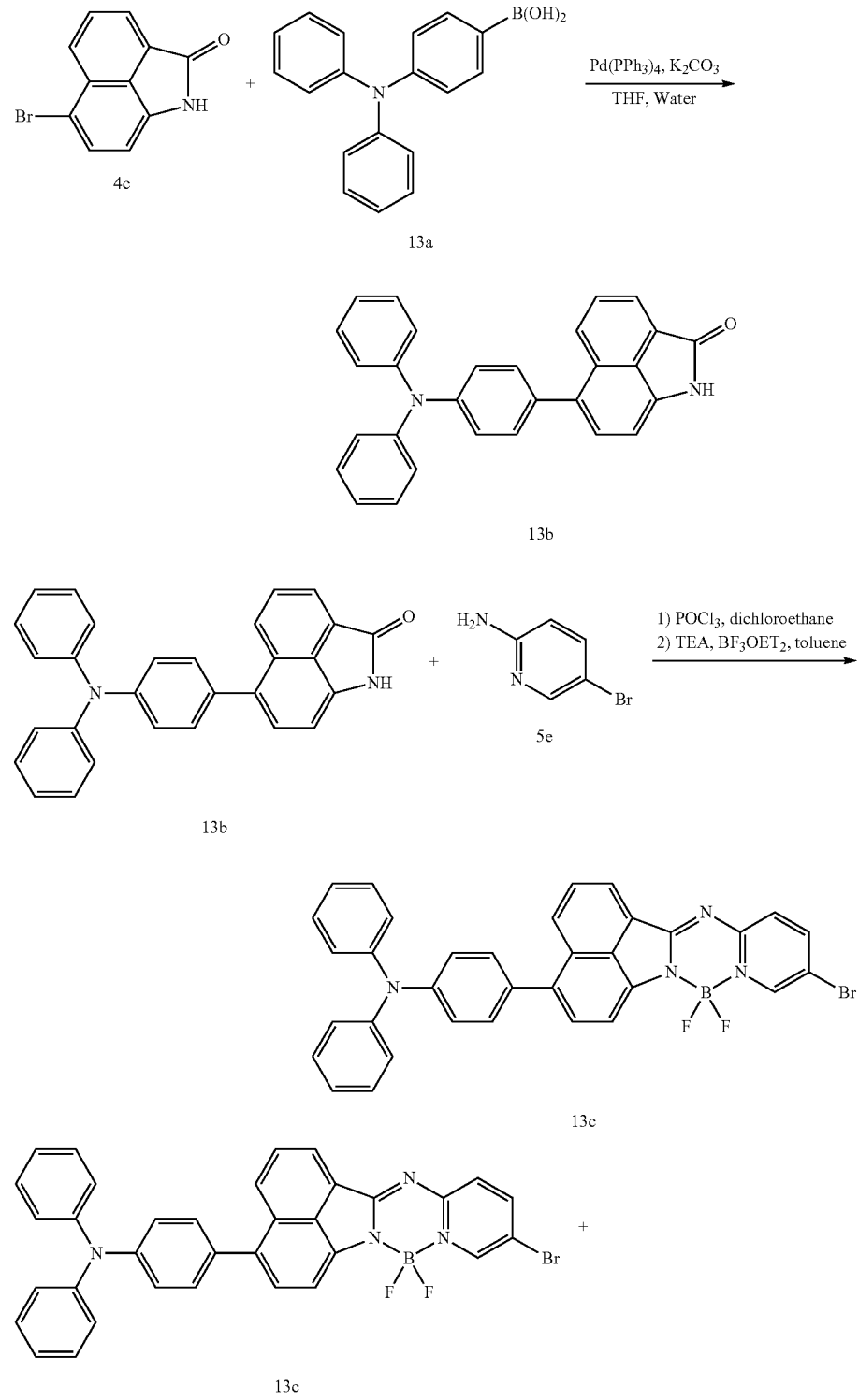

-continued

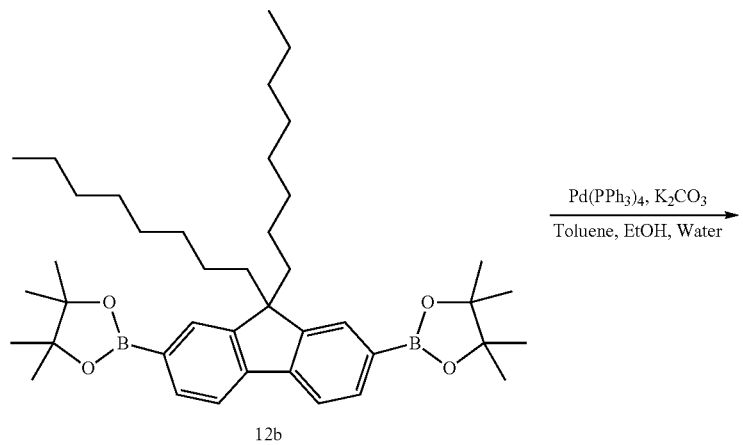

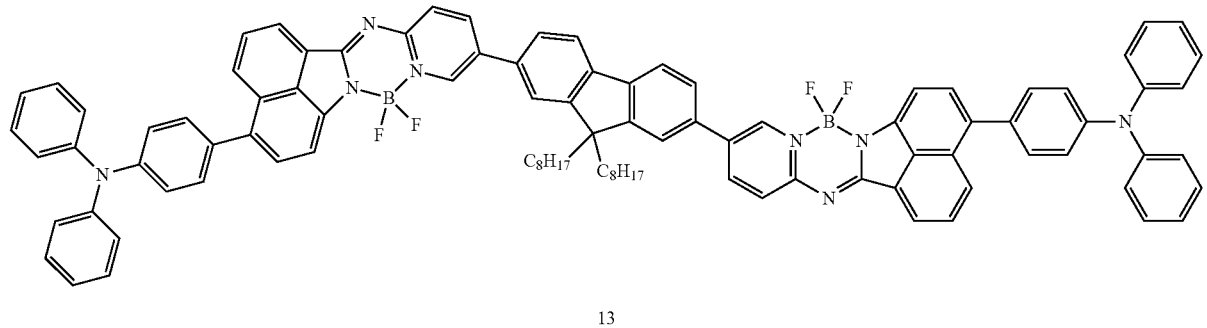

1) Synthesis of Compound 13b
2.76 g (yield 83%) of Compound 13b could be obtained by performing the synthesis in the same manner as in the synthesis of Compound 2c, except that 2.00 g (8.06 mmol, 1 equivalent) of Compound 4c was used instead of Compound 2a, and Compound 13a was used instead of using Compound 2b.

2) Synthesis of Compound 13c
2.54 g (yield 85%) of Compound 13c could be obtained by the method of [Reaction Formula 1] using 2.00 g (4.85 mmol, 1 equivalent) of Compound 13b and 1.5 equivalents of Compound 5e.

3) Synthesis of Compound 13
1.23 g (yield 54%) of Compound 13 could be obtained by performing the synthesis in the same manner as in the synthesis of Compound 3, except that Compound 13c was used instead of Compound 3c, and 1.00 g (1.56 mmol, 1 equivalent) of Compound 12b was used instead of Compound 3b.

HR LC/MS/MS m/z calcd for $C_{97}H_{84}B_2F_4N_8$ (M+): 1458.6941; found: 1458.6937.

Preparation Example 14. <Compound 14>

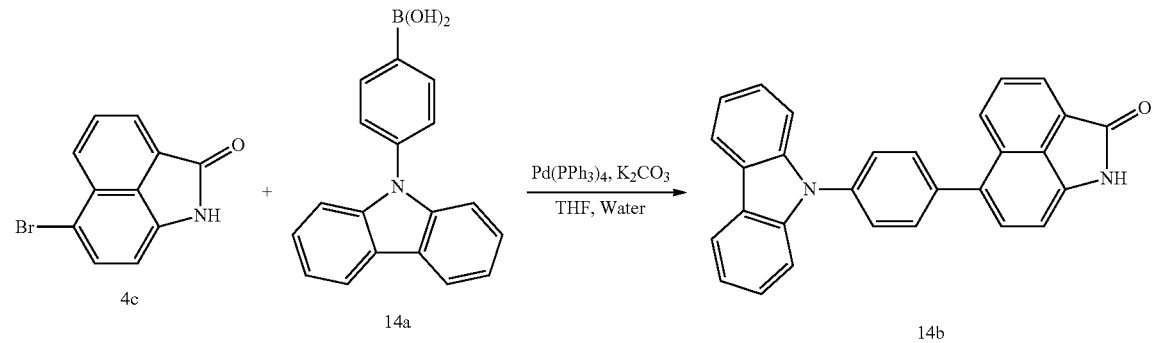

-continued
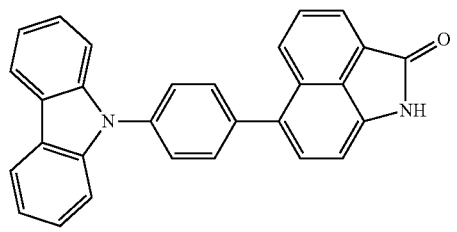
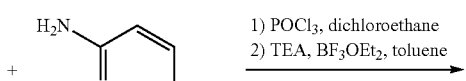
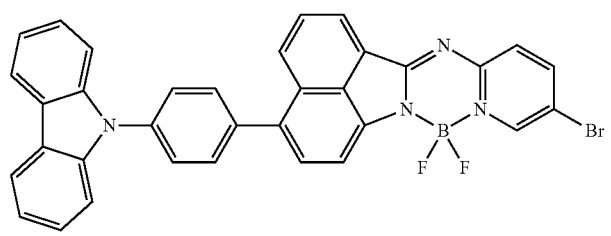
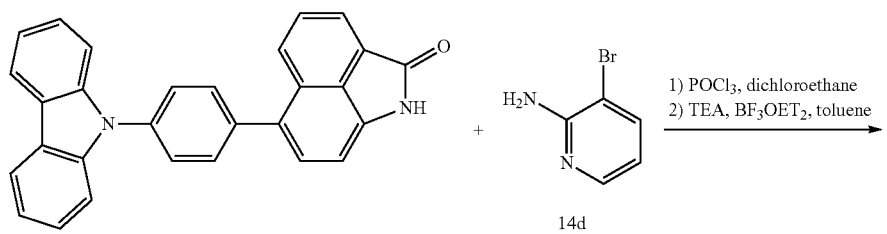
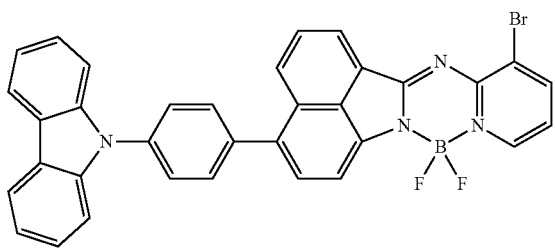
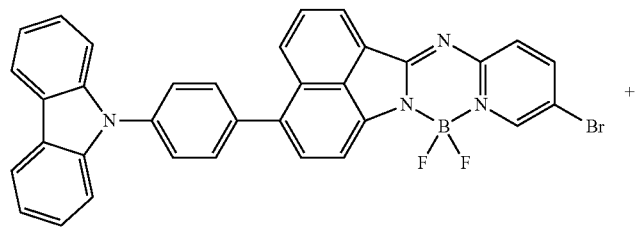

-continued

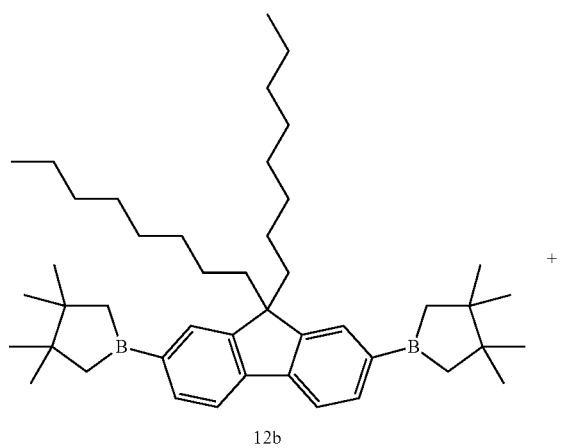

12b

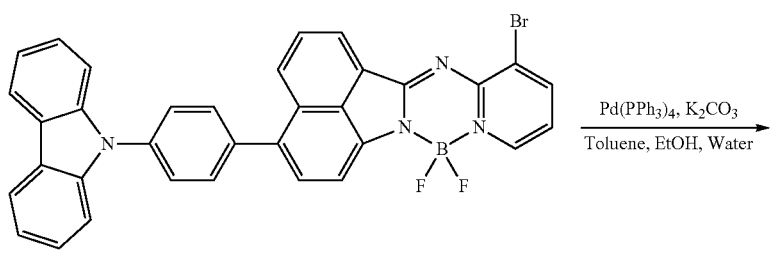

14c

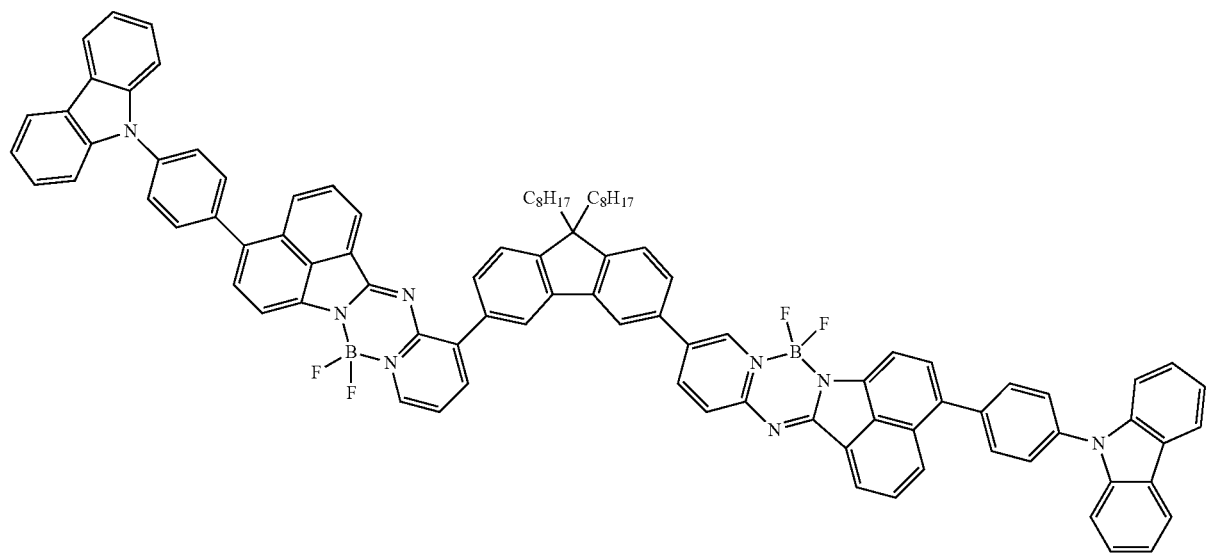

14

1) Synthesis of Compound 14b 2.85 g (yield 86%) of Compound 14b could be obtained by performing the synthesis in the same manner as in the synthesis of Compound 2c, except that 2.00 g (8.06 mmol, 1 equivalent) of Compound 4c was used instead of Compound 2a, and Compound 14a was used instead of using Compound 2b.

2) Synthesis of Compound 14c
1.86 g (yield 89%) of Compound 14c could be obtained by the method of [Reaction Formula 1] using 1.40 g (3.41 mmol, 1 equivalent) of Compound 14b and 1.5 equivalents of Compound 5e.

3) Synthesis of Compound 14e
1.82 g (yield 87%) of Compound 14e could be obtained by the method of [Reaction Formula 1] using 1.40 g (3.41 mmol, 1 equivalent) of Compound 14b and 1.5 equivalents of Compound 14d.

4) Synthesis of Compound 14
0.454 g (yield 20%) of Compound 14 could be obtained by performing the synthesis in the same manner as in the synthesis of Compound 1, except that Compound 14c was used instead of using Compound 1c, 1.00 g (1.56 mmol, 1 equivalent) of Compound 12b was used instead of using Compound 1b, and Compound 14e was used instead of using Compound 1d.
HR LC/MS/MS m/z calcd for $C_{97}H_{80}B_2F_4N_8$ (M+): 1454.6628; found: 1454.6621.
Preparation Example 15. <Compound 15>
1) Synthesis of Compound 15b
A synthesis was performed in the same manner as in the synthesis of Compound 1b, except that 2.00 g (6.10 mmol, 1 equivalent) of Compound 15a was used instead of using Compound 1a. 2.21 g (yield 86%) of Compound 15b could be obtained.
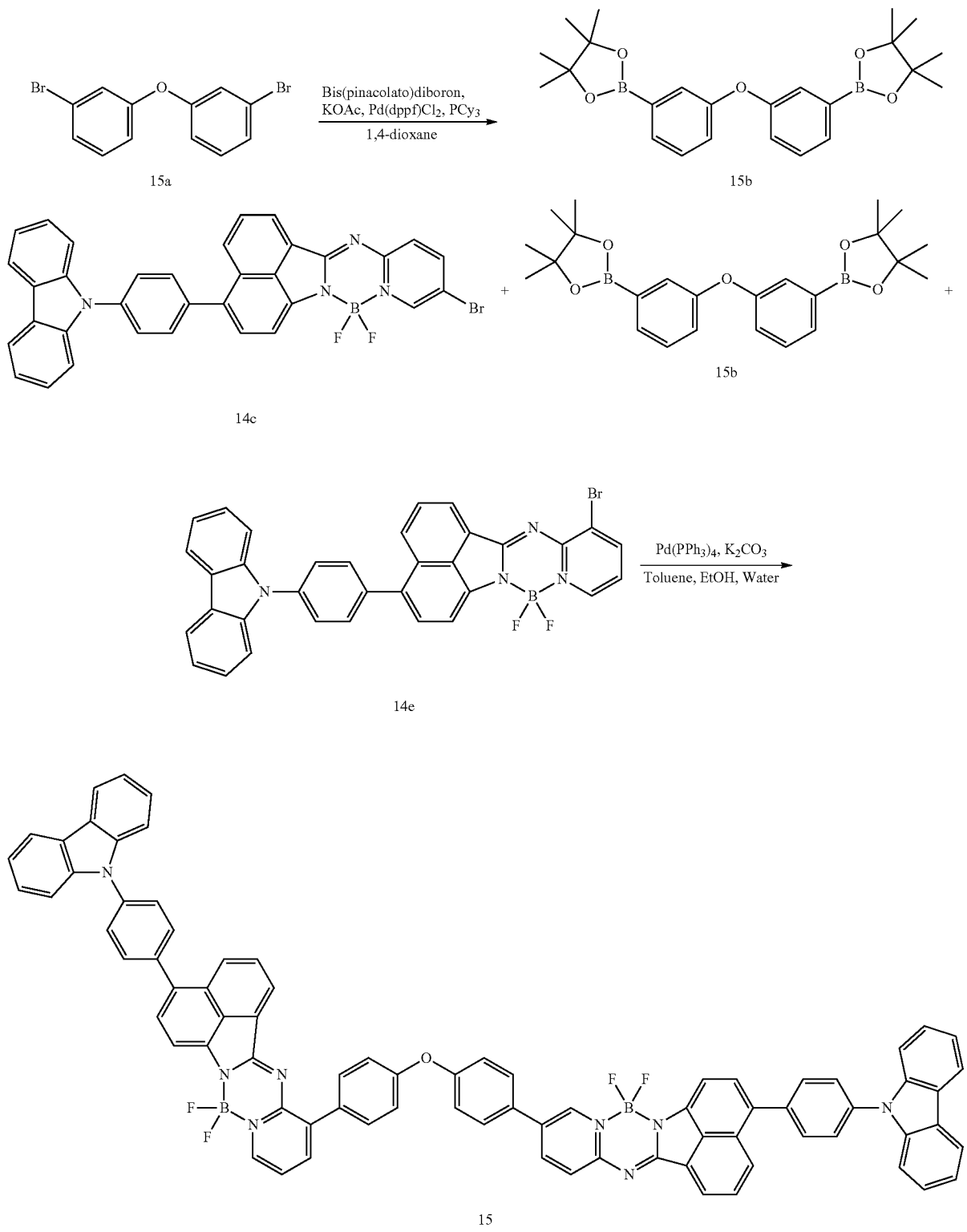

2) Synthesis of Compound 15

A synthesis was performed in the same manner as in the synthesis of Compound 14, except that 1.00 g (2.37 mmol, 1 equivalent) of Compound 15b was used instead of using Compound 12b. 0.527 g (yield 18%) of Compound 15 could be obtained.

HR LC/MS/MS m/z calcd for $C_{80}H_{48}B_2F_4N_{80}$ (M+): 1234.4073; found: 1234.4070.

Preparation Example 16. <Compound 16>

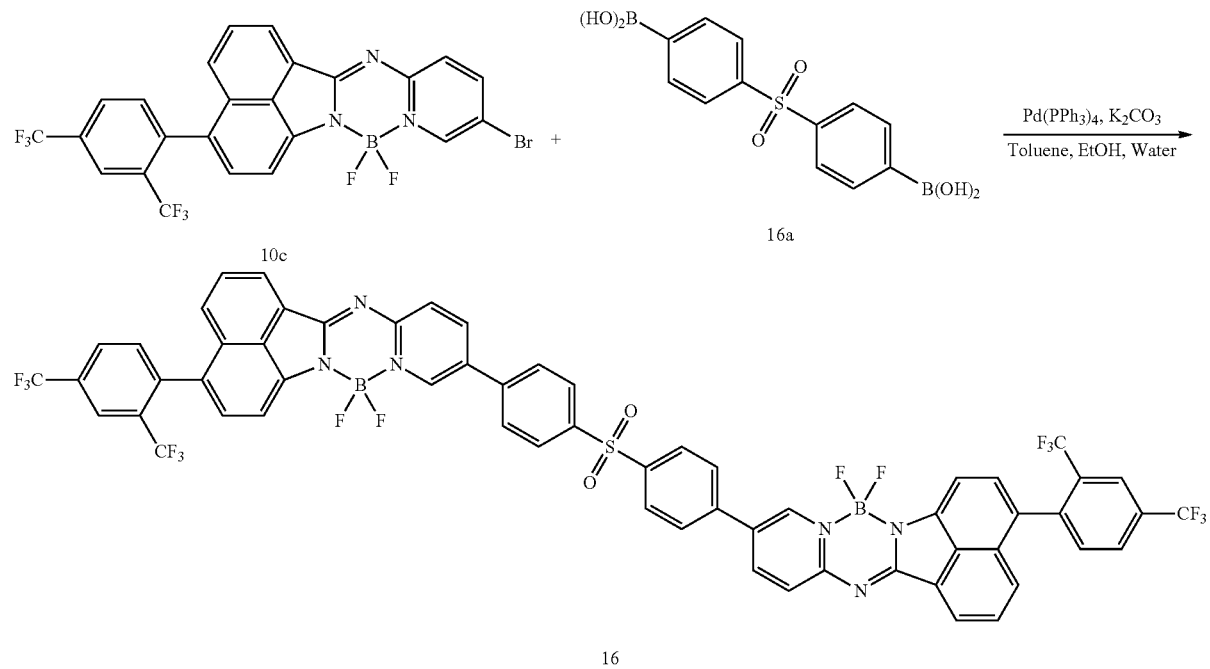

1) Synthesis of Compound 16

2.60 g (yield 65%) of Compound 16 could be obtained by performing the synthesis in the same manner as in the synthesis of Compound 10, except that 1.00 g (3.27 mmol, 1 equivalent) of Compound 16a was used instead of Compound 7b.

HR LC/MS/MS m/z calcd for $C_{60}H_{30}B_2F_{16}N_6O_2S$ (M+): 1224.2082; found: 1224.2095.

Preparation Example 17. <Compound 17>

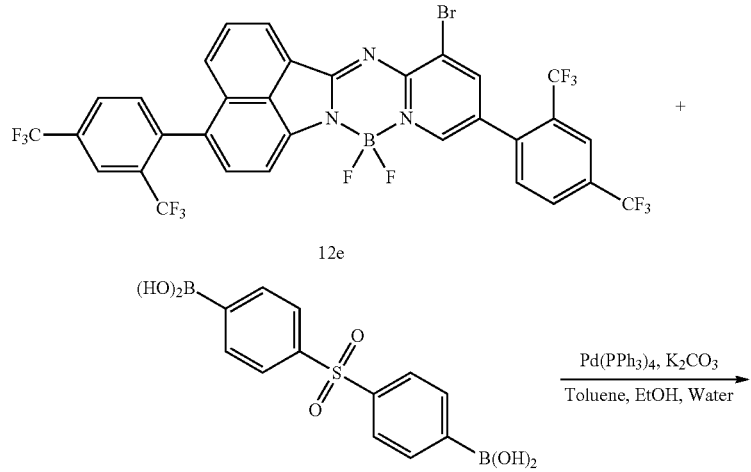

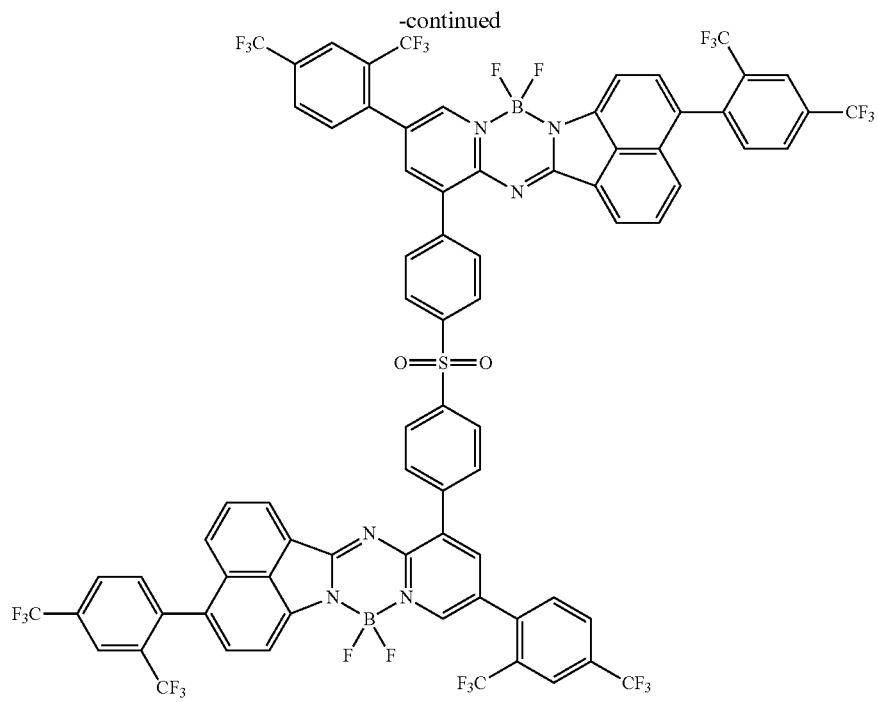
17
1) Synthesis of Compound 17
2.60 g (yield 52%) of Compound 17 could be obtained by performing the synthesis using 1.00 g (3.27 mmol, 1 equivalent) of Compound 16a in the same manner as in the synthesis of Compound 16, except that Compound 12e was used instead of Compound 10c.
HR LC/MS/MS m/z calcd for $C_{60}H_{30}B_2F_{16}N_6O_2S$ (M+): 1648.2203; found: 1648.2199.
Preparation Example 18. <Compound 18>
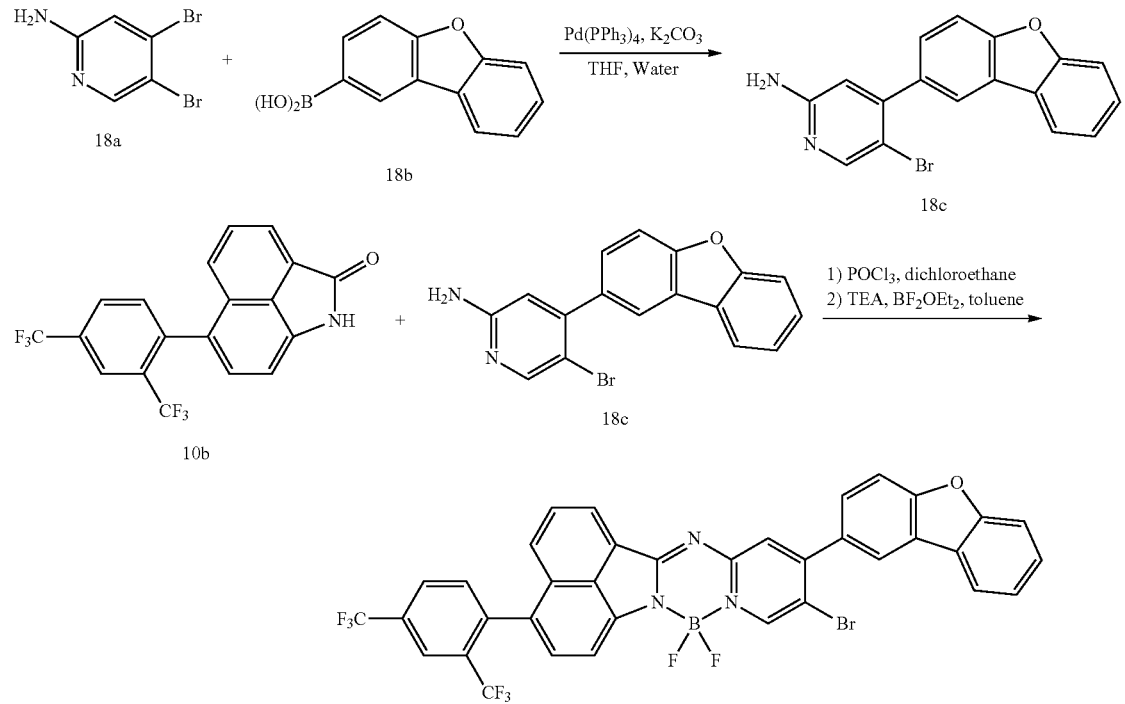

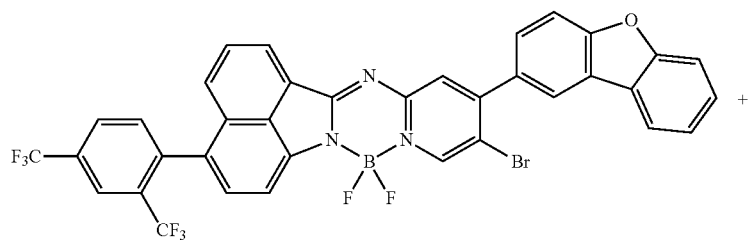

18d

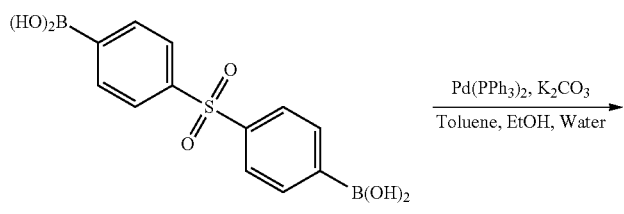

16a

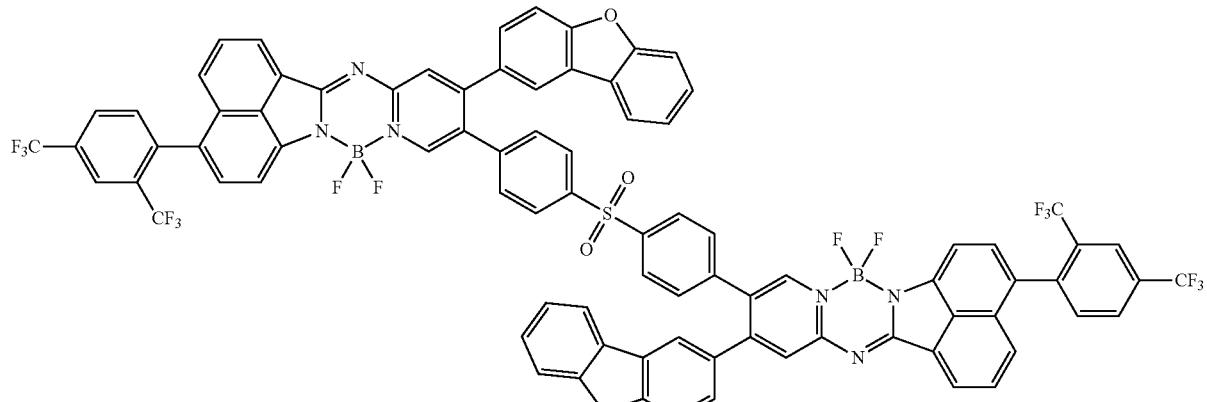

16

1) Synthesis of Compound 18c 3.40 g (yield 42%) of Compound 18c could be obtained by performing the synthesis in the same manner as in the synthesis of Compound 2c, except that 6.00 g (23.8 mmol, 1 equivalent) of Compound 18a was used instead of using Compound 2a, and Compound 18b was used instead of using Compound 2b.

2) Synthesis of Compound 18d 3.07 g (yield 78%) of Compound 18d could be obtained by the method of [Reaction Formula 1] using 2.00 g (5.25 mmol, 1 equivalent) of Compound 10b and 1.5 equivalents of Compound 18c.

3) Synthesis of Compound 18

2.30 g (yield 45%) of Compound 18 could be obtained by performing the synthesis using 1.00 g (3.27 mmol, 1 equivalent) of Compound 16a in the same manner as in the synthesis of Compound 16, except that Compound 18d was used instead of Compound 10c.

HR LC/MS/MS m/z calcd for $C_{84}H_{42}B_2F_{16}N_6O_4S$ (M+): 1556.2919; found: 1556.2927.

Preparation Example 19. <Compound 19>

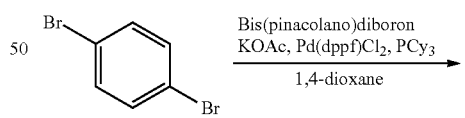

19a

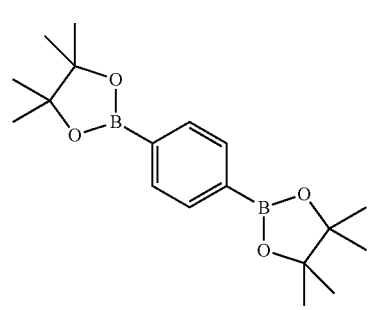

19b

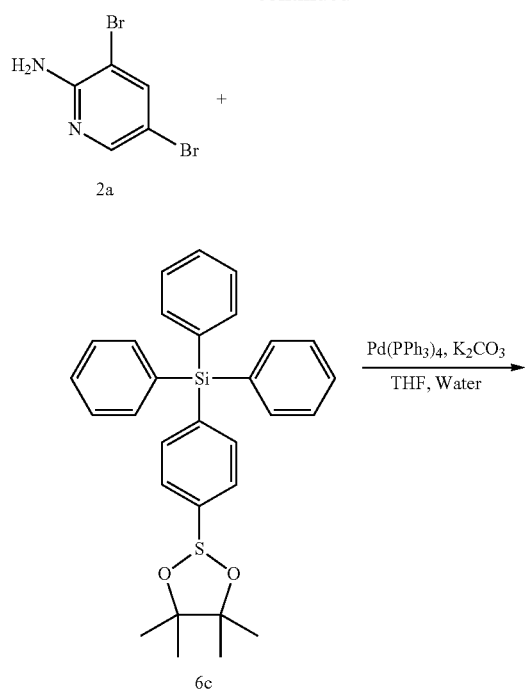
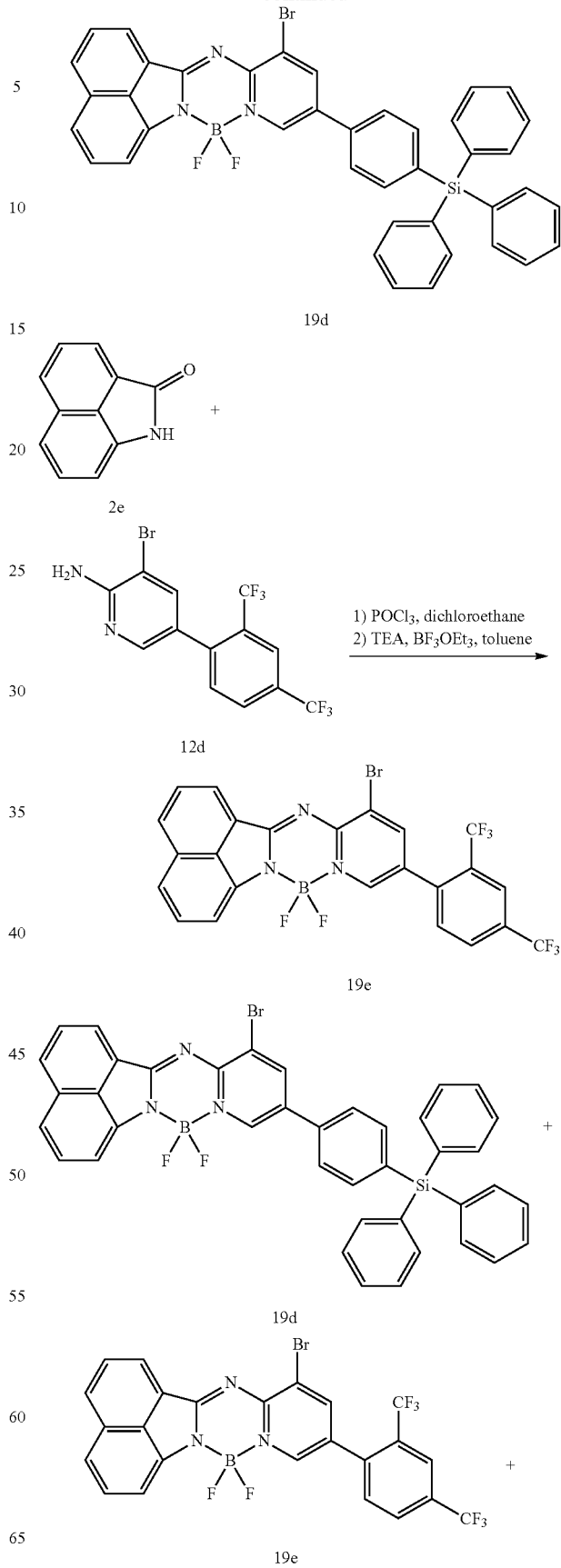

-continued

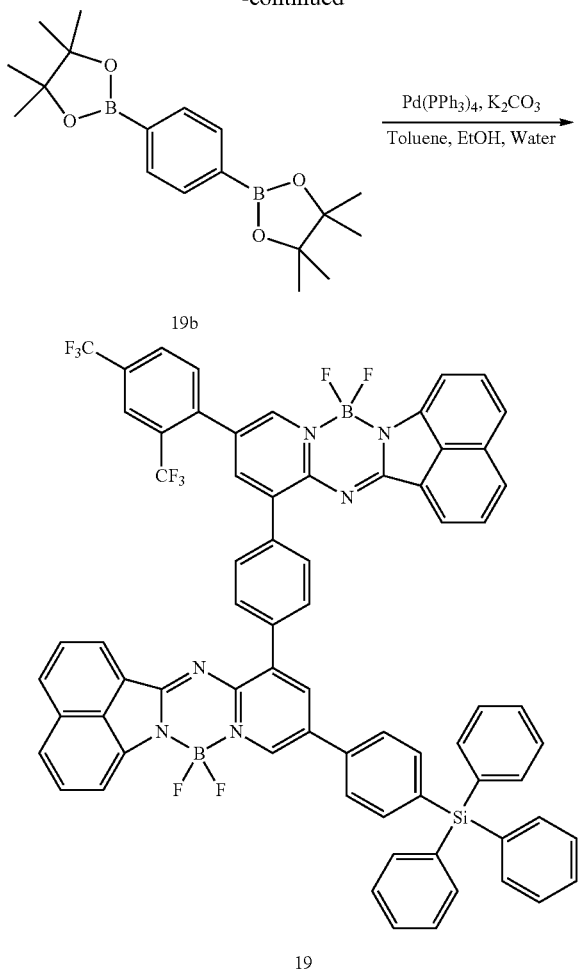

1) Synthesis of Compound 19b 2.74 g (yield 98%) of Compound 19b could be obtained by performing the synthesis in the same manner as in the synthesis of Compound 1b, except that 2.00 g (8.48 mmol, 1 equivalent) of Compound 19a was used instead of using Compound 1a.

2) Synthesis of Compound 19c 9.17 g (yield 38%) of Compound 19c could be obtained by performing the synthesis using 12.0 g (47.6 mmol, 1 equivalent) of Compound 2a in the same manner as in the synthesis of Compound 2c, except that Compound 6c was used instead of using Compound 2b.

3) Synthesis of Compound 19d 7.18 g (yield 86%) of Compound 19d could be obtained by the method of [Reaction Formula 1] using 2.00 g (11.8 mmol, 1 equivalent) of Compound 2e and 1.5 equivalents of Compound 19c.

4) Synthesis of Compound 19e 5.51 g (yield 80%) of Compound 19e could be obtained by the method of [Reaction Formula 1] using 2.00 g (11.8 mmol, 1 equivalent) of Compound 2e and 1.5 equivalents of Compound 12d.

5) Synthesis of Compound 19

0.329 g (yield 18%) of Compound 19 could be obtained by performing the synthesis in the same manner as in the synthesis of Compound 1, except that Compound 19d was used instead of using Compound 1c, 0.50 g (1.52 mmol, 1 equivalent) of Compound 19b was used instead of using Compound 1b, and Compound 19e was used instead of using Compound 1d.

HR LC/MS/MS m/z calcd for $C_{70}H_{42}B_2F_{10}N_6Si$ (M+): 1206.3267; found: 1206.3261.

Preparation Example 20. <Compound 20>

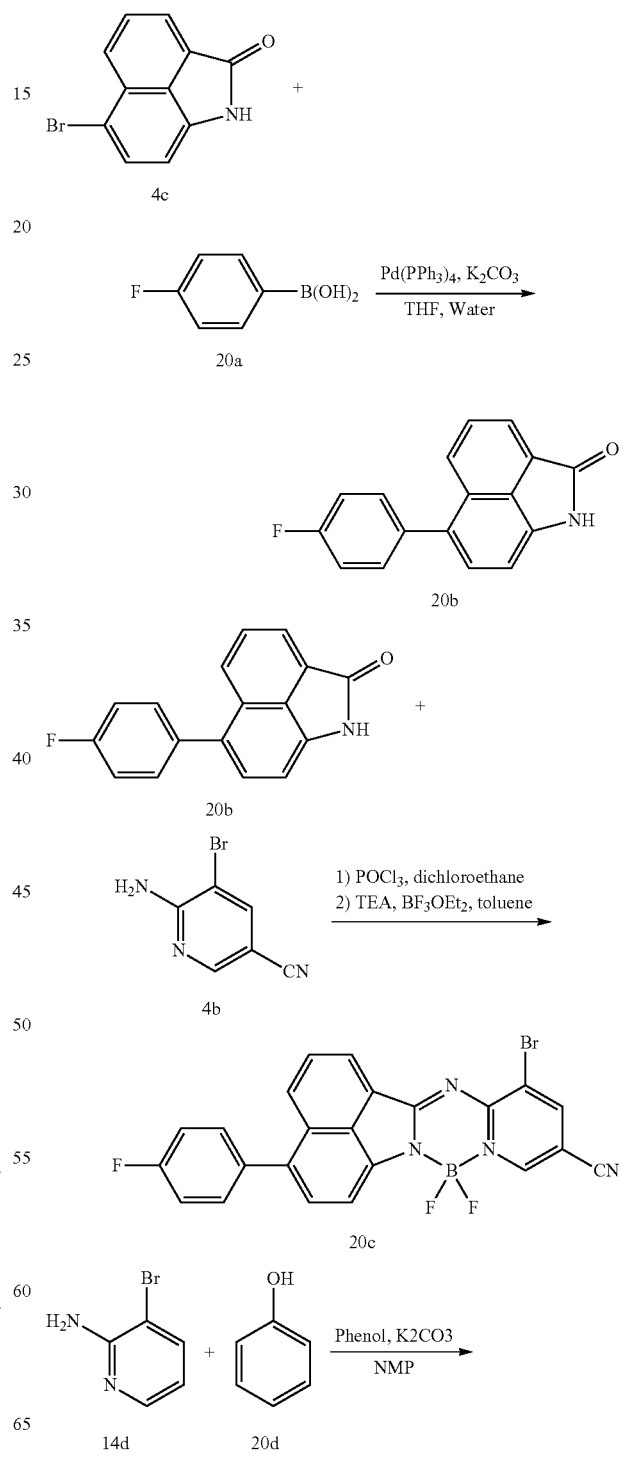

-continued

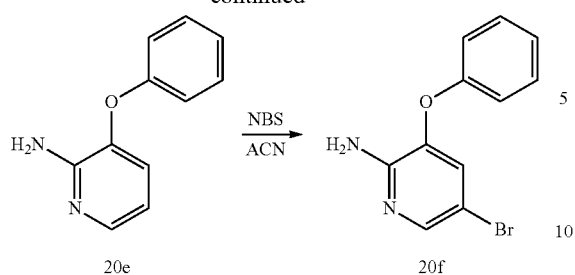

20e

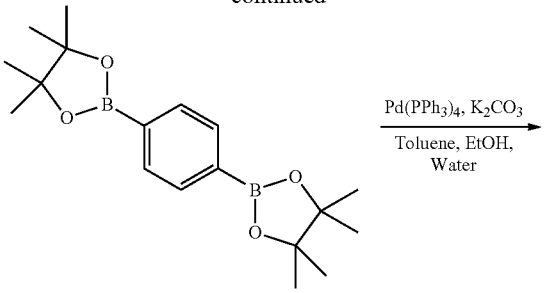

19b

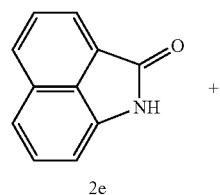

2e

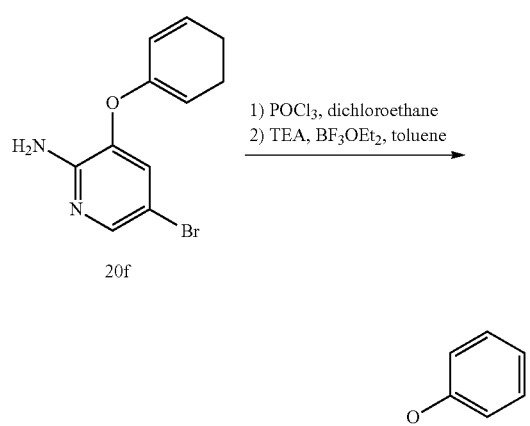

20f

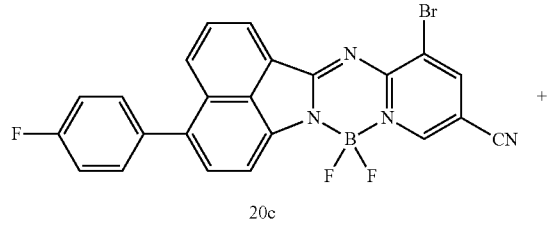

20g

20c

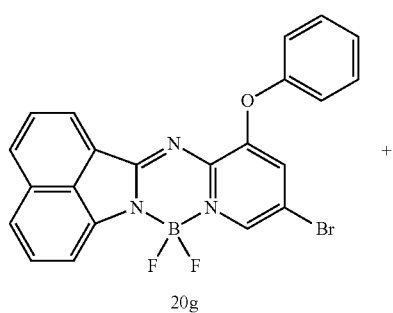

20g

1) Synthesis of Compound 20b 1.49 g (yield 70%) of Compound 20b could be obtained by performing the synthesis in the same manner as in the synthesis of Compound 2c, except that 2.00 g (8.06 mmol, 1 equivalent) of Compound 4c was used instead of using Compound 2a, and Compound 20a was used instead of using Compound 2b.

2) Synthesis of Compound 20c 2.98 g (yield 80%) of Compound 20c could be obtained by the method of [Reaction Formula 1] using 1.49 g (5.64 mmol, 1 equivalent) of Compound 20b and 1.5 equivalents of Compound 4b.

3) Synthesis of Compound 20e 2.00 g (11.6 mmol, 1 equivalent) of Compound 14d, 10 equivalents of phenol, and 5 equivalents of potassium carbonate were stirred under an NMP solvent. The temperature was adjusted to 90° C., and a reaction was performed under a nitrogen atmosphere. After the reaction was terminated, the temperature was cooled to room temperature and a solid was formed by pouring HCl (aq) thereto. After the formed solid was separated from the solution through a filter, the solid was dissolved in a chloroform solution and extraction was performed by using water. After the remaining moisture in the organic layer was removed over anhydrous magnesium sulfate, the residue was concentrated through distillation under reduced pressure, and 1.94 g (yield 90%) of Compound 20e could be obtained through column purification.

4) Synthesis of Compound 20f 1.93 g (yield 70%) of Compound 20f could be obtained by performing the synthesis in the same manner as in the synthesis of Compound 4b, except that 1.94 g (10.4 mmol, 1 equivalent) of Compound 20e was used instead of using Compound 4a.

5) Synthesis of Compound 20g 1.23 g (yield 90%) of Compound 20g could be obtained by the method of [Reaction Formula 1] using 0.50 g (2.96 mmol, 1 equivalent) of Compound 2e and 1.5 equivalents of Compound 20f.

6) Synthesis of Compound 20

0.252 g (yield 19%) of Compound 20 could be obtained by performing the synthesis using 0.50 g (1.52 mmol, 1 equivalent) of Compound 19b in the same manner as in the synthesis of Compound 19, except that Compound 20c was used instead of using Compound 19e, and Compound 20g was used instead of using Compound 19f.

HR LC/MS/MS m/z calcd for $C_{51}H_{28}B_2F_5N_7$ (M+): 871.2462; found: 871.2463.

Preparation Example 21. <Compound 21>

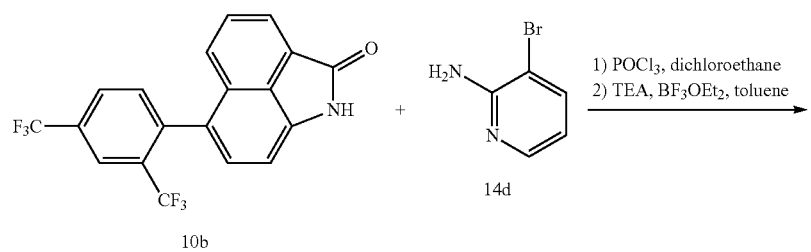

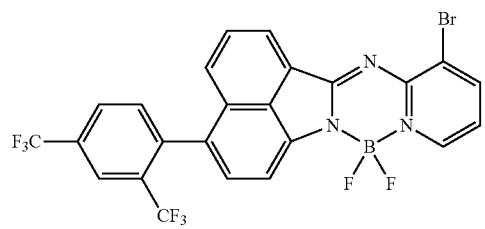

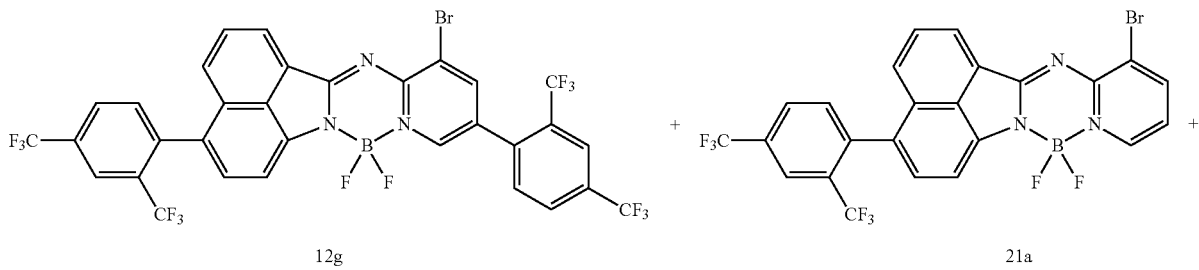

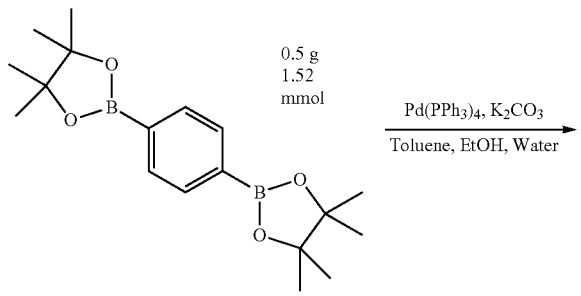

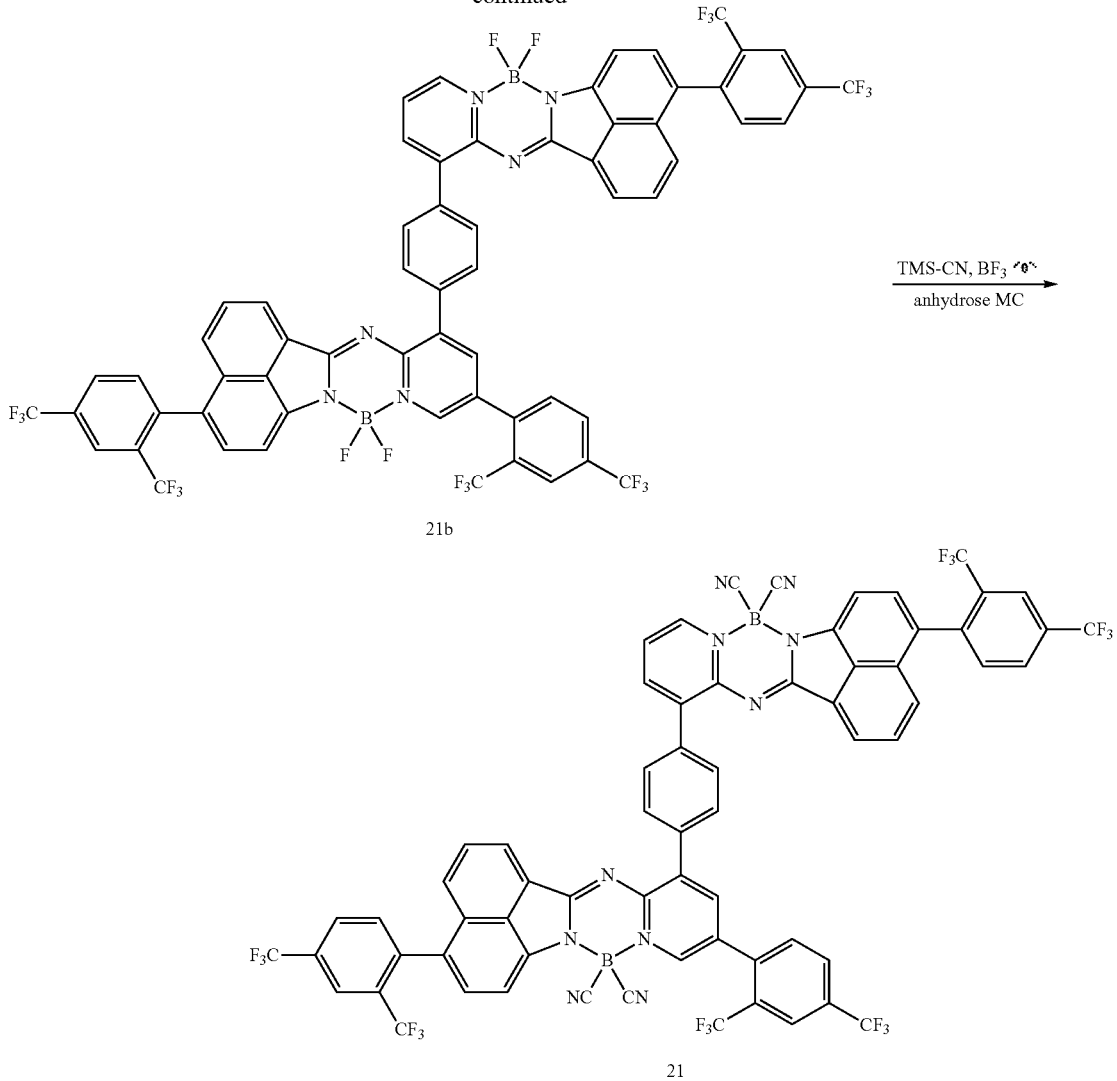

1) Synthesis of Compound 21a 2.51 g (yield 82%) of Compound 21a could be obtained by the method of [Reaction Formula 1] using 2.00 g (5.25 mmol, 1 equivalent) of Compound 10b and 1.5 equivalents of Compound 14d.

2) Synthesis of Compound 21b 0.786 g (yield 20%) of Compound 21b could be obtained by performing the synthesis using 1.00 g (3.03 mmol, 1 equivalent) of Compound 19b in the same manner as in the synthesis of Compound 19, except that Compound 12e was used instead of using Compound 19d, and Compound 21a was used instead of using Compound 19e.

3) Synthesis of Compound 21

0.786 g (0.606 mmol, 1 equivalent) of Compound 21b was dissolved in anhydrous methylene chloride, 10 equivalents of trimethylsilylcyanide were put thereinto under an $N_2$ atmosphere, and 2 equivalents of trifluoroboron ethylether were slowly added thereto. The reaction was confirmed through HPLC, and after the termination of the reaction, the product was washed with a sodium bicarbonate solution. After extraction was performed with chloroform and water, the moisture was removed from the organic layer over anhydrous magnesium sulfate. The solvent was removed through distillation under reduced pressure, and 0.602 g (yield 75%) of Compound 21 could be obtained by performing recrystallization with a chloroform solvent.

HR LC/MS/MS m/z calcd for $C_{66}H_{28}B_2F_{18}N_{10}$ (M+): 1324.2397; found: 1324.2392.

Physical properties of Compounds 1 to 21 are as shown in the following Table 1.

TABLE 1

| Compound | Solution Abs. (nm) | Solution PL (nm) | Quantum efficiency (Q.E.) (%) | FWHM (nm) |
|---|---|---|---|---|
| 1 | 455 | 498 | 92.5 | 58 |
| 2 | 460 | 502 | 92.8 | 54 |
| 3 | 456 | 499 | 95.0 | 56 |
| 4 | 470 | 530 | 96.5 | 67 |
| 5 | 466 | 526 | 94.2 | 69 |
| 6 | 474 | 528 | 90.8 | 70 |
| 7 | 487 | 547 | 87.0 | 68 |
| 8 | 474 | 529 | 89.5 | 63 |
| 9 | 504 | 601 | 63.9 | 86 |
| 10 | 467 | 513 | 89.0 | 51 |
| 11 | 468 | 515 | 87.4 | 58 |

TABLE 1-continued

| Compound | Solution Abs. (nm) | Solution PL (nm) | Quantum efficiency (Q.E.) (%) | FWHM (nm) |
|---|---|---|---|---|
| 12 | 463 | 513 | 86.0 | 61 |
| 13 | 497 | 593 | 84.9 | 73 |
| 14 | 476 | 541 | 92.0 | 67 |
| 15 | 473 | 537 | 88.1 | 68 |
| 16 | 461 | 507 | 91.2 | 64 |
| 17 | 459 | 507 | 89.6 | 72 |
| 18 | 463 | 509 | 90.0 | 70 |
| 19 | 452 | 497 | 93.7 | 63 |
| 20 | 460 | 520 | 85.3 | 61 |
| 21 | 461 | 507 | 93.5 | 65 |

The physical properties were measured after each compound was prepared at a concentration of $10^{-5}$ M under a toluene solvent.

Absorbance and photoluminescence are abbreviated as Abs and PL, respectively. In the table, the numerical values of 'Solution Abs' and 'Solution PL' indicate the wavelength values at the maximum intensity.

The Abs. was measured by using MEGA-2100 equipment manufactured by Scinco Co., Ltd., and the PL was measured by using FS-2 equipment manufactured by Scinco Co., Ltd.

EXAMPLES

Example 1

1.5 parts by weight of Compound 3 (maximum absorption wavelength 456 nm, maximum light emission wavelength 499 nm, and full width at half maximum 56 nm in a toluene solution) prepared in Preparation Example 3 were dissolved in a solvent propylene glycol monomethyl ether acetate (PGEMA), such that 33.9 parts by weight of an acrylic binder, 59.3 parts by weight of a polyfunctional monomer (pentaerythritol triacrylate, Nippon Kayaku Co., Ltd.), 2.3 parts by weight of a bonding aid and a surfactant (KBM 503, Shinetsu), and 3.0 parts by weight of a photoinitiator (Tinuvin® 477, BASF) had a solid content of 21 wt %, thereby preparing a solution. After the mixed solution was sufficiently stirred, a thin film was coated onto a glass substrate, and then dried to prepare a color conversion film. The brightness spectrum of the prepared color conversion film was measured by a spectroradiometer (SR series manufactured by Topcon, Inc.). Specifically, the prepared color conversion film was stacked on one surface of a light guide plate of a backlight unit including an LED blue backlight (maximum light emission wavelength 450 nm) and the light guide plate, a prism sheet and a DBEF film (Dual Brightness Enhancement Film) were stacked on the color conversion film, and then an initial value was set, such that the luminance of the blue LED light was 600 nit based on the film.

Example 2

An experiment was performed in the same manner as in Example 1, except that in Example 1, Compound 5 (maximum absorption wavelength 466 nm, maximum light emission wavelength 526 nm, and full width at half maximum 69 nm in a toluene solution) was used instead of Compound 3.

Example 3

An experiment was performed in the same manner as in Example 1, except that in Example 1, Compound 7 (maximum absorption wavelength 487 nm, maximum light emission wavelength 547 nm, and full width at half maximum 68 nm in a toluene solution) was used instead of Compound 3.

Example 4

An experiment was performed in the same manner as in Example 1, except that in Example 1, Compound 8 (maximum absorption wavelength 474 nm, maximum light emission wavelength 529 nm, and full width at half maximum 63 nm in a toluene solution) was used instead of Compound 3.

Example 5

An experiment was performed in the same manner as in Example 1, except that in Example 1, Compound 9 (maximum absorption wavelength 504 nm, maximum light emission wavelength 601 nm, and full width at half maximum 86 nm in a toluene solution) was used instead of Compound 3.

Example 6

An experiment was performed in the same manner as in Example 1, except that in Example 1, Compound 10 (maximum absorption wavelength 467 nm, maximum light emission wavelength 513 nm, and full width at half maximum 51 nm in a toluene solution) was used instead of Compound 3.

Example 7

An experiment was performed in the same manner as in Example 1, except that in Example 1, Compound 11 (maximum absorption wavelength 468 nm, maximum light emission wavelength 515 nm, and full width at half maximum 58 nm in a toluene solution) was used instead of Compound 3.

Example 8

An experiment was performed in the same manner as in Example 1, except that in Example 1, Compound 12 (maximum absorption wavelength 463 nm, maximum light emission wavelength 513 nm, and full width at half maximum 61 nm in a toluene solution) was used instead of Compound 3.

Example 9

An experiment was performed in the same manner as in Example 1, except that in Example 1, Compound 16 (maximum absorption wavelength 461 nm, maximum light emission wavelength 507 nm, and full width at half maximum 64 nm in a toluene solution) was used instead of Compound 3.

Example 10

An experiment was performed in the same manner as in Example 1, except that in Example 1, Compound 17 (maximum absorption wavelength 459 nm, maximum light emission wavelength 507 nm, and full width at half maximum 72 nm in a toluene solution) was used instead of Compound 3.

Example 11

An experiment was performed in the same manner as in Example 1, except that in Example 1, Compound 18 (maximum absorption wavelength 463 nm, maximum light emission wavelength 509 nm, and full width at half maximum 70 nm in a toluene solution) was used instead of Compound 3.

Example 12

An experiment was performed in the same manner as in Example 1, except that in Example 1, Compound 21 (maximum absorption wavelength 461 nm, maximum light emission wavelength 507 nm, and full width at half maximum 65 nm in a toluene solution) was used instead of Compound 3.

Comparative Example 1

An experiment was performed in the same manner as in Example 1, except that in Example 1, the following Dye <22> (Chem. Eur. J. 2015, 21, 12996-13003.) was used instead of Compound 3.

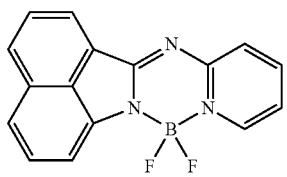

<22>

The thin film light emission wavelength, quantum yield, and Abs intensity ratio of each of the color conversion films according to Examples 1 to 12 and Comparative Example 1 are shown in the following Table 2.

TABLE 2

| | | Thin film light emission wavelength | | Quantum | Abs |
|---|---|---|---|---|---|
| | Compound | λmax (nm) | FWHM (nm) | yield (QY, %) | intensity ratio |
| Example 1 | 3 | 540 | 49 | 84.0 | 1.82 |
| Example 2 | 5 | 556 | 58 | 88.2 | 1.90 |
| Example 3 | 7 | 607 | 52 | 85.8 | 1.98 |
| Example 4 | 8 | 583 | 54 | 87.8 | 2.01 |
| Example 5 | 9 | 652 | 109 | 91.2 | 2.13 |
| Example 6 | 10 | 566 | 55 | 93.5 | 1.98 |
| Example 7 | 11 | 554 | 58 | 86.4 | 1.89 |
| Example 8 | 12 | 552 | 61 | 88.0 | 1.91 |
| Example 9 | 16 | 550 | 68 | 89.9 | 1.80 |
| Example 10 | 17 | 538 | 55 | 85.3 | 1.85 |
| Example 11 | 18 | 540 | 59 | 95.3 | 1.92 |
| Example 12 | 21 | 539 | 57 | 92.5 | 1.99 |
| Comparative Example 1 | 22 | 512 | 81 | 89.4 | 1 |

The thin film light emission wavelength was measured by using FS-2 equipment manufactured by Scinco Co., Ltd., and the quantum yield was measured by using Quantaurus-QY equipment manufactured by Hamamatsu Corp. The Abs intensity ratio is a numerical value indicating a ratio when the intensity is set to 1 at the maximum absorption wavelength of Comparative Example 1, and MEGA-2100 equipment manufactured by Scinco Co., Ltd was used.

When the maximum light absorption intensity in Comparative Example 1 which is an azaBODIPY single molecule was set to 1, it can be seen that the maximum light absorption intensities of the present synthetic compounds including two azaBODIPY chromophores are about two times as strong. It is possible to provide a color conversion film with improved brightness and color gamut by implementing the light absorption intensity and light emitting intensity enhanced by an equal mole number of molecules.

EXPLANATION OF REFERENCE NUMERALS AND SYMBOLS

101: Side chain-type light source
102: Reflective plate
103: Light guide plate
104: Reflective layer
105: Color conversion film
106: Light dispersion pattern

The invention claimed is:
1. A compound represented by the following Formula 1:

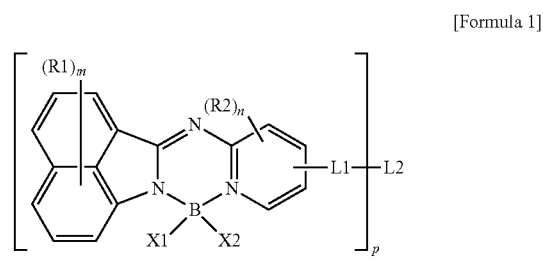

[Formula 1]

in Formula 1,
p is an integer of 2 or more, and structures in the parenthesis are the same or different,
L1 and L2 are the same or different from each other, and are each independently a direct bond; —SiR$_{101}$R$_{102}$—; —SO$_2$—; —O—; —NR$_{103}$—; —C(=O)O—; a substituted or unsubstituted alkylene group; a substituted or unsubstituted cycloalkylene group; a substituted or unsubstituted arylene group; or a substituted or unsubstituted divalent heterocyclic group,
R1 and R2 are the same or different from each other, and are each independently hydrogen; deuterium; a halogen group; a cyano group; a nitro group; a carbonyl group; a carboxyl group (—COOH); an ether group; a hydroxyl group; —C(=O)NR$_{104}$R$_{105}$; —C(=O)OR$_{106}$; a substituted or unsubstituted alkyl group; a substituted or unsubstituted cycloalkyl group; a substituted or unsubstituted alkoxy group; a substituted or unsubstituted aryloxy group; a substituted or unsubstituted alkenyl group; a substituted or unsubstituted amine group; a substituted or unsubstituted alkylamine group; a substituted or unsubstituted arylamine group; a substituted or unsubstituted aryl group; a substituted or unsubstituted haloalkyl group; a substituted or unsubstituted silyl group; or a substituted or unsubstituted heterocyclic group, or adjacent groups are optionally bonded to each other to form a ring,
m is an integer from 0 to 6, and when m is 2 or more, R2's are the same or different,
n is an integer from 0 to 3, and when n is 2 or more, R2's are the same or different,
X1 and X2 are the same or different from each other, and are each independently a halogen group; a cyano group; a substituted or unsubstituted alkyl group; a substituted or unsubstituted alkynyl group; a substituted or unsubstituted alkoxy group; a substituted or unsubstituted ether group; a substituted or unsubstituted —C(=O)

OR$_{107}$; a substituted or unsubstituted aryl group; a substituted or unsubstituted aryloxy group; or a substituted or unsubstituted aralkyl group, and R$_{101}$ to R$_{107}$ are the same or different, and are each independently hydrogen; deuterium; a substituted or unsubstituted alkyl group; a substituted or unsubstituted fluoroalkyl group; a substituted or unsubstituted aryl group; or a substituted or unsubstituted heterocyclic group.

2. The compound of claim 1, wherein the compound of Formula 1 is represented by one of the following Formulae 2 to 10:

[Formula 2]

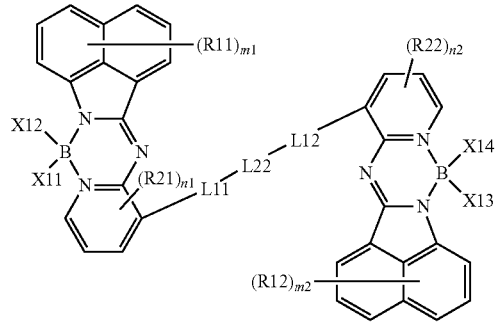

[Formula 3]

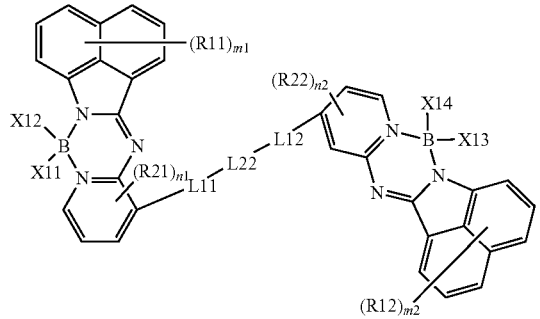

[Formula 4]

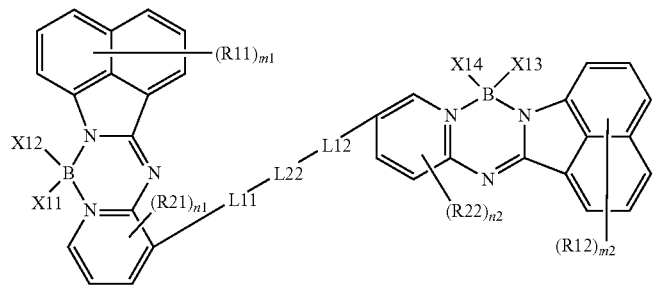

[Formula 5]

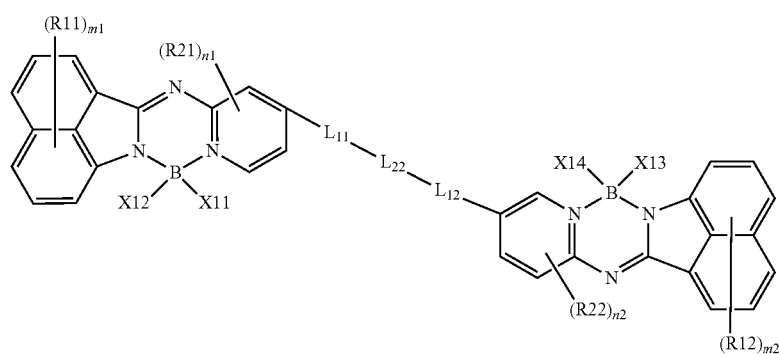

[Formula 6]

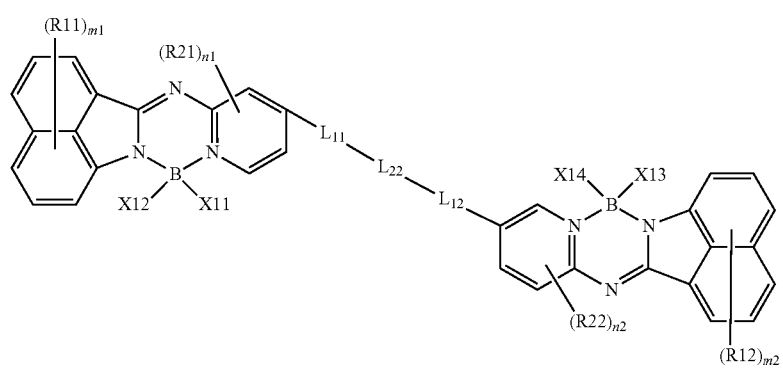

-continued

[Formula 7]

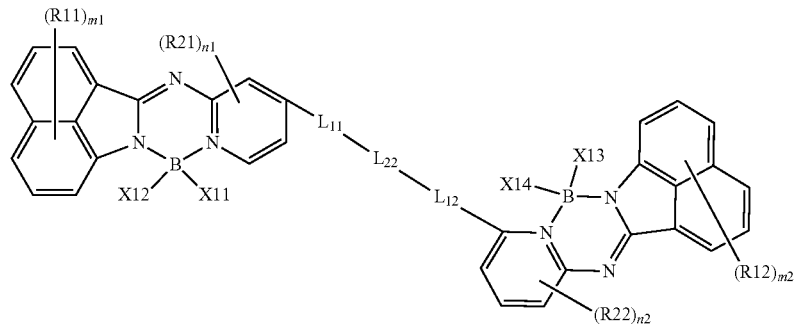

[Formula 8]

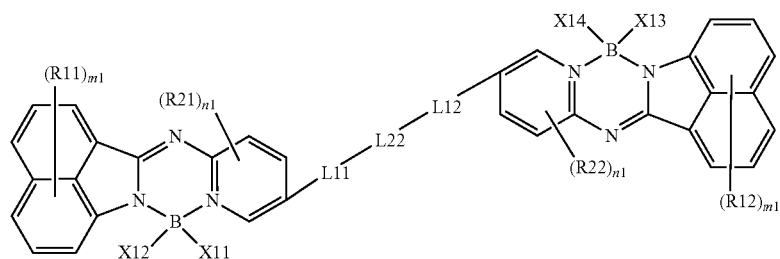

[Formula 9]

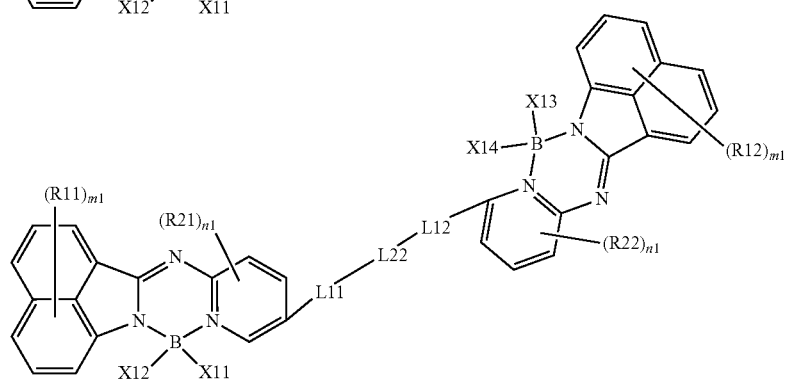

[Formula 10]

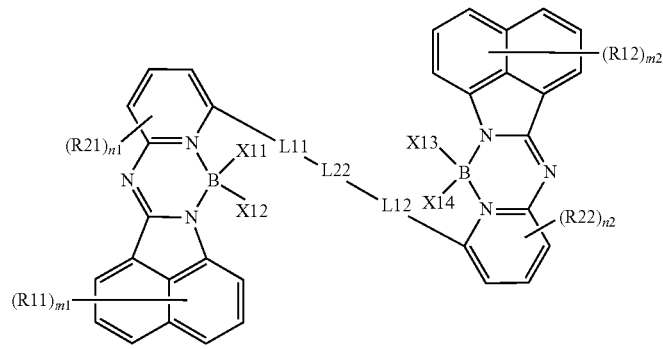

in Formulae 2 to 10,
L11 and L12 are as defined for L1 in Formula 1,
L22 is as defined for L2 in Formula 1,
R11 and R12 are as defined for R1 in Formula 1 and R21, and R22 are as defined for R2 in Formula 1,
m1 and m2 are as defined for m in Formula 1,
n1 and n2 are as defined for n in Formula 1, and
X11 to X14 are as defined for X1 and X2 Formula 1.

3. The compound of claim 1, wherein L1 and L2 are the same or different from each other, and are each independently a direct bond; —SiR$_{101}$R$_{102}$—; —SO$_2$—; —O—; —NR$_{103}$—; —C(=O)O—; a substituted or unsubstituted methylene group; a substituted or unsubstituted ethylene group; a substituted or unsubstituted propylene group; a substituted or unsubstituted butylene group; a substituted or unsubstituted pentylene group; a substituted or unsubstituted cyclohexylene group; a substituted or unsubstituted phenylene group; a substituted or unsubstituted biphenylene-group; a substituted or unsubstituted naphthylene group; a substituted or unsubstituted anthracenylene group; a substituted or unsubstituted phenanthrenylene group; a substituted or unsubstituted pyrenylene group; a substituted or unsubstituted fluorenylene group; a substituted or unsubstituted spirobifluorenylene group; a substituted or unsubstituted pyridinylene group; a substituted or unsubstituted pyrimidinylene group; a substituted or unsubstituted pyrrolylene group; a substituted or unsubstituted furanylene group; a substituted or unsubstituted thiophenylene group; a substituted or unsubstituted oxazolylene group; a substituted or unsubstituted triazolylene group; a substituted or unsubstituted indolene group; a substituted or unsubstituted benzoxadiazolene group; a substituted or unsubstituted triazolene group; a substituted or unsubstituted dibenzofuranylene group; a substituted or unsubstituted carbazolylene group; a substituted or unsubstituted xanthenylene group; a substituted or unsubstituted dihydroanthracenylene group; a substituted or unsubstituted dihydroacridinylene group; or a substituted or unsubstituted phenoxathinylene group, and $R_{101}$ to $R_{103}$ are the same or different, and are each independently hydrogen; deuterium; a methyl group; or a phenyl group.

4. The compound of claim 1, wherein X1 and X2 are the same or different from each other, and are each independently fluorine; chlorine; a cyano group; a phenoxy group substituted with a nitro group; a phenyl group; or —C(=O)OR$_{107}$, and $R_{107}$ is a trifluoromethyl group.

5. The compound of claim 1, wherein R1 is hydrogen; deuterium; fluorine; a carboxyl group; a hydroxyl group; a cyano group; a phenoxy group; a butylamine group; a diphenylamine group; a phenyl group unsubstituted or substituted with a fluoro group, a phenethyl group, a carboxyl group, a carbazole group, a butyl group or a trifluoromethyl group; a naphthyl group; an anthracenyl group; a pyrenyl group; a carbazole group unsubstituted or substituted with a butyl group; a trifluoromethyl group; a tetraphenylmethyl group; a tetraphenylsilyl group; a triphenylsilyl group; a dimethylfluorenyl group; a spirobifluorenyl group; an ethoxy group substituted with a carbazole group; an indole group unsubstituted or substituted with a carboxyl group; a triazaindene group; a triazole group substituted with a phenyl group; a dimethyldihydroacridine group; a dimethylxanthene group; a tetramethyldihydroanthracene group; or —C(=O)OR$_{106}$, and $R_{106}$ is a butyl group.

6. The compound of claim 1, wherein the compound of Formula 1 is represented by one of the following structural formulae 1 to 114:

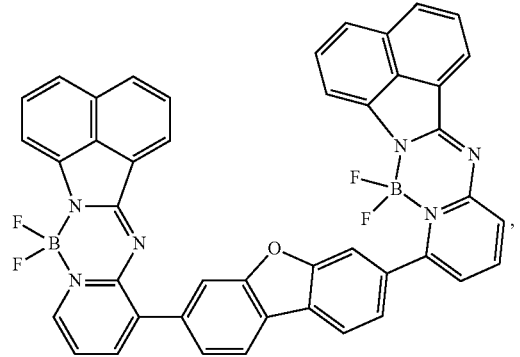

1

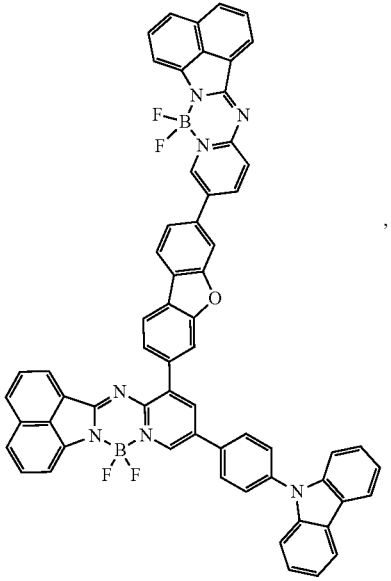

2

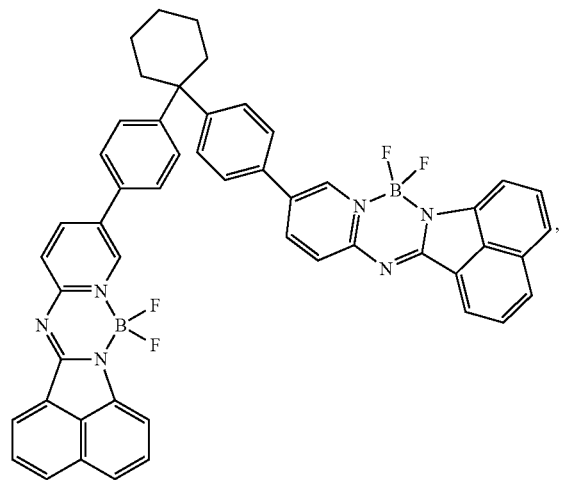

3

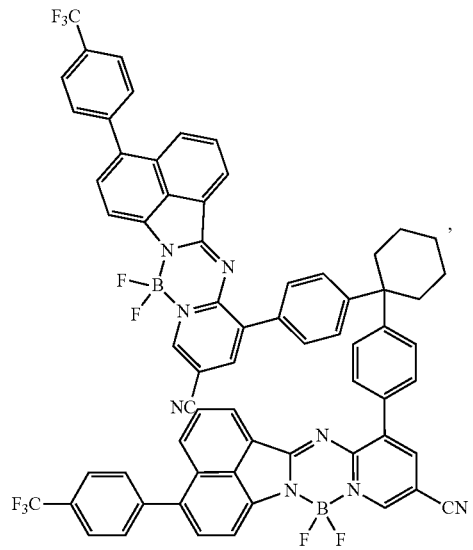

4

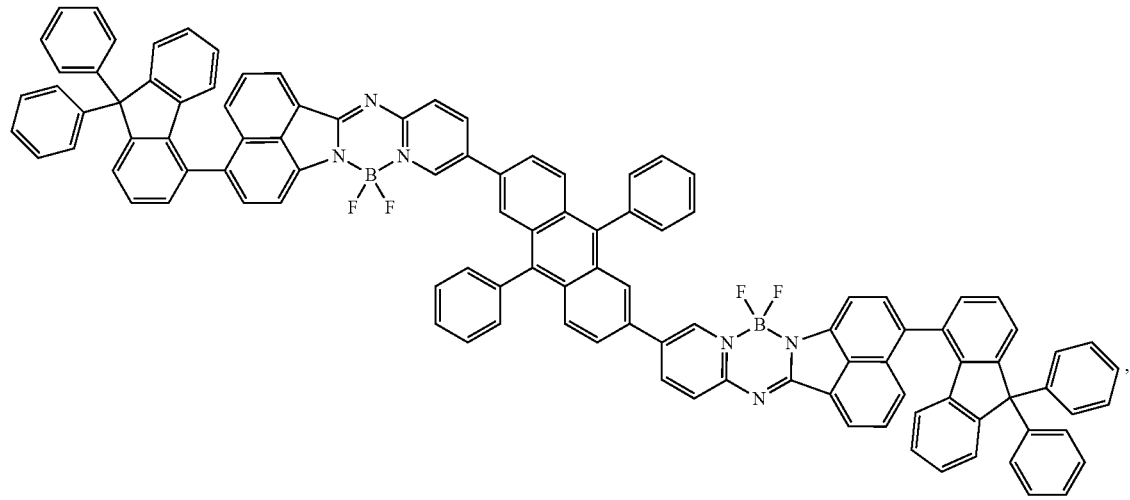
5
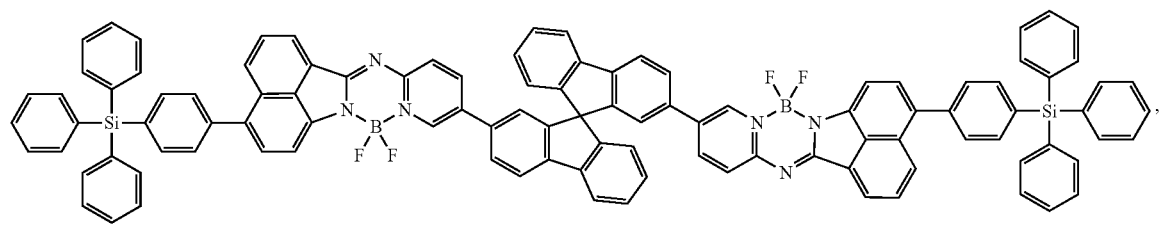
6
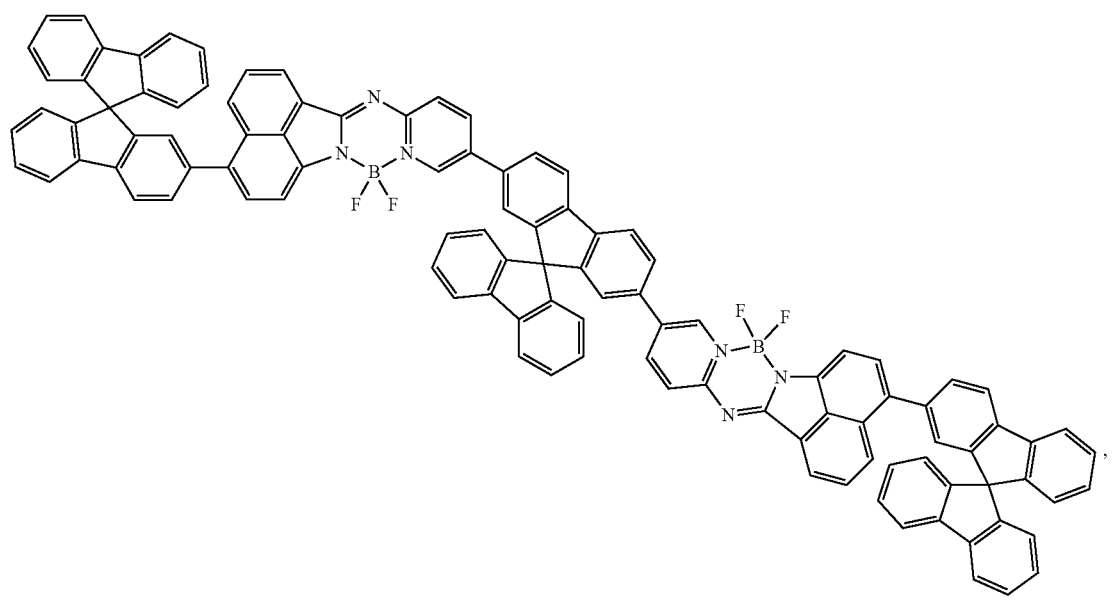
7

-continued
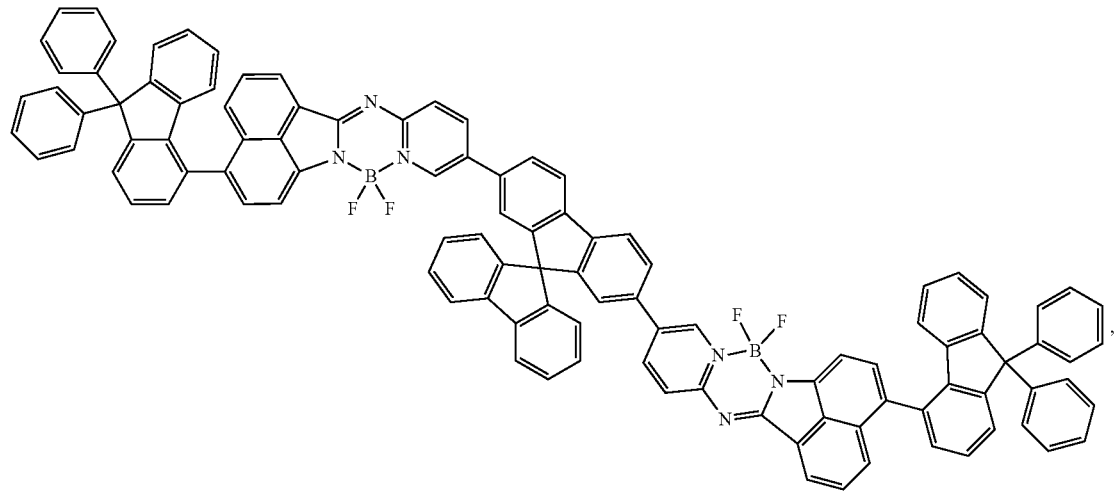
8
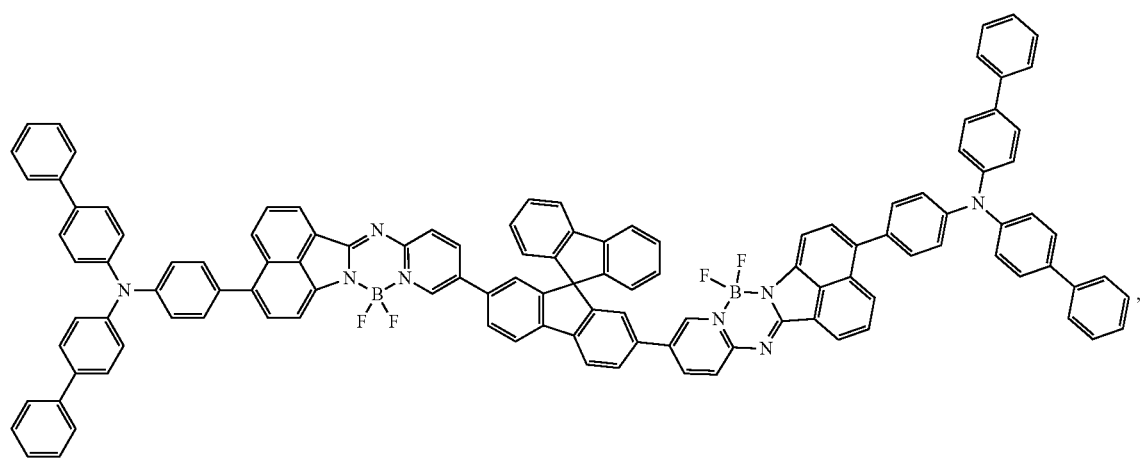
9
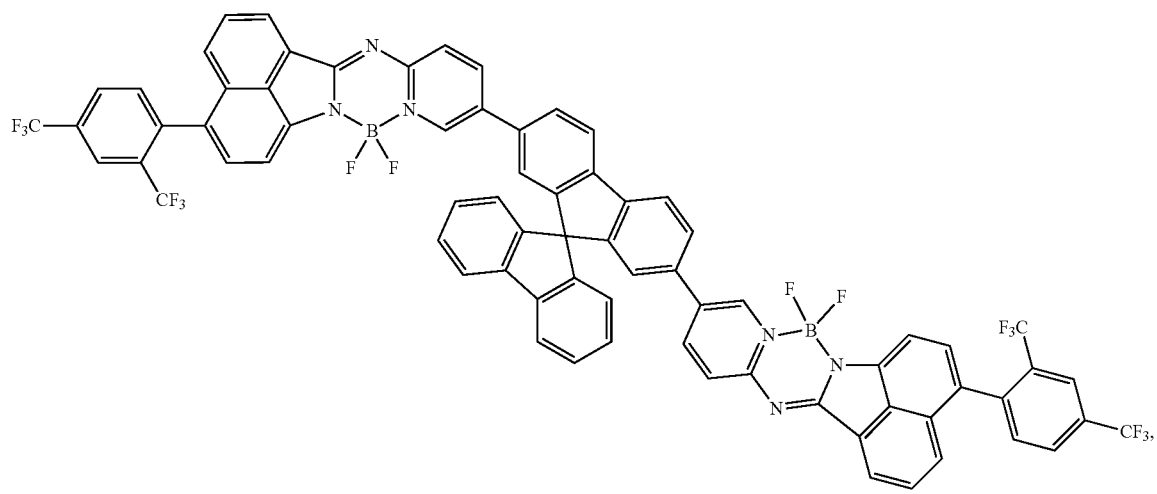
10

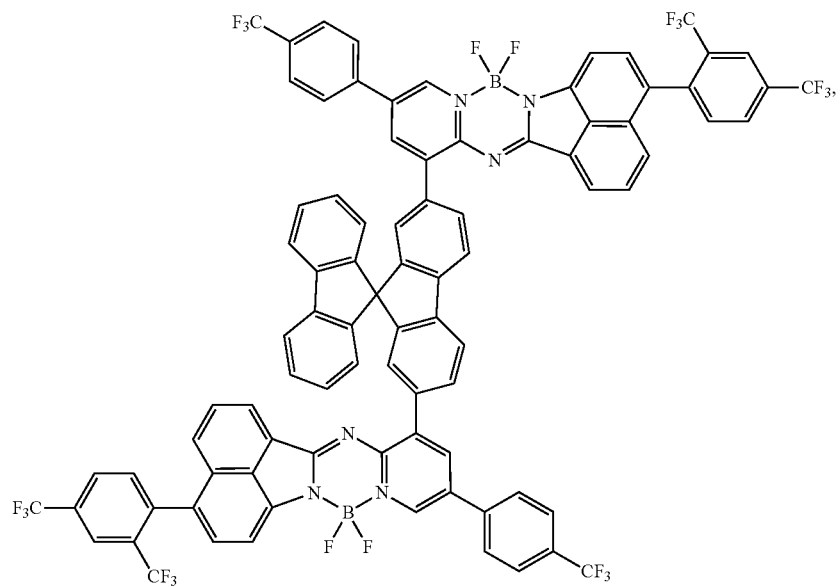
11
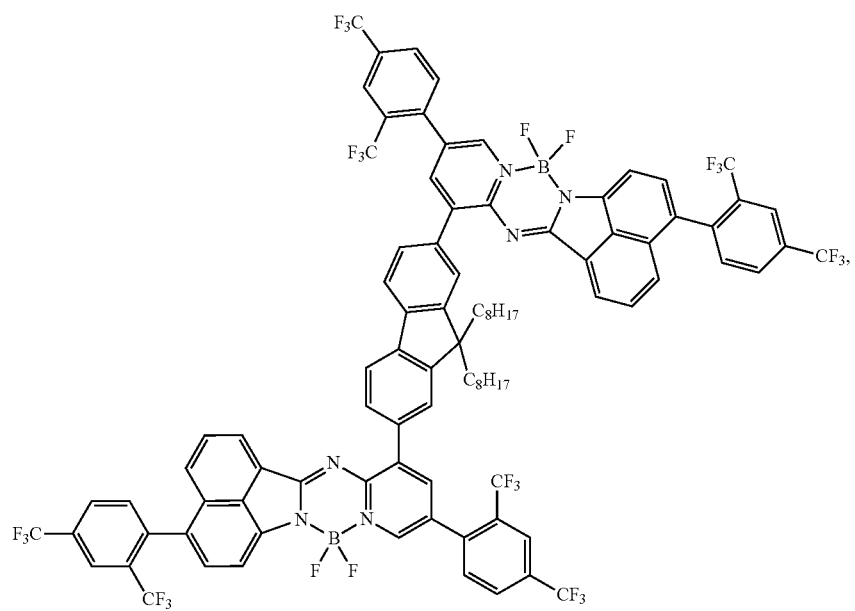
12
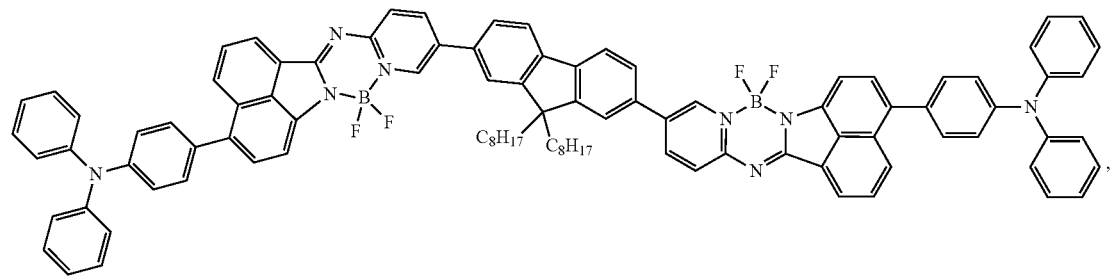
13

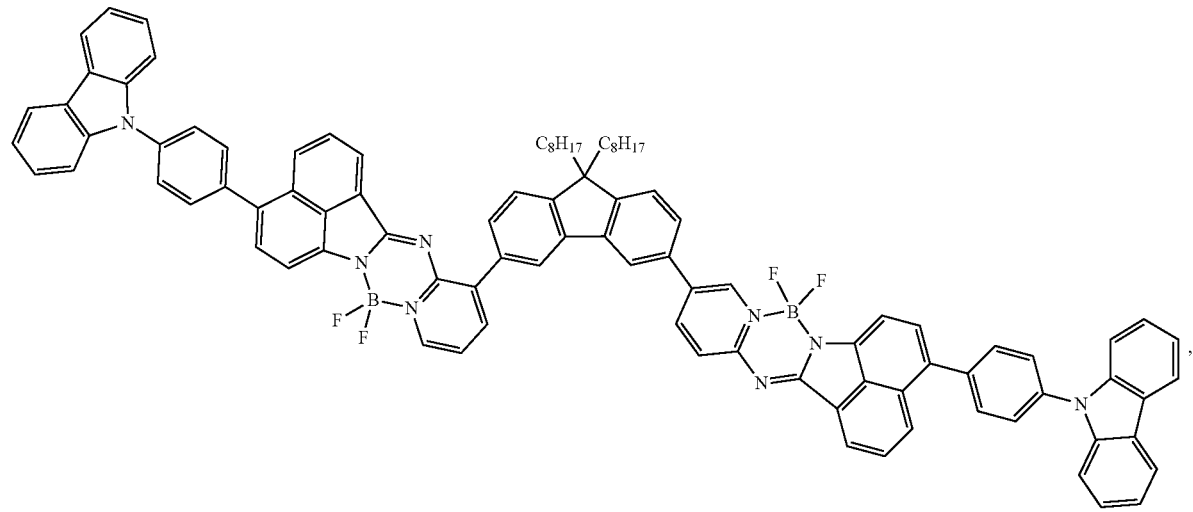
14
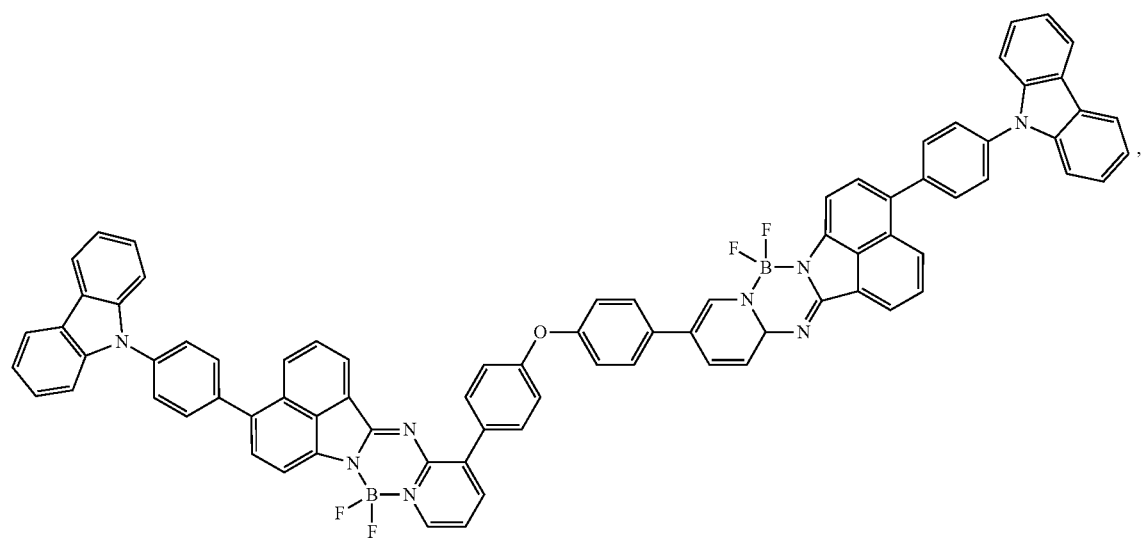
15
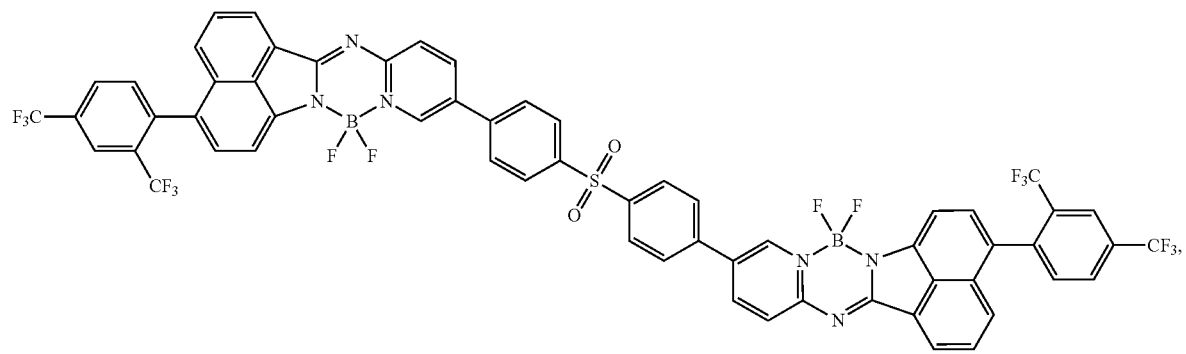
16

-continued
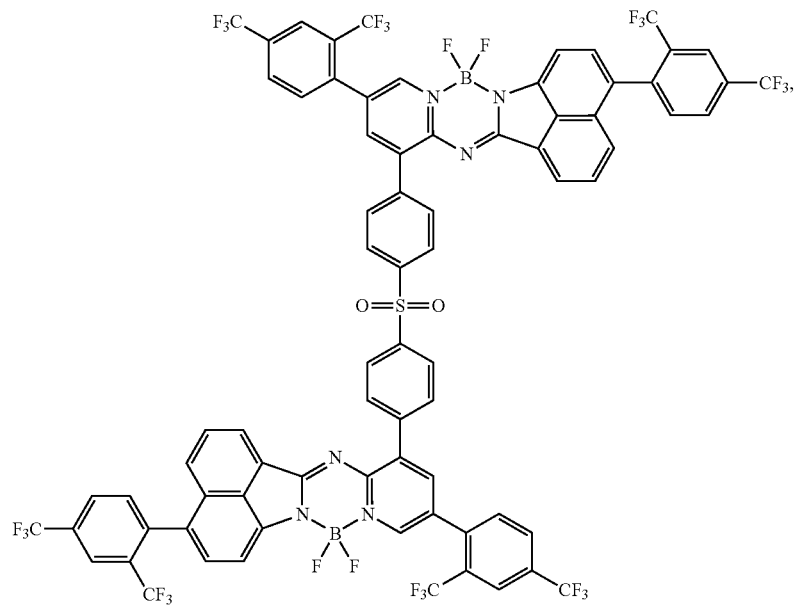
17
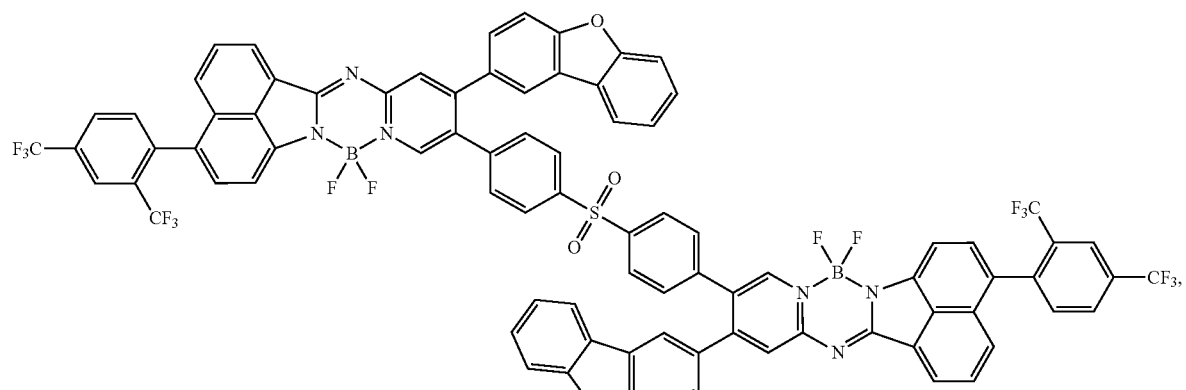
18
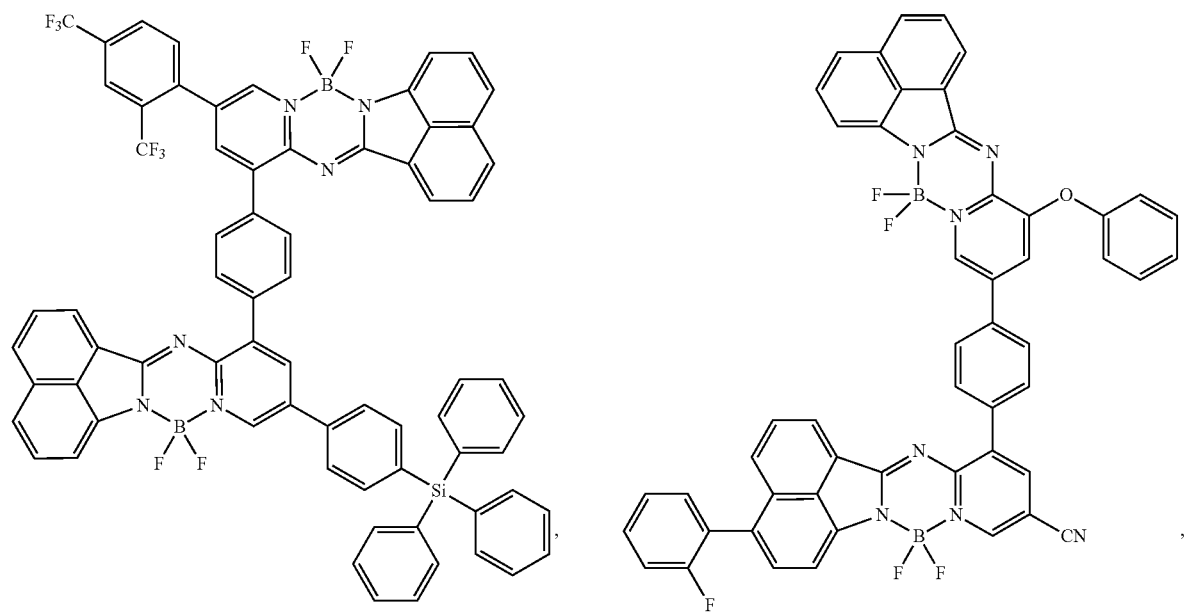

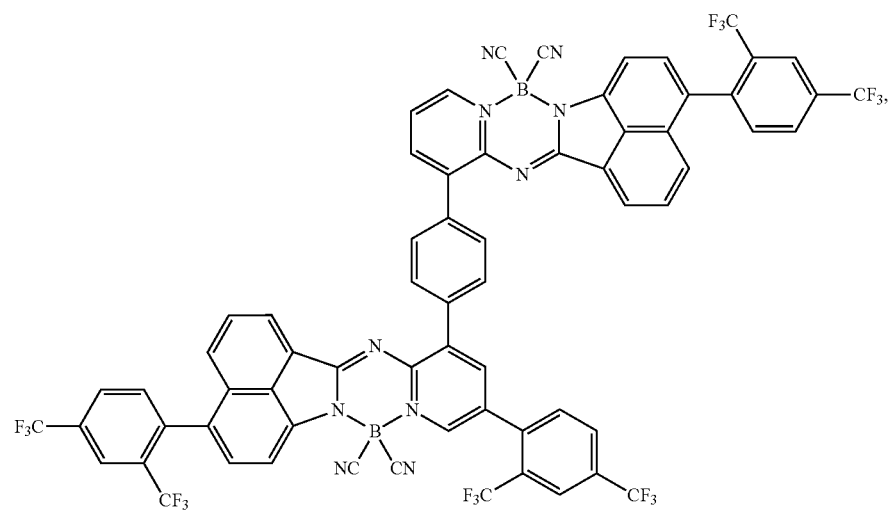
21
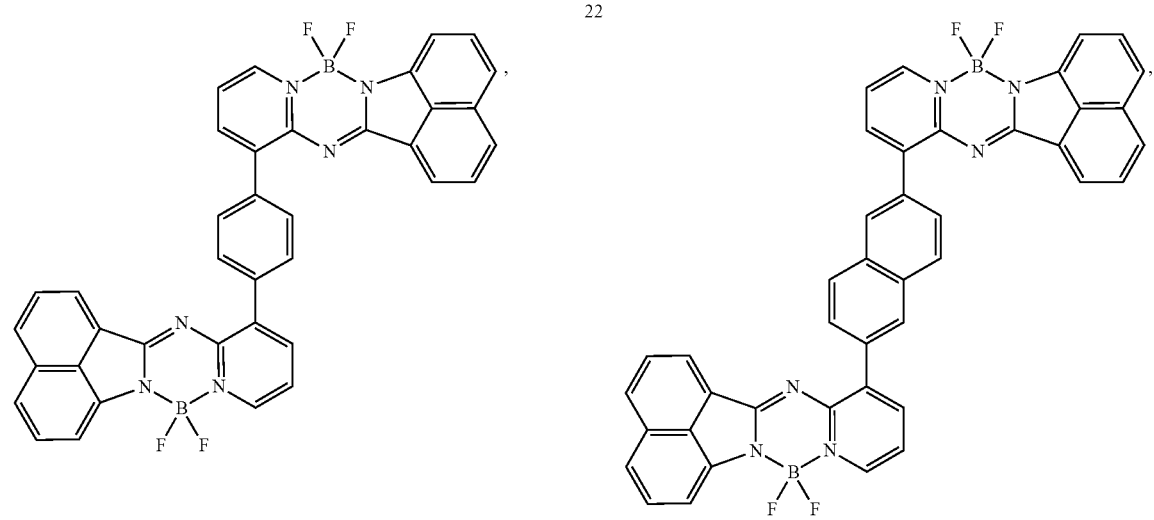
22
23
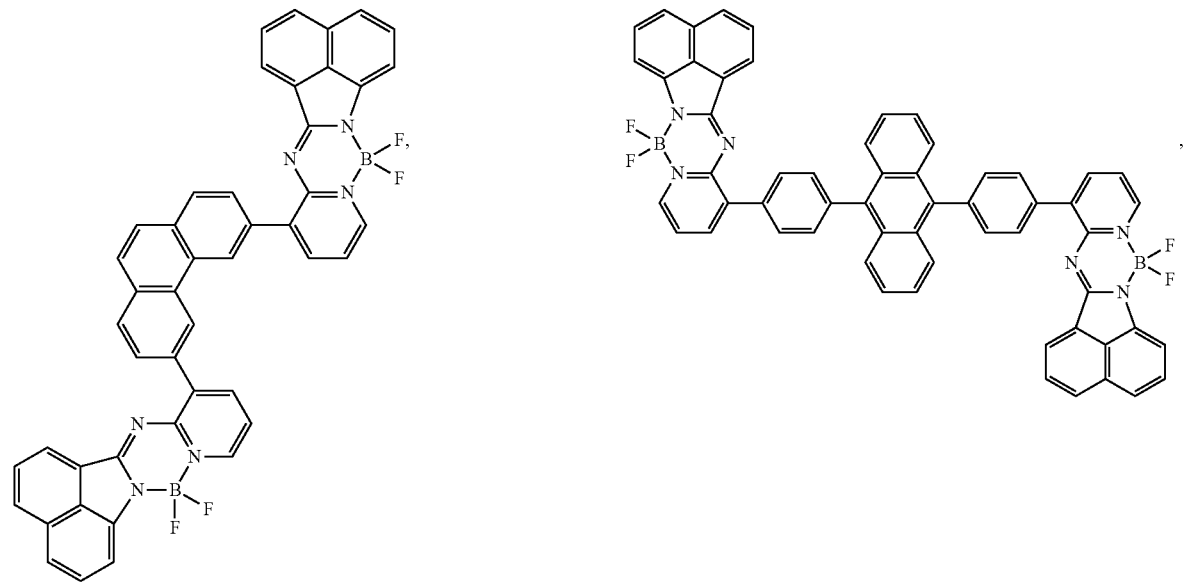
24
25

-continued
26
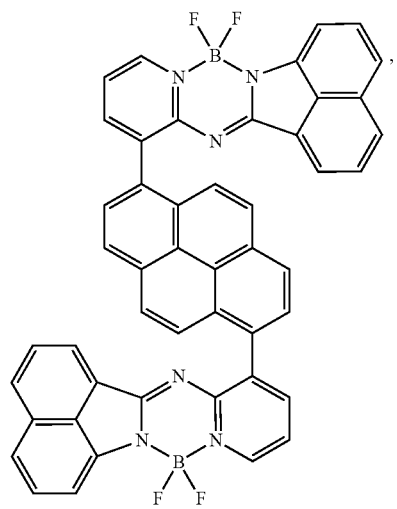
27
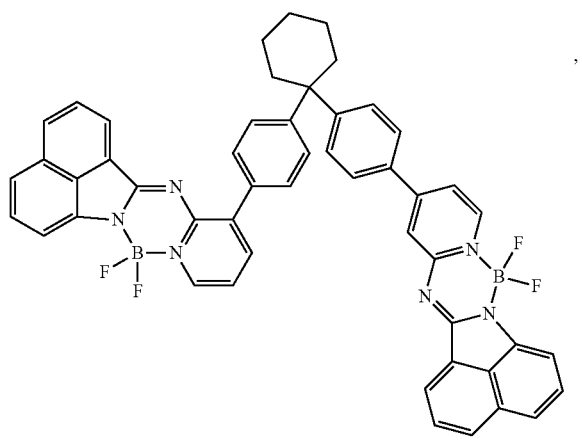
28
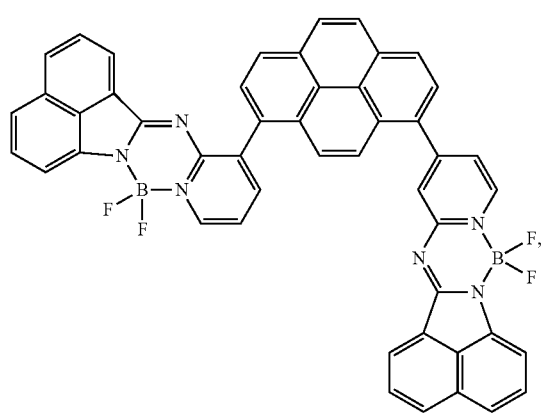
29
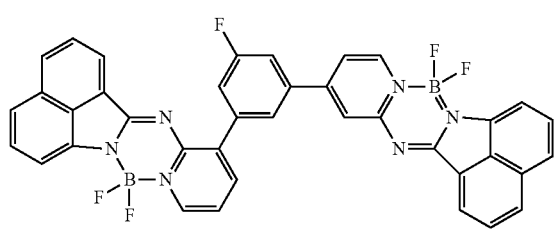
30
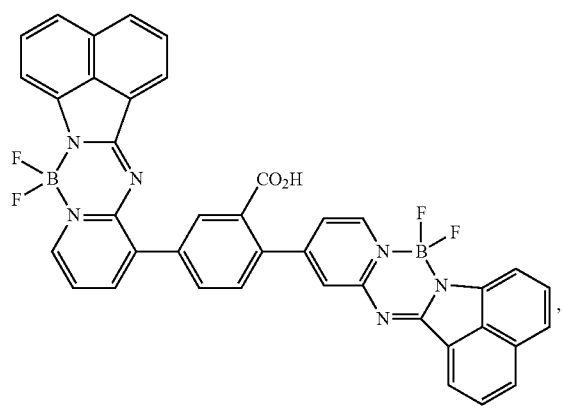
31
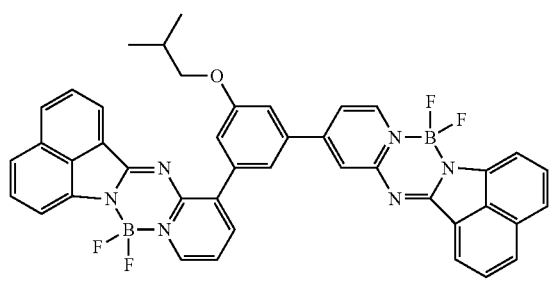

-continued
32
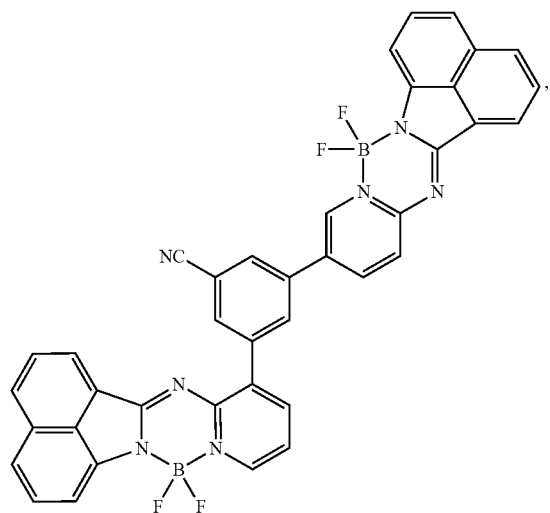
33
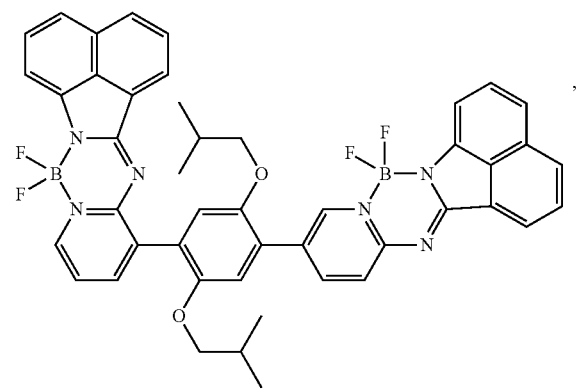
34
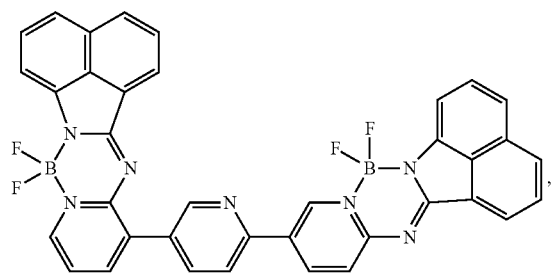
35
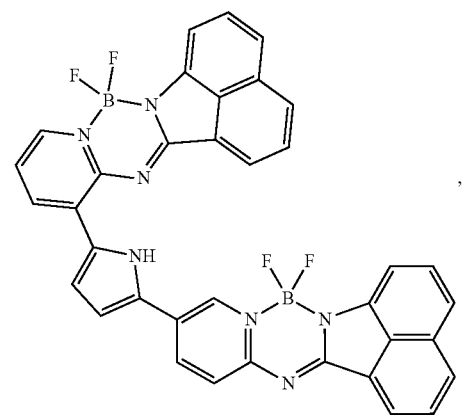
36
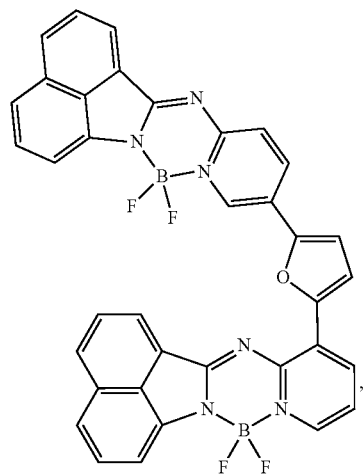
37
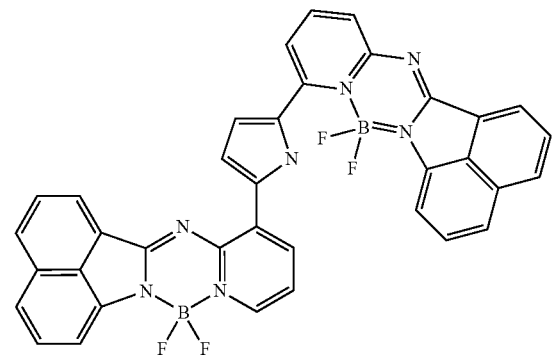

173                                                                                          174
-continued
38
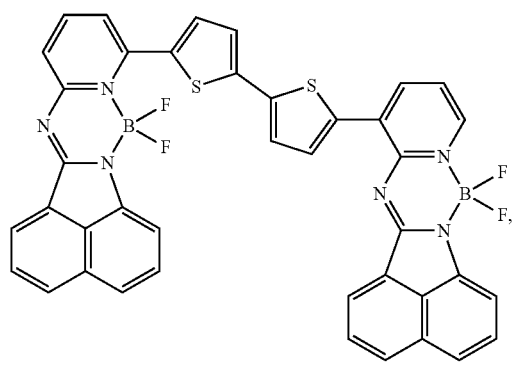
39
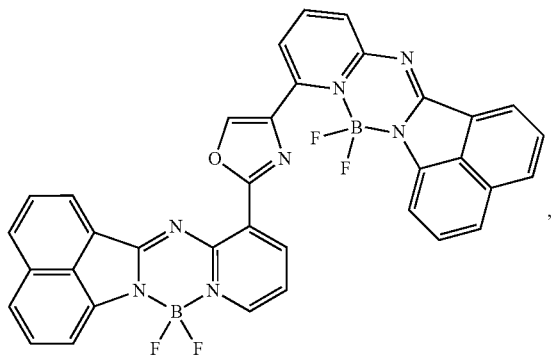
40
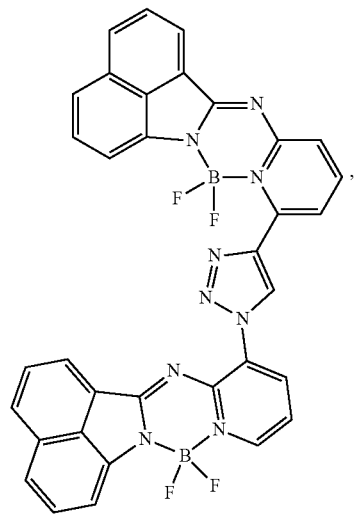
41
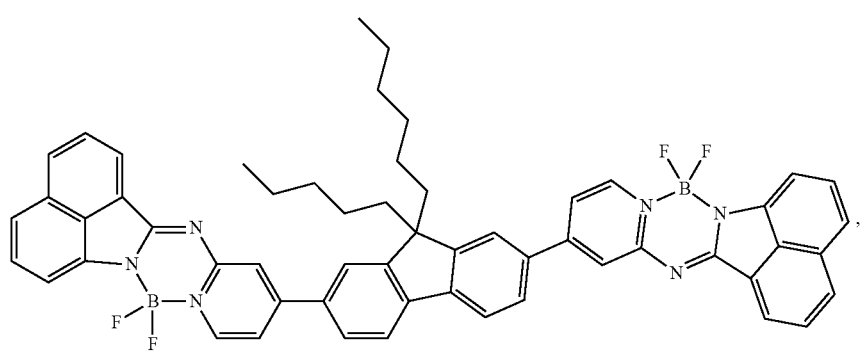
42
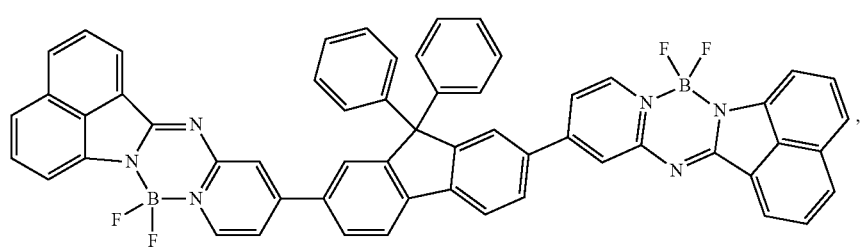

43
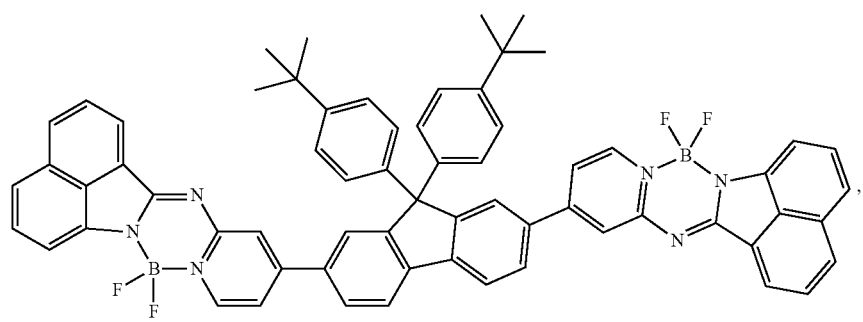
44
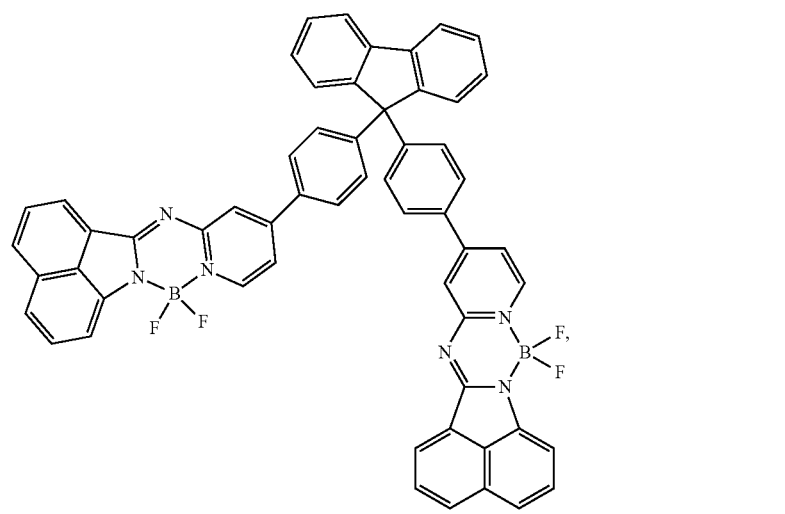
45
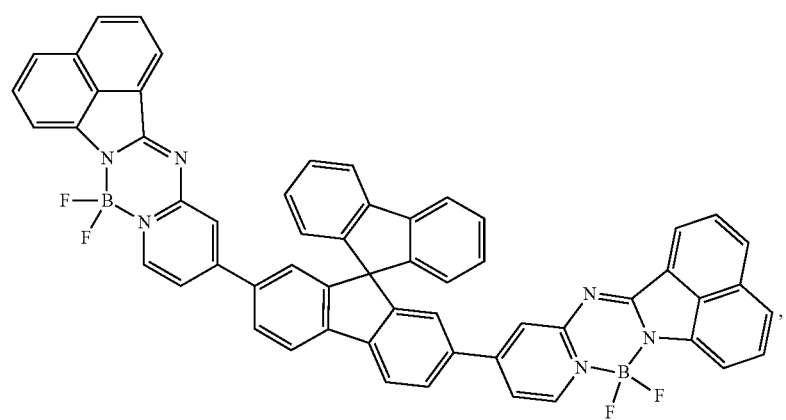
46
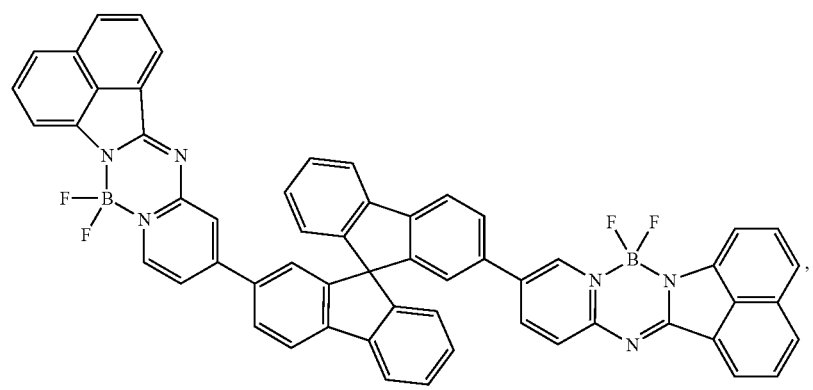

-continued
47
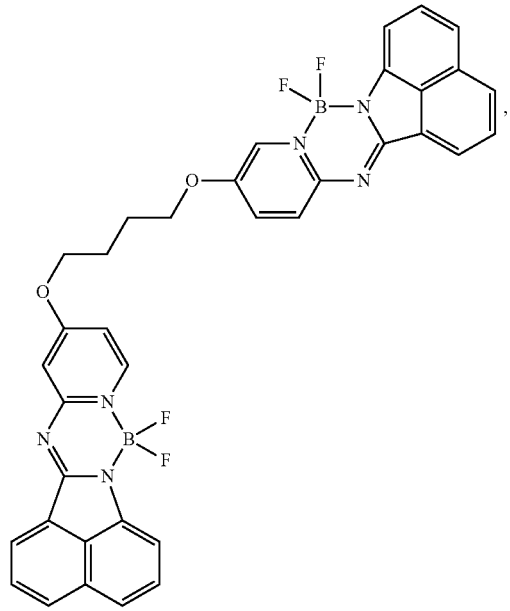
48
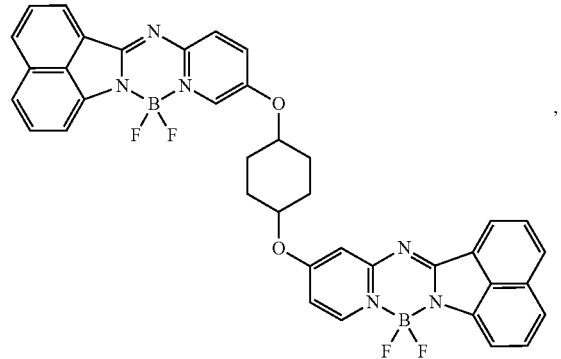
49
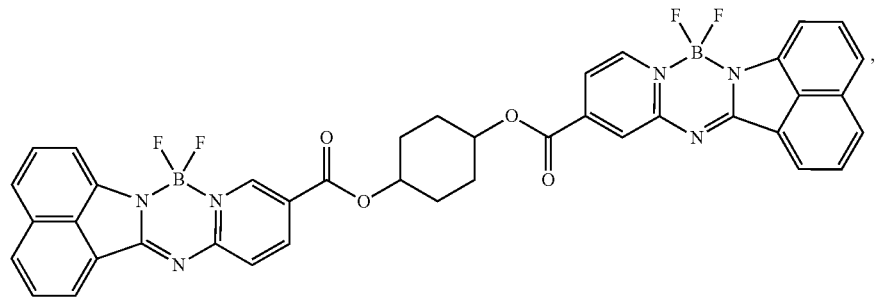
50
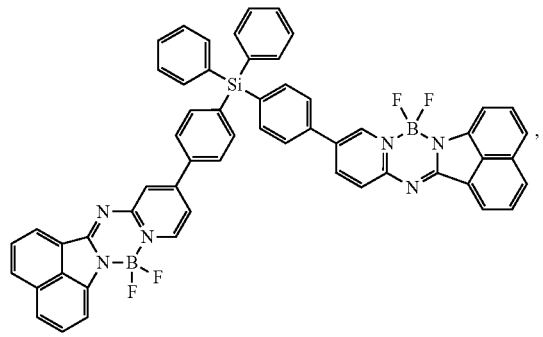
51
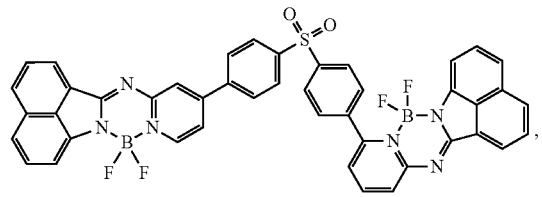
52
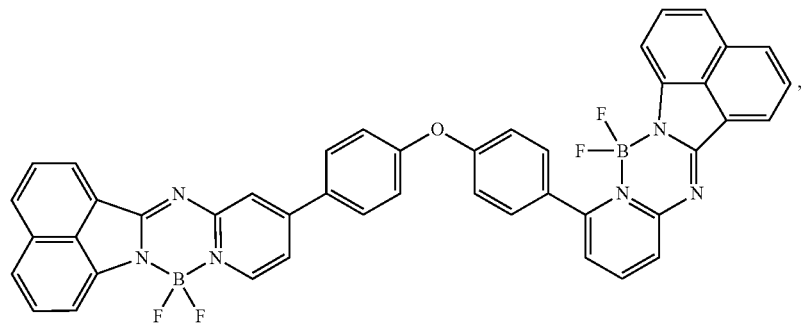

-continued
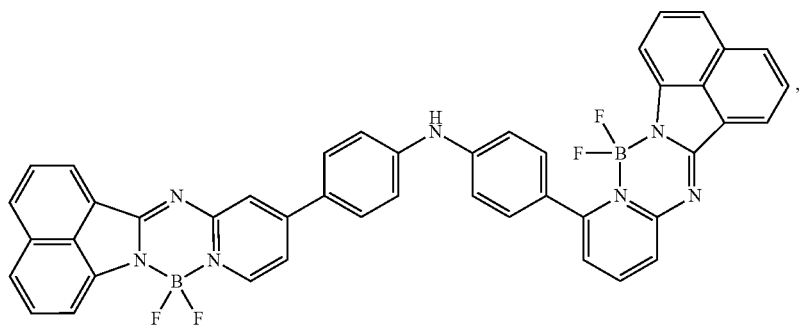
53
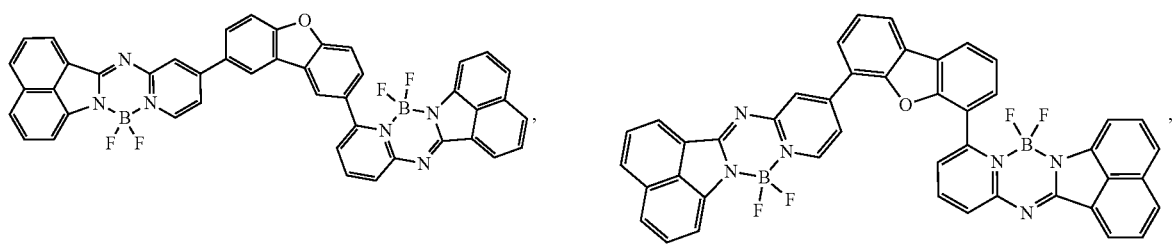
54
55
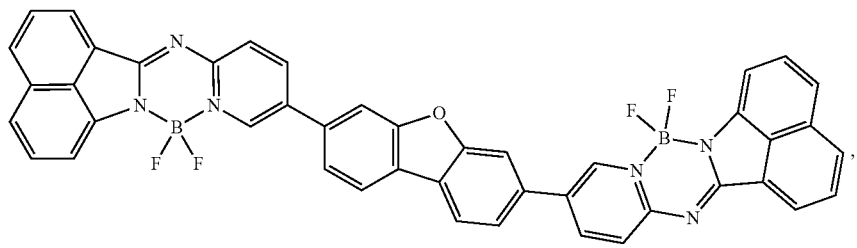
56
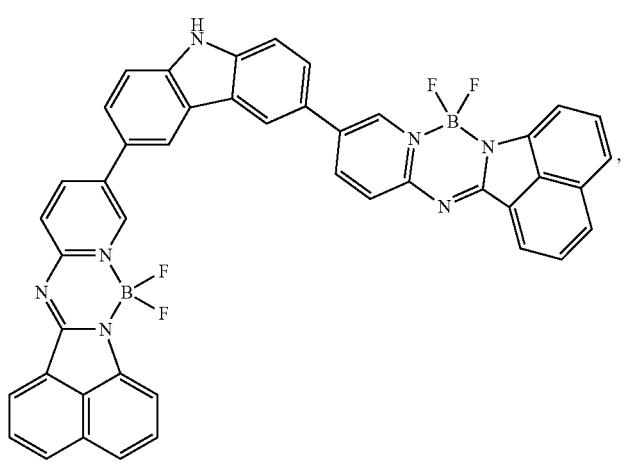
57

58
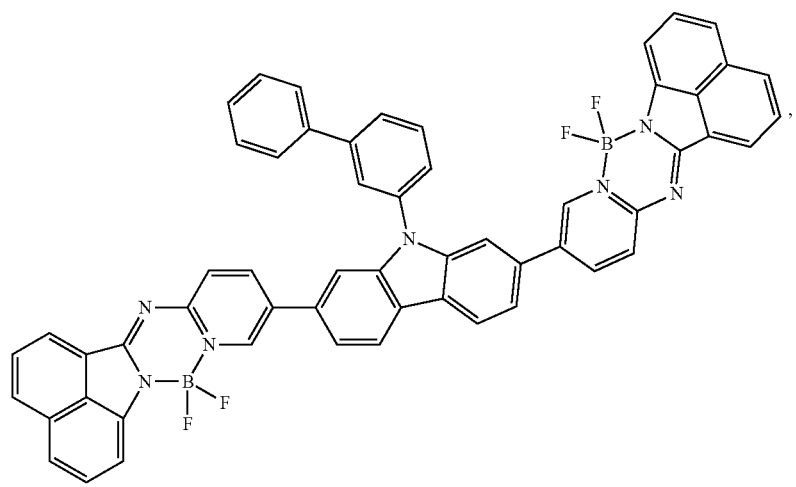
59
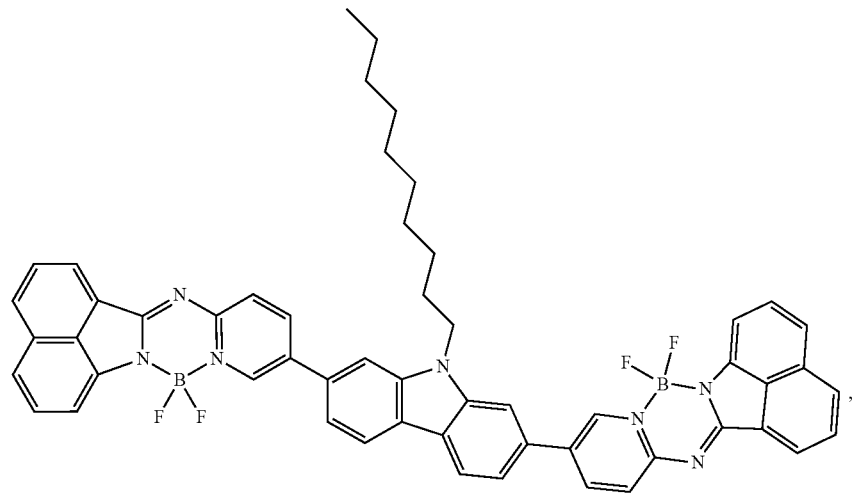
60
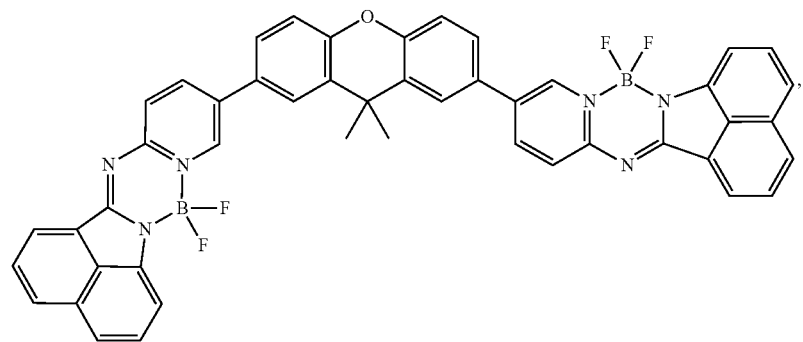

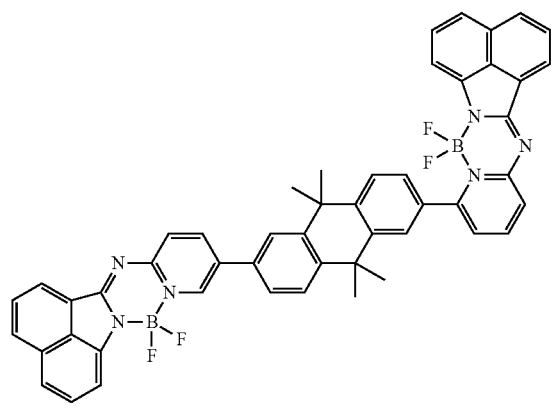
61
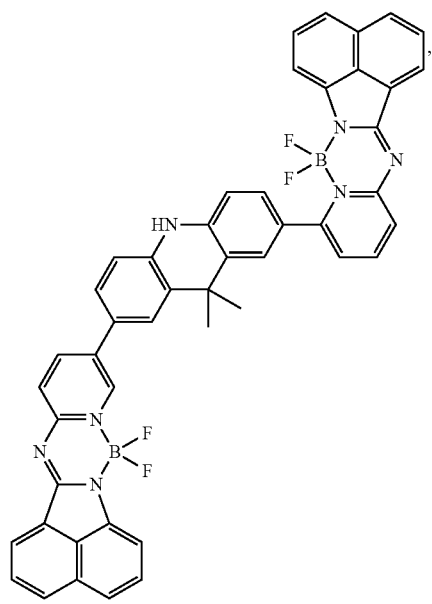
62
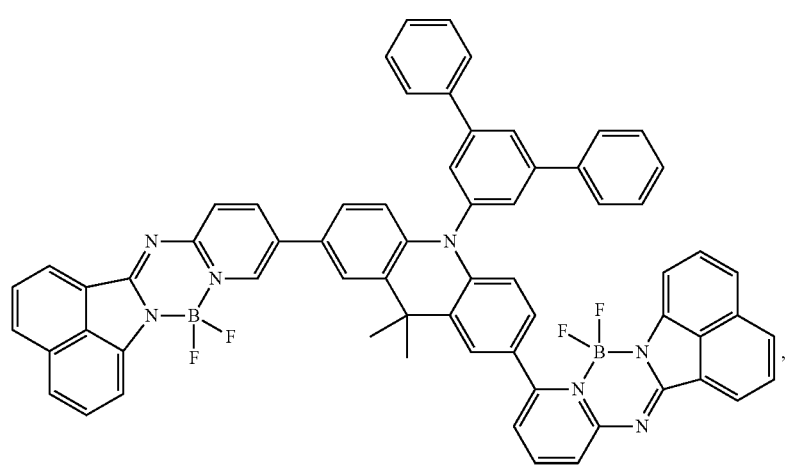
63
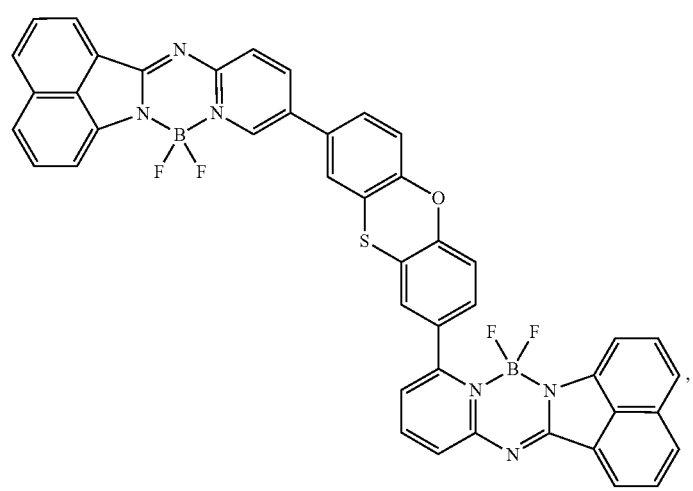
64

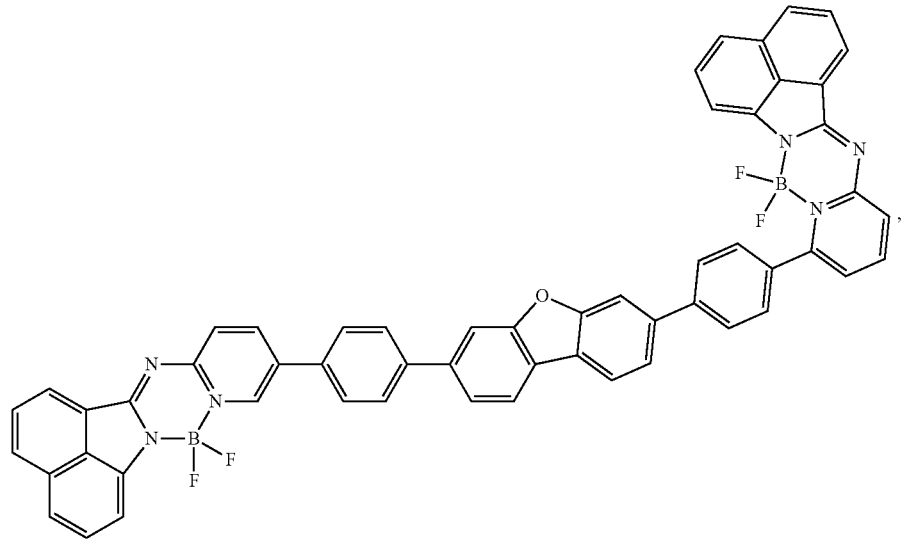
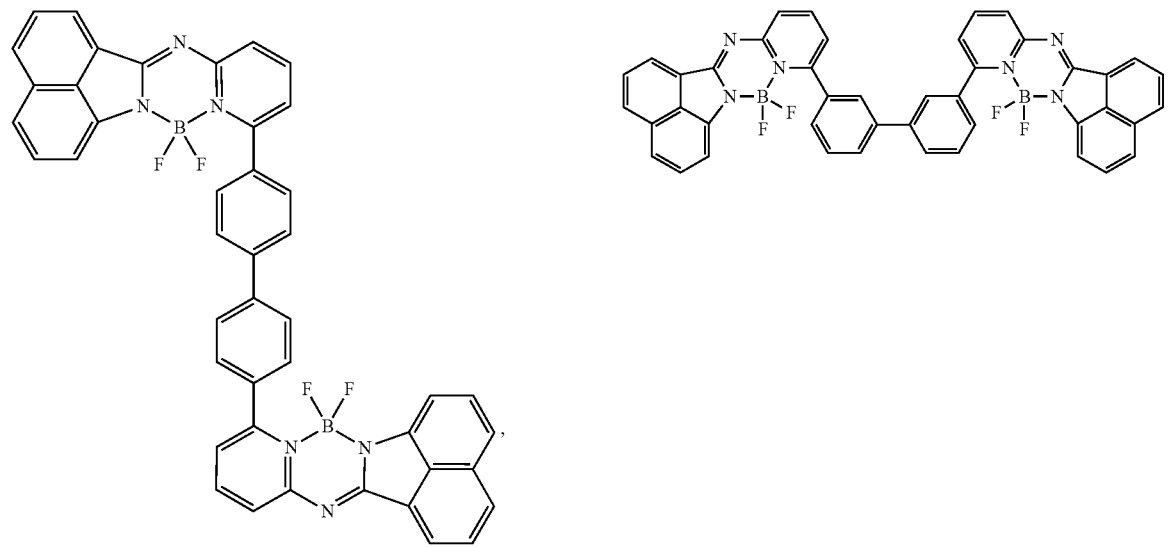
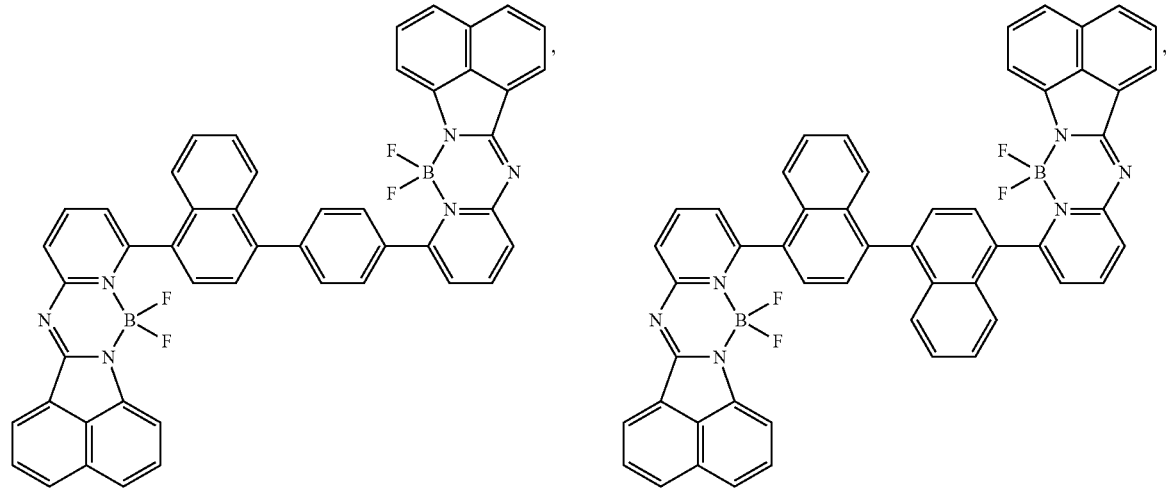

187                                   188
-continued
70
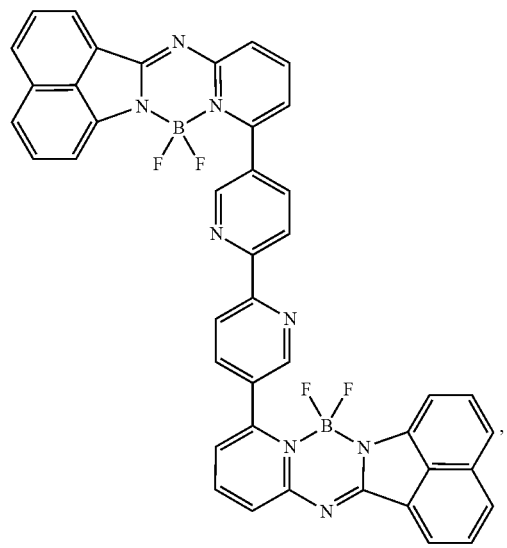
71
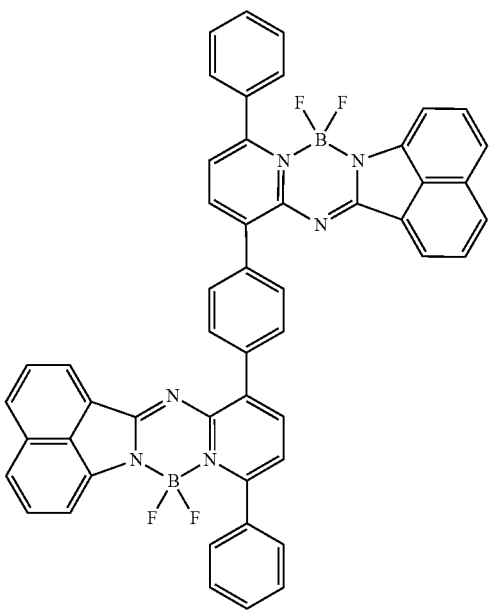
72
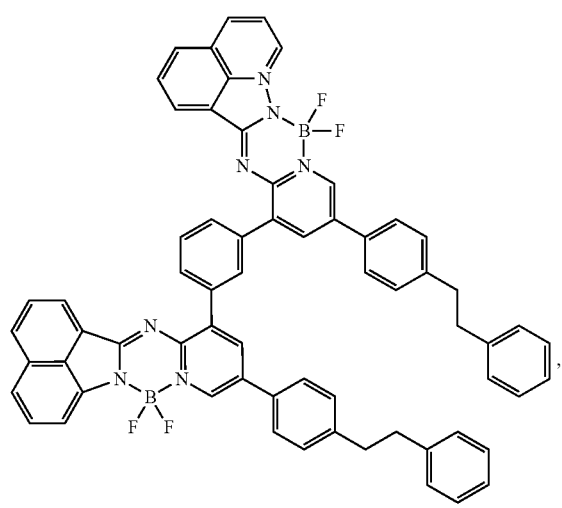
73
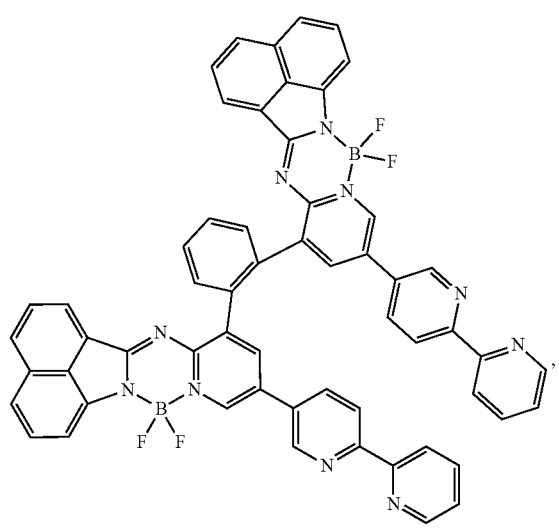
74
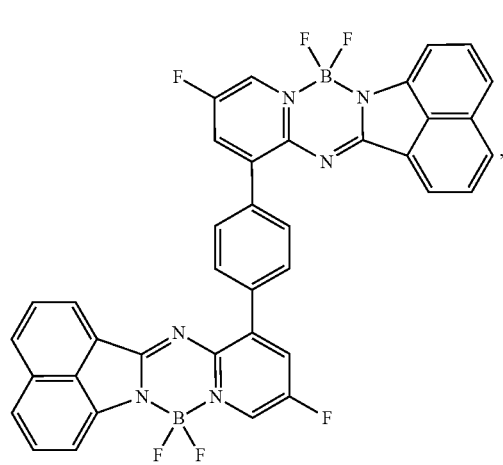
75
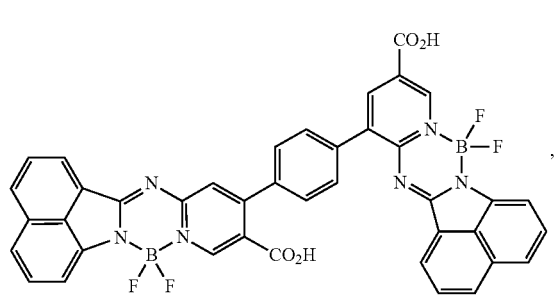

76
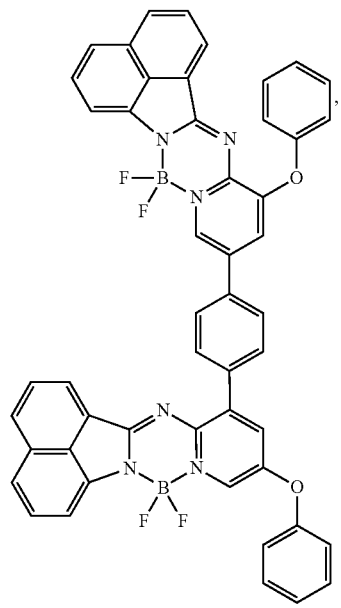
77
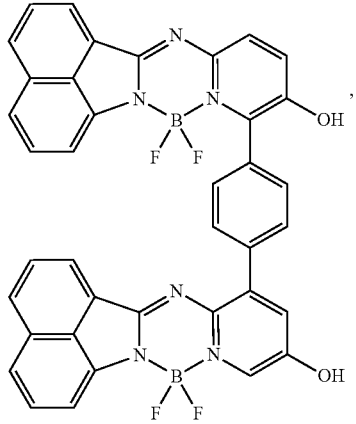
78
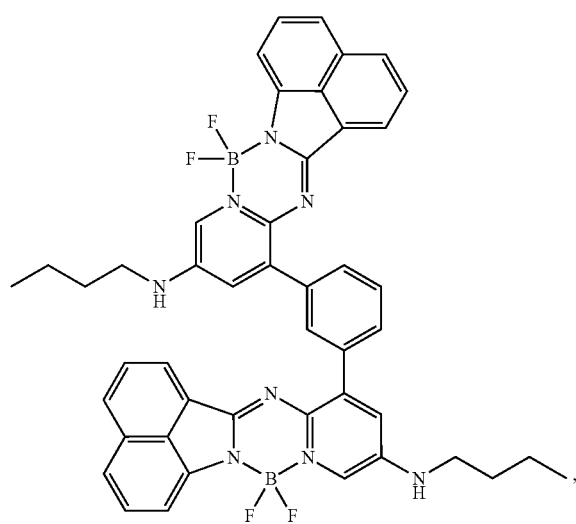
79
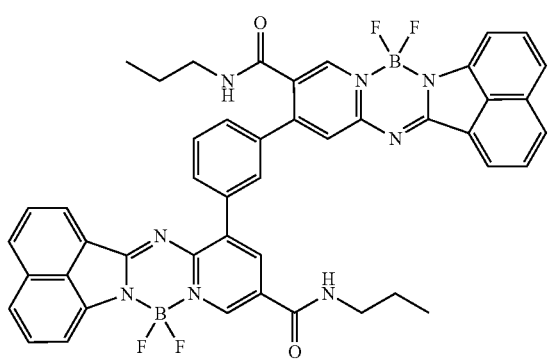

-continued
80
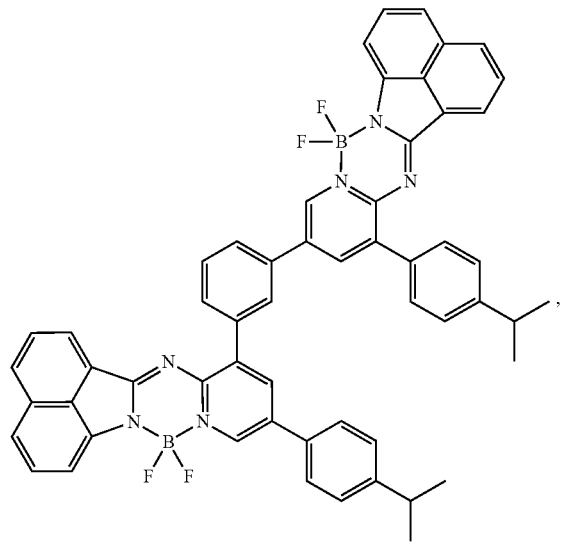
81
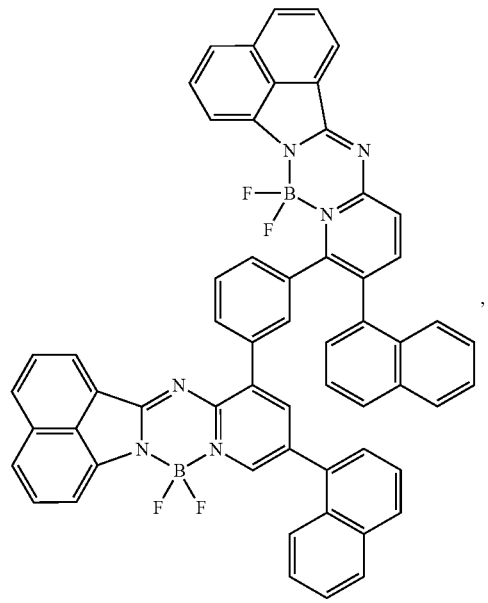
82
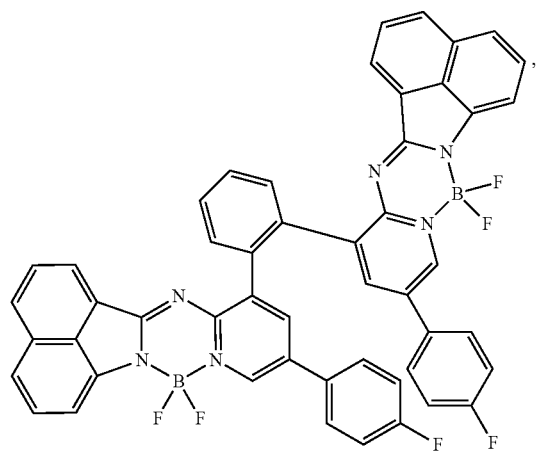
83
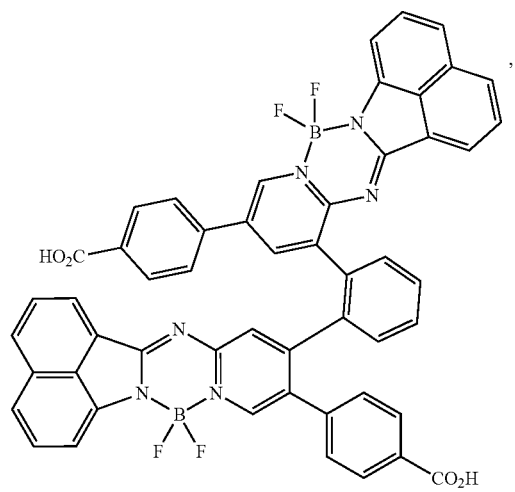
84
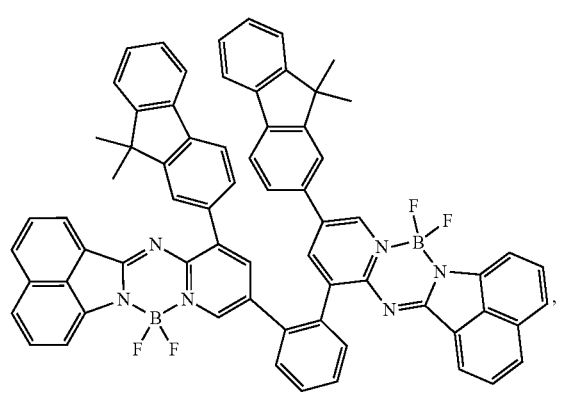
85
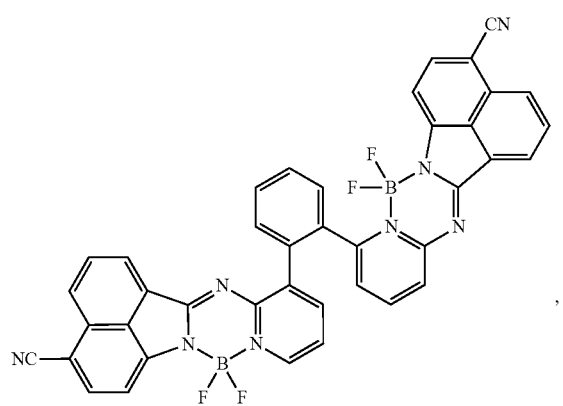

86
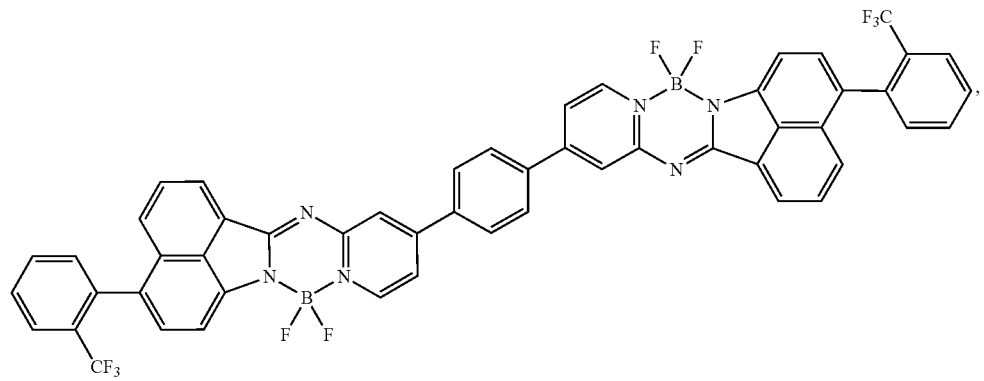
87
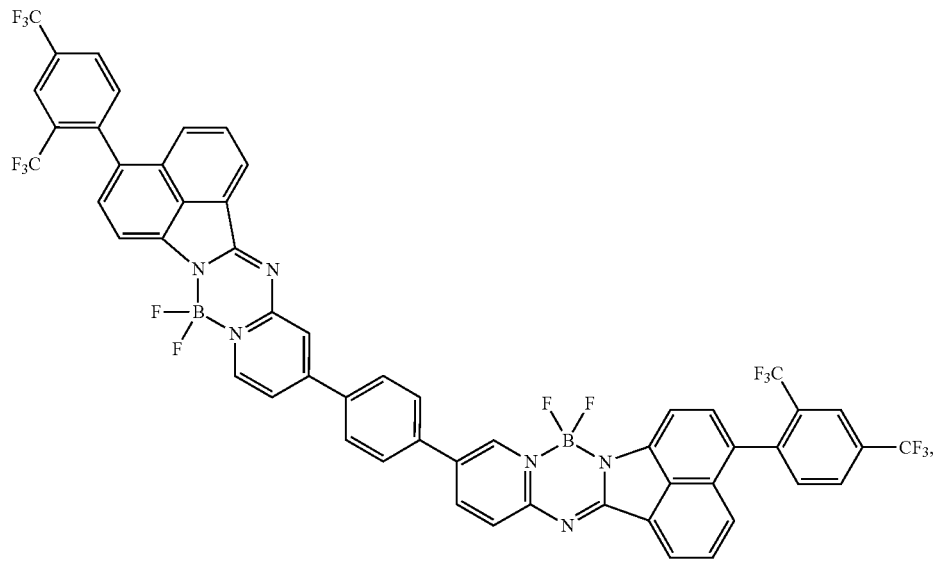
88
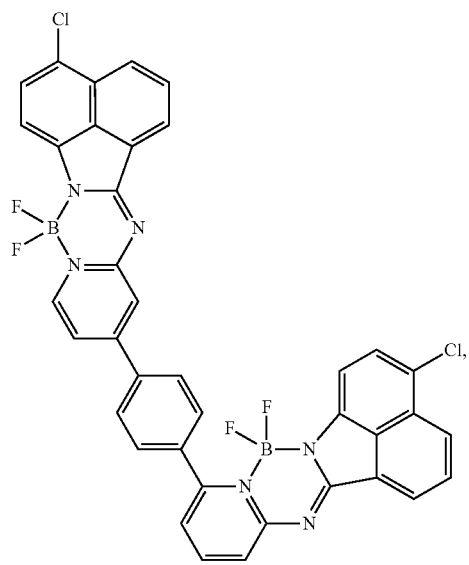

89
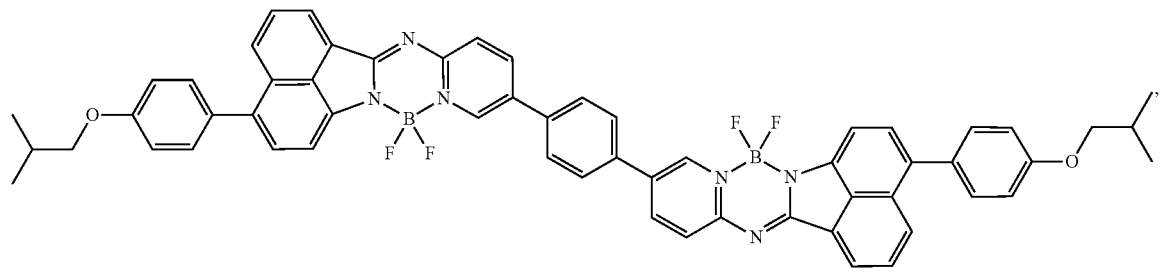
90
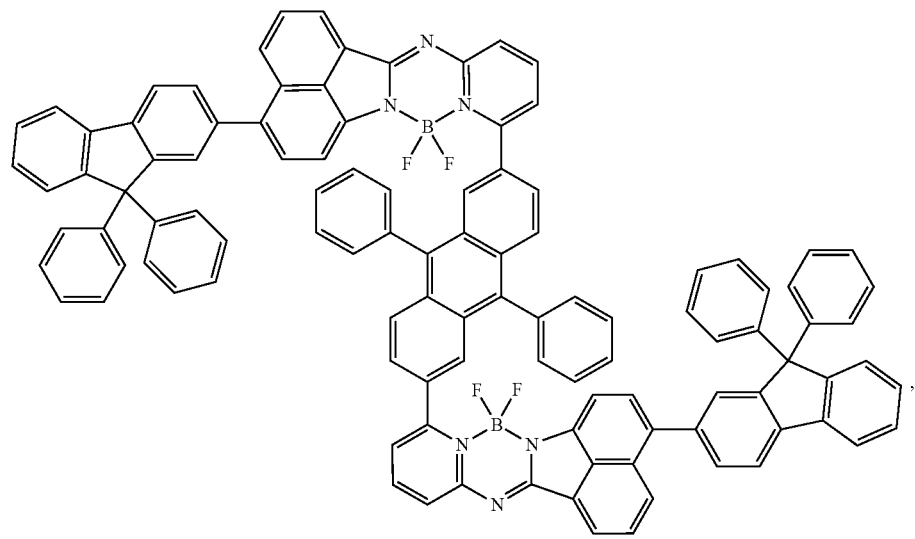
91
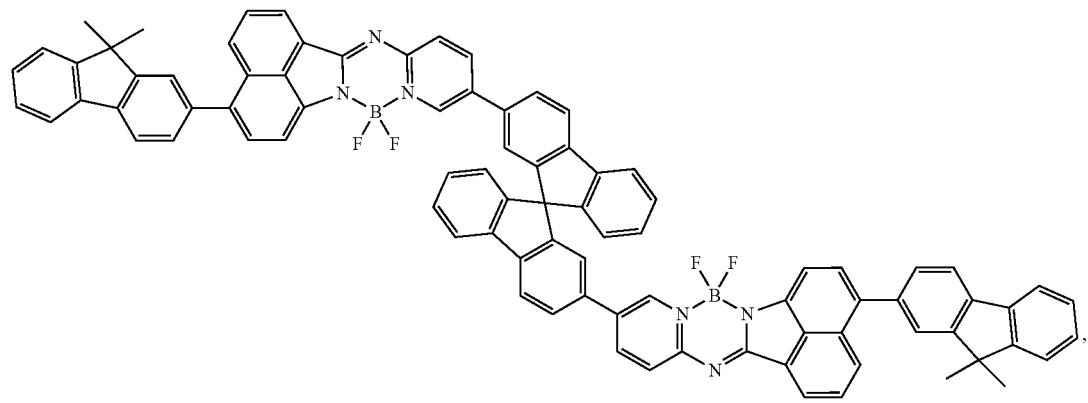

-continued
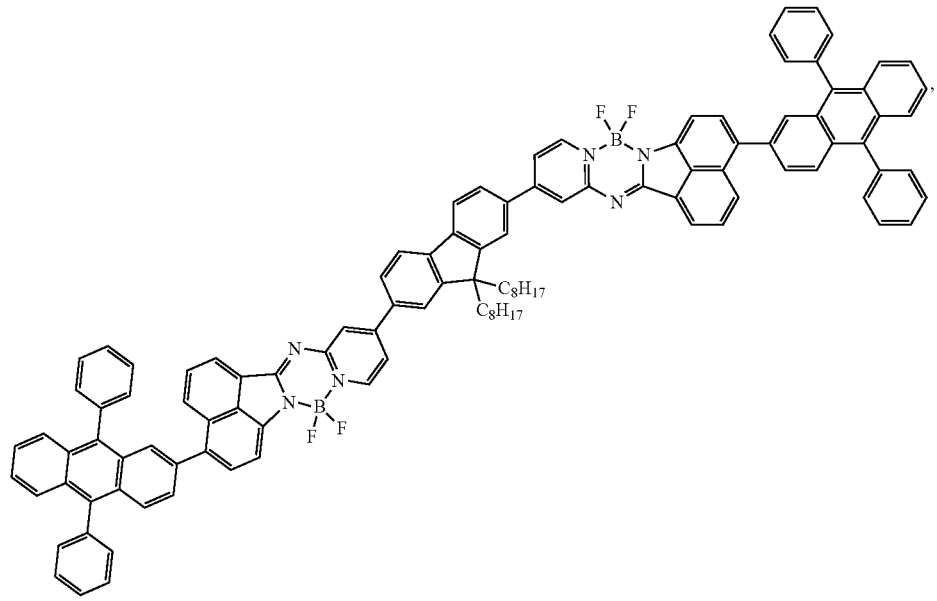
92
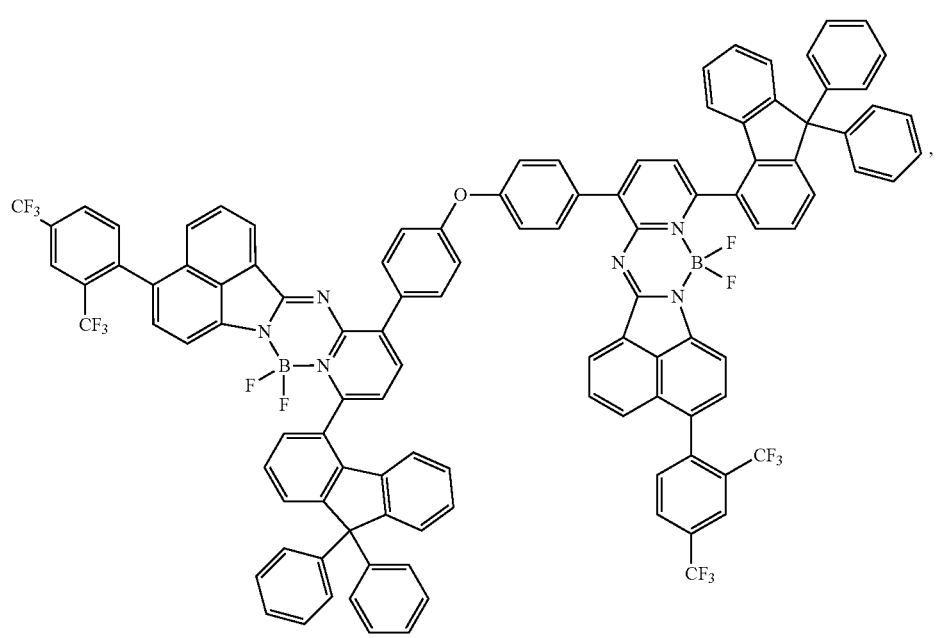
93

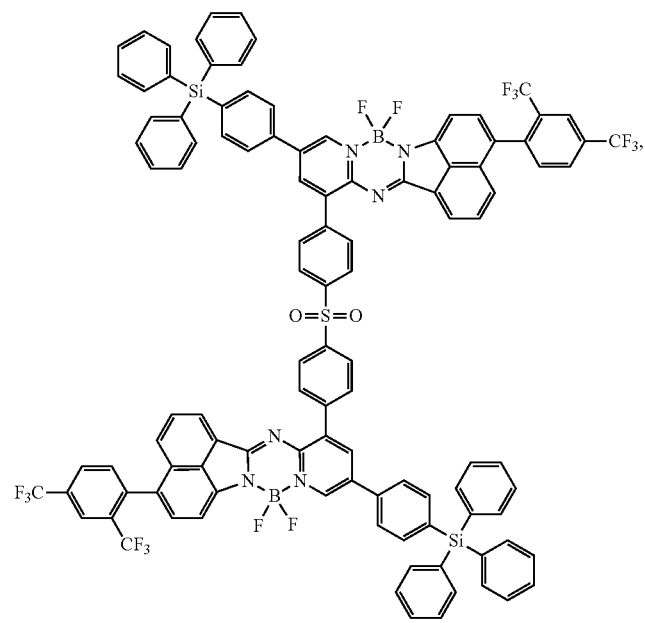
94
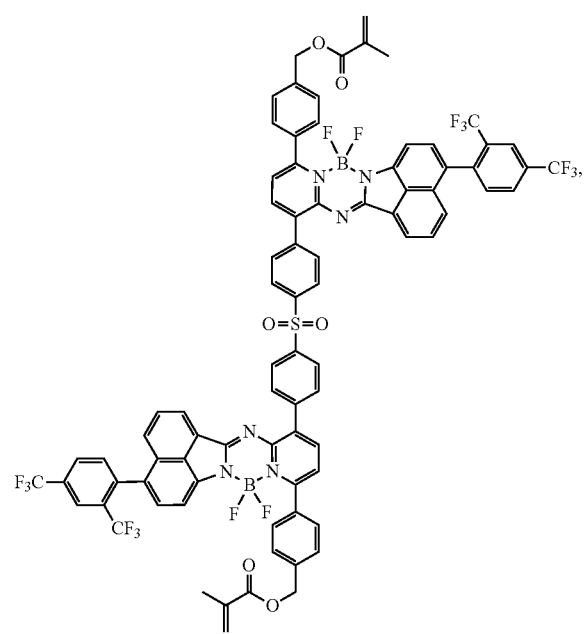
95

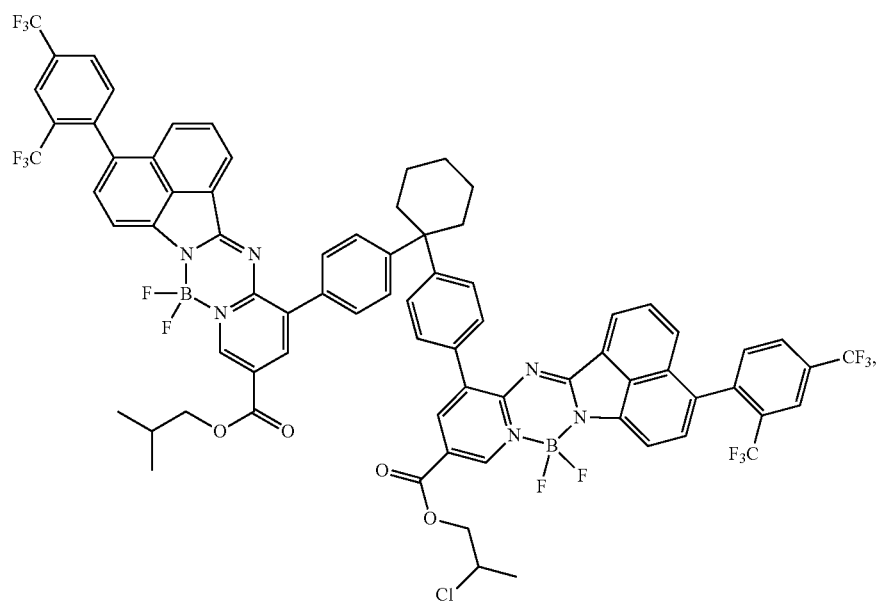
96
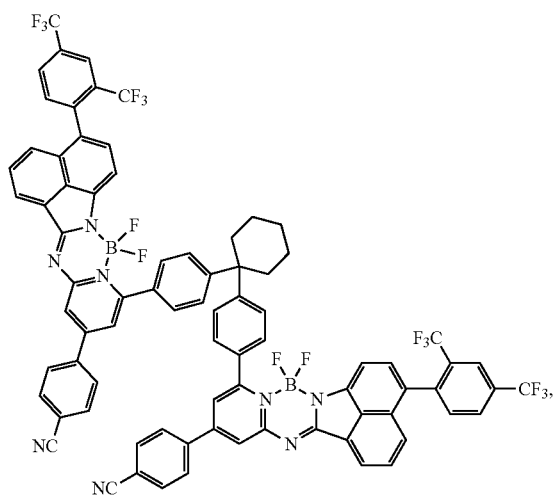
97
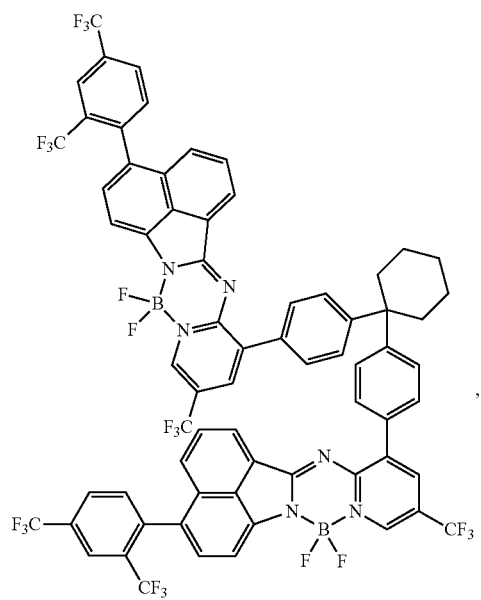
98

-continued
99
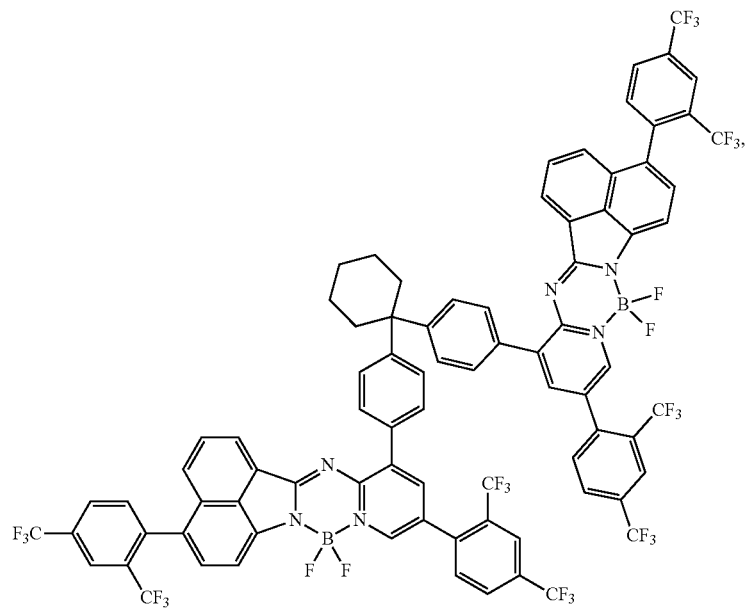
100
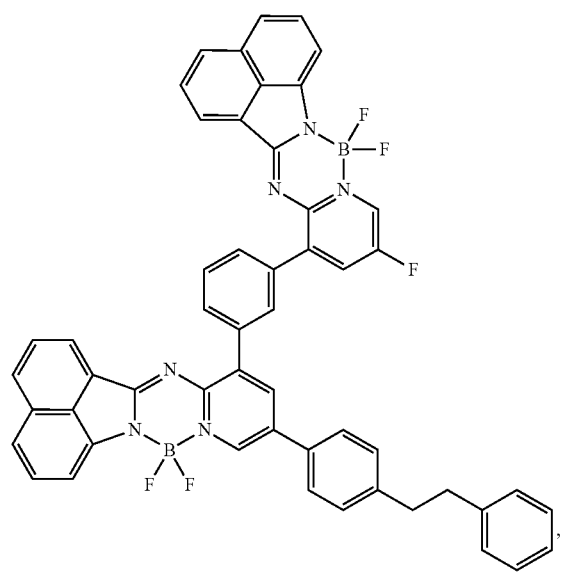
101
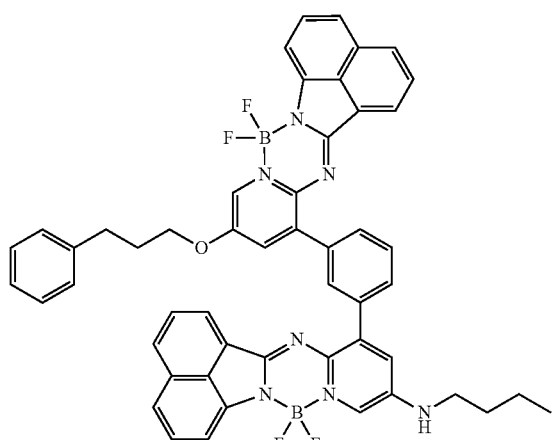

-continued
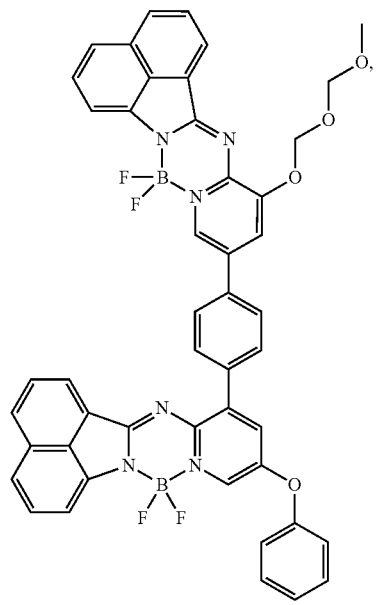
102
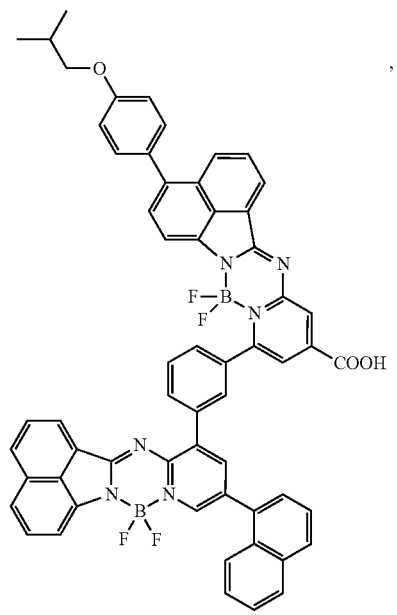
103
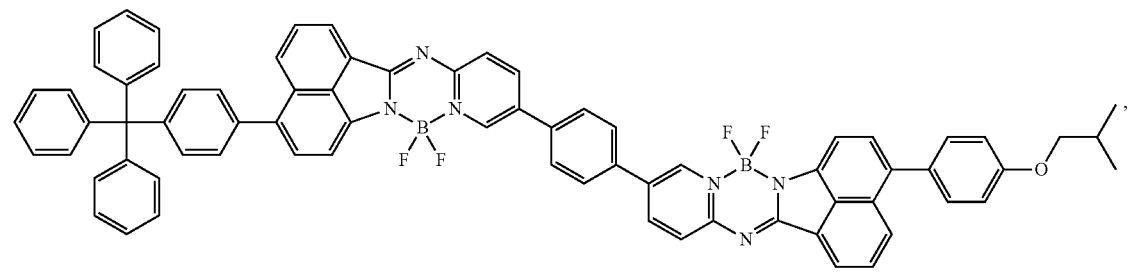
104
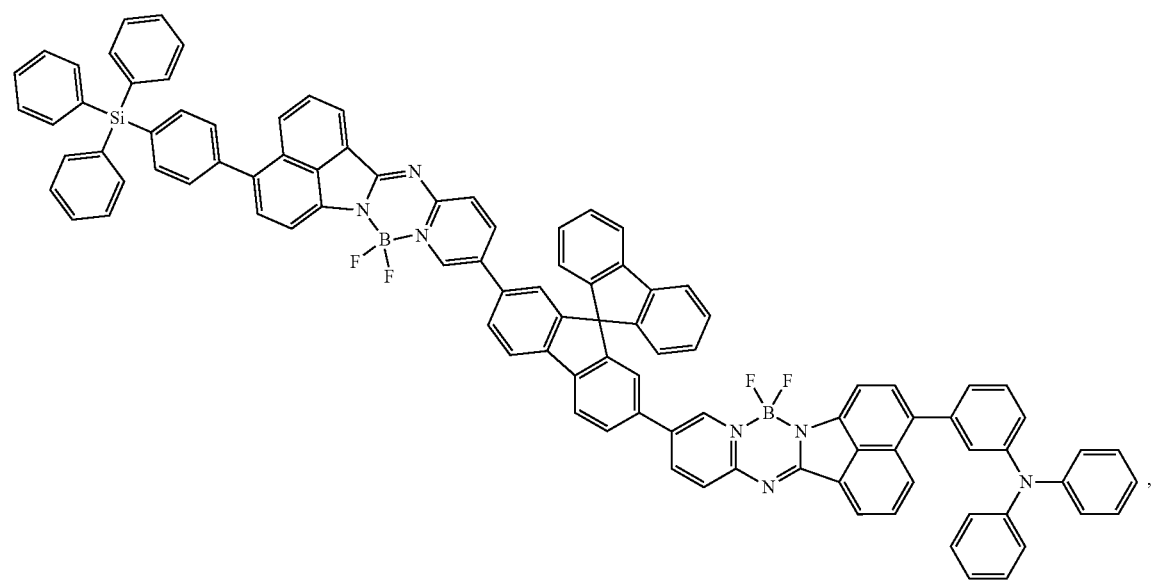
105

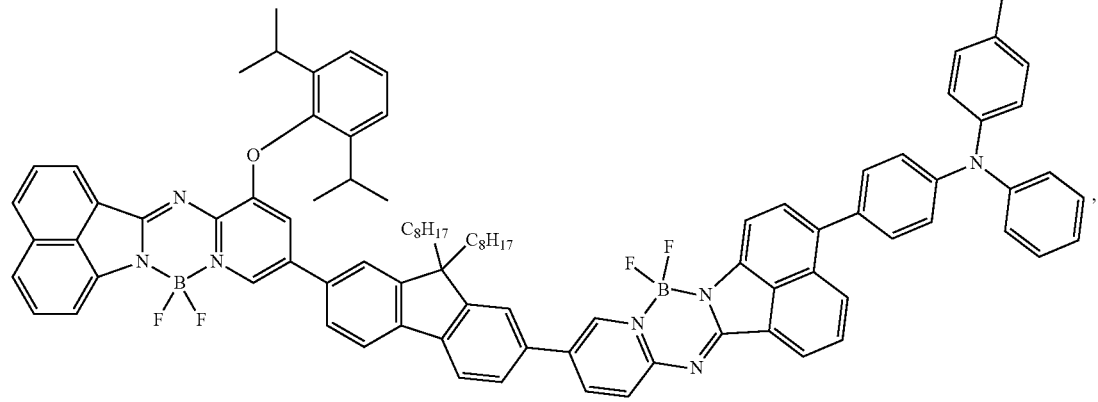
106
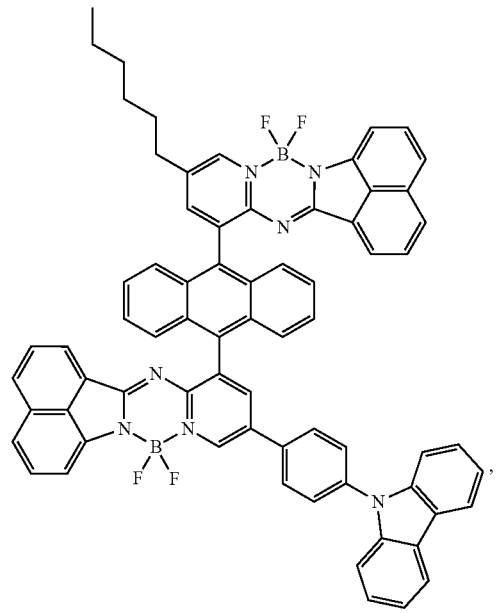
107
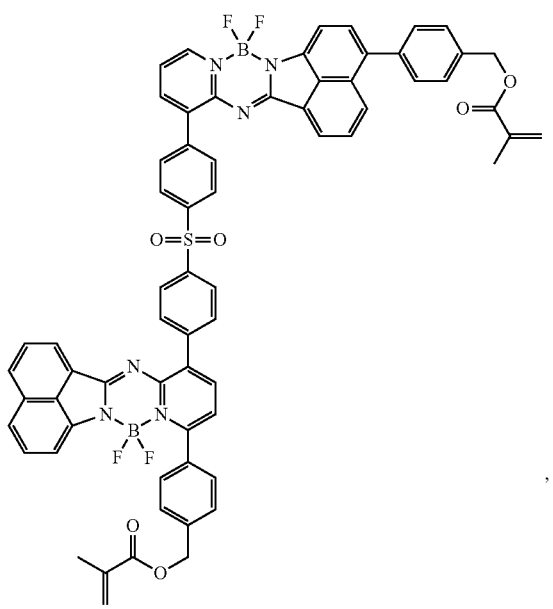
108

-continued
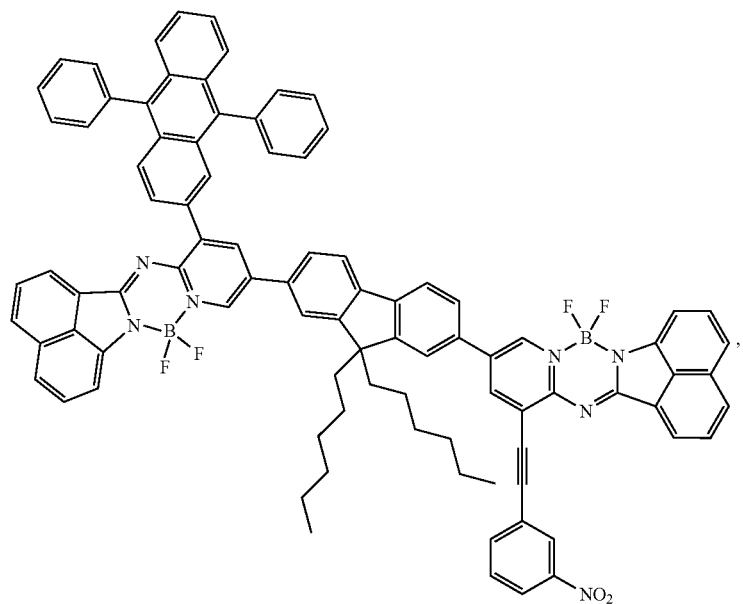
109
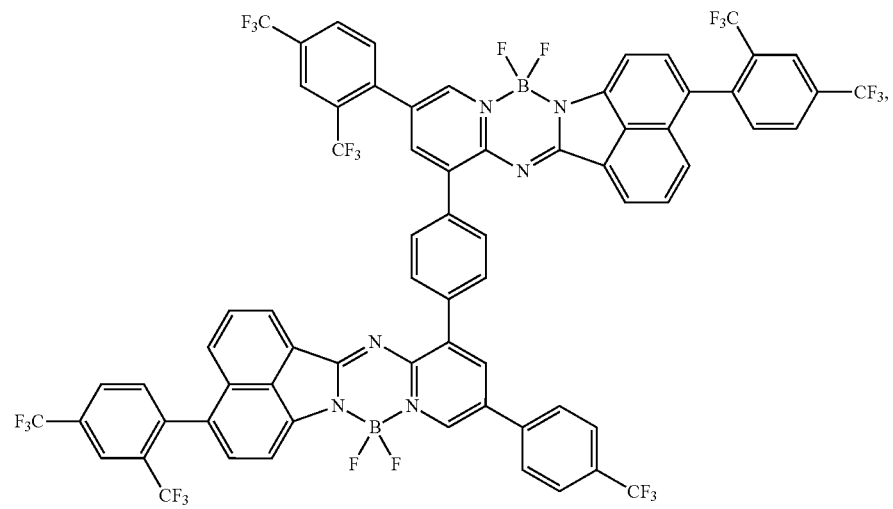
110

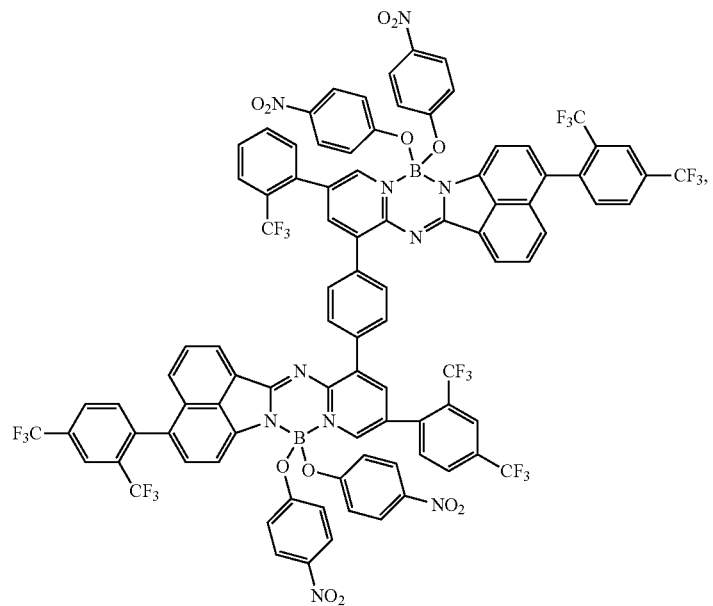
111
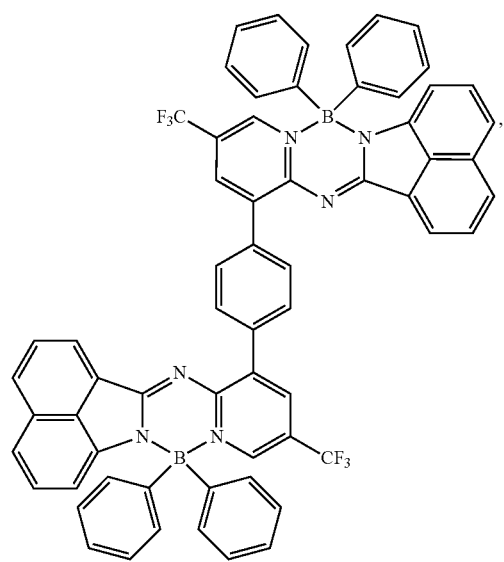
112
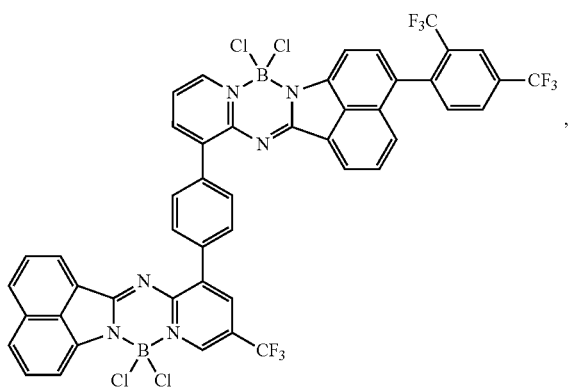
113

-continued
114
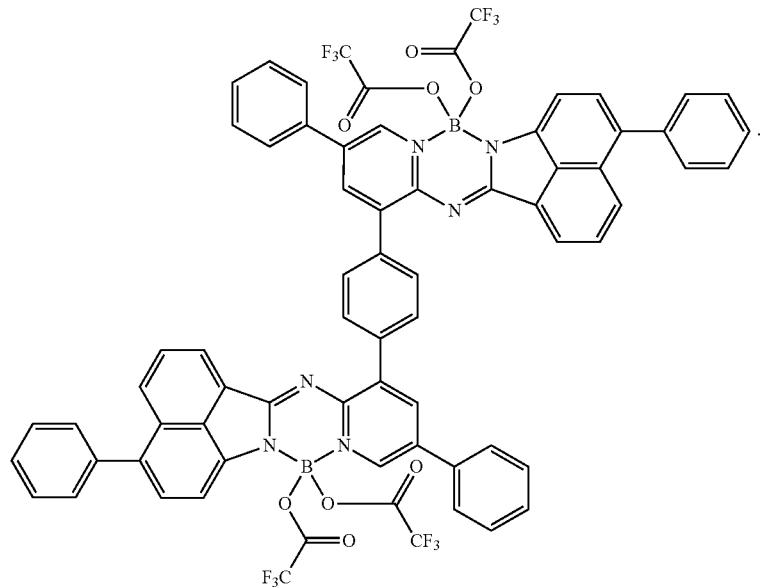
7. A color conversion film comprising:
a resin matrix; and
the compound according to claim 1, which is dispersed in the resin matrix.
8. A backlight unit comprising the color conversion film according to claim 7.
9. A display device comprising the backlight unit according to claim 8.
* * * * *